US011900136B2

(12) United States Patent
Corvi et al.

(10) Patent No.: US 11,900,136 B2
(45) Date of Patent: Feb. 13, 2024

(54) AOT COMPILER FOR A LEGACY GAME

(71) Applicant: Sony Interactive Entertainment LLC, San Mateo, CA (US)

(72) Inventors: Ernesto Corvi, San Mateo, CA (US); George Weising, Culver City, CA (US); David Thach, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 114 days.

(21) Appl. No.: 17/387,030

(22) Filed: Jul. 28, 2021

(65) Prior Publication Data

US 2023/0034289 A1 Feb. 2, 2023

(51) Int. Cl.

| | |
|---|---|
| ***G06F 8/41*** | (2018.01) |
| ***G06F 8/71*** | (2018.01) |
| ***G06F 9/445*** | (2018.01) |
| ***G06F 9/455*** | (2018.01) |
| ***G06F 9/38*** | (2018.01) |
| ***A63F 13/60*** | (2014.01) |

(52) U.S. Cl.

CPC ............ *G06F 9/4552* (2013.01); *A63F 13/60* (2014.09); *A63F 2300/209* (2013.01)

(58) Field of Classification Search

CPC .... G06F 9/4552; G06F 9/3851; G06F 9/3009; G06F 9/4843; G06F 9/461; G06F 9/30185; G06F 9/45504; G06F 9/30174; A63F 13/60; A63F 2300/209

USPC .......................................................... 717/148

See application file for complete search history.

(56) References Cited

U.S. PATENT DOCUMENTS 9,463,386 B1 * 10/2016 Chapman ................ A63F 13/69
10,649,749 B1 * 5/2020 Brooker .............. G06F 11/3624
10,668,378 B2 * 6/2020 Griffais .................. A63F 13/52
2015/0134888 A1 * 5/2015 Kimberly ........... G11C 16/3418 711/103
2016/0048376 A1 * 2/2016 Charupally ............... G06F 8/41 717/158
2018/0126279 A1 * 5/2018 Stelovsky ............... A63F 13/60

(Continued)

OTHER PUBLICATIONS

Title: Optimizing smartphone power consumption through dynamic resolution scaling, author: Songtao He et al., published on 2015.*

(Continued)

*Primary Examiner* — Thuy Dao
(74) *Attorney, Agent, or Firm* — Penilla IP, APC

(57) ABSTRACT

A method for ahead of time (AoT) compiling during a play of a legacy game is provided. The method includes scanning a memory device for an executable code of the legacy game, decoding the executable code, and translating the executable code into a first source code. The method further includes compiling the first source code to output a first compiled code, determining whether a user input during the play of the legacy game is received, and determining whether a fiber for servicing the user input is created. The fiber provides directionality of execution between the first compiled code and a second compiled code. The method includes executing the fiber in response to determining that the fiber for servicing the user input is created. The fiber is executed to generate one or more image frames of the legacy game.

22 Claims, 71 Drawing Sheets

(Block Interpreter)

(56) References Cited

U.S. PATENT DOCUMENTS

| | | | | |
|---|---|---|---|---|
| 2020/0004414 | A1* | 1/2020 | Aghaei | G06F 8/31 |
| 2020/0338446 | A1* | 10/2020 | Edwards | A63F 13/46 |

OTHER PUBLICATIONS

Title: The economics of cloud computing, author: E Bayrak, published on 2011.*

* cited by examiner (Block Interpreter)

(Runtime)

(Components)

(Download gcN to Game Console)

(Display Image Frames)

(Basic blocks)

(Method for Dynamically Compiling Basic Block(s))

(Validation)

(Basic blocks for Same Instruction Integrated)

(Modification of basic block)

(Skip Subroutine)

(Block Insertion)

(Switch Order of Execution)

(Transfer of Basic Blocks to Another Client Device)

(Emulation of Input)

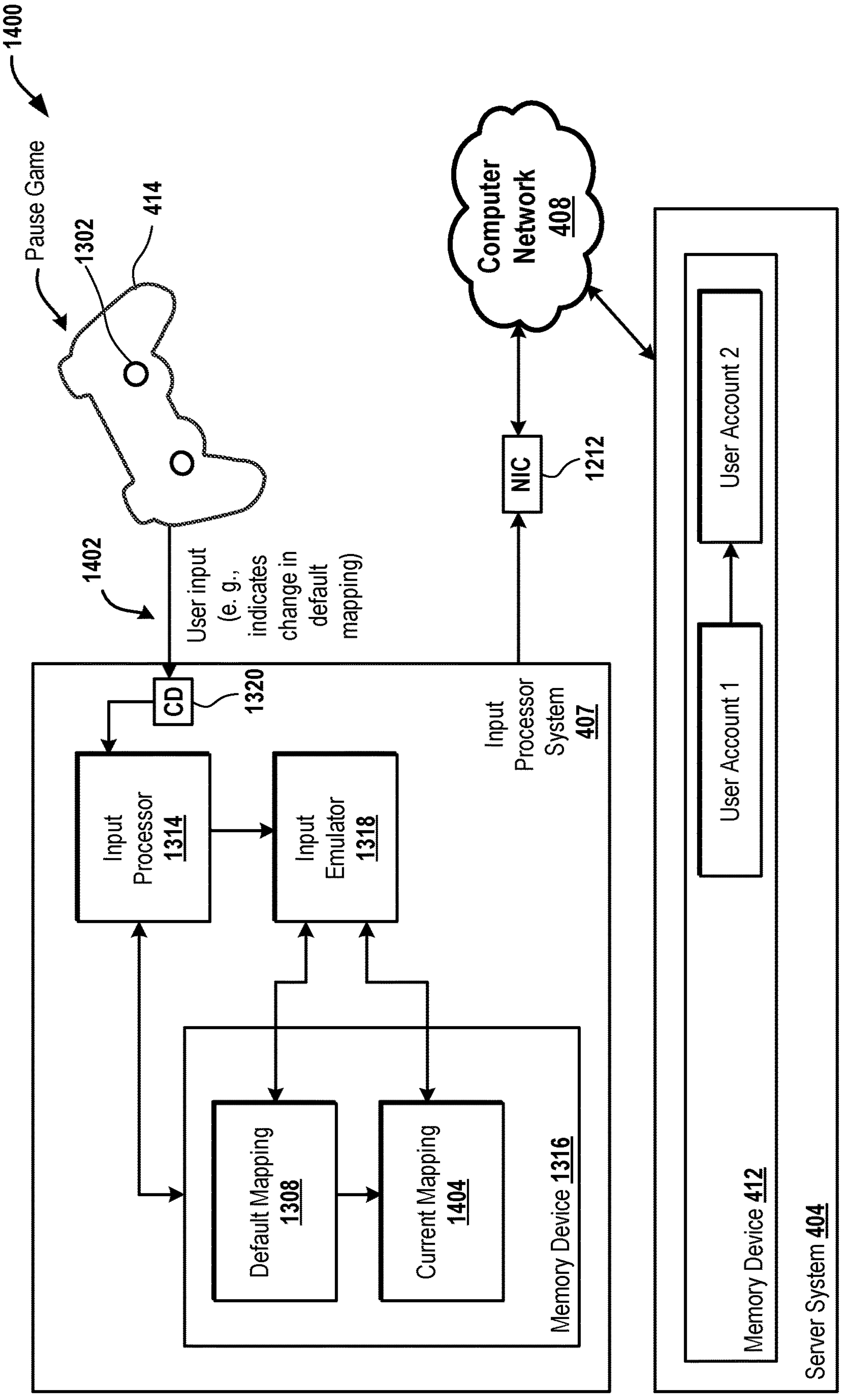
FIG. 14A-1 (Modification of Default Mapping)

Deafult Mapping 1308

| Legacy Input Device Identifiers 1310 | Legacy Input Functionality Identifiers | Updated Input Device Identifiers 1312 | Updated Input Functionality Identifiers |
|---|---|---|---|
| LID1 | LIF1 | UID1 | UIF1 |
| LID2 | LIF2 | UID2 | UIF2 |
| ... | ... | ... | ... |
| LID5 | LIF5 | UID5 | UIF5 |

Current Mapping 1404

| Legacy Input Device Identifiers 1310 | Legacy Input Functionality Identifiers | Updated Input Device Identifiers 1312 | Updated Input Functionality Identifiers |
|---|---|---|---|
| LID1 | LIF1 | UID2 | UIF2 |
| LID2 | LIF2 | UID1 | UIF1 |
| ... | ... | ... | ... |
| LID5 | LIF5 | UID5 | UIF5 |

Memory Device 1316

FIG. 14A-2

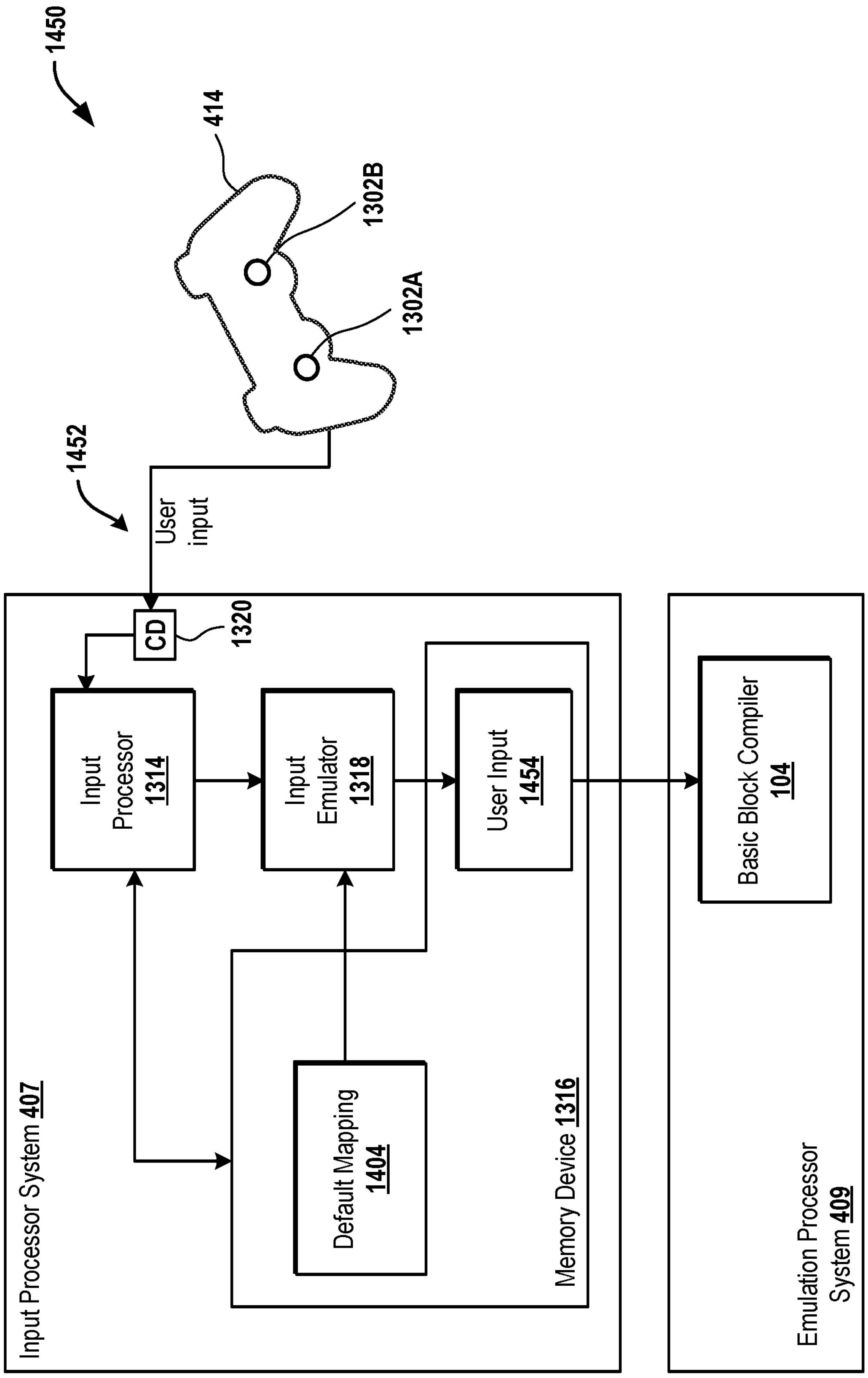
FIG. 14B (Use of Current Mapping)

(Thumbstick Move to Button Select)

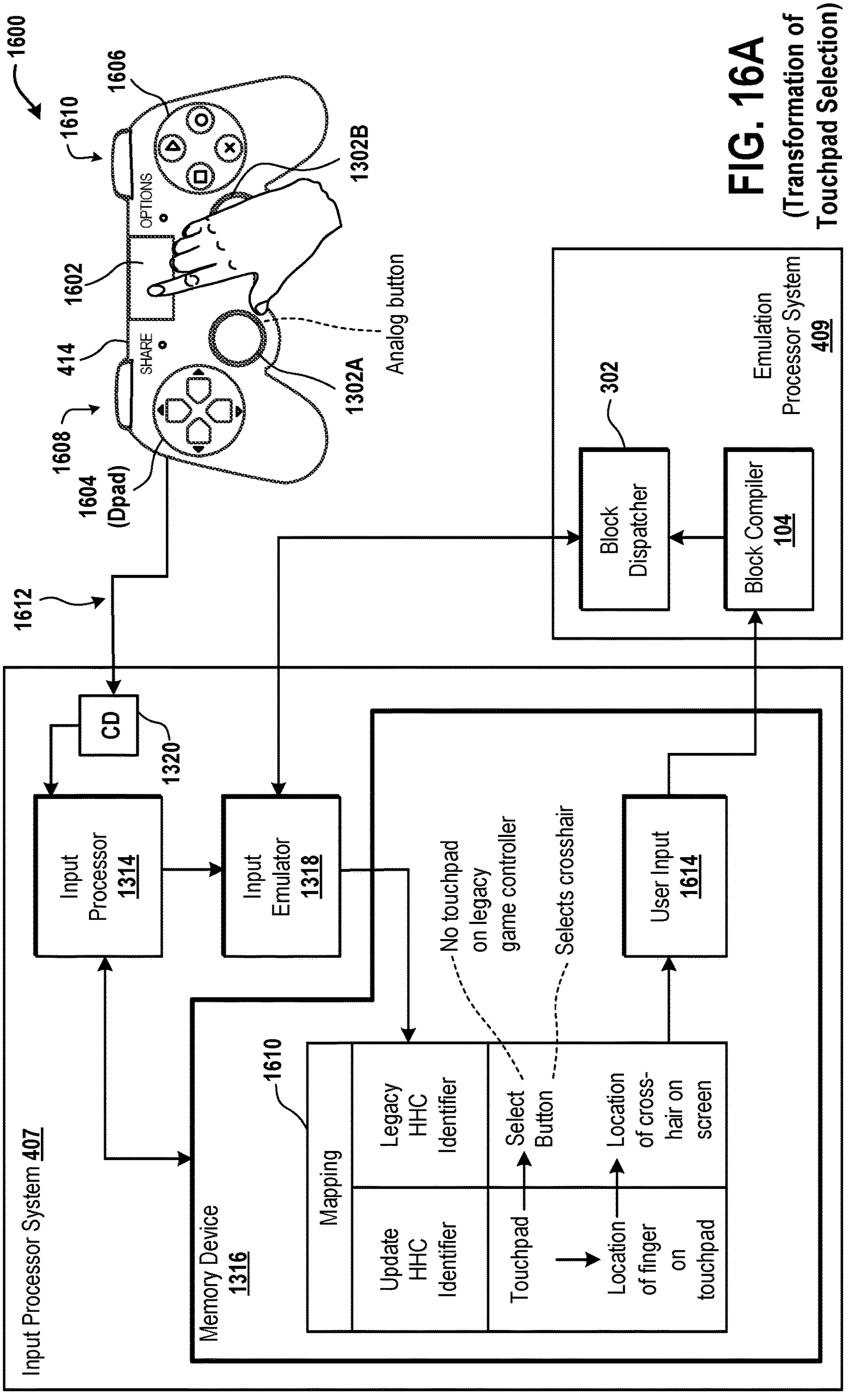
FIG. 16A (Transformation of Touchpad Selection)

(Identification of Controller Type)

(Transfer of Current Mapping)

(Selection of Updated Graphics Parameters)

(Emulation of Legacy Graphics Parameters)

| Legacy Graphical Parameters (Command List for Legacy GPU) | Updated Graphical Parameter (Command List for Updated GPU) |
|---|---|
| Legacy Resolution (e.g., 640x480, 720x480, or 720x586) | Updated Resolution/Rendering (e.g., HD (4 times legacy res.); 4K (8 times legacy res.)) |
| Legacy Line (e.g., resolution line) Thickness | Updated Line Thinkness |
| Legacy Line (e.g., resolution line count) | Updated Line Count |
| | Updated Scanline Thickness |
| | Updated Scanline Count |
| Legacy Anti-aliasing & Video Filler | Updated Anti-aliasing & Video Filtering (e.g., remove noise in image OR remove colors in pixels or remove pixels |
| Legacy Color Scale (e.g., 16bit OR VGA color space) | Updated Color Scale (32-bit Color Space) Greater Color Space |
| Legacy Rendering Rate (fps) | Updated Rendering Rate (fps) (e.g., 60 fps) |
| Legacy Upscale Factor (e.g., increase size of a video signal to fill pixels of a display) For a Standard TV Display | Updated Upscale Factor |
| | Updated Size of Cross-hair |

No. of color pixels/polygons representing a virtual object e.g., blurred virtual object e.g., 30 fps OR 20 fps

FIG. 21C-1

(Selection of Updated Audio Parameters)

(Emulation of Legacy Audio Parameters)

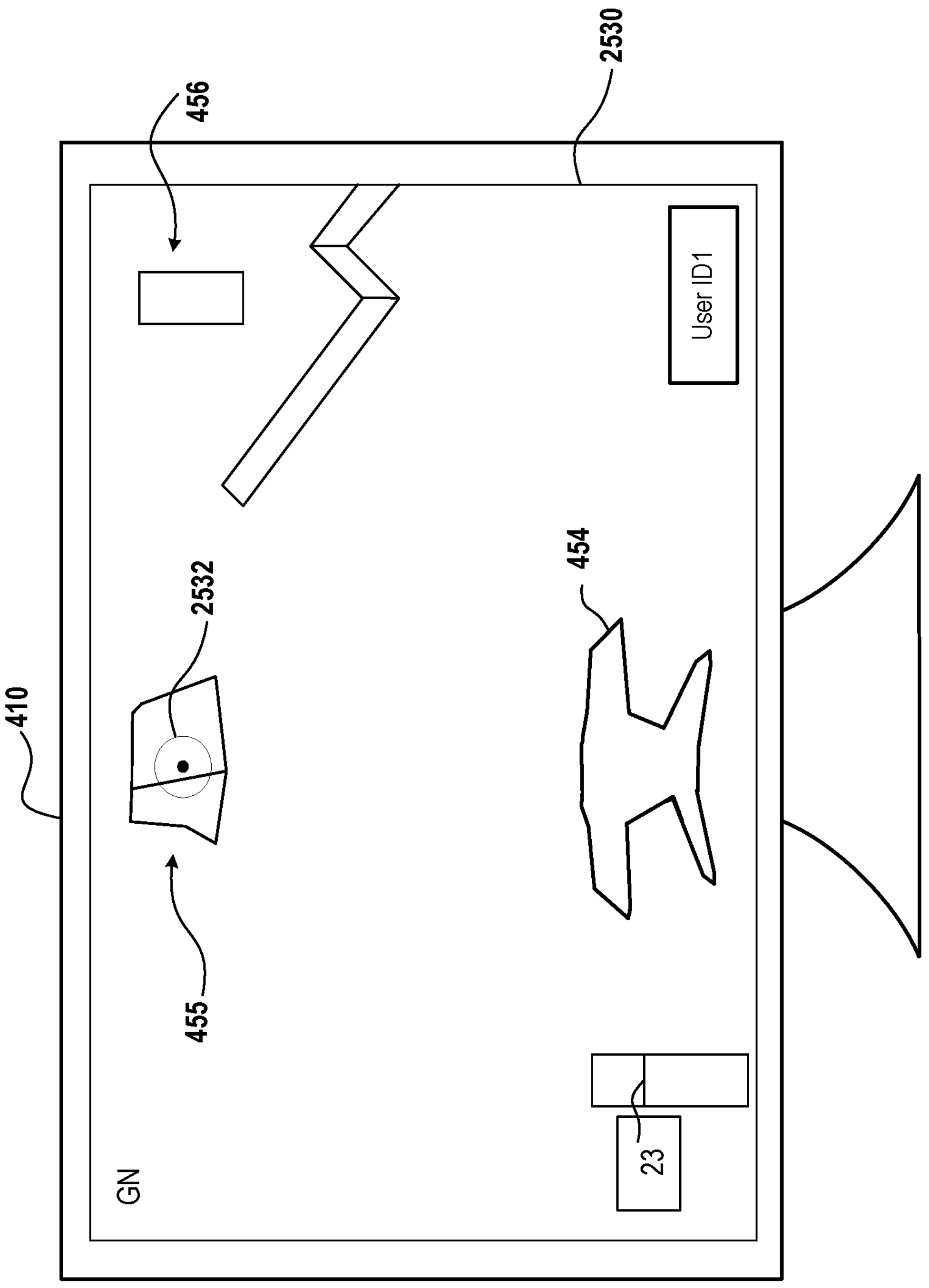
FIG. 25D (Cross-hair)

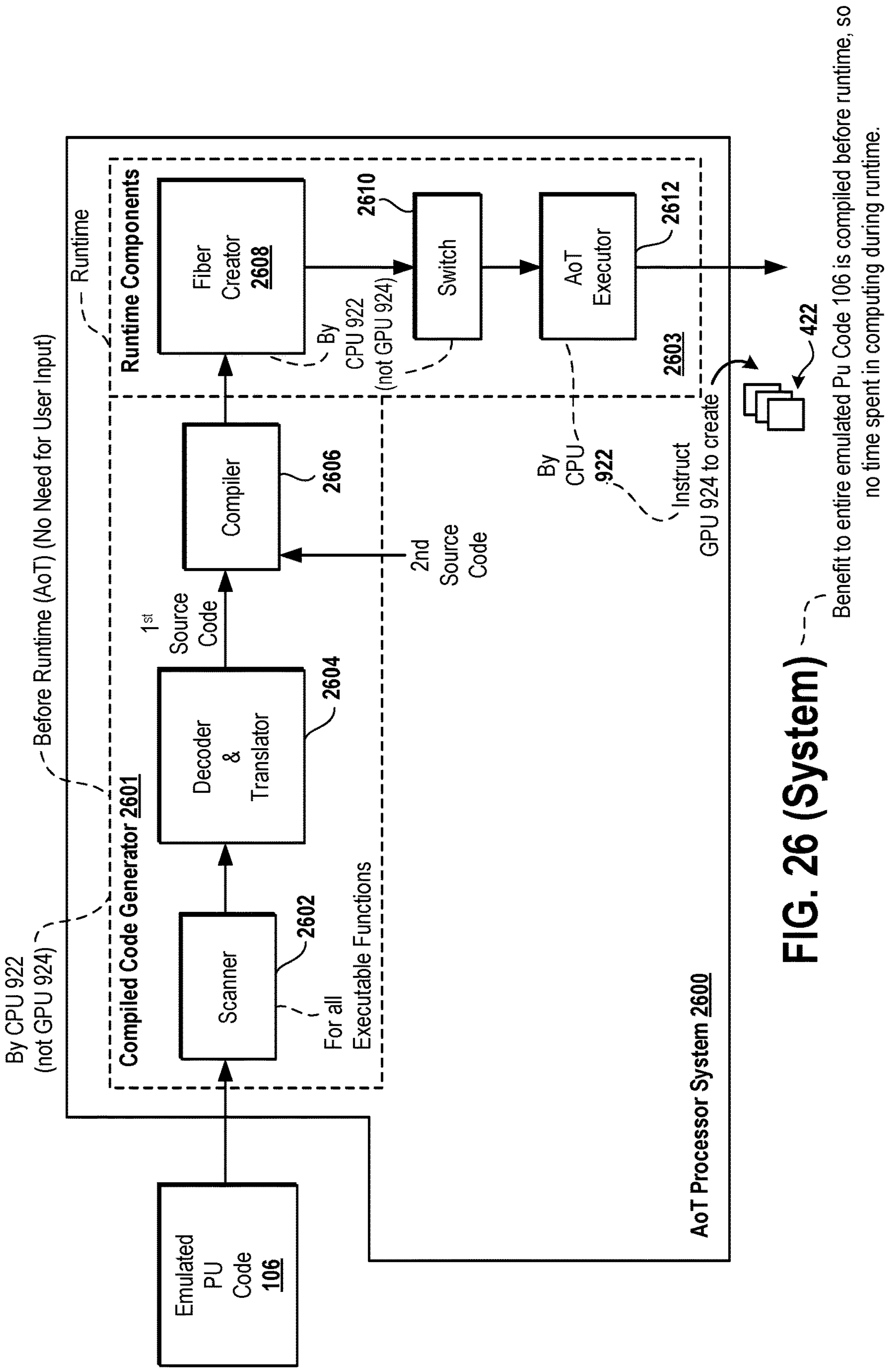
FIG. 26 (System)

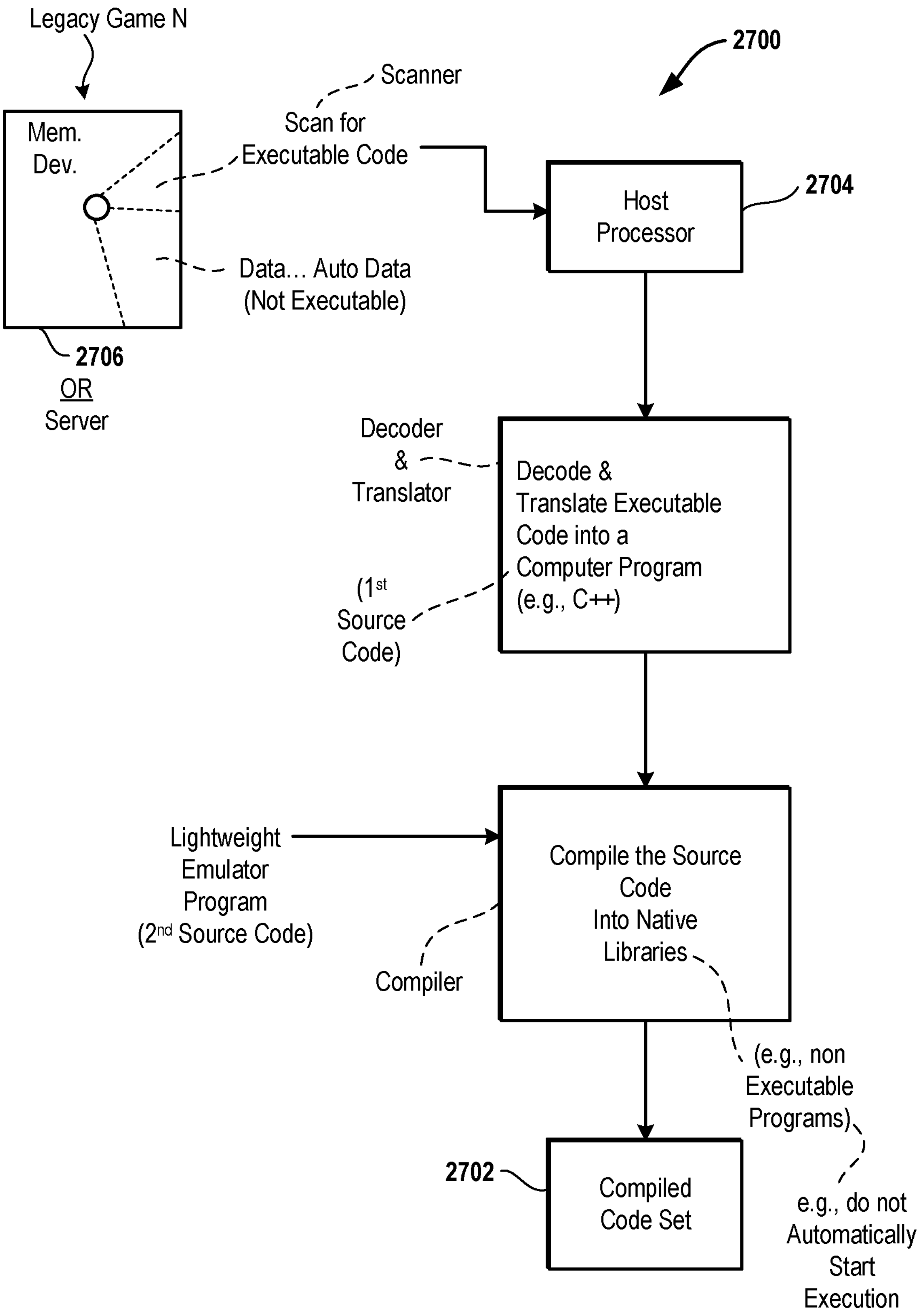
FIG. 27 (AoT Method)

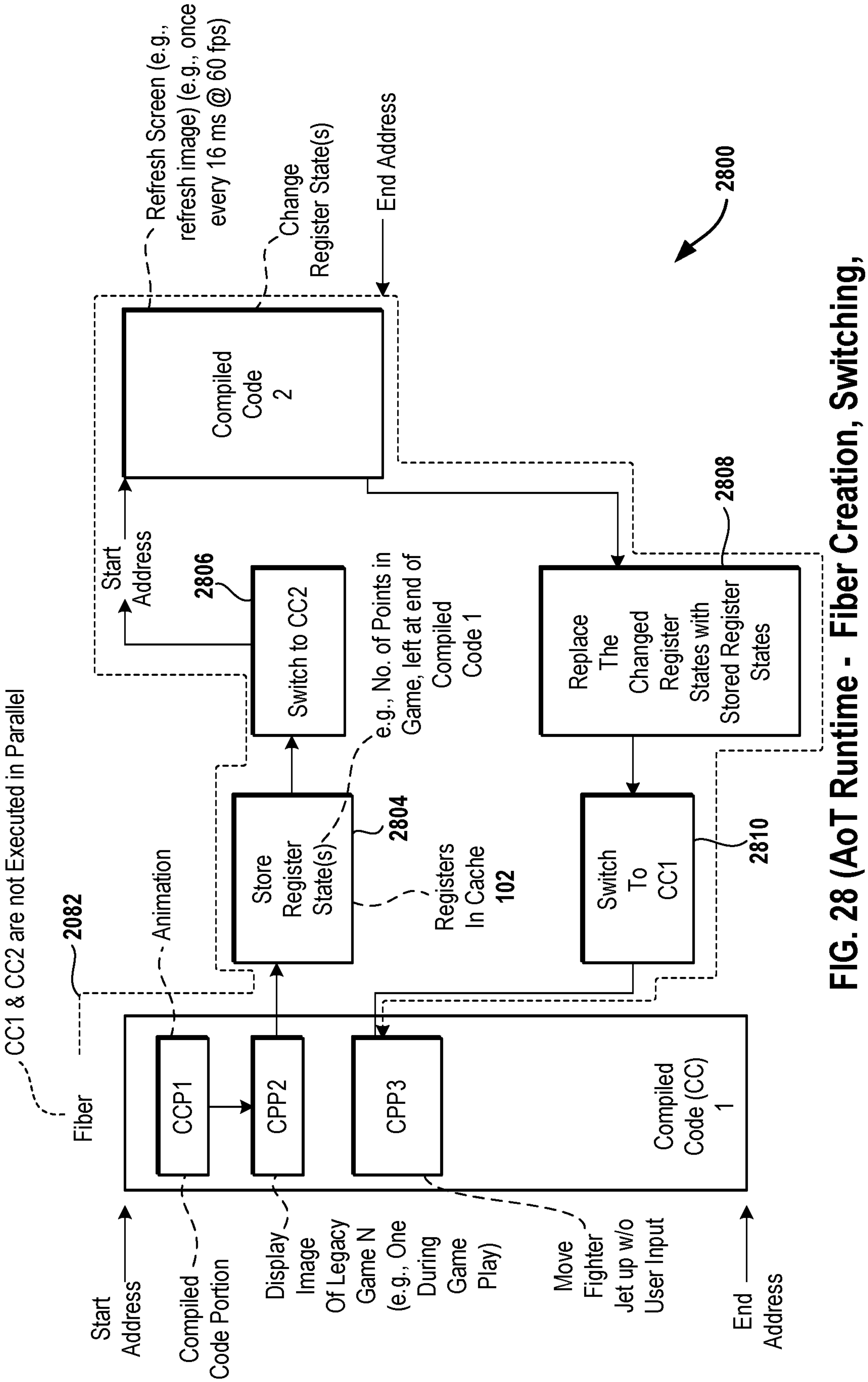
FIG. 28 (AoT Runtime - Fiber Creation, Switching, Execution)

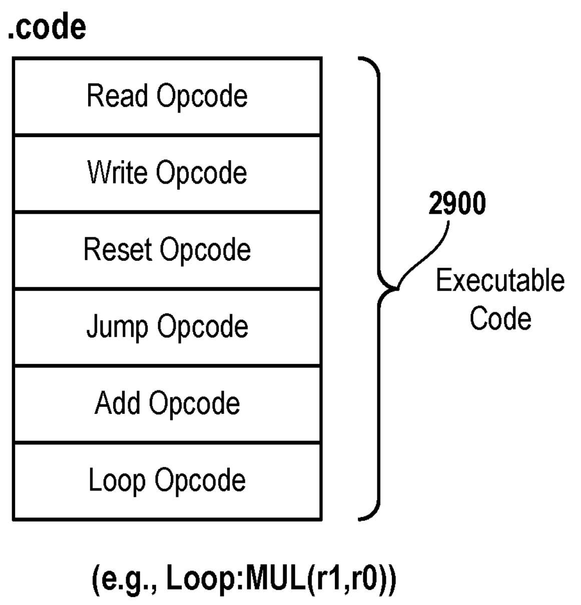
FIG. 29A (Executable Code)
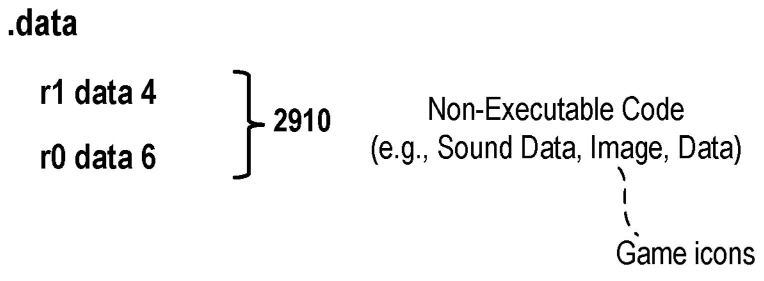
FIG. 29B

3000

```
Main ( )
{ int a;
  int b;
  read (a);
  write (b,1);
 }
```

FIG. 30A (Source Code)

3010

-Source Code for Compiled Code 1

3012

-Source Code for Compiled Code 2 or 3

FIG. 30B (Added Source Code)

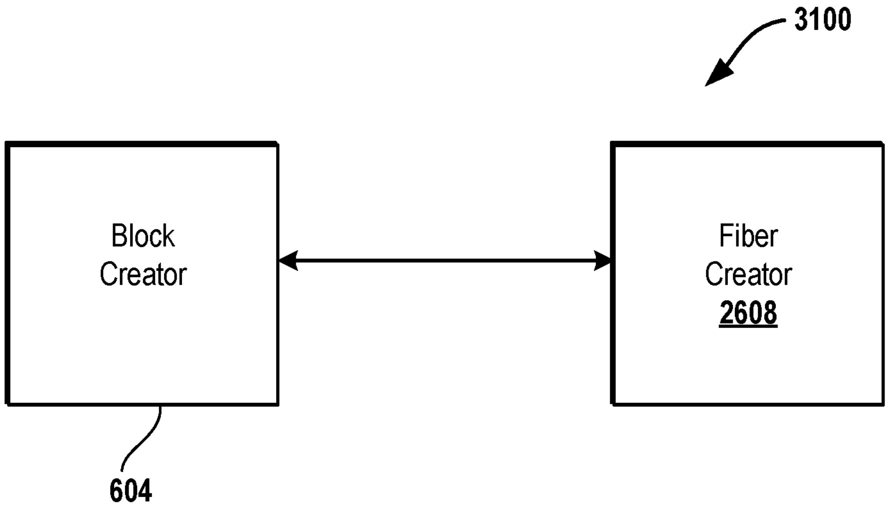
FIG. 31 (System)

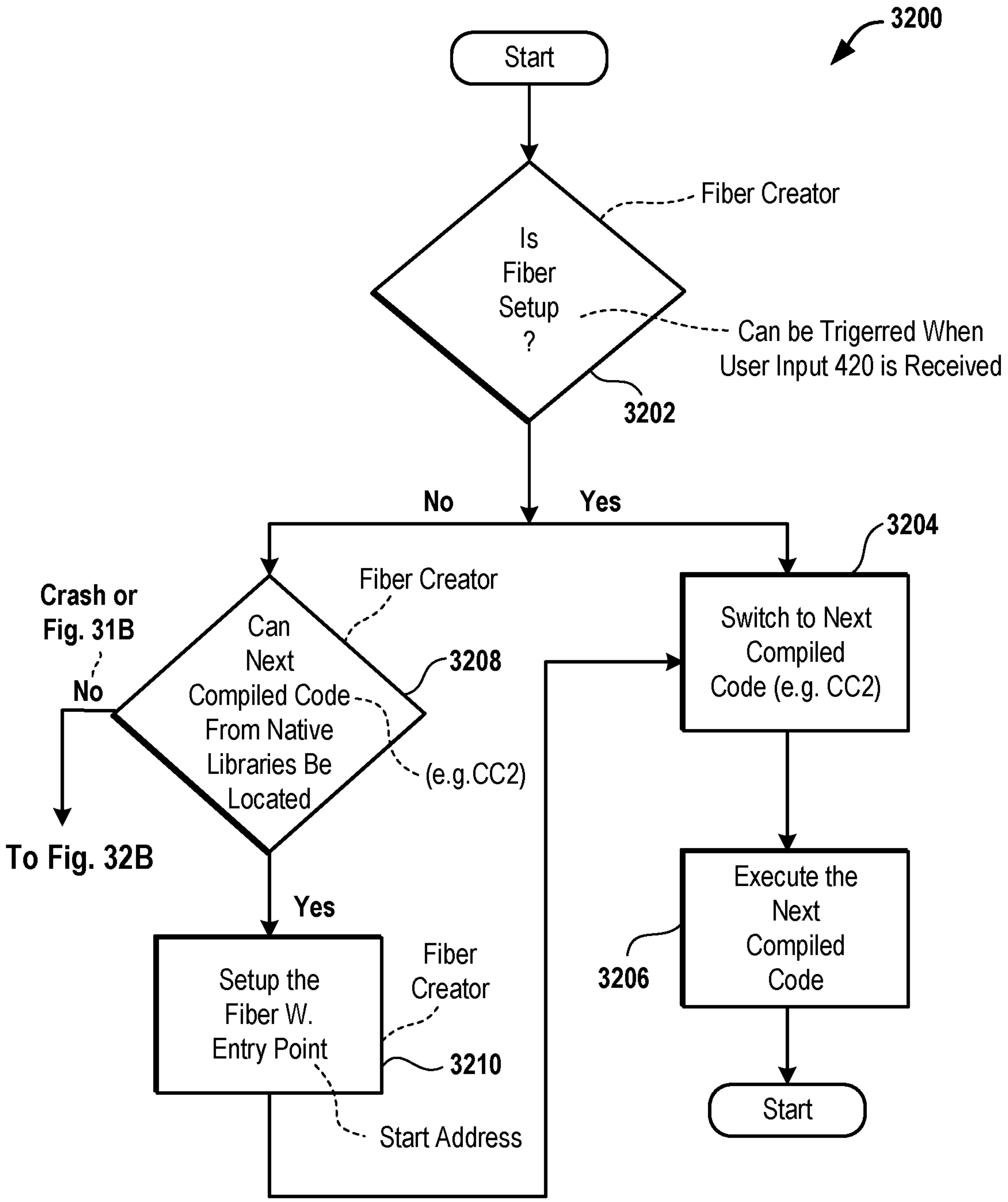
FIG. 32A (AoT Runtime)
By CPU 922

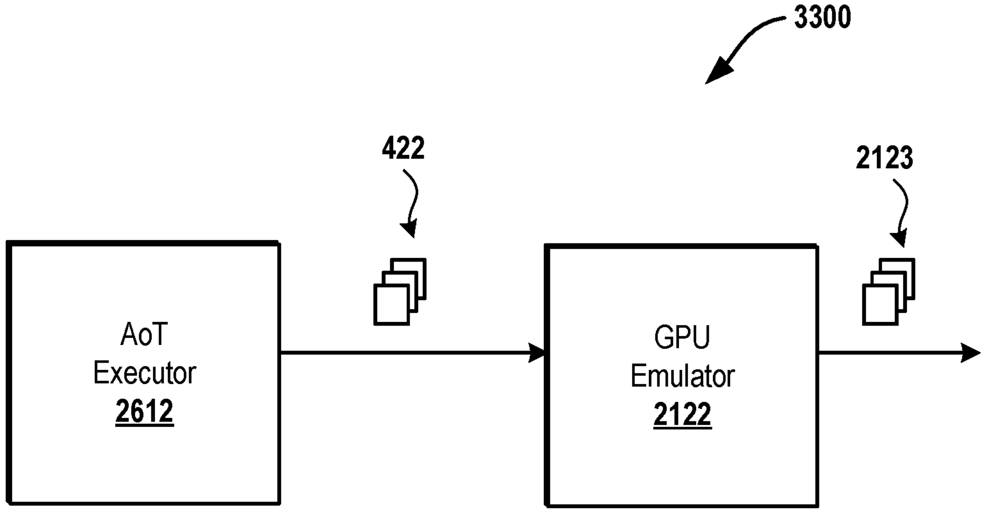
FIG. 33 (System)

AOT COMPILER FOR A LEGACY GAME

FIELD

The present disclosure relates to systems and methods for providing an ahead of time (AoT) compiler for a legacy game.

BACKGROUND

As electronic gaming and networking technologies have become more advanced, the complexity of games has increased accordingly. As a result, there may be more complex storylines, game play objectives, missions and tasks, capabilities associated with game play avatars, and scoring. Scoring may occur and be weighted in various ways and likewise be determined in various categories or on an individual or team basis.

The significance of the aforementioned problems only increases as the complexity of electronic games increases. As such, some players may wish to play older games, which are less complicated.

It is in this context that embodiments of the invention arise.

SUMMARY

Embodiments of the present disclosure provide systems and methods for providing an ahead of time (AoT) compiler for a legacy game.

In one embodiment, a method for AoT compiling during a play of a legacy game is provided. The method includes scanning a memory device for an executable code of the legacy game, decoding the executable code, and translating the executable code into a first source code. The method further includes compiling the first source code to output a first compiled code, determining whether a user input during the play of the legacy game is received, and determining whether a fiber for servicing the user input is created. The fiber provides directionality of execution between the first compiled code and a second compiled code. The method includes executing the fiber in response to determining that the fiber for servicing the user input is created. The fiber is executed to generate one or more image frames of the legacy game.

In an embodiment, a system for AoT compiling during a play of a legacy game is described. The system includes a first computing device. The first computing device includes a scanner that scans a memory device for an executable code of the legacy game. The first computing device further includes a decoder that decodes the executable code, a translator that translates the executable code into a first source code, and a compiler that compiles the first source code to output a first compiled code. The system further includes a second computing device that is coupled to the first computing device. The second computing device determines whether a user input during the play of the legacy game is received and determines whether a fiber for servicing the user input is created. The fiber provides directionality of execution between the first compiled code and a second compiled code. The second computing device executes the fiber when it is determined that the fiber for servicing the user input is created. The fiber is executed to generate one or more image frames of the legacy game Some advantages of the herein described systems and methods for converting a legacy code of the legacy game into an updated code include allowing functionality of the legacy code to be executed by an updated machine. Without the conversion, due to security issues, the functionality of the legacy code cannot be executed by the updated machine. For example, there is no permission to execute the legacy code from the updated machine and write data generated upon execution of the legacy code to registers in the updated machine. As such, by providing the conversion, the execution of the functionality of the legacy code by the updated machine is facilitated.

Further advantages of the herein described systems and methods include saving time of execution. As an example, two or more instructions, such as a routine and a subroutine or two similar instructions, of the legacy code are combined into one basic block of the updated code. As such, execution of the updated code is faster compared to execution of the legacy code.

Additional advantages of the herein described systems and methods for converting the legacy code into the updated code include recompiling one or more additional basic blocks of the updated code upon determining that one or more basic blocks of the updated code are invalid. For example, when the one or more basic blocks are marked as invalid, it is determined whether the one or more basic blocks are actually invalid. Upon determining so, instead of executing the one or more basic blocks, the one or more additional basic blocks are compiled and executed. The one or more additional basic blocks correspond to the same game to which the one or more basic blocks correspond.

Yet further advantages of the herein described systems and methods for converting the legacy code into the updated code include that all of the basic blocks do not need to be checked for invalidity. For example, only those basic blocks that are marked as invalid after compiling the basic blocks are checked for validity. This reduces latency in displaying a virtual environment from the one or more basic blocks. Also, processing power used for checking all of the basic blocks for invalidity is not needed.

Also, advantages of the herein described systems and methods for converting the legacy code into the updated code include saving processing time and processing power when the updated code for a game is already compiled. Once the updated code is generated at a server or at a game console, the updated code need not be recompiled. Rather, the updated code can be transferred from the server or the game console to another game console. As such, processing time and processing power in regenerating the updated code at the other game console is saved.

Additional advantages of the herein described systems and methods for emulation of user input during a play of a legacy game include using an updated hand-held controller to play the legacy game. An input emulator is used to convert a user input received from the updated hand-held controller into a user input for a legacy hand-held controller. The conversion of the user input received from the updated hand-held controller facilitates a play of the legacy game by using the updated hand-held controller.

Further advantages of the herein described systems and methods for emulation of legacy graphical parameters during a play of a legacy game include converting the legacy graphical parameters into updated graphical parameters to play the legacy game. A graphical processing unit (GPU) emulator is used to convert the legacy graphical parameters into the updated graphical parameters. The conversion of the legacy graphical parameters facilitates a play of the legacy game with high resolution graphics.

Also, advantages of the herein described systems and methods for emulation of legacy audio parameters during a play of a legacy game include converting the legacy audio parameters into updated audio parameters to play the legacy game. An audio processing unit (APU) emulator is used to convert the legacy audio parameters into the updated audio parameters. The conversion of the legacy audio parameters facilitates a play of the legacy game with high quality sound.

Advantages of the herein described systems and methods for providing the AoT compiler for the legacy game include saving time during execution of the legacy game. The AoT compiler generates one or more compiled codes ahead of time, which is before receiving a user input to initiate play of the legacy game. When the user input is received, a fiber is created to provide directionality of execution of the compiled codes and the compiled codes are executed as per the directionality.

Further advantages of the herein described systems and methods include using the one or more basic blocks when the compiled codes are not available. In case the compiled codes are not available for servicing a user input, it is determined whether one or more blocks of code for servicing the user input are cached. The one or more blocks of code are then executed to service the user input.

Additional advantages of the herein described systems and methods for providing the AoT compiler for the legacy game include allowing functionality of the legacy code to be executed by the updated machine. Without the compiled codes, due to security issues, the functionality of the legacy code cannot be executed by the updated machine. For example, there is no permission to execute the legacy code from the updated machine and write data generated upon execution of the legacy code to registers in the updated machine. As such, by providing the compiled codes, the execution of the functionality of the legacy code by the updated machine is facilitated.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 14A-1 is a diagram of an embodiment of a system to illustrate a change from a default mapping to a current mapping.

FIG. 14A-2 is a diagram of an embodiment of a memory device to illustrate the default mapping and a current mapping.

FIG. 14B is a diagram of an embodiment of a system to illustrate use of the current mapping instead of the default mapping during a play of the legacy game.

FIG. 16A is a diagram of an embodiment of a system to illustrate generation of a virtual image of a cross-hair when a touchpad is selected by a user.

FIG. 21B-1 is a diagram of an embodiment of a system to illustrate emulation of the one or more legacy graphical parameters into the one or more of the updated graphical parameters.

FIG. 21B-2 is a diagram of an embodiment of a system to illustrate generation of updated graphical frames from legacy graphical frames output from the block dispatcher.

FIG. 21C-1 is an embodiment of a listing of legacy and updated graphical parameters, and a correspondence between the legacy and updated graphical parameters.

FIG. 21C-2 is a diagram to illustrate an embodiment of a method executed by a graphical processing unit (GPU) emulator for changing a resolution of a virtual object during a rendering operation.

FIG. 22B-1 is a diagram of an embodiment of a system to illustrate emulation of the one or more legacy audio parameters into the one or more of the updated audio parameters.

FIG. 22B-2 is a diagram of an embodiment of a system to illustrate generation of updated audio frames from legacy audio frames output from the block dispatcher.

FIG. 22C-1 is a diagram to illustrate an embodiment of a method for generating an updated audio frame based on a legacy audio parameter.

FIG. 22C-2 is a diagram of an embodiment of a system to illustrate processing of audio frames of the legacy game by a client device.

FIG. 22C-3 is a diagram of an embodiment of a system to illustrate synchronization of display of images based on multiple image frames with output of sound based on multiple audio frames for multiple virtual scenes of the legacy game.

FIG. 25D is a diagram of an embodiment of the display device for displaying a virtual environment in which a cross-hair is displayed.

FIG. 26 is a diagram of an embodiment of an ahead-of-time (AoT) processor system.

FIG. 27 is a diagram of an embodiment of a system to illustrate generation of first and second compiled codes.

FIG. 28 is a diagram of an embodiment of a system to illustrate a fiber.

FIG. 29A is a diagram of an embodiment of an executable code of the legacy game to illustrate executable functions of the legacy game.

FIG. 29B is a diagram of an embodiment of data, which is identified by a host processor of FIG. 27 as not being executable.

FIG. 30A illustrates an embodiment of a source code.

FIG. 30B illustrates an embodiment of a source code and another source code.

FIG. 31 is a diagram of an embodiment of a system to illustrate a coupling between a block creator and a fiber creator.

FIG. 32A is a flowchart of an embodiment of a method that is executed by the block creator and the fiber creator of FIG. 31.

FIG. 33 is a diagram of an embodiment of a system to illustrate a coupling between an AoT executor and the GPU emulator.

DETAILED DESCRIPTION

Systems and methods for providing an ahead of time (AoT) compiler for a legacy game are described. It should be noted that various embodiments of the present disclosure are practiced without some or all of these specific details. In other instances, well known process operations have not been described in detail in order not to unnecessarily obscure various embodiments of the present disclosure.

Figure 1:
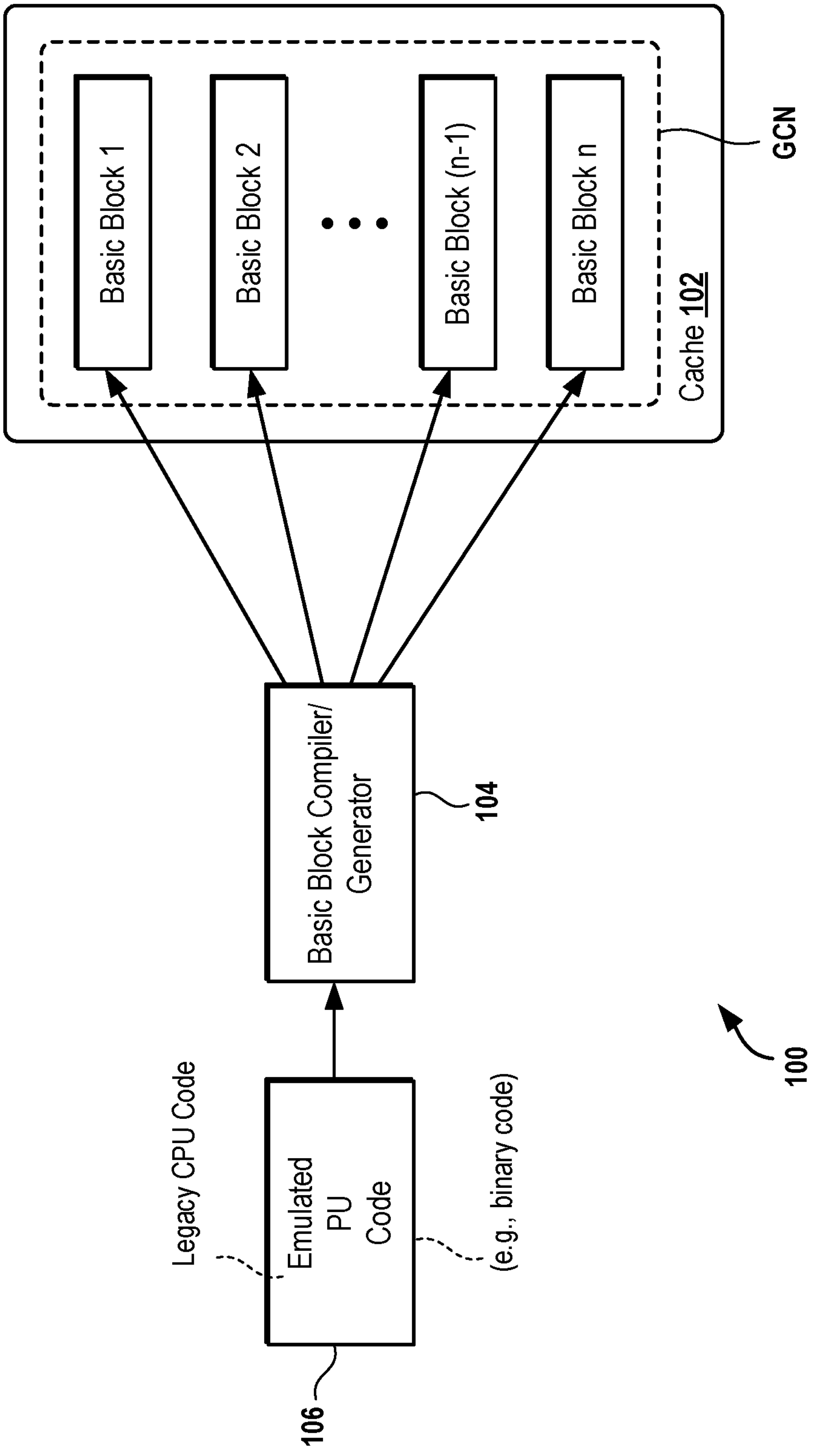
FIG. 1 is a block diagram to illustrate an embodiment of a system for generation of basic blocks of an updated code.

FIG. 1 is a block diagram to illustrate an embodiment of a system 100 for generation of basic blocks 1 through n of an updated code, where n is a positive integer. The system 100 includes a cache 102, a basic block compiler 104, and an emulated processing unit (PU) code 106 of a legacy game N having a game title GN, where N is a positive integer. As an example, a cache, as used herein, is a hardware or software component that stores data so that future requests for the data can be served faster. A cache hit occurs when requested data can be found in the cache, while a cache miss occurs when it cannot. The cache hits are served by reading data from the cache, which is faster than re-computing a result or reading from a slower data store, such as a memory device, thus, the more requests that can be served from the cache, the faster a system performs. To illustrate, a cache is a group of registers, which can be accessed faster, such as by 10 to 100 times, compared to a main memory device.

As an example, a cache has a lower number of memory addresses than the main memory device. In the example, a processor first determines whether data used in an operation is stored at a memory address in the cache and if not the processor accesses memory addresses in the main memory device to look for the data.

As an example, a basic block compiler, as used herein, is a computer program that converts the emulated PU code 106 code into a game code GCN, which is an example of the updated code. The game code GCN represents functionality of the legacy game N. The computer program is executed by one or more processors of an emulation processor system. The game code GCN is sometimes referred to herein as an intermediate code. As an example, the intermediate code is neither a source code nor a machine code. To illustrate, the intermediate code includes basic blocks that are not specific to an architecture of a central processing unit (CPU) or an architecture of a graphical processing unit (GPU) or an architecture of an audio processing unit (APU) of an updated machine, examples of which are provide below. In the illustration, the intermediate code includes basic blocks that can be executed by a CPU or a GPU of the updated machine, examples of which include a game console, a desktop computer, a laptop computer, a tablet, a smartphone, and a smart television. As an example, the source code is written using a human readable programming language, which can be plain text. As an example, a basic block compiler, as used herein, is implemented using hardware or software or a combination thereof. To illustrate, functionality of the basic block compiler is implemented using a controller or a programmable logic device (PLD) or an application specific integrated circuit (ASIC).

Examples of a controller, as used herein, include a processor and a memory device. The processor is coupled to the memory device. As used herein, as an example, a processor is a microprocessor, or a CPU, or a GPU, or a microcontroller, or an ASIC, or a PLD. Examples of a memory device, as used herein, include a random access memory (RAM) and a read-only memory (ROM). To illustrate, the memory device is a flash memory device, or a hard disk, or a solid-state storage device, or a redundant array of independent disks (RAID), or a combination thereof.

An example of the emulated PU code 106 is a machine code that directs a processor, such as a CPU or a GPU or an APU, of a legacy machine to perform an operation. For example, the emulated PU code 106 includes a sequence of instructions that instruct the CPU of the legacy machine to perform a specific operation, such as load, store, jump, or an arithmetic logic unit (ALU) operation on data stored within the cache 102. As another example, the emulated PU code 106 is a binary code that includes a series of ones and zeros. As another example, the emulated PU code 106 includes a sequence of instructions that instruct the GPU of the legacy machine to perform a specific operation, such as load, store, jump, or an ALU operation on data stored within the cache 102. The GPU of the legacy machine performs an operation on a virtual object to assign a parameter, such as color, or intensity, or shade, or texture, or a combination thereof, to the virtual object. Examples of the virtual object include a virtual vehicle, a virtual animal, a virtual game character, a virtual stationary object, a virtual building, etc. It should be noted that color, intensity, shade, texture, or a combination thereof are examples of a legacy graphical parameter.

As yet another example, the emulated PU code 106 includes a sequence of instructions that instruct the APU of the legacy machine to generate one or more legacy audio parameters, such as reverb, which is an amount of echo that is output synchronous to a display of a virtual scene of the legacy game N. Another example of the one or more legacy audio parameters includes a sampling rate based on which a sound can be output in synchronization with a virtual scene of the legacy game N. Yet another example of the one or more legacy audio parameters include that a sound is output in synchronization with a virtual object of the legacy game N as stereo only.

The emulated PU code 106 is specific or unique to an architecture of the CPU or the GPU of the legacy machine. For example, the emulated PU code 106 cannot be executed by a CPU or a GPU of the updated machine. As another example, the emulated PU code 106 is executable on the legacy machine but cannot be executed on the updated machine.

As an example, the emulated PU code 106 is executed by the processor of the legacy machine to perform operations in the legacy game N. To illustrate, the emulated PU code 106 is executed to play legacy games on the legacy machine. Examples of the legacy games include video games, such as, a fighter jet game, a dance lesson game, an adventure game, and an action game. To illustrate, the legacy games are not being updated by a game developer. To further illustrate, there are no current versions of the legacy games. As another further illustration, the legacy games are created years before the creation of a current game.

The basic block compiler 104 accesses the emulated PU code 106 for the legacy game N and converts the emulated PU code 106 into one or more basic blocks, such as the basic blocks 1 through n. As an example, each basic block 1 through n has a start identifier and an end identifier to distinguish one basic block from another. The basic block compiler 104 stores the basic blocks 1 through n in the cache 102. When the basic blocks 1 through n are executed, the legacy game N is emulated.

Figure 2:
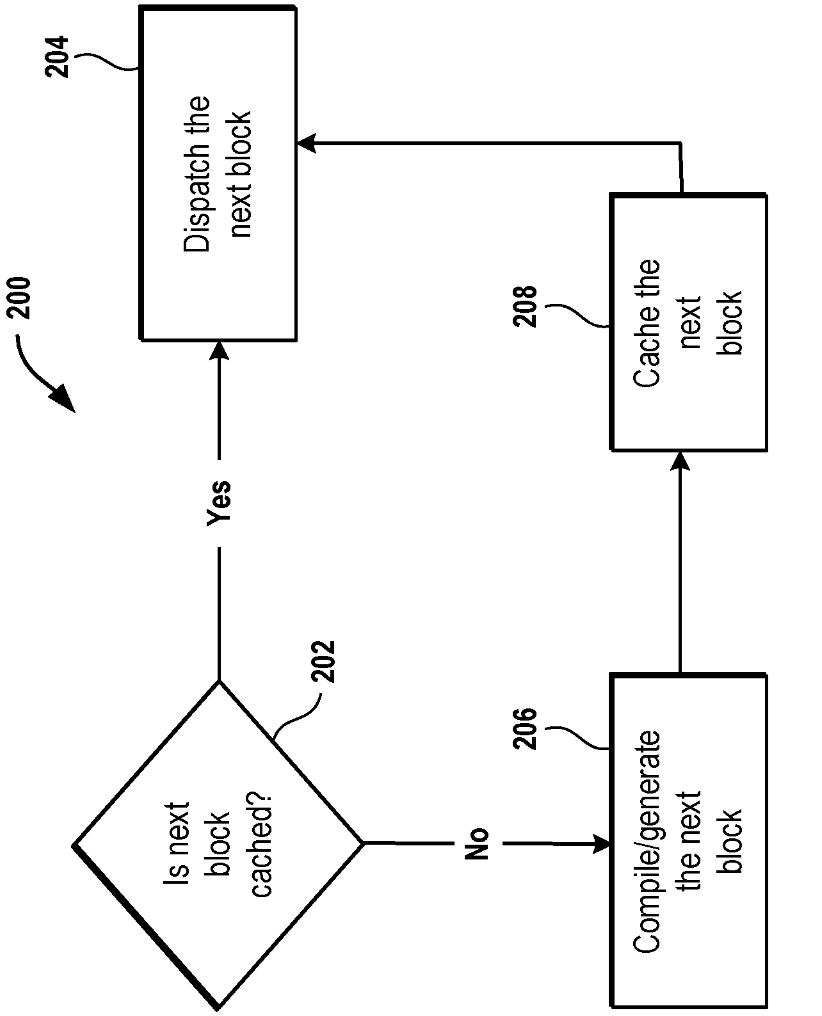
FIG. 2 is a flowchart to illustrate an embodiment of a method for compiling and executing a basic block of a game code.

FIG. 2 is a flowchart to illustrate an embodiment of a method 200 for compiling and dispatching a basic block of the game code GCN. The method 200 is executed by one or more processors of the updated machine. The method 200 includes an operation 202 of determining whether there is a cache hit, e.g., whether a basic block is stored in the cache 102. For example, the operation 202 is performed or triggered when a user input during a play of a legacy game is received. To illustrate, the user input is received to change a position or an orientation or a combination thereof of a virtual object of the legacy game N. In the illustration, upon determining that the user input is received, it is determined whether a basic block, such as one of the basic blocks 1 through n, is stored in the cache 102 (FIG. 1). In the illustration, the basic block is to be executed to change the position or the orientation or the combination thereof of the virtual object.

As another illustration, the operation 202 is performed when a user input to change the parameter, such as a look and feel, of a virtual object of a legacy game is received. In the illustration, upon determining that the user input is received, it is determined whether a basic block, such as one of the basic blocks 1 through n, is stored in the cache 102. In the illustration, the basic block is to be executed to generate or change the parameter of the virtual object. It should be noted that the look and feel is an example of the legacy graphical parameter.

As yet another illustration, the operation 202 is performed when a user input to change the legacy audio parameter based on which sound is output. In the illustration, when the user input is received, it is determined whether a basic block, such as one of the basic blocks 1 through n, is stored in the cache 102. In the illustration, the basic block is to be executed to generate or change the legacy audio parameter that is to be output as sound with a display of a virtual scene of the legacy game N.

In response to determining that the basic block is cached, in an operation 204 of the method 200, the basic block is dispatched. For example, the basic block is executed or run in the operation 204. To illustrate, the basic block is run by the CPU of the updated machine to move a virtual object from one position to another or from one orientation to another or a combination thereof. As another illustration, the basic block is executed by the GPU of the updated machine to generate the parameter and assign the parameter to a portion of the virtual object. An example of a portion of a virtual object includes a pixel of virtual object or a triangular portion of the virtual object or a portion of a pre-defined shape of the virtual object. To illustrate, the virtual object is divided into a pre-determined number of pixels, and each pixel is assigned a value of the parameter. As another example, the basic block is executed by an APU of the updated machine to generate the legacy audio parameter and output the legacy audio parameter as sound with a virtual scene of the legacy game N.

In response to determining that the basic block is not cached, an operation 206 of compiling the basic block is performed in the method 200. The operation 206 is performed by the basic block compiler 104 (FIG. 1). For example, the basic block compiler 104 parses the emulated PU code 106 (FIG. 1) for the legacy game N to identify an emulated PU code instruction that includes a function for servicing the user input received, before the operation 202, during the play of the legacy game. The user input received, before the operation 202, triggers the operation 202. To illustrate, the basic block compiler 104 traverses through each emulated code PU instruction of the emulated PU code 106 to determine whether the emulated code PU code instruction includes an operation, such as a function, to satisfy, such as generate a response to, the user input received during the play of the legacy game. In the illustration, once the function is identified, the basic block compiler 104 converts the emulated code PU code instruction to generate the basic block. In the illustration, in response to the user input received, before the operation 202, other emulated code PU code instructions, of the legacy game, that are no needed to service the user input are not compiled into basic blocks by the basic block compiler 104.

In an operation 208 of the method 200, the basic block generated in the operation 206 is stored in the cache 102 by the basic block compiler 104. The cached basic block is then executed in the operation 204 to service the user input received before the operation 202.

In one embodiment, the method 200 is executed by one or more processors of a server system. As an example, the server system includes updated machines as servers. To illustrate, each server blade is an updated machine, such as a game console.

In an embodiment, the method 200 is not executed until a user input is received. For example, there is no determination whether a basic block, such as one of the basic blocks 1 through n, is stored in the cache 102, no compiling of the basic blocks, and no execution of the basic blocks until the user input is received.

In one embodiment, the basic block compiler 104 compiles one or more of the basic blocks 1 through n in response to a first user input during a play of the legacy game N and compiles one or more of remaining of the basic blocks 1 through n in response to a second user input during a play of the legacy game N. To illustrate, the basic block compiler 104 generates the basic blocks 1 and 2 to service the first user input and generates the basic blocks 3 through 7 to service the second user input. The second user input is received after the first user input.

Figure 3:
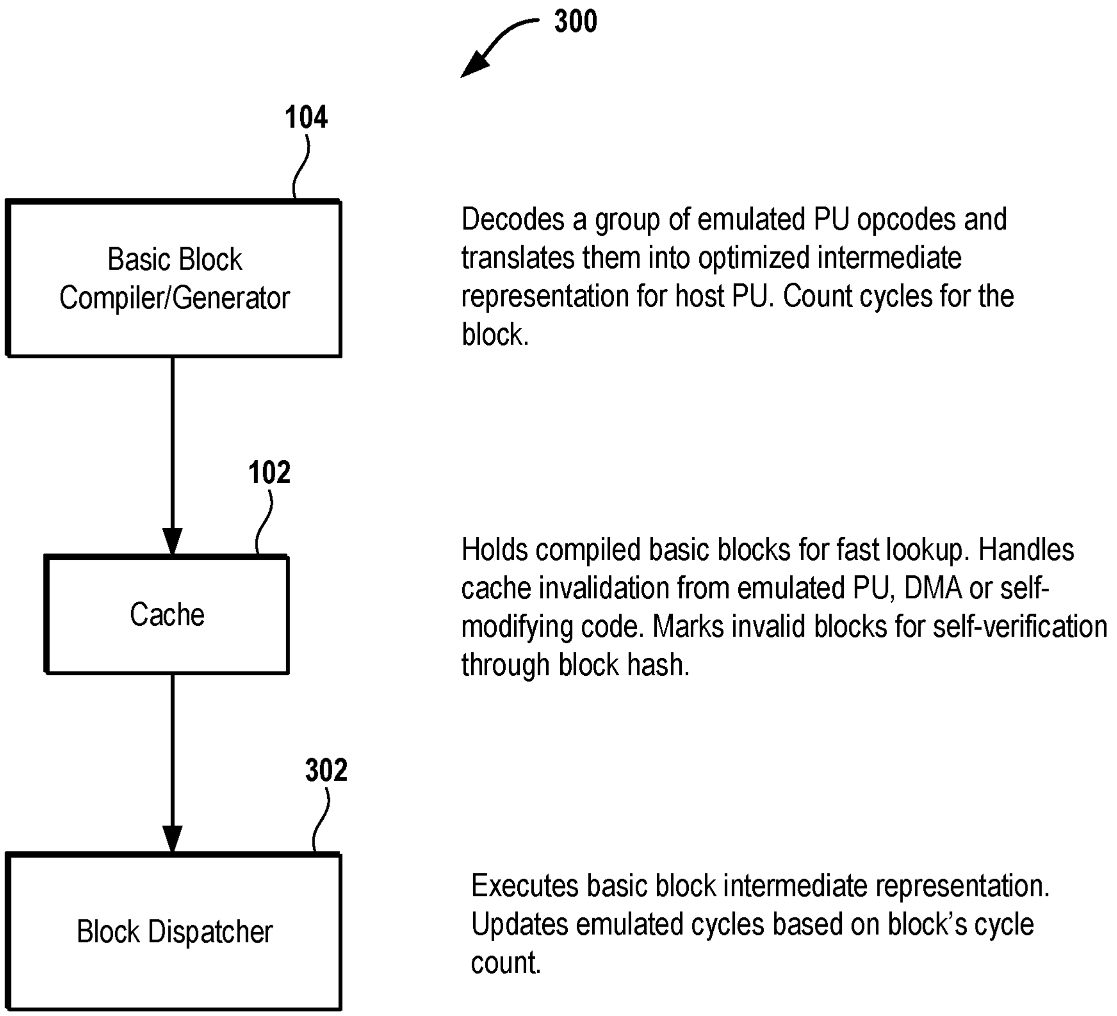
FIG. 3 is a block diagram to illustrate an embodiment of a system for compiling and executing the basic blocks.

FIG. 3 is a block diagram to illustrate an embodiment of a system 304 for compiling and dispatching basic blocks, such as the basic blocks 1 through n. The system 300 includes the basic block compiler 104, the cache 102, and a block dispatcher 302. As an example, the block dispatcher 302 is hardware or software, or a combination thereof, that carries out operations of one or more of the basic blocks 1 through n to service a user input. To illustrate, the block dispatcher 302 is a PLD or an ASIC or a controller. As another illustration, the block dispatcher 302 is a computer software. As an example, the block dispatcher 302 is the GPU or the CPU of the updated machine.

The basic block compiler 104 decodes a portion of the emulated PU code 106 (FIG. 1), such as an operational code (opcode), and translates the portion into an intermediate representation for a processing unit, such as the CPU or the GPU or the APU, of the updated machine. For example, the basic block compiler 104 parses a portion, such as one or more instructions, of a CPU code of the emulated PU code 106 to determine whether the portion of the CPU code includes functionality to service a user input. Upon determining so, the basic block compiler 104 translates the portion of the CPU code into one or more basic blocks, such as the basic blocks 1 through n. As another example, the basic block compiler 104 parses a portion, such as one or more instructions, of a GPU code of the emulated PU code 106 to determine whether the portion of the GPU code includes functionality to service a user input. Upon determining so, the basic block compiler 104 translates the portion of the GPU code into one or more basic blocks, such as the basic blocks 1 through n. As yet another example, the basic block compiler 104 parses a portion, such as one or more instructions, of an APU code of the emulated PU code 106 to determine whether the portion of the APU code includes functionality to service a user input. Upon determining so, the basic block compiler 104 translates the portion of the APU code into one or more basic blocks, such as the basic blocks 1 through n.

Also, the basic block compiler 104 estimates a number of cycles for execution of each basic block generated from the portion of the emulated PU code 106 to generate an estimated count. For example, the basic block compiler 104 determines that the basic block 1 includes a jump operation and a jump operation takes a pre-determined amount of time.

The basic block compiler 104 estimates that the jump operation of the basic block 1 takes the pre-determined amount of time. The block compiler 104 stores the estimated count in the cache 102. For example, the block compiler 104 stores the estimated count in the basic block n for which the number of cycles is estimated.

Once the basic blocks are compiled, they are stored in the cache 102 for fast lookup. For example, when another user input is received after receiving a user input in response to which the basic blocks are compiled, and the same basic blocks can be used for servicing the other user input, the basic blocks can be accessed from the cache 102 quickly and do not need to be regenerated.

In addition, one or more of the basic blocks stored in the cache 102 can be marked as invalid after compilation. The one or more of the basic blocks, marked as invalid, are later validated or invalidated during runtime of the basic blocks. When the one or more of the basic blocks are invalidated, one or more additional basic blocks are compiled. The compilation of the one or more additional basic blocks is sometimes referred to herein as recompiling of the one or more basic blocks.

Each of the one or more additional basic blocks have the same structure as that of the one or more basic blocks 1 through n. For example, each of the one or more additional basic blocks has a source register address, a destination register address, and an operation. As another example, each of the one or more additional basic blocks has a source register address, a destination register address, an operation, and a number of cycles of execution of the operation of the additional basic block. In the example, some of the one or more additional basic blocks include an invalid mark. As yet another example, each of the one or more additional basic blocks has a source register address, a destination register address, an operation, and a number of cycles of execution of the operation of the additional basic block. It should be noted that each of the additional blocks of code is executed in the same manner as each of the basic blocks 1 through n.

The block dispatcher 302 executes or runs one or more of the basic blocks 1 through n based on a user input. For example, the block dispatcher 302 executes the basic blocks 1 and 2 to service the first user input and executes the basic blocks 3 through 7 in response to the second user input. As an example, the block dispatcher 302 includes a clock source, such as a digital clock oscillator or a clock generator, that counts a number of cycles used to execute one or more of the basic blocks 1 through n based on the user input to generate a real count. The block dispatcher 302 sends the real count to the block compiler 104 to update the estimated count with the real count. For example, the real count is stored in the basic block n for which the real count is calculated. To illustrate, the real count is stored in one or more memory registers of the cache 102 assigned to the basic block n.

In one embodiment, the basic block compiler 104 does not estimate the number of cycles for execution of any basic block. In this embodiment, there is no replacement of the estimated count with the real count. Rather, in the embodiment, the real count is stored by the block compiler 104 in the basic block n for which the real count is determined.

Figure 4A:
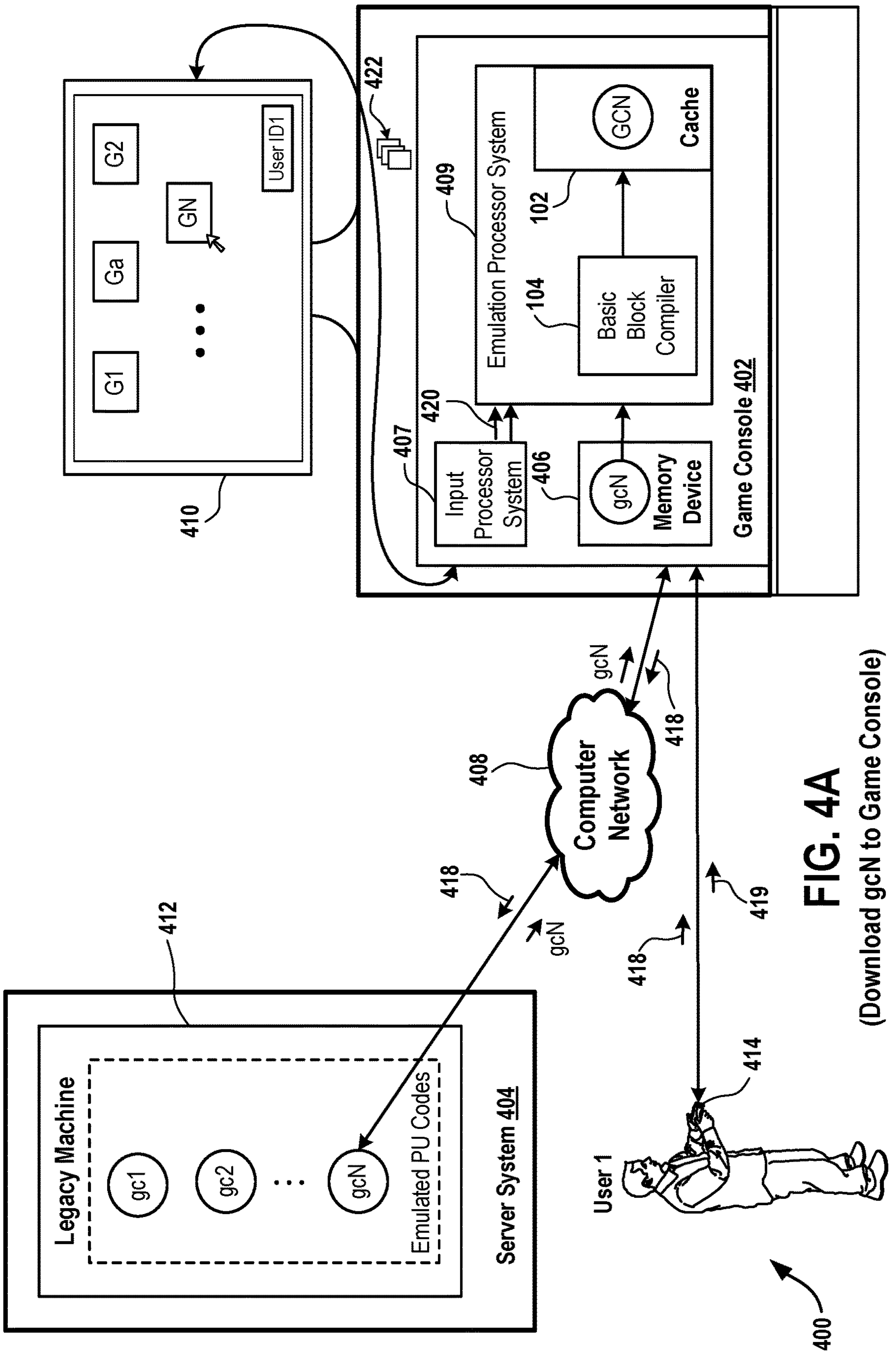
FIG. 4A is a diagram of an embodiment of a system to illustrate compiling of the basic blocks within a game console.

FIG. 4A is a diagram of an embodiment of a system 400 to illustrate compiling of the basic blocks 1 through n within a game console 402. The system 400 includes the game console 402, a server system 404, a computer network 408, and a display device 410. The server system 404 includes one or more servers. As an example, the server system 404 is located within a housing of a data center. The server system 404 includes a memory device 412, which stores emulated PU codes, such as the emulated PU code 104. For example, the memory device 412 stores a game code 1 (gc1), a game code 2 (gc2), and so on until a game code N (gcN). The game code gcN is an example of the emulated PU code 106 (FIG. 1). Each game code 1 through N is a legacy code of a legacy game. To illustrate, the game code gc1 is a machine code for play of a first legacy game and the game code gc2 is a machine code for play of a second legacy game. The second legacy game is different from the first legacy game. It should be noted that as an example, the memory device 412 is a memory device of the legacy machine.

As an example, none of the game codes gc1 through gcN can be executed in the updated machine and can be executed in the legacy machine. To illustrate, a CPU or an operating system of the updated machine cannot support execution of the game codes gc1 through gcN. On the other hand, a CPU or an operating system of the legacy machine supports execution of the game codes gc1 through gcN. Examples of a computer network, as used herein, include a wide area network (WAN), such as the Internet, or a local area network (LAN), such as an intranet, or a combination thereof.

The game console 402 is an example of the updated machine. Examples of the display device 410 include a television, a smart television, and a computer monitor. To illustrate, the display device 410 is a liquid crystal display (LCD) device, or a light emitting diode (LED) display device, or an organic light emitting diode (OLED) display device.

The system 400 further includes a hand-held controller (HHC) 414, which is held in one or two hands of a user 1. Examples of a hand-held controller, as used herein, include a controller with buttons, a Move™ controller from Sony™ Corporation, and a gun-shaped controller. Examples of buttons of the hand-held controller include joysticks, buttons for moving a virtual object upwards, downwards, left, or right on the display device 410, and other buttons for selection of various features of the legacy game N having the game title GN.

The game console 402 includes a memory device 406, an input processor system 407, and an emulation processor system 409. As an example, a processor system, as used herein, includes one or more processors that are coupled to each other. The emulation processor system 409 is coupled to the memory device 406 and the input processor system 407 is coupled to the emulation processor system 409. The emulation processor system 409 includes the basic block compiler 104 and the cache 102. The basic block compiler 104 is coupled to the cache 102.

The game console 402 is coupled to the display device 410 via a wired communication medium, such as a high definition media interface (HDMI) cable or a wireless connection. Examples of a wireless connection, as used herein, include a Wi-Fi™ connection or a Bluetooth™ connection. Also, the hand-held controller 414 is coupled to the game console 402 via a wired connection or a wireless connection. Examples of a wired connection, as used herein, include a serial transfer cable, a parallel transfer cable, and a Universal Serial Bus (USB) cable.

An example of a client device includes a combination of a hand-held controller, a game console, and a display device. Another example of the client device includes a combination of a hand-held controller and a display device. Yet another example of the client device includes a display device, such as a smart television or a head-mounted display. Another example of the client device includes a computer or a smartphone.

The user 1 logs into his/her user account 1 when a user identification (ID) and a password are authenticated by the server system 404. The user account 1 is assigned a user ID1 by the server system 1. Once the user 1 logs into the user account 1, the user 1 can access multiple game titles, such as a game title G1, a game title Ga, a game title G2, and so on until the game title GN. The game titles G1, G2 and so on until the game title GN are examples of titles of legacy games. The game title Ga is a title of a game that is not a legacy game. Rather, the game title Ga is of the current game, such as Fortnite™ that is not available for play in the legacy machine.

After logging into the user account 1, the user 1 selects one or more buttons on the hand-held controller 414 to select the game title GN to play a legacy game N. Once the user 1 selects the game title GN, a user input 418 indicating the selection is sent from the hand-held controller 414 via the game console 402 and the computer network 408 to the server system 404. As an example, a user input is an input signal. Upon receiving the user input 418 indicating the selection of the game title GN, the server system 404 identifies the game code gcN based on the user input 418. For example, the server system 404 identifies that the game code gcN has the same game title as that of the game title GN, a selection of which is indicated in the user input 418.

The server system 404 sends the game code gcN via the computer network 408 to the game console 402. Upon receiving the game code gcN, the emulation processor system 409 stores the game code gcN in the memory device 406 of the game console 402.

When a user input 419 is received, via the wireless connection, from the hand-held controller 414 during a play of the legacy game N having the game code gcN, the input processor system 407 converts the user input 419 into a user input 420 and provides the user input 420 to the emulation processor system 409. As an example, the user input 419 includes a request to move a fighter jet from a position P1 to a position P2 or from one orientation to another orientation during a play of the legacy game N. The fighter jet is an example of a virtual object. Upon receiving the user input 420, the emulation processor system 409 executes the basic block compiler 104 to generate a portion of the game code GCN from a portion of the game code gcN stored in the memory device 406. The portion of the game code GCN is generated based on the user input 420. For example, when the user input 420 includes a request to move the fighter jet from the position P1 to the position P2 during a play of the legacy game N, the basic block compiler 104 parses the game code gcN to identify an instruction that calculates the position P2 from the position P1. The basic block compiler 104 converts the instruction into a basic block of the game code GCN, and the basic block is then executed to change the position of the fighter jet to P2 from P1. Further, in the example, when the position changes from P1 to P2, a virtual environment in which the fighter jet is at the position P1 is modified to a virtual environment in which the fighter jet is at the position P2. In the example, the basic block of the game code GCN is executed by a GPU of the emulation processor system 409 to generate image frames 422. To illustrate, the image frames 422 are displayed on the display device 410 to display a virtual environment having the fighter jet at the position P2. In this manner, a majority or the entirety of the game code GCN is compiled by the basic block compiler 104 and stored in the cache 102 for execution. As an example, a virtual environment, such as a virtual scene, includes one or more virtual reality (VR) images or one or more augmented reality (AR) images.

In an embodiment, communication of data between the server system 404 and the game console 402 occurs via a network communication protocol, such as a Transmission Control Protocol over Internet Protocol (TCP/IP). For example, the server system 404 includes a network interface controller (NIC) to convert data into packets. The network interface controller of the server system 404 is coupled to the memory device 412 to receive data from the memory device 412. Upon receiving the data from the memory device 412, the network interface controller of the server system 404 embeds the data within one or more packets by applying the network communication protocol to the data. The one or more packets are transferred from the network interface controller of the server system 404 via the computer network 408 to the game console 402. A network interface controller of the game console 402 extracts the data from the one or more packets by applying the network communication protocol. The network interface controller of the game console 402 is coupled to the emulation processor system 409. The network interface controller of the game console 402 provides the data received from the computer network 408 to the emulation processor system 409. Moreover, the network interface controller of the game console 402 receives data from the emulation processor system 409 and embeds the data within one or more packets by applying the network communication protocol and sends the one or more packets via the computer network 408 to the server system 404. The network interface controller of the server system 404 applies the network communication protocol to the one or more packets received from the computer network 408 to extract the data from the one or more packets and sends the data to the memory device 412 for storage. Examples of a network interface controller include a network interface card, an Ethernet card, and a network adapter. To illustrate, the network interface controller of the game console 402 enables the input processor system 407 to communicate with the computer network 408.

In one embodiment, in addition to or instead of the computer network 408, a cellular network is used to communicate data between the server system 404 and the game console 402. For example, communication between the server system 404 and the game console 402 is facilitated using wireless technologies. The wireless technologies include, for example, 4G or 5G wireless communication technologies. As used herein, 5G is the fifth generation of cellular network technology. Also, 5G networks are digital cellular networks, in which a service area covered by providers is divided into small geographical areas called cells. In 5G wireless communication technology, analog signals representing sounds and images are digitized in a telephone, converted by an analog-to-digital converter and transmitted as a stream of bits. All 5G wireless devices in a cell communicate by radio waves with a local antenna array and low power automated transceiver (transmitter and receiver) in the cell, over frequency channels assigned by the transceiver from a pool of frequencies that are reused in other cells. Local antennas are connected with the cellular network by a high bandwidth optical fiber or wireless backhaul connection. As in other cell networks, a mobile device crossing from one cell to another is automatically transferred to the new cell. It should be understood that 5G networks are just an example type of a communication network, and embodiments of the disclosure may utilize earlier generation wireless or wired communication, such as 3G or 4G, as well as later generation wired or wireless technologies that come after 5G.

In an embodiment, any of the game console 402 and the server system 404 is referred to herein as a computing device. Other examples of the computing device include a tablet, a smartphone, a laptop computer, a desktop computer, and a smart television.

In one embodiment, each of the game codes gc1 through gcN is stored in a separate memory device of the server system 404 or of a legacy machine. For example, the game code gc1 is stored in a memory device of a first legacy machine and the game code gc2 is stored in a memory device of a second legacy machine. As another example, the game code gc1 is stored in a first memory device of the server system 404 and the game code gc2 is stored in a second memory device of a server system 404.

In an embodiment, the memory device 412 or the memory device 406 is not a cache. Rather, each of the memory device 412 or the memory device 406 is a main memory, such as a RAM.

In one embodiment, the memory device 412 is coupled to a memory controller. The memory controller reads data from the memory device 412 and writes data to the memory device 412. The memory controller is coupled to the network interface controller of the server system 404. The memory controller sends data received from the network interface controller of the server system 404 to the memory device 412 for storage. The memory controller also sends data received from the memory device 412 to the network interface controller of the server system 404 for sending via the computer network 408 to the game console 402.

Figure 4B:
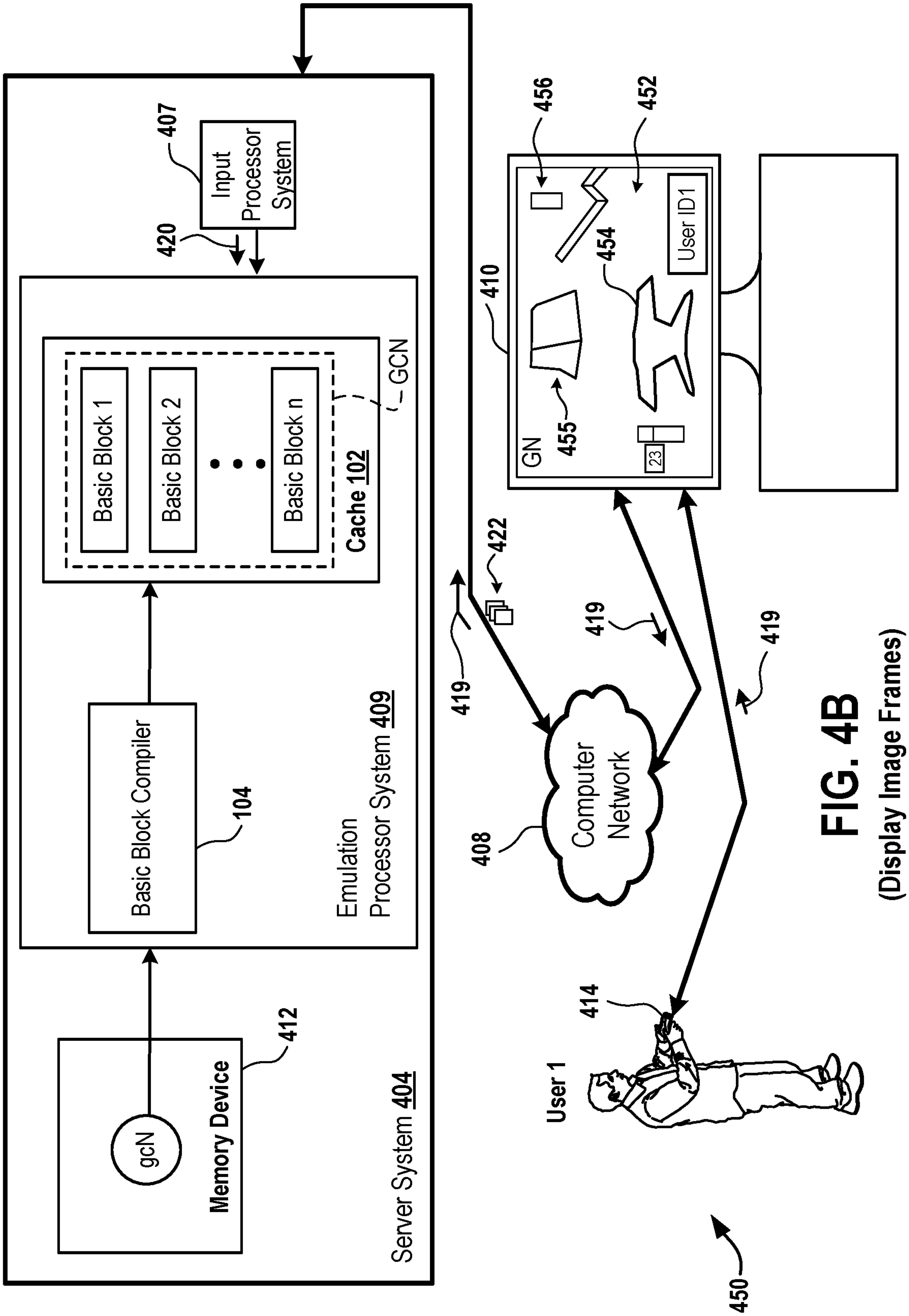
FIG. 4B is a diagram of an embodiment of a system to illustrate compiling of the basic blocks within a server system.

FIG. 4B is a diagram of an embodiment of a system 450 to illustrate that the emulation processor system 409 and the input processor system 407 are located within the server system 404, and the image frames 422 are sent from the server system 404 via the computer network 408 to the display device 410 for display of a virtual environment or a virtual scene. The system 450 includes the server system 404, display device 410, and the hand-held controller 414.

The server system 404 includes the memory device 412, the input processor system 407, and the emulation processor system 409. The memory device 412 is coupled to the emulation processor system 409 and the input processor system 407 is coupled to the emulation processor system 409. The display device 410 is coupled to the computer network 408 via a network interface controller of the display device 410. The display device 410 includes a processor that is coupled to the network interface controller of the display device 410. The processor of the display device 410 receives the user input 419 during a play of the legacy game N having the game title GN and the game code gcN, and sends the user input 419 to the network interface controller of the display device 410. The network interface controller of the display device 410 sends the user input 419 via the computer network 408 to the input processor system 407 of the server system 404.

Upon receiving the user input 419, the input processor system 407 converts the user input 419 into the user input 420 and provides the user input 420 to the emulation processor system 409. Upon receiving the user input 420, the emulation processor system 409 performs the same functions as described above with reference to FIG. 4A with respect to the game code gcN to compile the basic blocks 1 through n for generation of the image frames 422. The server system 404 sends the image frames 422 via the computer network 408 to the display device 410 for display of a virtual environment, such as a virtual environment 452, on a display screen of the display device 410. For example, the virtual environment 452 includes a virtual object 454, which is an example of the fighter jet. In the example, the virtual environment 452 includes a virtual background, which includes one or more virtual objects, such as a virtual pyramid 455 and a virtual structure 456. In this example, the virtual object 454 is capable of shooting virtual missiles at the virtual pyramid 455 and the virtual structure 456 during a play of the legacy game N having the game code gcN.

In an embodiment, communication of data between the server system 404 and the display device 410 occurs via the network communication protocol. For example, the server system 404 includes the network interface controller to convert data into packets. The network interface controller of the server system 404 is coupled to the emulation processor system 409 to receive data from the emulation processor system and embeds the data within one or more packets by applying the network communication protocol. The packets are transferred from the network interface controller of the server system 404 via the computer network 408 to the display device 410. The network interface controller of the display device 410 extracts the data from the one or more packets by applying the network communication protocol. The network interface controller of the display device is coupled to the processor of the display device 410. The network interface controller of the display device provides the data received from the computer network 408 to the processor of the display device 410. The processor of the display device 410 renders data, such as the image frames 422, on the display screen of the display device 410. Moreover, the network interface controller of the display device 410 receives data from the processor of the display device 410 and embeds the data within one or more packets by applying the network communication protocol and sends the one or more packets via the computer network 408 to the server system 404. The network interface controller of the server system 404 applies to network communication protocol to the one or more packets received from the computer network 408 to extract the data from the one or more packets and sends the data to the emulation processor system 409.

In one embodiment, in addition to or instead of the computer network 408, a cellular network is used to communicate data between the server system 404 and the display device 410. For example, communication between the server system 404 and the display device is facilitated using the wireless technologies.

In an embodiment, instead of the display device 410, a head-mounted display (HMD) is used. The head-mounted display is worn on the user 1's head and includes a display screen, such as an LED screen or an OLED screen or an LCD screen. The HMD performs the same functions as that performed by the display device 410.

Figure 5A:
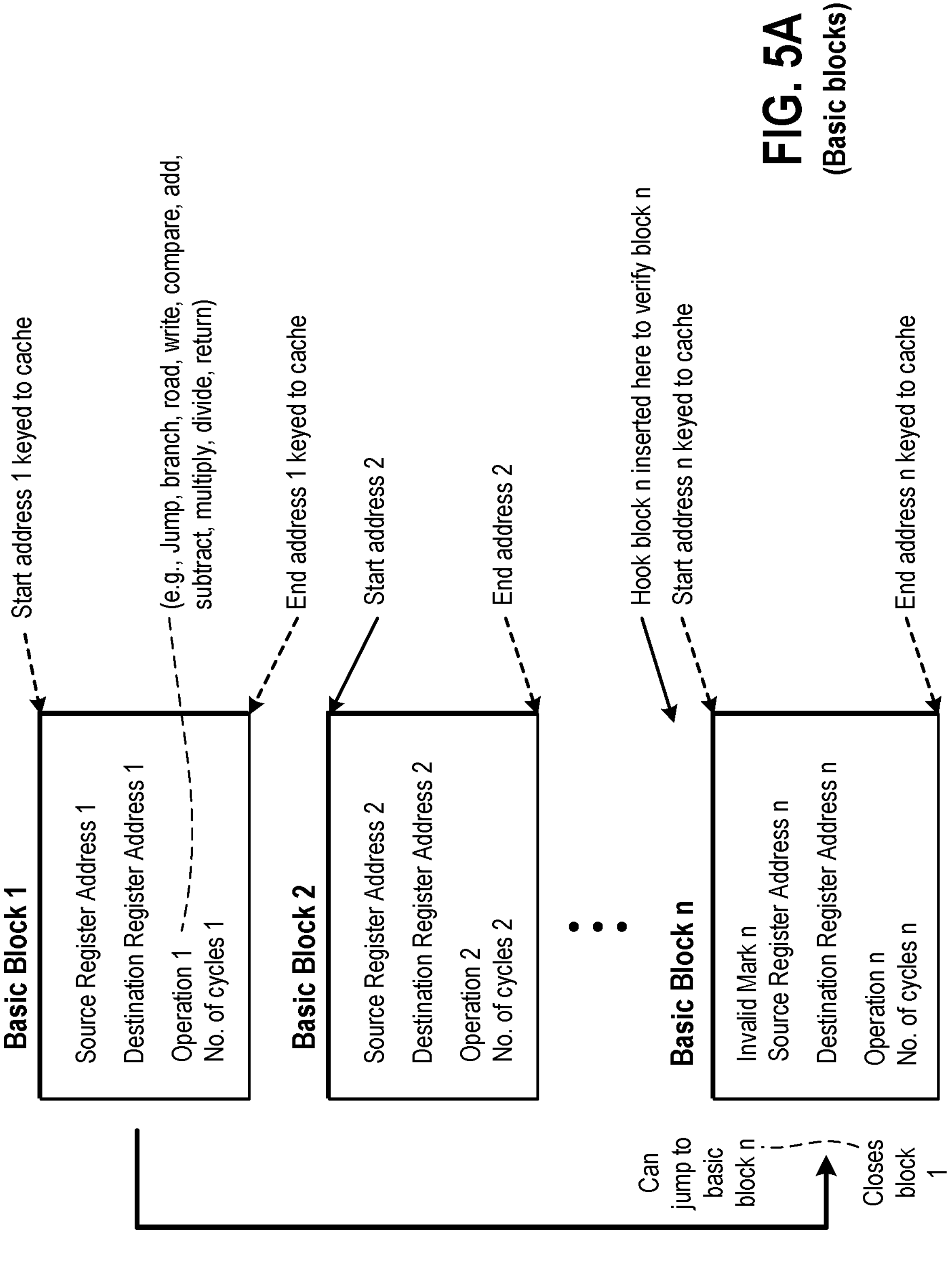
FIG. 5A is a diagram to illustrate an embodiment of a basic block.

FIG. 5A is a diagram to illustrate an embodiment of a basic block. Each basic block includes a source register address, a destination register address, and an operation. For example, the basic block 1 includes a source register address 1, a destination register address 1, and an operation 1. The basic block 2 includes a source register address 2, a destination register address 2, and an operation 2 and the basic block n includes a source register address n, a destination register address n, and an operation n. As an example, a source register address is an address of one or more source registers within the cache 102 and a destination register addresses is an address of one or more destination registers within the cache 102. Examples of an operation of a basic block include a jump operation, and branch operation, a read operation, a write operation, a compare operation, and a return operation. Further examples of an operation of a basic block include an arithmetic operation, such as an add operation, a subtract operation, a multiply operation, and a divide operation.

As an example, when the operation n is the read operation, data is read from the source register address n to execute the basic block n. As another example, when the operation n is a write operation, data is written to the destination register address n to execute the basic block n. As another example, when the operation n is a move operation, data is read from the source register address n, the operation n is performed on the data, and the data is written is to the destination register address n to execute the basic block n. As yet another example, when the operation n is the compare operation, a first value of data stored at a first source register address mentioned in the basic block n is compared with a second value of data stored at a second source register address mentioned in the basic block n to generate a comparison result and the comparison result is stored at the destination register address n to execute the basic block n. As another example, when the operation n is the add operation, a first value of data stored at the first source address mentioned within the basic block n is added to a second value of data stored at the second source address indicated within the basic block n to generate an add result and the add result is stored at the destination register address n to execute the basic block n. As yet another example, when a virtual object, described herein, is to move from the position P1 to the position P2 and the operation n is the write operation in which the position of the virtual object is to be updated from P1 to P2, the position P1 at the destination register address n is overwritten with the position P2 to execute the basic block n. In the example, the execution of the basic block n indicates to the emulation processor system 409 that the virtual object is to move from the position P1 to the position P2. Also, in the example, the user input 420 (FIG. 4A) instructs the emulation processor system 409 to move the virtual object from the position P1 to P2. Similarly, as another example, when a virtual object, described herein, is to move from an orientation O1 to an orientation O2 and the operation n is the write operation in which the orientation of the virtual object is to be updated from O1 to O2, the orientation O1 at the destination register address n is overwritten with the orientation O2 to execute the basic block n. In the example, the execution of the basic block n indicates to the emulation processor system 409 that the virtual object is to move from the orientation O1 to the orientation O2. Further, in the example, the user input 420 instructs the emulation processor system 409 to move the virtual object from the orientation O1 to O2.

As still another example, when a portion of a virtual object, described herein, is to change color from red to green and the operation n is the write operation in which the color of the virtual object is to be updated from red to green, data representing the color red at the destination register address n is overwritten with data representing the color green to execute the basic block n. In the example, the execution of the basic block n indicates to the emulation processor system 409 that the color of the portion of the virtual object is to be changed from red to green. Also, in the example, the user input 420 instructs the emulation processor system 409 to change the color of the portion of the virtual object from red to green. In a similar manner, other parameters, such as intensity and texture, can be modified based on the user input 420. Intensity and texture are examples of the legacy graphical parameter.

Each basic block includes a number of cycles of execution of the basic block. For example, the basic block 1 includes a number of cycles 1 of execution of the basic block 1. As another example, the basic block 2 includes a number of cycles 2 of execution of the basic block 2 and the basic block n includes a number of cycles n of execution of the basic block n. As an example, an estimated number of cycles of execution of the basic block is estimated by the basic block compiler 104 (FIG. 1) upon compiling the basic block. In the example, the estimated number of cycles is stored in the basic block. Also in the example, after the basic block is executed by the block dispatcher 302 (FIG. 3), the block dispatcher 302 updates the estimated number of cycles of execution in the manner described above with the real count and provides the real count to the block compiler 104. The estimated number of cycles is replaced by the real count in the basic block by the block compiler 104. As another example, the real count of a number of cycles of execution of the operation n is generated by the block dispatcher 302 and stored in the basic block n. In this example, there is no estimation of a number of cycles of execution of the operation n.

Moreover, as another example, one or more of the basic blocks 1 through n include an invalid mark indicating that the one or more of the basic blocks 1 through n be checked for validity. For example, the basic block n includes an invalid mark n.

It should be noted that by converting the emulated PU code 106 into the basic blocks 1 through n of the game code GCN, a hook, such as a hook block, can be inserted between any two of the basic blocks 1 through n. For example, a hook block n can be inserted between the basic blocks (n−1) and n. The hook block n has the same structure as that of the basic block n. For example, the hook block includes a source register address, a destination register address, an operation, and a number of cycles of execution of the operation of the hook block. As an example, due to security issues associated with the legacy machine, a hook, as described herein, cannot be inserted between instructions of the emulated PU code 106 (FIG. 1) stored in the legacy machine for execution on the legacy machine.

It should further be noted that the basic blocks 1 through n are keyed into, such as fixed within, the cache 102 (FIG. 1). For example, the basic block 1 has a start memory address 1, which indicates a location of start of the basic block 1 in the cache 102. Also, the basic block 1 has an end memory address 1, which indicates a location of end of the basic block 1 in the cache 102. As another example, the end address 1 of the basic block 1 is indicated by an offset in the cache 106 from the start memory address 1. As yet another example, the basic block 2 has a start memory address 2, which indicates a location of start of the basic block 2 in the cache 102. Also, the basic block 2 has an end memory address 2, which indicates a location of end of the basic block 2 in the cache 102. As another example, the end address 2 of the basic block 2 is indicated by an offset in the cache 106 from the start memory address 2. Similarly, as another example, the basic block n has a start memory address n, which indicates a location of start of the basic block n in the cache 102. Also, the basic block n has an end memory address n, which indicates a location of end of the basic block n in the cache 102. As another example, the end address n of the basic block n is indicated by an offset in the cache 106 from the start memory address n. From the start and end memory addresses, stored in the cache 102, of the basic blocks 1 through n, the emulation processor system 409 (FIG. 4A), such as the basic block compiler 102, can identify the locations of the basic blocks 1 through n in the cache 102.

It should also be noted that in case a user input indicating that the block dispatcher 302 of the updated machine execute the basic block n immediately after executing the basic block 1, the block dispatcher 302 skips execution of the basic blocks 2 through (n−1) in the cache 102 and jumps to the basic block n from the basic block 1. In this case, execution of the basic block 1 is closed by the block dispatcher 302 when the block dispatcher 302 jumps to the basic block n. Also, in this case, a start address of a next basic block is consecutive to an end address of a preceding basic block. For example, the start address 2 is consecutive to the end address 1 and the start address n is consecutive to an end address (n−1) of the basic block (n−1).

In an embodiment, the source register addresses 1 through n are memory addresses of registers of the cache 102 and the destination register addresses 1 through n are memory addresses of registers in the cache 102.

In one embodiment, a basic block includes multiple operations. For example, the basic block n includes a first operation, a first source register address, and a first destination register address. The basic block n further includes a second operation, a second source register address, and a second destination register address.

In an embodiment, a basic block includes an operation, multiple source addresses, and a destination address.

In one embodiment, a basic block includes an operation, multiple destination addresses, and a source address.

In an embodiment, a basic block includes multiple operations, multiple source addresses, and multiple destination addresses.

In an embodiment, a basic block includes one or more operations, one or more source addresses, and one or more destination addresses.

In an embodiment, a basic block includes either a source register address or a destination register address but not both.

In one embodiment, the block compiler 102 does not estimate the number of cycles for execution of the basic block n. Rather, the block dispatcher 302 generates the real count of the number of cycles of execution of the basic block n and stores the real count in the basic block n.

Figure 5B:
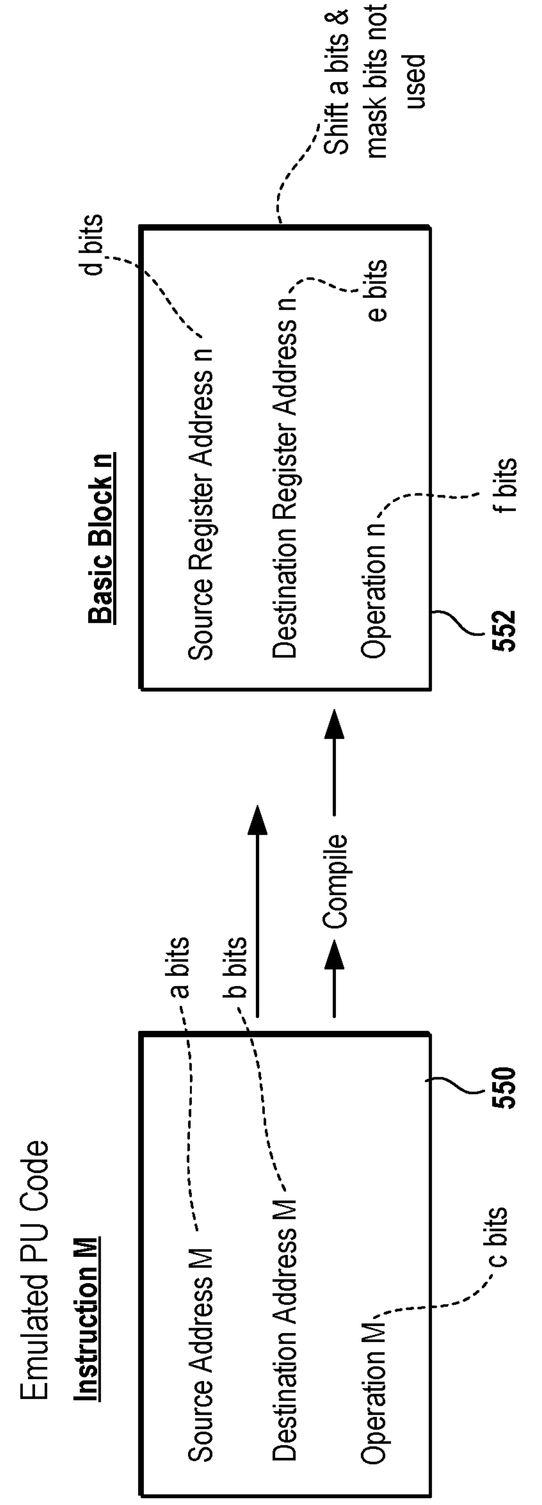
FIG. 5B is a diagram to illustrate an embodiment of a compile operation performed by a basic block compiler.

FIG. 5B is a diagram to illustrate an embodiment of a compile operation performed by the basic block compiler 104 (FIG. 1). An example of an emulated PU code instruction M is illustrated as an instruction 550 and an example of the basic block n is illustrated as a basic block 552, where M is a positive integer. The instruction 550 includes a source address M having a length of a bits, a destination address M having a length of b bits, and an operation M represented by bits of length c, where a, b, and c are positive integers. As an example, a is 4, b is 4, and c is 32. As an example, the a bits, b bits, and c bits are stored in the one or more memory devices of the legacy machine. For example, the a bits are stored in the memory device 406 or 412 (FIGS. 4A and 4B). The operation 552 includes the source register address n having a length of d bits, the destination address n having a length of e bits, and the operation n represented by bits of length f, where d, e, and f are positive integers. As an example, d is 8, e is 8, and f is 64. As an example, the d bits, e bits, and f bits are stored in the one or more registers of the updated machine. As an example, d is greater than a, e is greater than b, and f is greater than c. To illustrate, d is 8, e is 8, and f is 64 when a is 4, b is 4, and c is 32. As another example, d is 16, e is 16, and f is 128 when a is 4, b is 4, and c is 32.

To perform the compile operation, the basic block compiler 104 (FIG. 1) converts the source address M into the source register address n, the destination address M into the destination register address n, and the operation M into the operation n to generate the basic block n from the emulated PU code instruction M. For example, the basic block compiler 104 shifts 4 bits of the source address M to the right to occupy 4 memory addresses of 8 source registers in the cache 102 and masks any bits in remaining four memory addresses of the 8 source registers. The four memory addresses occupied by the 4 bits of the source address M are at the least significant positions of the 8 source registers in the cache 102 and the remaining four memory addresses in which the bits are masked are at the most significant positions of the 8 source registers in the cache 102.

As another example, the basic block compiler 104 shifts 4 bits of the destination address M to the right to occupy 4 memory addresses of 8 destination registers in the cache 102 and masks any bits in remaining four memory addresses of the 8 destination registers. The four memory addresses occupied by the 4 bits of the destination address m are at the least significant positions of the 8 destination registers in the cache 102 and the remaining four memory addresses in which the bits are masked are at the most significant positions of the 8 destination registers in the cache 102.

Similarly, as another example, the basic block compiler 104 shifts 32 bits of the operation M to the right to occupy 32 memory addresses of 64 operation registers in the cache 102 and masks any bits in remaining 32 memory addresses of the 64 operation registers. The 32 memory addresses occupied by the 32 bits of the operation M are at the least significant positions of the 32 operation registers in the cache 102 and the remaining 32 memory addresses in which the bits are masked are at the most significant positions of the 64 operation registers in the cache 102. The operation n is stored in the operation registers of the cache 102.

Figure 6A:
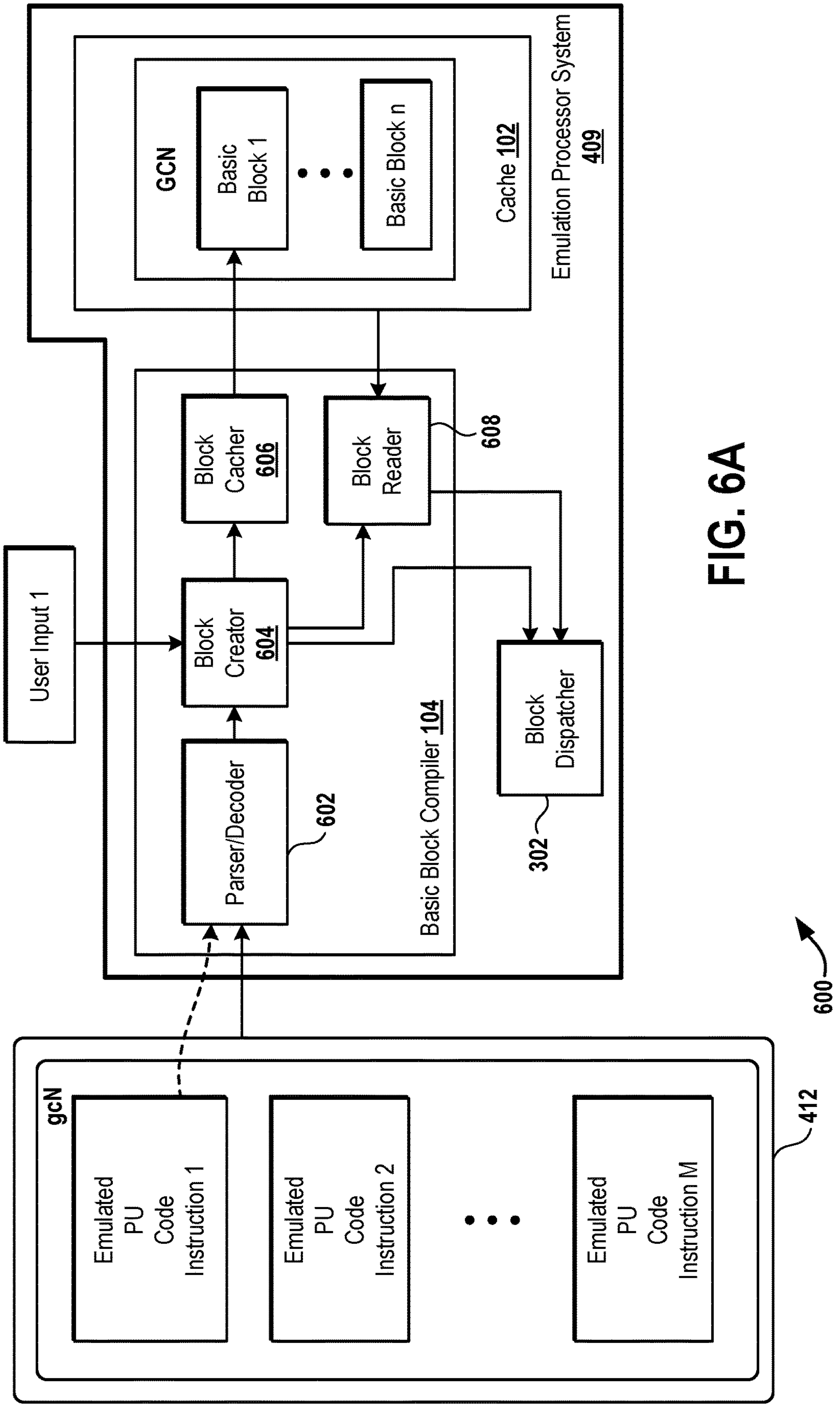
FIG. 6A is a diagram of an embodiment of a system to illustrate components of the emulation processor system.

FIG. 6A is a diagram of an embodiment of a system 600 to illustrate components of the emulation processor system 409. The system 600 includes the memory device 412 and the emulation processor system 409. The basic block compiler 104 of the emulation processor system 409 includes a parser or decoder 602. The basic block compiler 104 further includes a block creator 604, a block cacher 606A, and a block reader 608. The emulation processor system 409 includes the block dispatcher 302.

As an example, each of the parser 609, the block creator 604, the block cacher 606, the block reader 608, and the block dispatcher 302 is implemented using software, or hardware, or a combination thereof. For example, each of the parser 609, the block creator 604, the block cacher 606, the block reader 608, and the block dispatcher 302 is a separate integrated circuit, such as a PLD or an ASIC or a controller or a processor or a portion of a computer program. As another example, each of the parser 609, the block creator 604, the block cacher 606, the block reader 608, and the block dispatcher 302 is a separate computer software program.

The game code gcN includes multiple instructions, such as an emulated PU code instruction 1, an emulated PU code instruction 2 and so on until the emulated PU code instruction M. For example, each instruction of the game code gcN is a series of bits that can be executed by the processor of the legacy machine to implement a function, such as moving a virtual object from the position P1 to the position P2, or changing an orientation of the virtual object from O1 to O2, or modifying the parameter of a portion of the virtual object.

The parser 602 is coupled to the block creator 604, which is coupled to the block cacher 606 and to the block reader 608. The block cacher 606 and the block reader 608 or coupled to the cache 102. The block reader 608 is coupled to the block dispatcher 302.

Figure 6B:
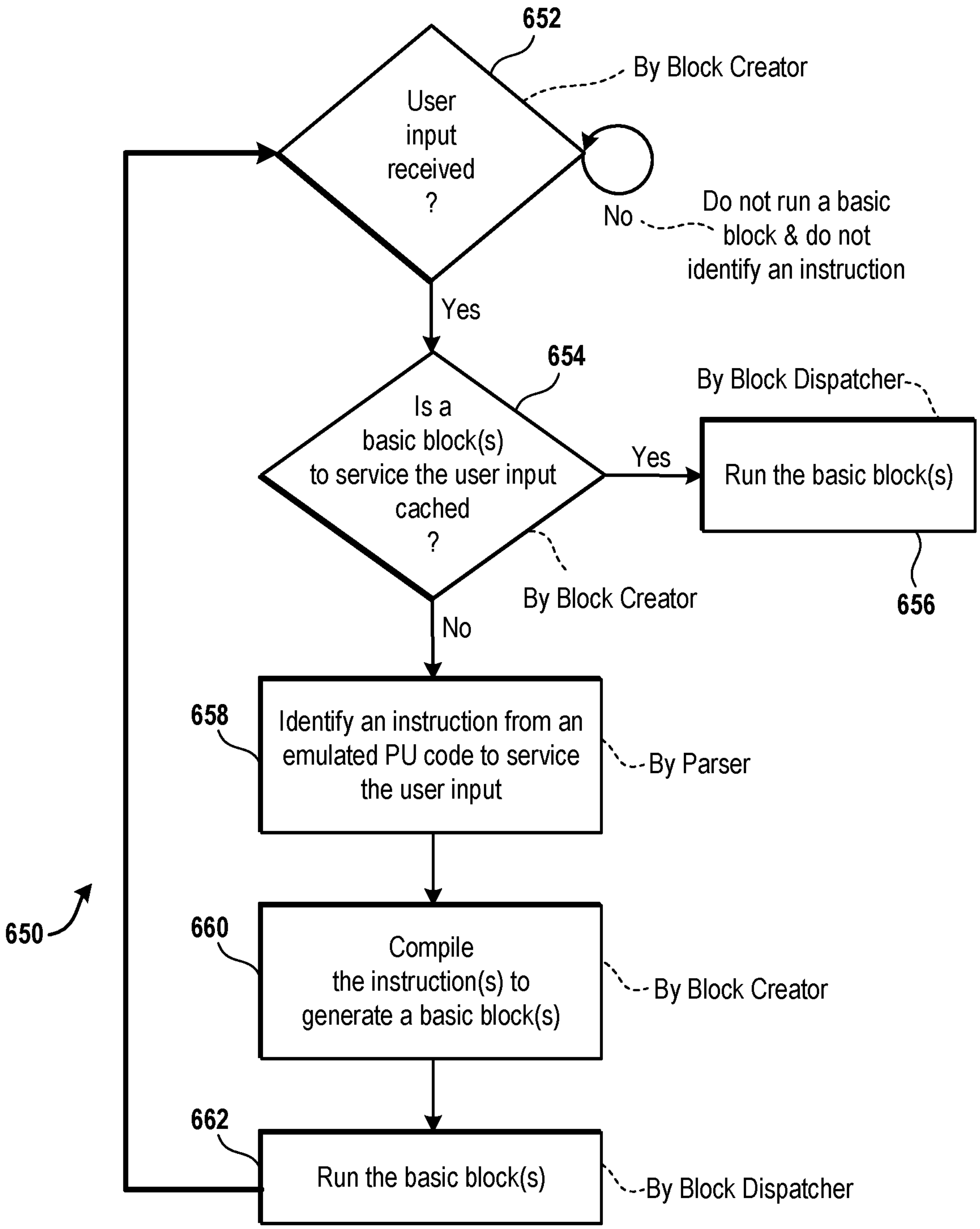
FIG. 6B is a flowchart to illustrate an embodiment of a method for compiling and executing the basic blocks.

FIG. 6B is a flowchart to illustrate an embodiment of a method 650 for compiling and executing the basic blocks 1 through n. The method 650 is illustrated using the system 600 of FIG. 6A. In an operation 652 of the method 650, the block creator 604 determines whether any user input, such as a user input 1, is received. As an example, the user input 1 is a signal that is generated based on one or more identifications of one or more buttons of the hand-held controller 414 (FIG. 4A) that are selected by the user 1. As another example, the user input 1 is a signal that is generated based on a measure of movement, such as pitch, yaw, and roll, with respect to an origin of an xyz co-ordinate system centered on the hand-held controller 414. As yet another example, the user input 1 is a signal that is generated based on a measure of movement, such as pitch, yaw, and roll, with respect to an origin of an xyz co-ordinate system of the HMD. An example of the user input 1 is the user input 420 (FIG. 4A). Another example of the user input 1 is the user input 418 (FIG. 4A).

The block creator 604 continues to check whether the user input is received in the operation 652 upon determining that the user input is not received. For example, the basic block compiler 104 does not run any of basic blocks (n+1) through p stored in the cache 102 (FIG. 1) and the basic block compiler 104 (FIG. 1) does not identify any of the emulated PU code instructions 1 through M (FIG. 6A) when the user input is not received in the operation 652, where p is a positive integer. It is assumed that at a time the user input is received in the operation 652, the basic blocks 1 through n are not generated and are not stored in the cache 102.

On the other hand, in response to determining that the user input is received in the operation 652, in an operation 654 of the method 650, the block creator 604 determines whether one or more of the basic blocks (n+1) through p that are stored in the cache 102 satisfy the user input. For example, the block creator 604 sends a request to the block reader 608 to access the basic blocks (n+1) through p from the cache 102. In the example, the block reader 608, upon receiving the request, reads the basic blocks (n+1) through p from the cache 102 and sends the basic blocks (n+1) through p to the block creator 604. Further, in the example, the block creator 604 determines whether functionality of one or more of the basic blocks (n+1) through p satisfies, such as services, the user input 1. To illustrate, when the user input 1 indicates to change a position of a virtual object from the position P1 to the position P2, the block creator 604 determines whether any of the basic blocks (n+1) through p include an operation of overwriting the position P1 with the position P2. Upon determining that one or more of the basic blocks (n+1) through p include the operation of overwriting the position P1 with P2, the block creator 604 determines that one or more functionalities of the one or more of the blocks (n+1) through p satisfies the user input 1. On the other hand, upon determining that none of the basic blocks (n+1) through p include the operation of overwriting the position P1 with P2, the block creator 604 determines that functionalities of the basic blocks (n+1) through p do not satisfy the user input 1.

As another illustration, when the user input 1 is to change an orientation of a virtual object from the orientation O1 to the orientation O2, the block creator 604 determines whether any of the basic blocks (n+1) through p include an operation of overwriting the orientation O1 with the orientation O2. Upon determining that one or more of the basic blocks (n+1) through p includes the operation of overwriting the orientation O1 with O2, the block creator 604 determines that one or more functionalities of the one or more of the basic blocks (n+1) through p satisfies the user input 1. On the other hand, upon determining that none of the basic blocks (n+1) through p includes the operation of overwriting the orientation O1 with O2, the block creator 604 determines that functionalities of the basic blocks (n+1) through p do not satisfy the user input 1. As yet another illustration, when the user input 1 is to change a value of the parameter of a portion of a virtual object from a first value to a second value, the block creator determines whether any of the basic blocks (n+1) through p include an operation of overwriting the first value with the second value. Upon determining that one or more of the basic blocks (n+1) through p include the operation of overwriting the first value with the second value, the block creator 604 determines that one or more functionalities of the one or more of the basic blocks (n+1) through p satisfies the user input 1. On the other hand, upon determining that none of the basic blocks (n+1) through p include the operation of overwriting the first value at the second value, the block creator 604 determines that functionalities of the basic blocks (n+1) through p do not satisfy the user input 1.

As yet another illustration, when the user input 1 is to initiate the legacy game N, the block creator 604 determines whether any of the basic blocks (n+1) through p can be executed to generate an animation including the game title GN of the legacy game N to represent the initiation of the legacy game N. Upon determining that one or more of the basic blocks (n+1) through p includes can be executed to generate the animation, the block creator 604 determines that one or more functionalities of the one or more of the basic blocks (n+1) through p satisfies the user input 1. On the other hand, upon determining that none of the basic blocks (n+1) through p can be executed to generate the animation, the block creator 604 determines that functionalities of the basic blocks (n+1) through p do not satisfy the user input 1.

Upon determining that the functionalities of one or more of the basic blocks (n+1) through p satisfy the user input 1, in an operation 656 of the method 600, the block dispatcher 302 executes the one or more of the basic blocks (n+1) through p. For example, upon determining that the functionalities of one or more of the basic blocks (n+1) through p satisfy the user input 1, the block creator 604 sends an instruction to the block dispatcher 302 to execute the one or more of the basic blocks (n+1) through p. In the example, in response to receiving the instruction, the block dispatcher 302 sends a command to the block reader 608 to read the one or more of the basic blocks (n+1) through p from the cache 102 for satisfying the user input received in the operation 652. Also, in the example, upon receiving the one or more of the basic blocks from the cache 102 in response to the command, the block dispatcher 302 executes the one or more of the basic blocks (n+1) through p.

On the other hand, upon determining that the functionalities of the blocks (n+1) through p do not satisfy the user input 1, in an operation 658 of the method 600, the block compiler 102 identifies one or more of the emulated PU code instructions 1 through M for servicing the user input received in the operation 652. For example, upon determining that the functionalities of the blocks (n+1) through p do not satisfy the user input 1, the block creator 604 sends a request to the parser 602 to parse the game code gcN to identify and obtain one or more of the emulated PU code instructions 1 through M of the game code gcN that satisfy the functionality identified in the user input 1. In the example, in response to receiving the request, the parser 602 accesses the memory device 412 to parse the game code gcN to determine whether functionalities of one or more of the emulated PU code instructions 1 through M satisfy the user input 1 and upon determining that the functionalities of one or more of the emulated PU code instructions 1 through M satisfy the user input 1, the parser 602 provides the one or more of the emulated PU code instructions 1 through M to the block creator 604.

To illustrate, when the user input 1 is to change a position of a virtual object from the position P1 to the position P2, the parser 602 determines whether any of the emulated PU code instructions 1 through M include an operation of overwriting the position P1 with the position P2. Upon determining that one or more of the emulated PU code instructions 1 through M include the operation of overwriting the position P1 with P2, the parser 602 determines that one or more functionalities of the one or more of the emulated PU code instructions 1 through M satisfies the user input 1. On the other hand, upon determining that none of the emulated PU code instructions 1 through M includes the operation of overwriting the position P1 with P2, the parser 602 determines that functionalities of the emulated PU code instructions 1 through M do not satisfy the user input 1.

As another illustration, when the user input 1 is to change an orientation of a virtual object from the orientation O1 to the orientation O2, the parser 602 determines whether any of the emulated PU code instructions 1 through M include an operation of overwriting the orientation O1 with the orientation O2. Upon determining that one or more of the emulated PU code instructions 1 through M includes the operation of overwriting the orientation O1 with O2, the parser 602 determines that one or more functionalities of the one or more of the emulated PU code instructions 1 through M satisfies the user input 1. On the other hand, upon determining that none of the emulated PU code instructions 1 through M includes the operation of overwriting the orientation O1 with O2, the parser 602 determines that functionalities of the emulated PU code instructions 1 through M do not satisfy the user input 1. As yet another illustration, when the user input 1 is to change a value of the parameter of a portion of a virtual object from a first value to a second value, the parser 602 determines whether any of the emulated PU code instructions 1 through M include an operation of overwriting the first value with the second value. Upon determining that one or more of the emulated PU code instructions 1 through M include the operation of overwriting the first value with the second value, the parser 602 determines that one or more functionalities of the one or more of the emulated PU code instructions 1 through M satisfies the user input 1. On the other hand, upon determining that none of the emulated PU code instructions 1 through M include the operation of overwriting the first value at the second value, the parser 602 determines that functionalities of the emulated PU code instructions 1 through M do not satisfy the user input 1.

In an operation 660 of the method 600, when the one or more of the emulated PU code instructions 1 through M that satisfy the user input 1 are received from the parser 602, the block creator 604 applies the compile operation, described above, to generate one or more of the basic blocks 1 through n from the one or more of the emulated PU code instructions 1 through M. For example, the block creator 604 compiles the one or more of the basic blocks 1 through n, sends the one or more of the basic blocks 1 through n to the block cacher 606, and sends an instruction to the block dispatcher 302 to execute the one or more of the basic blocks 1 through n. Upon receiving the one or more of the basic blocks 1 through n, the block cacher 606 stores the one or more of the basic blocks 1 through n in the cache 102.

In an operation 662 of the method 600, upon receiving the instruction from the block creator 604 to execute the one or more of the basic blocks 1 through n, the block dispatcher 302 runs the one or more of the basic blocks 1 through n to service the user input received in the operation 652. For example, the block dispatcher 302 sends a request to the block reader 608 to read the one or more of the basic blocks 1 through n from the cache 102. Upon receiving the command, the block reader 608 reads the one or more of the basic blocks 1 through n from the cache 102 and provides the one or more of the basic blocks 1 through n to the block dispatcher 302. Upon receiving the one or more of the basic blocks 1 through n, the block dispatcher 302 executes the one or more of the basic blocks 1 through n to generate the virtual environment 452 (FIG. 4B). To illustrate, the block dispatcher 302 executes the one or more of the basic blocks 1 through n to generate an image frame, which includes virtual environment data, such as a position and an orientation of the virtual object 454, the parameter, such as the legacy graphical parameter, of the virtual object 454, positions and orientations of other virtual objects in the virtual environment 452, and the parameter, such as the legacy graphical parameter, of the other virtual objects in the virtual environment 452. Further, in the example, when the position or the orientation or a combination thereof of the virtual object 454 changes, a virtual environment changes. The block dispatcher 302 provides the image frame to a GPU of the emulation processor system 409 to display, such as render, the virtual environment 452 on the display screen of the display device 410 (FIG. 4A). As another example, the block dispatcher 302 executes the one or more of the basic blocks 1 through n to generate one or more audio frames, which include the legacy audio parameters, and provides the one or more audio frames to a client device to output sounds based on the one or more audio frames. To illustrate, each audio frame is an audio file that includes the one or more legacy audio parameters. The method 600 repeats, when another user input, such as the user input 2, is received after the user input 1 is received in the operation 652.

In one embodiment, the image frame is provided from the block dispatcher 302 to a GPU of the display device 410 to display the virtual environment 452 on the display screen of the display device 410.

Figure 6C:
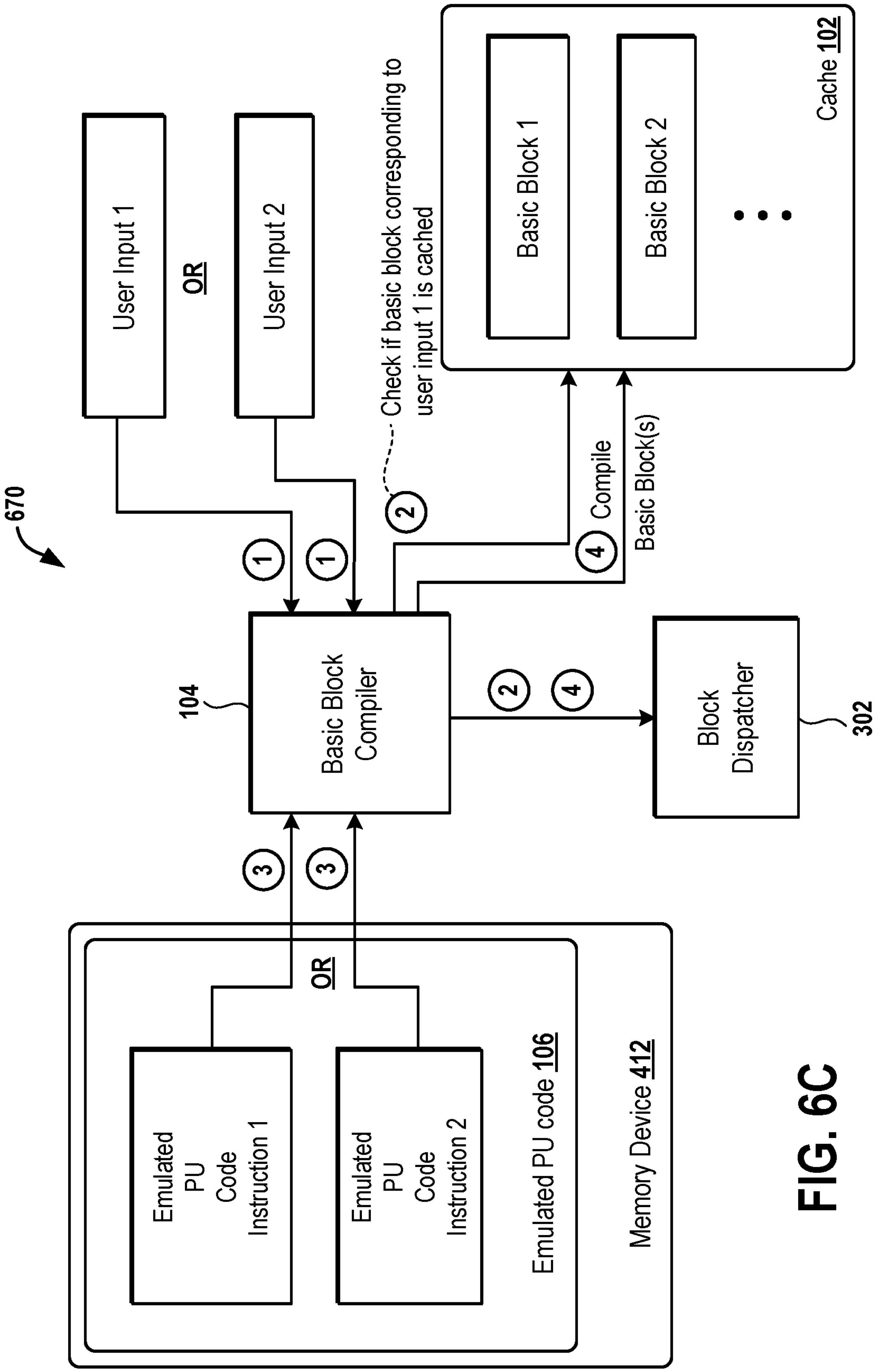
FIG. 6C is a diagram of an embodiment of a system to illustrate that for different user inputs, different basic blocks are compiled dynamically.

FIG. 6C is a diagram of an embodiment of a system 670 to illustrate that for different user inputs, different basic blocks or different sets of basic blocks are compiled dynamically. The system 670 includes the memory device 412, the basic block compiler 104, the block dispatcher 302, and the cache 102. When the user input 1 is received by the basic block compiler 104, the basic block compiler 104 determines if the basic block 1 that corresponds to the user input 1 is stored in the cache 102. For example, the basic block 1 corresponds to the user input 1 when the basic block 1 includes a function for servicing the user input 1. To illustrate, when the user input 1 is to move a virtual object from the position P1 to the position P2 and the basic block 1 includes an operation of updating the position P1 stored at the destination register address 1 with the position P2, the basic block 1 can service the user input 1. In the illustration, the user input 1 is a signal indicating a selection of a move to right button or a move to left button or a move up button or a move down button on the hand-held controller 414 (FIG. 4A). Similarly, the basic block 2 does not correspond to the user input 1 when the basic block 2 does not include a function for servicing the user input 1. To illustrate, when the user input 1 is to move a virtual object from the position P1 to the position P2 without changing an orientation of the virtual object and the basic block 2 includes an operation of updating the orientation O1 stored in the destination register 2 with the orientation O2, the basic block 2 cannot service the user input 1. Upon determining that the basic block 1 that can service the user input 1 is stored in the cache 102, the basic block compiler 104 provides the basic block 1 to the block dispatcher 302 for executing the basic block 1.

On the other hand, upon determining that the basic block 1 is not stored in the cache 102, the basic block compiler 104 parses the emulated PU code 106 stored in the memory device 412 to identify the emulated PU code instruction 1 corresponding to the user input 1. For example, the basic block compiler 104 parses the emulated PU code 106 to identify that the emulated PU code instruction 1 satisfies, such as services, the user input 1. To illustrate, when the user input 1 is to move a virtual object from the position P1 to the position P2 and the emulated PU code instruction 1 includes a function of updating the position P1 stored at the destination address 1 with the position P2, the emulated PU code instruction 1 can service the user input 1. Similarly, the emulated PU code instruction 2 does not correspond to the user input 1 when the emulated PU code instruction 2 does not include a function for servicing the user input 1. To illustrate, when the user input 1 is to move a virtual object from the position P1 to the position P2 without changing an orientation of the virtual object and the emulated PU code instruction 2 includes an operation of updating the orientation O1 stored at the destination address 2 with the orientation O2, the emulated PU code instruction 2 cannot service the user input 1.

Upon determining that the emulated PU code instruction 1 can service the user input 1 and the emulated PU code instruction 2 cannot service the user input 1, the basic block compiler 104 accesses, such as reads, the emulated PU code instruction 1 from the memory device 412 and compiles the basic block 1 from the emulated PU code instruction 1. The basic block compiler 102 does not compile the basic block 2 from the emulated PU code instruction 2 in response to receiving the user input 1. The basic block compiler 104 stores the basic block 1 in the cache 102 and sends an instruction to the block dispatcher 302 to access and execute the basic block 1. Upon receiving the instruction, block dispatcher 302 reads the basic block 1 from the cache 102 and runs the basic block 1.

Similarly, when the user input 2 is received by the basic block compiler 104, the basic block compiler 104 determines if the basic block 2 that corresponds to the user input 2 is stored in the cache 102. For example, the basic block 2 corresponds to the user input 2 when the basic block 2 includes a function for servicing the user input 2. To illustrate, when the user input 2 is to move a virtual object from the orientation O1 to the orientation O2 and the basic block 2 includes an operation of updating the orientation O1 stored at the destination register address 2 with the orientation O2, the basic block 2 can service the user input 2. In the illustration, the user input 2 is a signal indicating a selection of a rotate clockwise or a rotate counterclockwise button on the hand-held controller 414. Similarly, the basic block 1 does not correspond to the user input 2 when the basic block 1 does not include a function for servicing the user input 2. To illustrate, when the user input 2 is to move a virtual object from the orientation O1 to the orientation O2 without changing a position of the virtual object and the basic block 1 includes an operation of updating the position P1 stored in the destination register 1 with the position P2, the basic block 1 cannot service the user input 2. Upon determining that the basic block 2 can service the user input 2 is stored in the cache 102, the basic block compiler 104 provides the basic block 2 to the block dispatcher 302 for executing the basic block 2.

On the other hand, upon determining that the basic block 2 is not stored in the cache 102, the basic block compiler 104 parses the emulated PU code 106 stored in the memory device 412 to identify the emulated PU code instruction 2 corresponding to the user input 2. For example, the basic block compiler 104 parses the emulated PU code 106 to identify that the emulated PU code instruction 2 satisfies, such as services, the user input 2. To illustrate, when the user input 2 is to move a virtual object from the orientation O1 to the orientation O2 and the emulated PU code instruction 2 includes a function of updating the orientation O1 stored at the destination address 2 with the orientation O2, the emulated PU code instruction 2 can service the user input 2. Similarly, the emulated PU code instruction 1 does not correspond to the user input 2 when the emulated PU code instruction 1 does not include a function for servicing the user input 2. To illustrate, when the user input 2 is to move a virtual object from the orientation O1 to the orientation O2 without changing a position of the virtual object and the emulated PU code instruction 1 includes an operation of updating the position P1 stored in the destination address 1 with the position P2, the emulated PU code instruction 1 cannot service the user input 2.

Upon determining that the emulated PU code instruction 2 can service the user input 2 and the emulated PU code instruction 1 cannot service the user input 2, the basic block compiler 104 accesses, such as reads, the emulated PU code instruction 2 from the memory device 412 and compiles the emulated PU code instruction 2 to generate the basic block 2. The basic block compiler 102 does not compile the emulated PU code instruction 1 in response to receiving the user input 2. The basic block compiler 104 stores the basic block 2 in the cache 102 and sends an instruction to the block dispatcher 302 to access and execute the basic block 2. Upon receiving the instruction, block dispatcher 302 reads the basic block 2 from the cache 102 and runs the basic block 2.

Figure 7A:
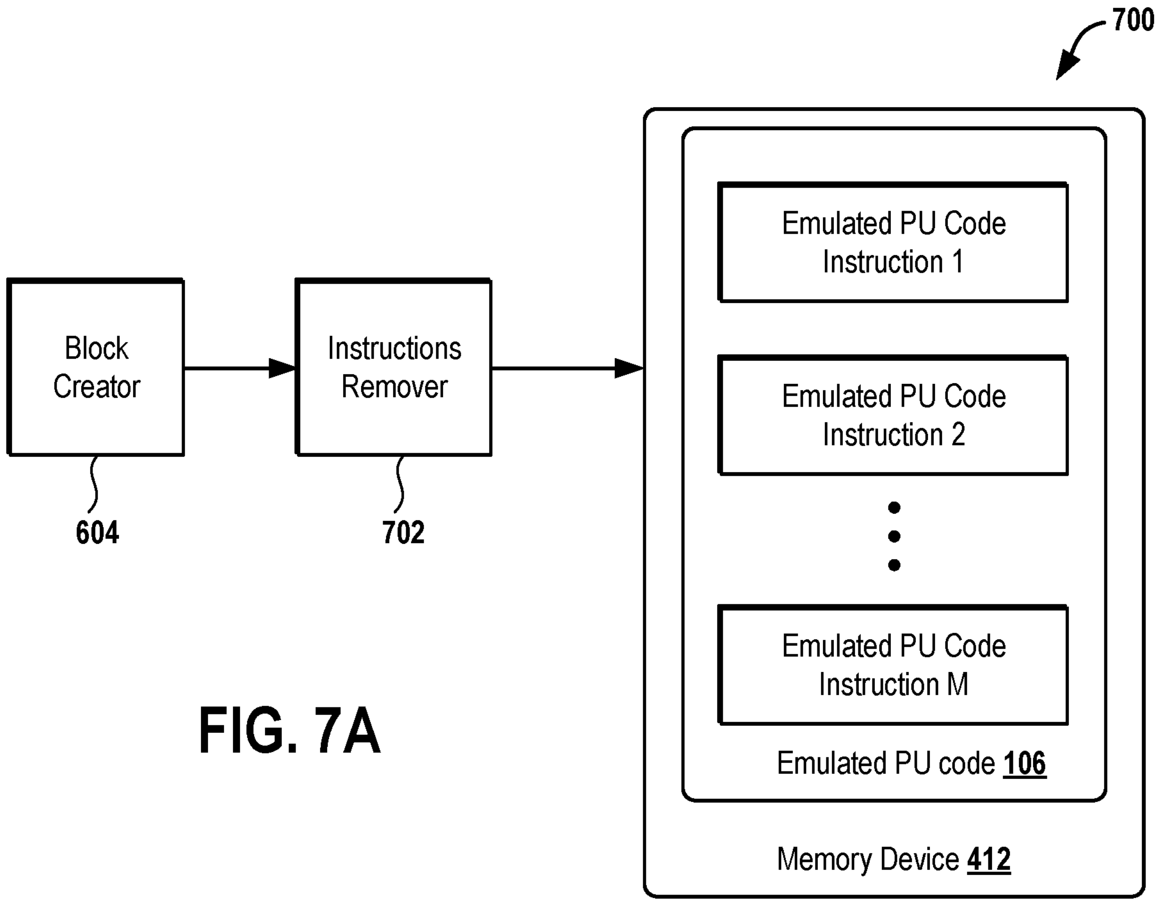
FIG. 7A is a diagram of an embodiment of a system to illustrate deletion of an emulated processing unit (PU) code from a memory device.

FIG. 7A is a diagram of an embodiment of a system 700 to illustrate deletion of the emulated PU code 106 from the memory device 412. The system 700 includes the block creator 604, an instruction remover 702, and the memory device 412. Examples of the instruction remover 702 include a processor, an ASIC, a PLD, a computer program, a portion of a computer program, and a microcontroller. The instruction remover 702 is coupled to the block creator 604 and to the memory device 412.

Figure 7B:
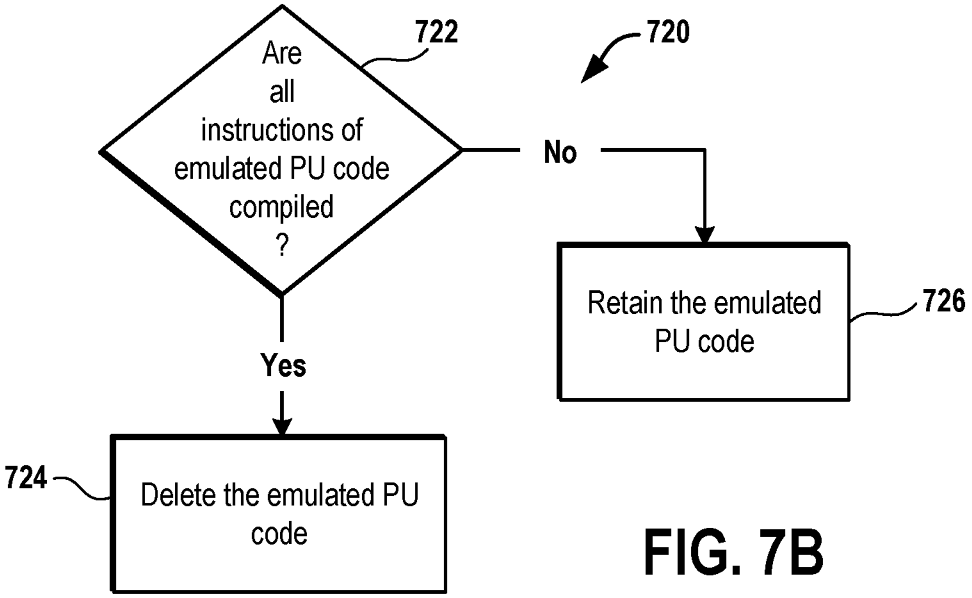
FIG. 7B is a flowchart to illustrate an embodiment of a method for deleting the emulated PU code from the memory device.

FIG. 7B is a flowchart to illustrate an embodiment of a method 720 for deleting the emulated PU code 106 (FIG. 6C) from the memory device 412 (FIG. 6C). The method 720 includes an operation 702 for determining whether all instructions of the emulated PU code 106 are compiled. For example, the block creator 604 (FIG. 7A) determines whether all of the emulated PU code instructions 1 through M of the game code gcN are compiled. To illustrate, before compiling any of the emulated PU code instructions 1 through M of the game code gcN, the block creator 604 sends a request to the processor of the legacy machine to obtain identities of all of the emulated PU code instructions 1 through M of the game code gcN. In the illustration, the block creator 604 sends an identity, such as one or more bits, of the game code gcN to the processor of the legacy machine to obtain identities of all of the emulated PU code instructions 1 through M of the game code gcN. Examples of the identities of the emulated PU code instructions 1 through M include one or more bits. To illustrate, the identity of the emulated PU code instruction M is represented by a first sequence of bits and the identity of the emulated PU code instruction M−1 is represented by a second sequence of bits, which is different from the first sequence. Upon receiving the identities of the emulated PU code instructions 1 through M from the processor of the legacy machine, the block creator 604 stores the identities in a table in the cache 102. As each of the emulated PU code instructions 1 through M is compiled, the block creator 604 updates the table to include indications that identify which of the emulated PU code instructions 1 through M are compiled. The block creator 604 determines whether all of the emulated PU code instructions 1 through M are compiled from the indications that identify which of the emulated PU code instructions 1 through M are compiled.

Upon determining that all the emulated PU code instructions 1 through M of the game code gcN are compiled, the block creator 604 sends a command to the instruction remover 702 (FIG. 7A) to delete the game code gcN from the memory device 412. Upon receiving the command, in an operation 724 of the method 720, the instruction remover 702 erases the emulated PU code instructions 1 through M from the memory device 412.

On the other hand, upon determining that one or more of the emulated PU code instructions 1 through M of the game code gcN are not compiled based on the table, in an operation 726 of the method 720, the block creator 604 does not send the command to the instruction remover 702 to delete the game code gcN from the memory device 412. Until the command to delete the game code gcN is received, the instruction remover 702 does not delete the emulated PU code instructions 1 through M from the memory device 412.

In one embodiment, the block creator 604 determines whether the game code gcN is accessed from the memory device 412 (FIG. 4A) within a pre-determined time period, which is stored in the cache 102, from the latest time the game code gcN is accessed from the memory device 412. As an example, the block creator 604 can access the Internet clock via the computer network 408 to determine the latest time and the pre-determined time period. As another example, the block creator 604 includes a clock source, such as a clock oscillator, to count the latest time and the pre-determined time period. Upon determining that the game code gcN is not accessed from the memory device 412 within the pre-determined time period, the block creator 604 sends a command to the instruction remover 702 to delete the game code gcN from the memory device 412. As an example, when the game code gcN is not accessed within the pre-determined time period, a majority of emulated PU code instructions 1 through M are accessed by the basic block compiler 104 to compile one or more of the basic blocks 1 through n. As another example, when the game code gcN is not accessed within the pre-determined time period, a number of emulated PU code instructions 1 through M that are frequently used during a play of the legacy game N having the game title GN are accessed by the basic block compiler 104 to compile one or more of the basic blocks 1 through n. On the other hand, upon determining that the game code gcN is accessed within the pre-determined time period, the block creator 604 does not send the command to the instruction remover 702 and the game code gcN is not deleted from the memory device 412.

Figure 8A:
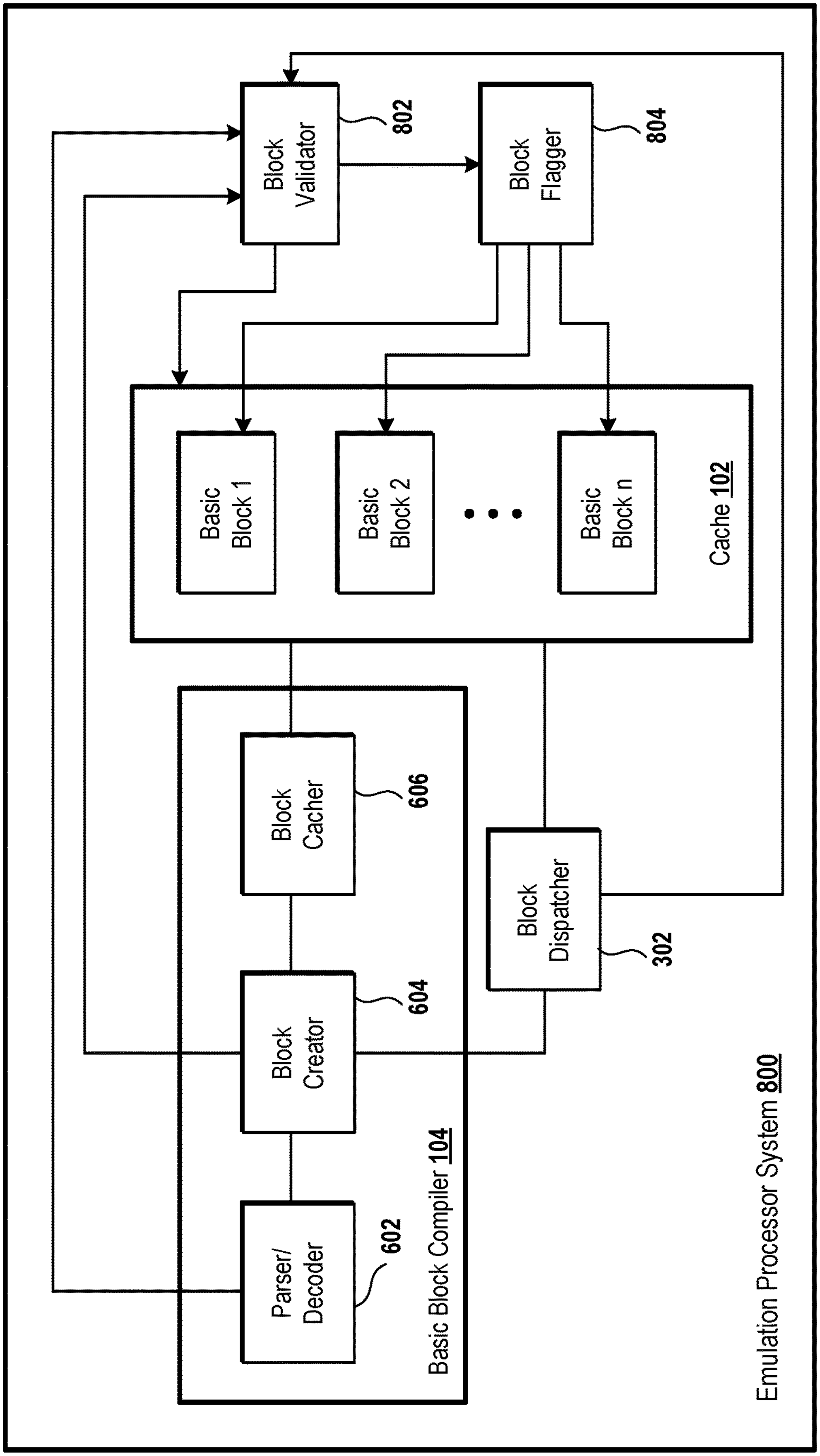
FIG. 8A is a diagram of an embodiment of an emulation processor system to illustrate validation of basic blocks.

FIG. 8A is a diagram of an embodiment of an emulation processor system 800 to illustrate validation of basic blocks. The emulation processor system 800 is an example of the emulation processor system 409 (FIG. 4B). The emulation processor system 800 includes the basic block compiler 104, the cache 102, a block validator 802 and a block flagger 804. The block validator 802 is coupled to the block creator 604, the block dispatcher 302, the parser 602, and the block flagger 804. Each of the clock validator 802 and the block flagger 804 is coupled to the cache 102.

As an example, the block validator 802 is implemented as an ASIC, or a PLD, or a microcontroller, or a processor, or a computer program, or a portion of a computer program. Also as an example, the block flagger 804 is implemented as an ASIC, or a PLD, or a microcontroller, or a processor, or a computer program, or a portion of a computer program.

In one embodiment, the terms ASIC, PLD, microcontroller, microprocessor, controller, and processor are used herein interchangeably.

Figure 8B:
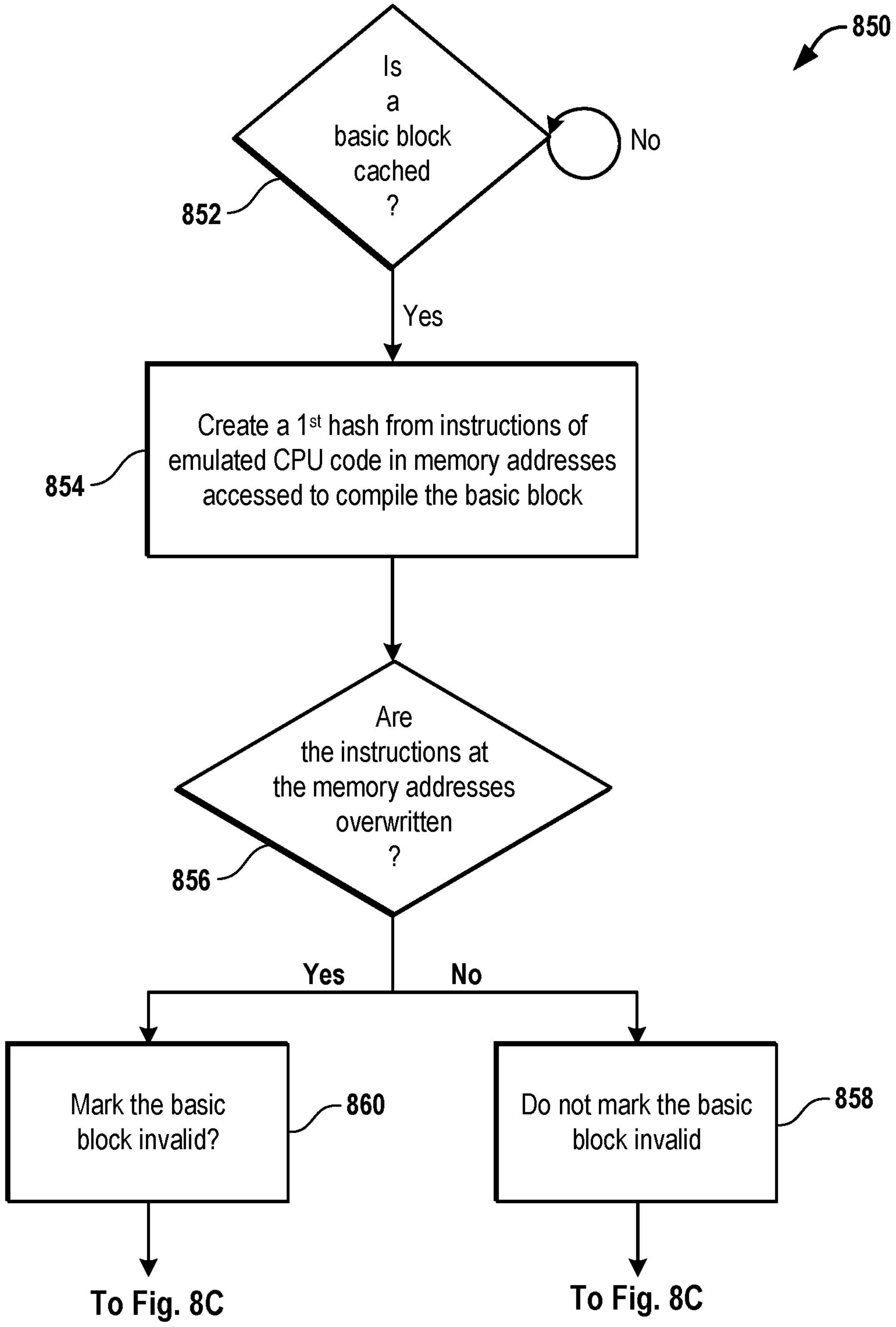
FIG. 8B is a flowchart of an embodiment of a method to illustrate a validation operation performed by the emulation processor system of FIG. 8A.

FIG. 8B is a flowchart of an embodiment of a method 850 to illustrate a validation operation performed by the emulation processor system 800 (FIG. 8A). In an operation 852 of the method 800, the block validator 802 (FIG. 8A) determines whether the basic block n is compiled. For example, the block validator 802 accesses, such as reads, the cache 102 to determine whether a new basic block, such as the basic block n, is now stored in the cache 102 compared to the basic blocks 1 through n−1 previously stored in the cache 102. The block validator 802 previously identified the basic blocks 1 through n−1 stored in the cache 102. Upon determining that the basic block n is not cached, the block validator 802 continues to access the cache 102 to determine whether the new basic block is cached. For example, the block validator 802 periodically parses the basic blocks 1 through n−1 stored in the cache 102 to determine whether the basic block n is stored in the cache 102.

Upon determining that the basic block n is cached, the block validator 802 creates, in an operation 854 of the method 800, a first hash value from the one or more of the emulated PU code instructions 1 through M from which the basic block n is compiled. For example, the block validator 802 sends a request to the parser 602 to obtain the one or more of the emulated PU code instructions 1 through M from the memory device 412. The request includes identities of memory addresses of the basic block n in the cache 102. The identities of the memory addresses of the basic block n are received, such as obtained by request, from the block creator 604 by the block validator 602. The parser 602, upon receiving the request from the block validator 802, reads the one or more of the emulated PU code instructions 1 through M from the memory device 412 and provides the one or more of the emulated PU code instructions 1 through M to the block validator 802. To illustrate, when the one or more of the emulated PU code instructions 1 through M are provided to the basic block compiler 104 for compiling the basic block n, the parser 602 stores a one-to-one correspondence between one or more identities of one or more memory addresses occupied by the basic block n in the cache 102 and one or more identities of one or more memory addresses occupied by the one or more of the emulated PU code instructions 1 through M in the memory device 412. The parser 602 receives the identities of the memory addresses of the basic block n in the cache 102 from the block validator 802 and identifies the one or more memory addresses of the one or more of the emulated PU code instructions 1 through M in the memory device 412 from the one-to-one correspondence. The parser 602 reads the one or more of the emulated PU code instructions 1 through M from the one or more memory addresses of the memory device 412 and provides the one or more of the emulated PU code instructions 1 through M to the block validator 802.

Continuing with the example, upon receiving the one or more of the emulated PU code instructions 1 through M from the parser 602, the block validator 802 generates the first hash value from the one or more of the emulated PU code instructions 1 through M and stores the first hash value in the cache 102. To illustrate, the block validator 802 generates a digest or a checksum from the one or more of the emulated PU code instructions 1 through M corresponding to the basic block n. In the example, the first hash value is stored in one or more registers, of the cache 102, that are keyed to include the basic block n.

In an operation 856 of the method 800, the block validator 802 sends a command to the parser 602 to determine whether the one or more memory addresses, within the memory device 412, at which the one or more of the emulated PU code instructions 1 through M are stored, are overwritten. The one or more memory addresses, within the memory device 412, can be overwritten with data from a compact disc-read only memory (CD-ROM) of the legacy machine. The data can be an update to the one or more of the emulated PU code instructions 1 through M. The update to the one or more of the emulated PU code instructions 1 through M is referred to as updated instructions. Alternatively, the data can be corrupted data, which is not the updated instructions. The parser 602, upon receiving the command from the block validator 802 sends a request to the processor of the legacy machine to determine whether the one or more memory addresses, within the memory device 412, at which the one or more of the emulated PU code instructions 1 through M are stored are overwritten.

Upon receiving the request from the parser 602, the processor of the legacy machine provides a response to the request and the response indicates whether the one or more memory addresses, within the memory device 412, at which the one or more of the emulated PU code instructions 1 through M are stored are overwritten. Upon receiving the response that the one or more memory addresses, within the memory device 412, at which the one or more of the emulated PU code instructions 1 through M are stored are not overwritten, the block validator 802 sends a command to the block flagger 804 (FIG. 8A) to not mark the basic block n as invalid. Upon receiving the command, in an operation 858 of the method 800, the block flagger 804 does not mark the basic block n as invalid.

On the other hand, upon receiving the response that the one or more memory addresses, within the memory device 412, at which the one or more of the emulated PU code instructions 1 through M are stored are overwritten, in an operation 860 of the method 850, the block validator 802 sends a command to the block flagger 804 (FIG. 8A) to mark the basic block n as invalid. Upon receiving the command to mark the basic block n as invalid, the block flagger 804 marks the basic block n as invalid. For example, the block flagger 804 accesses the basic block n within the cache 102 and includes an identifier, such as the invalid mark n (FIG. 5A), within the memory addresses in the cache 102 having the basic block n to indicate that the basic block n is invalid. An example of the invalid mark n is a sequence of bits.

In one embodiment, a hash value is an example of a validation result.

Figure 8C:
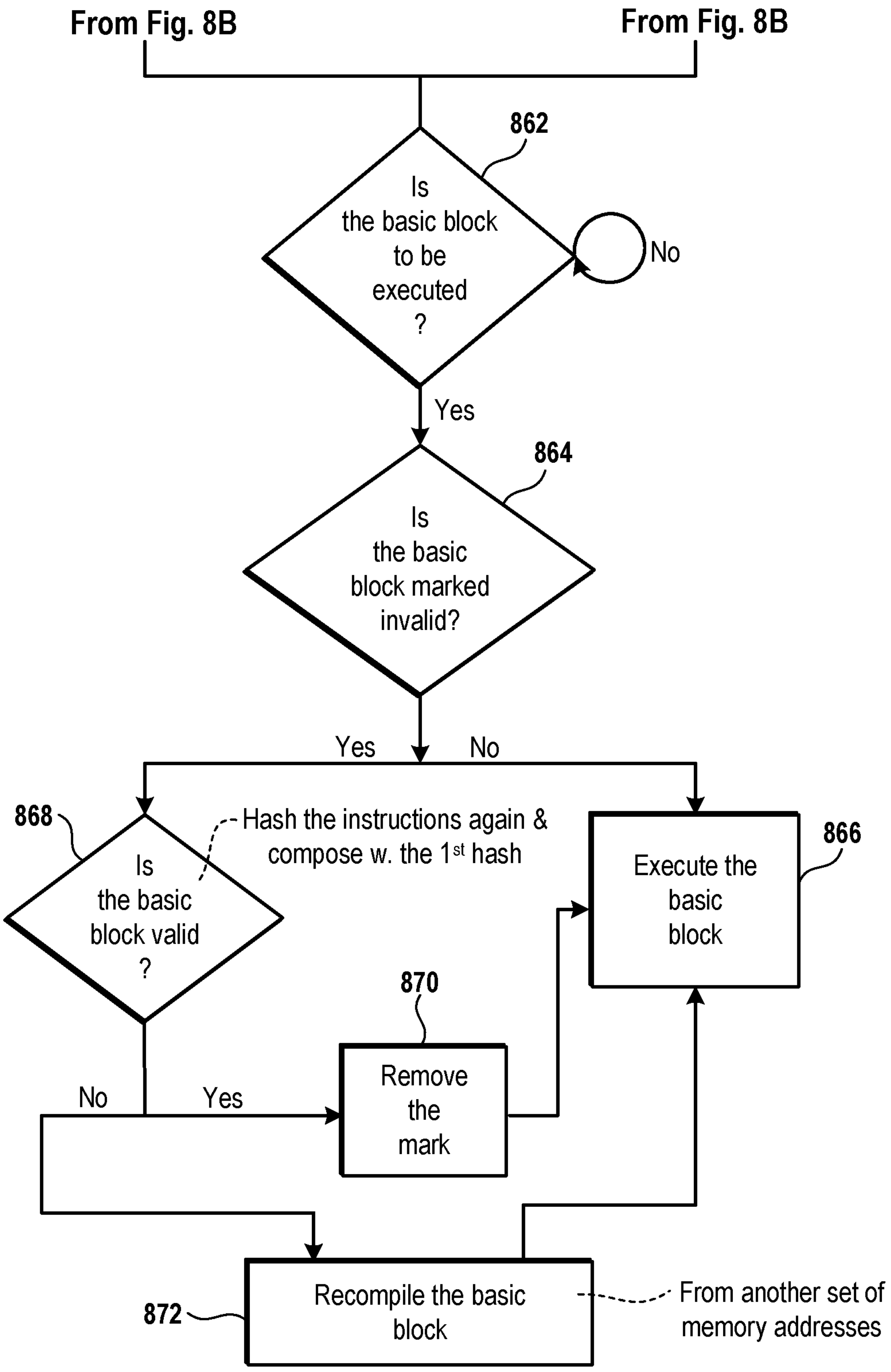
FIG. 8C is a continuation of the flowchart of the method of FIG. 8B.

FIG. 8C is a continuation of the flowchart of the method 800 of FIG. 8B. In an operation 862 of the method 800, the block validator 802 (FIG. 8A) determines whether the basic block n is to be executed. For example, the block dispatcher 302 sends an indication to the block validator 802 that the basic block n is to be executed. Upon receiving the indication from the block dispatcher 302 that the basic block n is to be executed, the block validator 802 determines that the basic block n is to be executed. Until the indication is received, the block validator 802 does not determine that the basic block n is to be validated.

Upon determining that the basic block n is to be executed, the block validator 802, in an operation 864 of the method 800, determines whether the basic block n is marked as invalid. For example, the block validator 802 sends a command to the block flagger 804 to determine whether the basic block n is flagged as invalid. Upon receiving the command, the block flagger 804 sends an indication to the block validator 802 whether the basic block n is flagged as invalid. To illustrate, the block flagger 804 accesses the basic block n to determine whether the basic block n includes the invalid mark n to generate and send the indication of invalidity to the block validator 802. As another illustration, the block flagger 804 accesses the basic block n to determine whether the basic block n does not include the invalid mark n to generate and send the indication of lack of invalidity to the block validator 802. Upon receiving the indication from the block flagger 804 that the basic block n is marked as invalid, the block validator 802 determines that the basic block n is invalid. On the other hand, upon receiving the indication from the block flagger 804 that the basic block n lacks the invalid mark n, the block validator 802 determines that the basic block n is not marked as invalid.

Upon determining that the basic block n is not marked as invalid, in an operation 866 of the method 800, the basic block n is executed. For example, the operation 866 is similar to the operation 662 (FIG. 6B). To illustrate, the block validator 802 sends a command to the block dispatcher 302 to execute the basic block n. Upon receiving the command to execute the basic block n, the block dispatcher 302 runs the basic block n. In this illustration, until the command is received from the block validator 802 for execution of the basic block n, the block dispatcher 302 does not execute the basic block n.

On the other hand, in response to determining that the basic block n is marked as invalid, in an operation 866 of the method 800, the block validator 802 determines whether the basic block n is actually valid. For example, upon determining that the basic block n is marked as invalid, the block validator 802 creates a second hash value from either the updated instructions or the corrupted data stored in the same memory addresses, within the memory device 412, at which the one or more of the emulated PU code instructions 1 through M from which the basic block n is compiled are stored. In the example, the second hash value is stored in one or more registers, of the cache 102, that are keyed to include the basic block n. To illustrate, the block validator 802 sends a request to the parser 602 to obtain the updated instructions or the corrupted data stored at the one or more memory addresses within the memory device 412. The parser 602, upon receiving the request, reads the updated instructions or the corrupted data from the one or more memory addresses from the memory device 412, and provides the updated instructions or the corrupted data to the block validator 802. In the illustration, the block validator 802 generates the second hash value from the updated instructions or the corrupted data and stores the second hash value in the cache 102. For example, the block validator 802 generates a digest or a checksum from the updated instructions or the corrupted data. In the illustration, the block validator 802 compares the second hash value with the first hash value to determine whether the basic block n is valid. Upon determining, based on the comparison, that there is a match between the first hash value and the second hash value, the block validator 802 determines that the basic block n is valid. The match occurs when the second hash value is generated from the updated instructions. On the other hand, upon determining, based on the comparison, that there is a lack of match between the first hash value and the second hash value, the block validator 802 determines that the basic block n is invalid. The lack of match occurs when the second hash value is generated from the corrupted data.

In response to determining that the basic block n is valid, in an operation 870 of the method 800, the invalid mark n is removed. For example, the block validator 802 sends a command to the block flagger 804 to remove the invalid mark n from the basic block n stored in the cache 102. Upon receiving the command from the block validator 802, the block flagger 804 accesses the basic block n from the cache 102 and erases the invalid mark n from the basic block n. To illustrate, the block flagger 804 erases the invalid mark n from one or more memory addresses of the cache 102 in which the invalid mark n is stored. Upon removing the invalid mark n, the block flagger 804 sends a command to the block dispatcher 302 to execute the basic block n, and upon receiving the command, in the operation 866, the block dispatcher 302 runs the basic block n. As an example, the block dispatcher 302 does not execute the basic block n until the command to execute the basic block n is received from the block flagger 804.

On the other hand, upon determining that the basic block n is not valid, in an operation 872 of the method 800, an additional basic block, having the same functionality or operation as the basic block n, is compiled. For example, the block validator 802 sends a command to the block dispatcher 302 to not execute the basic block n and sends an indication to the block creator 604 that the basic block n is invalid. Upon receiving the indication, the block creator 604 recompiles the basic block n. To illustrate, the block creator 604 compiles the additional basic block in the same manner as that of compiling the basic block n from one of the more of the emulated PU code instructions 1 through M stored in the memory device 412 except that the additional basic block is compiled from an additional set of emulated PU code instructions, such as one or more of the emulated PU code instructions 1 through M, stored within a memory device of an additional legacy machine. The additional legacy machine is different from the legacy machine that includes the memory device 412. Also, the additional set of emulated PU code instructions are of the same game title GN as that of the game code gcN. As another illustration, the block creator 604 compiles the additional basic block in the same manner as that of compiling the basic block n from one of the more of the emulated PU code instructions 1 through M stored in the memory device 412 except that the additional basic block is compiled from an additional set of emulated PU code instructions, such as one or more of the emulated PU code instructions 1 through M, stored within different memory addresses of the memory device 412 than memory addresses, of the memory device 412, at which the emulate PU code instructions 1 through M are stored. As yet another illustration, the block creator 604 compiles the additional basic block in the same manner as that of compiling the basic block n from one of the more of the emulated PU code instructions 1 through M stored in the memory device 412 except that the additional basic block is compiled from an additional set of emulated PU code instructions, such as one or more of the emulated PU code instructions 1 through M, stored within a different memory device than the memory device 412.

The additional basic block is sent from the block creator 604 to the block dispatcher 302 for execution. For example, the block dispatcher 302 executes the additional basic block to generate a portion of an additional virtual environment, such as the virtual environment 452 (FIG. 4B). To illustrate, the block dispatcher 302 executes the additional basic block to generate a portion of an image frame, which includes additional virtual environment data, such as a position and an orientation of the virtual object 454, the parameter of the virtual object 454, positions and orientations of other virtual objects in the virtual environment 452, and the parameter of the other virtual objects in the additional virtual environment. The block dispatcher 302 provides the image frame to the GPU of the emulation processor system 409 to display, such as render, the additional virtual environment on the display screen of the display device 410.

It should be noted that although the method 850 is illustrated with reference to the basic block n and the additional basic block, the method 850 is equally applicable to other basic blocks 1 through (n−1) and more additional basic blocks, which are generated in the same manner in which the additional basic block is generated.

In one embodiment, the set of emulated PU code instructions 1 through M are stored in a first set of one or more memory devices, located outside the legacy machine, and the additional set of emulated PU code instructions is stored in a second set of one or more memory devices, located outside the additional legacy machine.

Figure 9A:
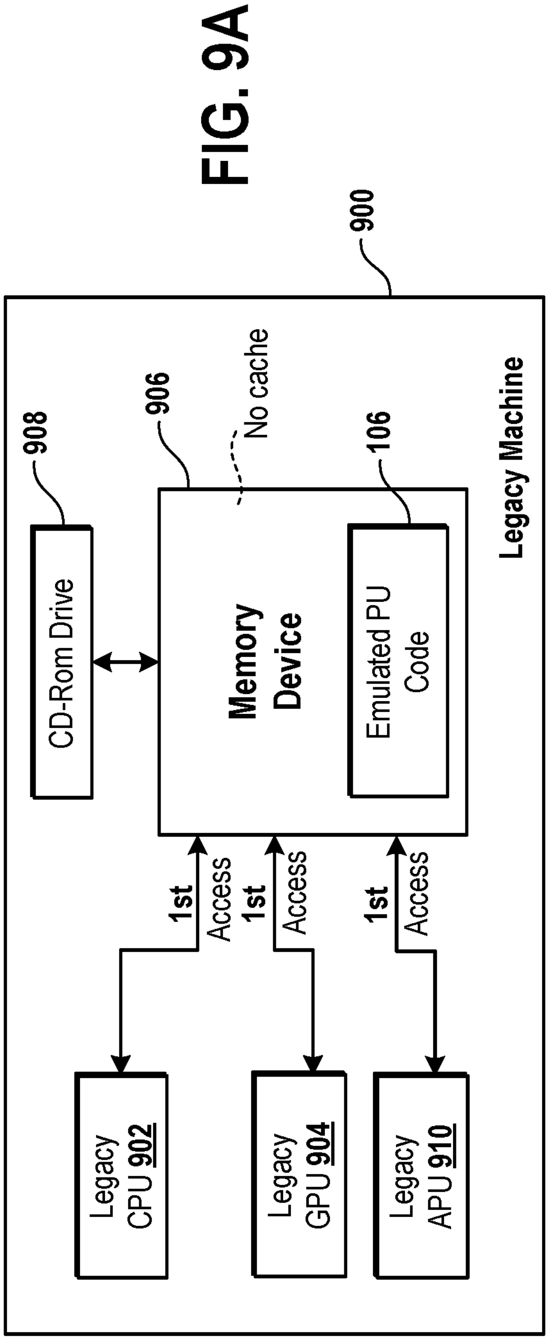
FIG. 9A is a diagram to illustrate an embodiment of a legacy machine.

FIG. 9A is a diagram to illustrate an embodiment of a legacy machine 900. The legacy machine 900 includes a legacy CPU 902, a legacy GPU 904, a legacy APU 910, a memory device 906, and a CD-ROM drive 908. The memory device 906 is an example of the memory device 412 (FIG. 4A). An example of the legacy CPU 902 is a 32-bit CPU that can process at most 32 bits during one clock cycle. Also, an example of the legacy GPU 904 is a 32-bit GPU that can process at most 32 bits during one clock cycle. An example of the legacy APU 910 is a 16-bit APU that can process at most 16 bits to generate one or more legacy audio parameters during one clock cycle. An example of the memory device 906 is a 2 megabyte (MB) RAM.

The legacy CPU 902, the legacy APU 910, and the legacy GPU 904 are coupled to the memory device 906, which is coupled to the CD-ROM drive 908. The emulated PU code 106 is stored within the memory device 906.

The legacy CPU 902, the legacy APU 910, or the legacy GPU 904 accesses the emulated PU code 106 from the memory device 906 and processes the emulated PU code 106. The CD-ROM drive 908 receives a CD-ROM, which includes the updated instructions or the corrupted code. The updated instructions or the corrupted code can be transferred from the CD-ROM to the memory device 906 by the legacy CPU 902.

In one embodiment, the legacy machine 900 excludes a cache. In an embodiment, the legacy machine 900 includes a cache of limited capacity, such as a 4 kilobyte (KB) cache.

In an embodiment, the legacy machine 900 is not currently being manufactured by an entity, such as a company or a corporation, but has been manufactured by the entity in the past.

Figure 9B:
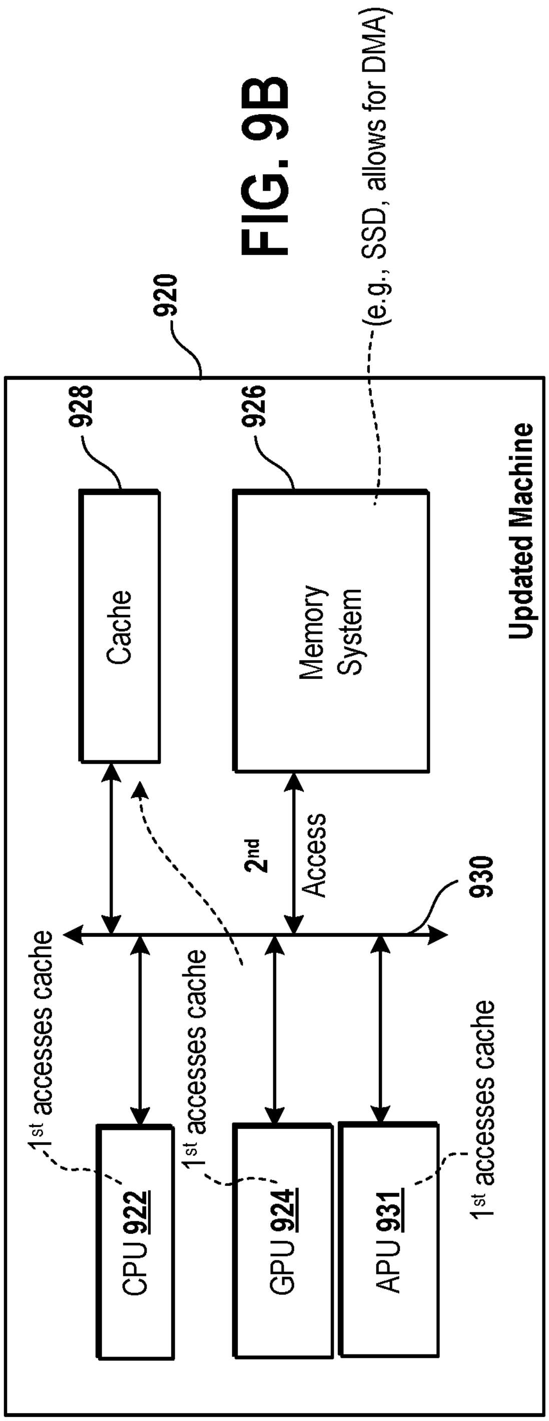
FIG. 9B is a diagram to illustrate an embodiment of an updated machine.

FIG. 9B is a diagram to illustrate an embodiment of an updated machine 920. The updated machine 920 includes a CPU 922, a GPU 924, an APU 931, a memory system 926, and a cache 928, which is an example of the cache 102 (FIG. 1). The game console 402 (FIG. 4B) is an example of the updated machine 920. As an example, the CPU 922 includes two quad-core modules and each module can process 64 bits during each clock cycle. Each core has a 32 kilobyte (KB) cache. Another example of the CPU 922 is a 64-bit CPU that can process at most 64 bits during one clock cycle. As an example, the GPU 924 has 1152 cores and each core can process 64-bits during one clock cycle. As another example, the legacy GPU 924 is a 64-bit GPU that can process at most 64 bits during one clock cycle. As yet another example, the APU 931 is a 16-bit APU that can process at most 16 bits during one clock cycle. As still another example, the APU 931 is a 24-bit APU that can process at most 24 bits during one clock cycle. As still another example, the APU 931 is a 32-bit APU that can process at most 32 bits during one clock cycle.

The CPU 922, the GPU 924, and the APU 931 are coupled to the memory system 906. As an example, the emulated PU code 106 is stored within the legacy memory system 906. An example of the memory system 926 includes is a hard drive that provides a storage of 500 gigabytes (GB), or 2 terabytes (TB). The CPU 922, the GPU 924, the cache 928, and the memory system 926 are coupled to each other via a bus 930.

The CPU 922 or the GPU 924 accesses the cache 928 first before accessing the memory system 926. Upon determining that the cache 928 does not data that is requested by the CPU 922 or the GPU 924, the CPU 922 or the GPU 924 or the APU 931 accesses the memory system 926.

It should be noted that in one embodiment, the game code gcN cannot be executed by the CPU 922 or the GPU 924 or the APU 931 but can be executed by the legacy CPU 902 or the legacy GPU 904. Also, the basic blocks 1 through n can be executed by the CPU 922 or the GPU 924 or the APU 930 but cannot be executed by the legacy CPU 902 or the legacy GPU 904 or the legacy APU 910.

In one embodiment, the cache 928 is located within the CPU 922.

In an embodiment, the cache 928 is located within the GPU 924.

In an embodiment, the cache 928 is located within the APU 931.

In one embodiment, the cache 928 is located within the CPU 922 and another cache, such as the cache 102, is located within the GPU 924.

In an embodiment, the updated machine 920 is currently being or has recently been manufactured by the entity. For example, the updated machine 920 is manufactured by the entity years are manufacturing the legacy machine 900.

Figure 10A:
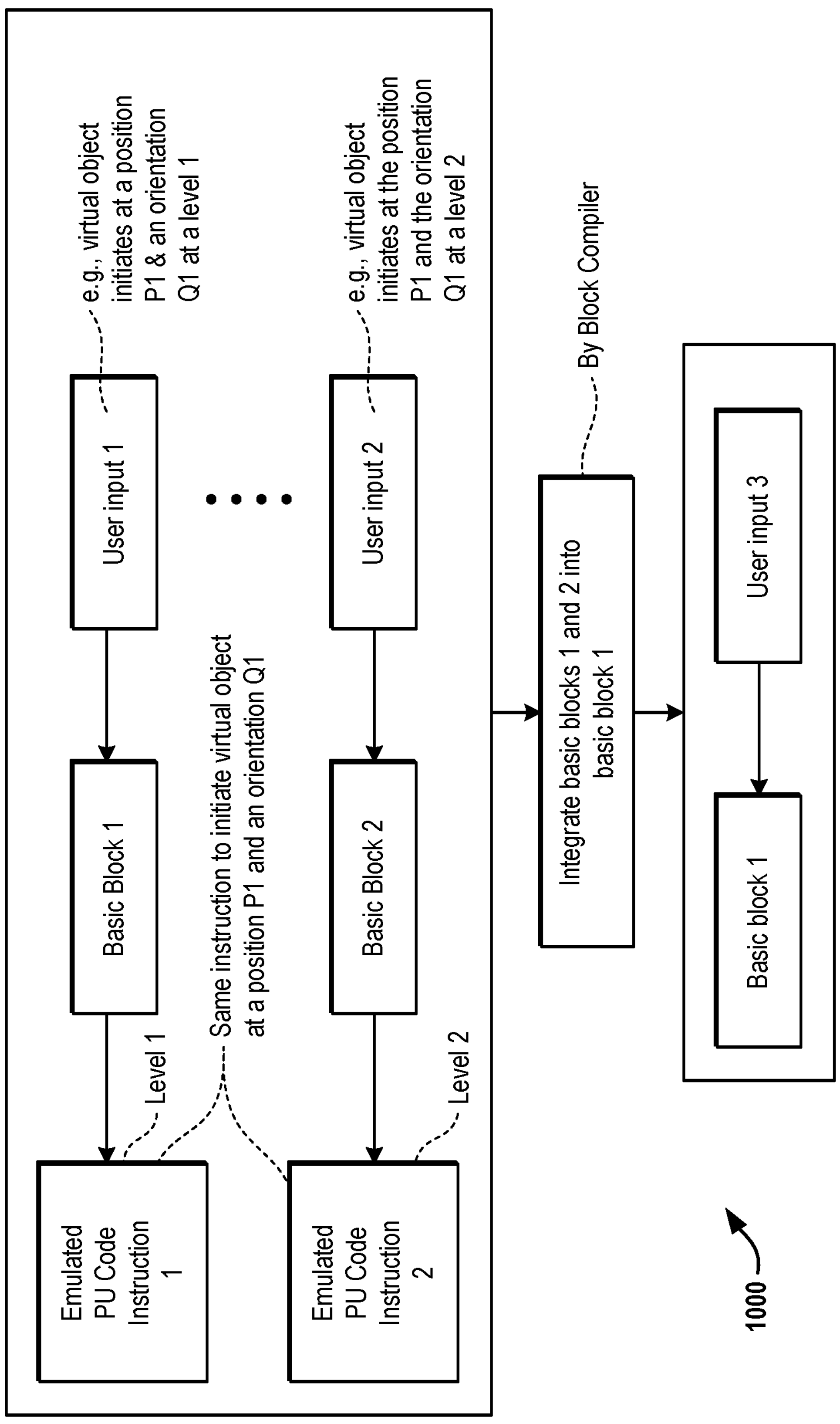
FIG. 10A is a diagram of an embodiment of a system to illustrate combining of multiple basic blocks into one basic block by a basic block compiler.

FIG. 10A is a diagram of an embodiment of a system 1000 to illustrate combining of multiple basic blocks into one basic block by the basic block compiler 104 (FIG. 1). The block creator 604 (FIG. 6A) receives the user input 1, such as a signal indicating that the virtual object 454 (FIG. 4B) be initiated at the position P1 and the orientation O1 at a level 1 of the legacy game N having the game title GN. Upon receiving the user input 1, the basic block 1 is generated by the basic block compiler 104 based on the emulated PU code instruction 1 to service the user input 1. Similarly, the block creator 604 receives the user input 2, such as a signal indicating that the virtual object 454 be initiated at the position P1 and the orientation O1 at a level 2 of the legacy game N. Upon receiving the user input 2, the basic block 2 is generated by the basic block compiler 104 based on the emulated PU code instruction 2 to service the user input 2.

When a user input 3, such as a signal indicating that the virtual object 454 be initiated at the position P1 and the orientation O1 at a level 3 of the legacy game N, is received, the block compiler 104 identifies the basic blocks 1 and 2 as servicing the user input 3. Upon identifying so, the block creator 604 integrates, such as combines, the basic blocks 1 and 2 into a single basic block, such as the basic block 1 or the basic block 2. The integration saves memory space in the cache 102 and also increases efficiency in accessing the single basic block instead of accessing the basic block 1 and the basic block 2.

The block creator 604 further generates a value in a pointer of the cache 102. An example of a pointer, as used herein, is a register. The pointer indicates to the block dispatcher 302 to execute the single basic block when a user input for servicing the basic block 1 or the basic block 2 is received. At a time the block dispatcher 302 is to execute the basic block 1 or 2, the block dispatcher 302 accesses the pointer and executes the single basic block instead of the basic block 1 or 2.

Figure 10B:
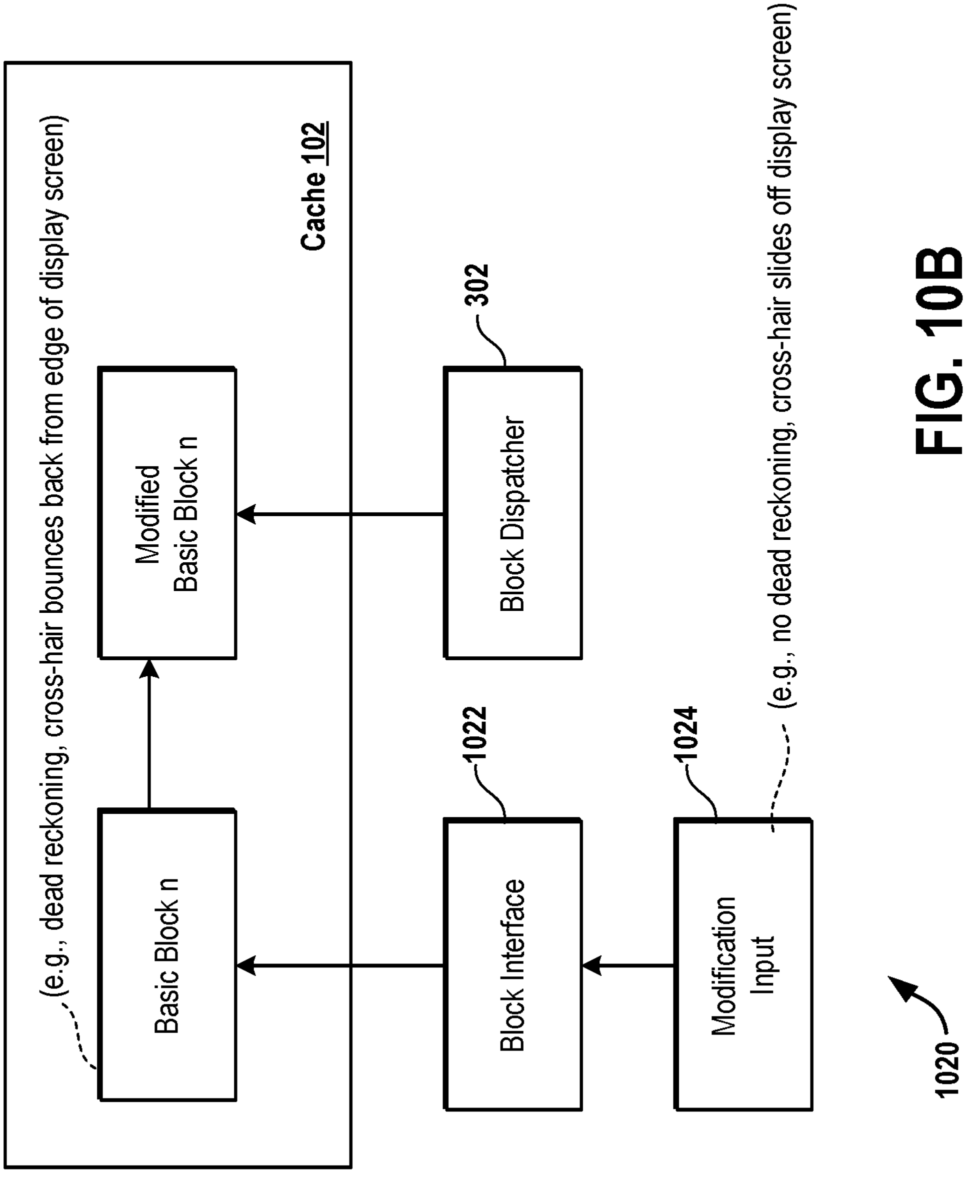
FIG. 10B is a diagram of an embodiment of a system to illustrate modification of one or more of the basic blocks.

FIG. 10B is a diagram of an embodiment of a system 1020 to illustrate modification of one or more of the basic blocks 1 through n. The system 1020 includes a block interface 1022, the cache 102, and the block dispatcher 302. As an example, the basic block n includes the operation n of dead reckoning. As another example, the basic block n includes the operation n of bouncing back a crosshair from an edge of the display screen of the display device 410 (FIG. 4B). An example of the block interface 1022 is an ASIC, or a PLD, or a microprocessor, or a microcontroller, or a computer program, or a portion of a computer program. The block interface 1022 is coupled to the cache 102.

The block interface 1022 provides access to the user to one or more of the basic blocks 1 through n stored in the cache 102. For example, the user selects one or more buttons on an input device, such as a keyboard or a mouse or a keypad, to generate a modification input 1024. As an example, the modification input 1024 includes one or more user instructions in the form of source code to modify the basic block n. To illustrate, the modification input 1024 includes a user instruction to remove the operation n of dead reckoning from the basic block n. As another example, the modification input 1024 includes an instruction to change the operation n to include that the cross hair slides off the edge of the display screen of the display device 410 and is displayed at an opposite edge of the display screen of the display device 410. The opposite edge is diagonally opposite to the edge at which the cross hair slides off.

The input device is coupled to the block interface 1022. The modification input 1024 is sent from the input device to the block interface 1022 to modify the basic block n to output a modified basic block n. As an example, the modified basic block n does not include the operation of dead reckoning. As another example, the modified basic block n includes the operation n of sliding off the crosshair from the edge to the opposite edge. As yet another example, the modified basic block n includes an operation of calculating a number of clock cycles of execution of the operation n and storing the number in the basic block n. To illustrate, the number of cycles is stored in memory addresses of the cache 102 in which the basic block 1 is stored. The operation of calculating the number of clock cycles is executed by the block dispatcher 302 (FIG. 3) in addition to executing the operation n. The block dispatcher 302 calculates the number of clock cycles upon execution of the operation n and stores the number in the basic block n.

The block creator 604 further generates a value in a pointer within the cache 102, and the pointer indicates to the block dispatcher 302 to execute the modified basic block n when a user input for servicing the basic block n is received. At a time the block dispatcher 302 is to execute the basic block n, the block dispatcher 302 accesses the pointer and executes the modified basic block n instead of the basic block n.

Figure 10C:
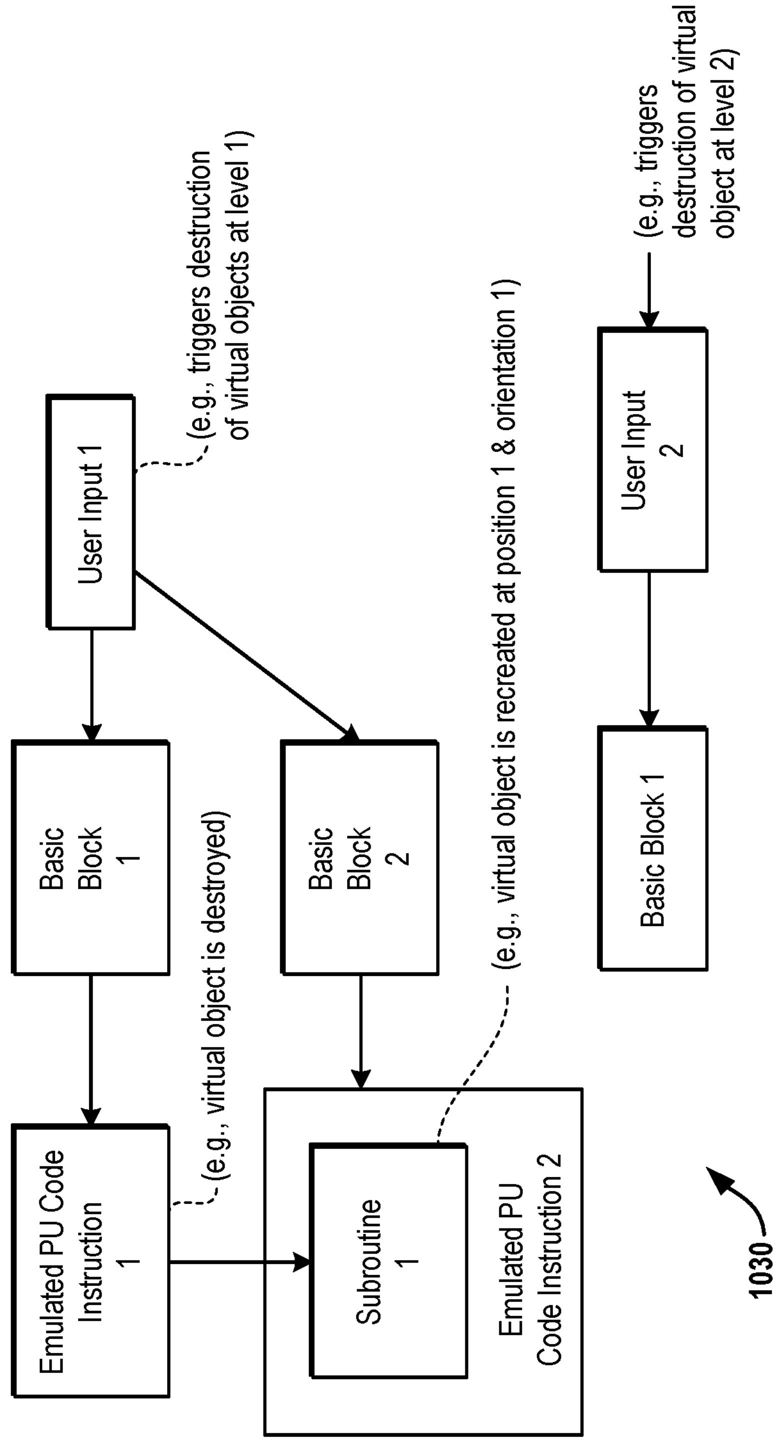
FIG. 10C is a diagram of an embodiment of the system to illustrate combining of a basic block created based on a subroutine with a basic block generated based on an emulated PU code instruction, which calls the subroutine.

FIG. 10C is a diagram of an embodiment of a system 1030 to illustrate combining of a basic block created based on a subroutine with a basic block generated based on an emulated PU code instruction, which calls the subroutine. The block creator 604 (FIG. 6A) receives the user input 1, such as a signal indicating a change in a position and/or an orientation of the virtual object 454 (FIG. 4B) that results in a destruction of the virtual object 454. Upon receiving the user input 1, the basic block 1 is generated by the basic block compiler 104 based on the emulated PU code instruction 1 to service the user input 1. The emulated PU code instruction 1 includes a function call to a subroutine 1. As such, upon receiving the user input 1, the basic block 2 is generated by the basic block compiler 104 based on the subroutine 1, which is an example of the emulated PU code instruction 2. As an example, the basic block 2 includes the operation 2 of regenerating the virtual object 454 at the position P1 and the orientation O1.

When a user input 2, such as a signal indicating a change in a position and/or an orientation of the virtual object 454 (FIG. 4B) that results in a destruction of the virtual object 454, is received, the block compiler 104 identifies the basic blocks 1 and 2 as servicing the user input 2. Upon identifying so, the block creator 604 integrates, such as combines, the basic blocks 1 and 2 into a single basic block, such as the basic block 1 or the basic block 2. For example, upon receiving the user input 2, the destruction of the virtual object 454 and the regeneration of the virtual object 454 are triggered. When the basic blocks 1 and 2 are combined, the subroutine 1 is skipped.

The block creator 604 further generates a value and stores the value in a pointer within the cache 102. The value indicates to the block dispatcher 302 to execute the single basic block when a user input for servicing the basic blocks 1 and 2 is received. At a time the block dispatcher 302 is to execute the basic blocks 1 and 2, the block dispatcher 302 accesses the pointer and executes the single basic block instead of the basic block 1.

Figure 10D:
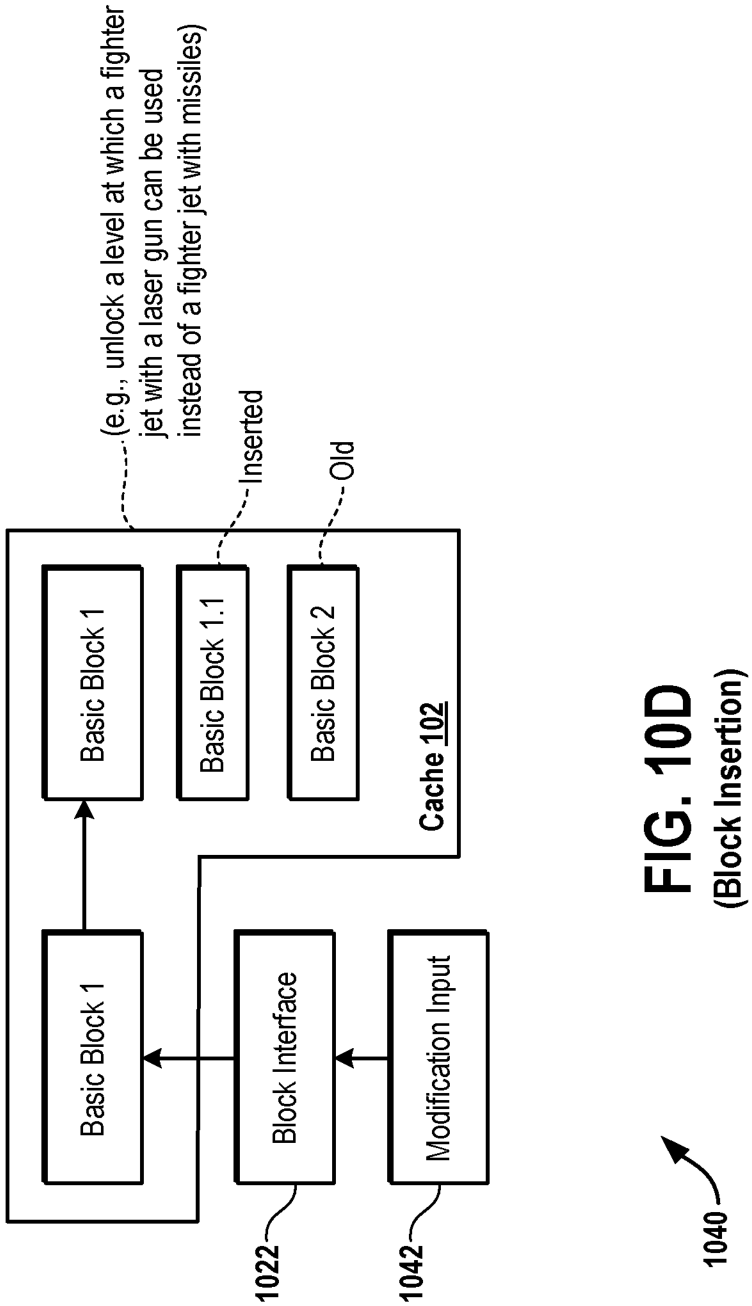
FIG. 10D is a diagram of an embodiment of a system to illustrate an insertion of a basic block between two basic blocks.

FIG. 10D is a diagram of an embodiment of a system 1040 to illustrate an insertion of a basic block between two basic blocks. The system 1040 includes the block interface 1022 and the cache 102. After the basic blocks 1 and 2 are stored in the cache 102, a modification input 1042 is received from the user via the input device. As an example, the modification input 1042 is a signal including a source code that defines a basic block 1.1, which includes a source register address 1.1 within the cache 102, a destination register address 1.1 within the cache 102, and an operation 1.1 to be performed on data stored within the source register address 1.1, or on the destination register address 1.1, or both the source and destination register addresses 1.1. Examples of the operation 1.1 include jump, store, load, branch, and an arithmetic operation.

The modification input 1042 further includes an indication of a location of the basic block 1.1 and an association of the basic block 1.1 with the basic block 1 or 2. For example, the modification input 1042 includes a signal indicating that the basic block 1.1 is to be inserted between the basic blocks 1 and 2 in the cache 102 and a signal indicating that the basic block 1.1 is to be linked to the basic blocks 1 and/or 2. To illustrate, the basic block 1.1 is inserted to include a location, such as one or more register addresses, in the cache 102, for receiving an invalid mark 2 of the basic block 2. As another illustration, the basic block 1.1 is inserted to include a location, such as one or more register addresses in the cache 102, for receiving a number of cycles of execution of the basic block 2. In the illustration, the block interface 1022 receives the modification input 1042, identifies, from the modification input 1042 that the basic block 1.1 is to be inserted between the basic blocks 1 and 2, and inserts the basic block 1.1 between the basic blocks 1 and 2. As another illustration, the block interface 1022 determines that the basic block 1.1 includes an operation for unlocking a level in the legacy game N having the game title GN. The level is between a first level identified in an operation of the basic block 1 and a second level identified in an operation of the basic block 2. The first and second levels are in the legacy game N having the game title GN. The level inserted between the first and second levels is not a part of the game code gcN but is a new level of the legacy game N. An example of the level inserted between the first and second levels is a level in which the virtual object 454 shoots a laser gun instead of missiles.

In addition, the block interface 1022 identifies from the modification input 1042 a value of a pointer and stores the value the cache 102. As an example, the value of the pointer indicates that execution of the basic block 1.1 occur immediately before execution of the basic block 2. When the block dispatcher 302 is to execute the basic block 2, the block dispatcher 302 identifies the value within the pointer to point the basic block 1.1, and executes the basic block 1.1 immediately before executing the basic block 2. As another example, the value of the pointer indicates that execution of the basic block 1.1 occur immediately after execution of the basic block 2. After the block dispatcher 302 executes the basic block 2, the block dispatcher 302 identifies the value within the pointer to point the basic block 1.1, and executes the basic block 1.1 immediately after executing the basic block 2.

Figure 10E:
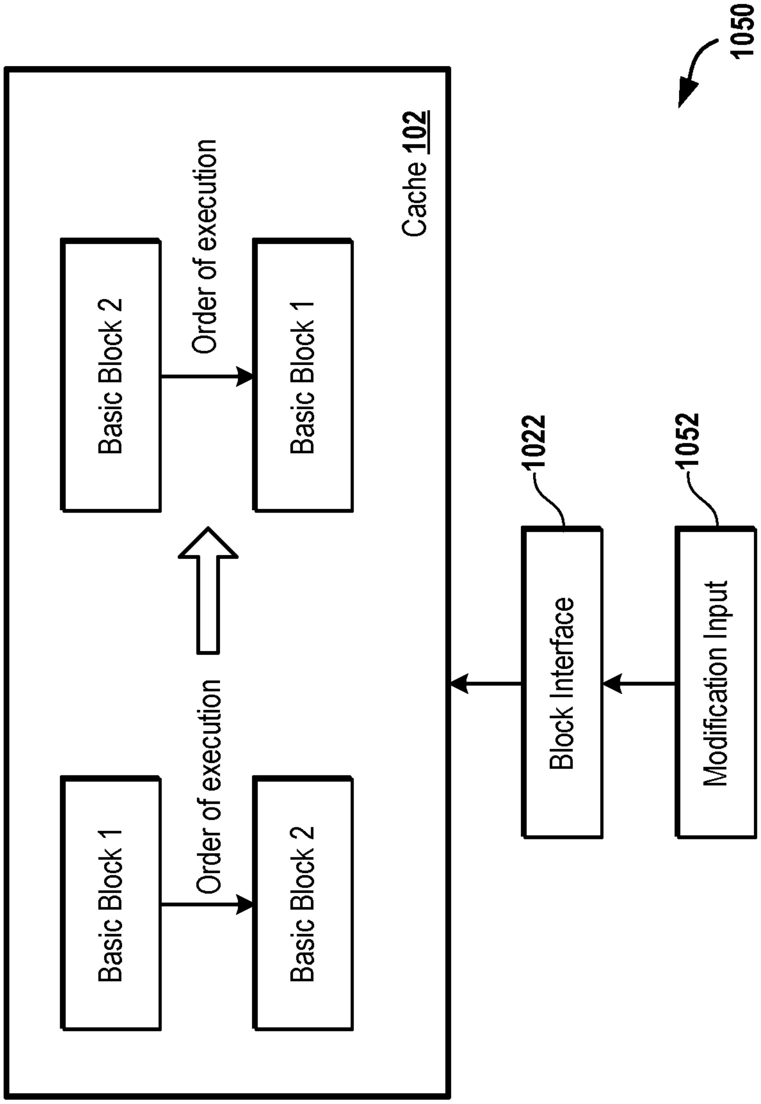
FIG. 10E is a diagram of an embodiment of a system to illustrate a switch in an order of execution of basic blocks.

FIG. 10E is a diagram of an embodiment of a system 1050 to illustrate a switch in order of execution of basic blocks. The system 1050 includes the cache 102 and the block interface 1022. The cache 102 includes a value within a pointer of the cache 102 and the value indicates that the basic block 2 be executed after executing the basic block 1. The user uses the input device to provide a modification input 1052, which includes a signal indicating that an order of execution of the basic blocks 1 and 2 be switched. Upon receiving the signal, the block interface 1022 changes a value of the pointer in the cache 102 to indicate that the basic block 1 be executed after executing the basic block 2.

Figure 11A:
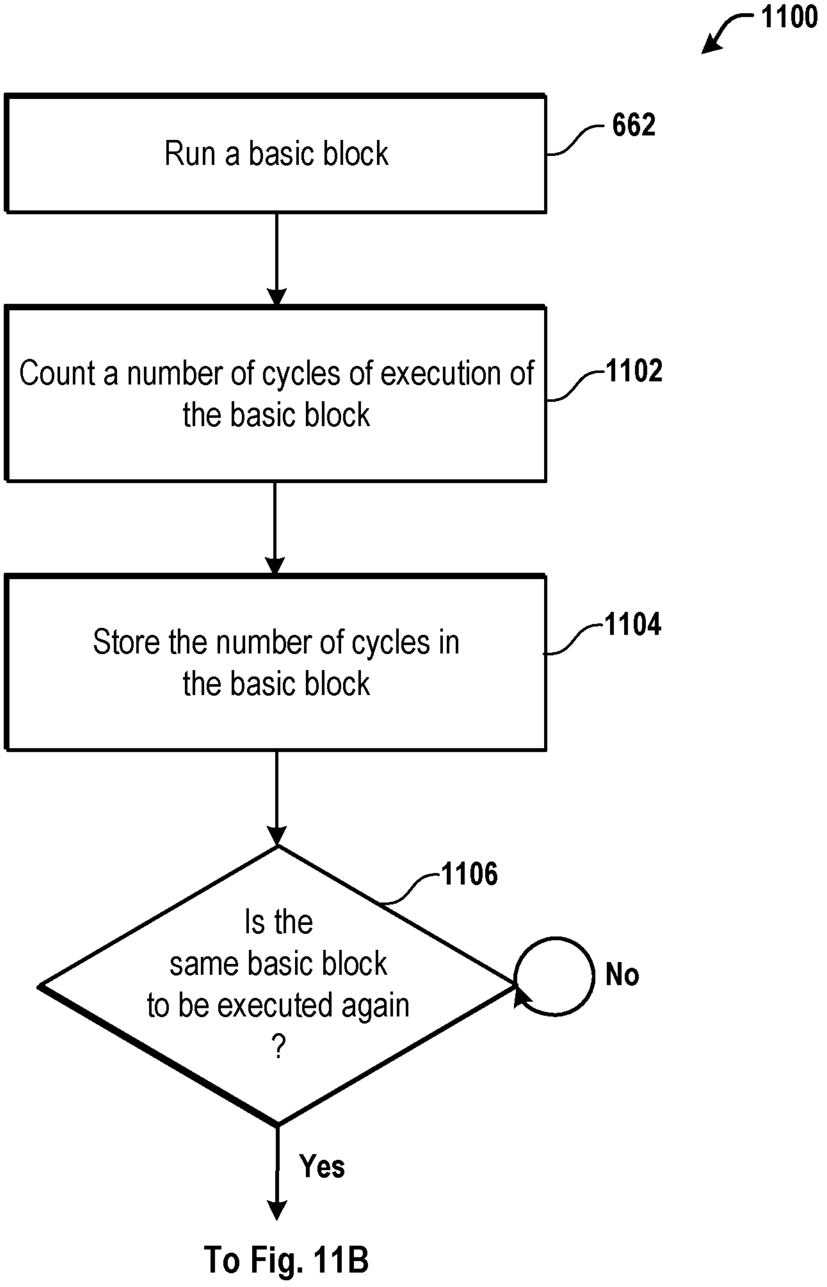
FIG. 11A is a flowchart of an embodiment of a method to illustrate use of a count of a number of cycles stored in the basic block n.

FIG. 11A is a flowchart of an embodiment of a method 1100 to illustrate use of the real count of the number of cycles stored in the basic block n. The method 1100 includes the operation 662 of executing the basic block n. In an operation 1102 of the method 1100, the block dispatcher 302 (FIG. 3) counts the number of cycles of execution, in the operation 662, of the basic block n to generate a first count. The block dispatcher 302, in an operation 1104 of the method 1100, stores the first count in the basic block n. For example, the block dispatcher 302 writes the real count to a register having one of register addresses, within the cache 102, that are assigned to the basic block n.

In an operation 1106 of the method 1100, the block creator 604 (FIG. 6A) determines whether the same basic block n is to be executed again. For example, the block creator 604 determines whether a user input for servicing the same basic block n is received from the client device. The block creator 604 continues to determine whether the user input for servicing the same basic block n is received until the user input is received.

Figure 11B:
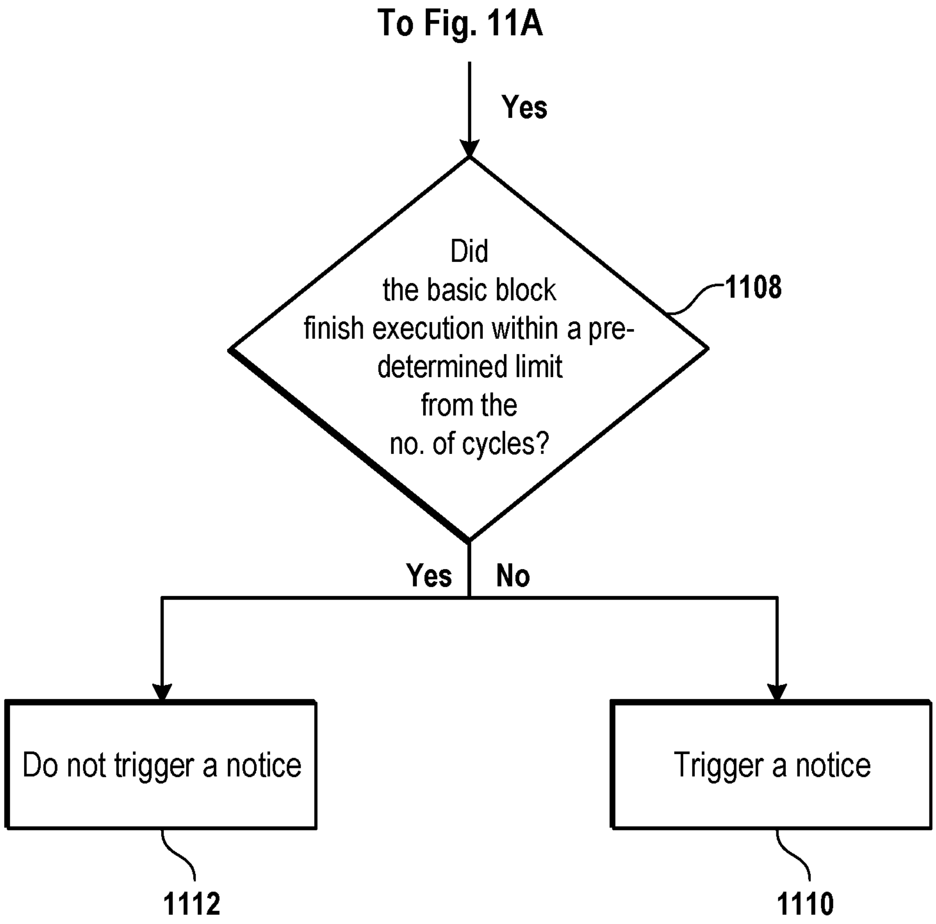
FIG. 11B is a continuation of the flowchart of the method of FIG. 11A.

FIG. 11B is a continuation of the flowchart of the method 1100 of FIG. 11A. Upon determining that the user input for servicing the basic block n is received again, the basic block n is executed again by the block dispatcher 304. In an operation 1108 of the method 1100, the block dispatcher 304 counts a number of cycles of execution, in the operation 1106, of the basic block n, to calculate a second count.

The block dispatcher 304 determines whether the second count is within a pre-determined limit from the first count in an operation 1108 of the method 1100. The pre-determined limit is stored in the cache 102. In response to determining that the second count is not within the pre-determined limit from the first count, in an operation 1110 of the method 1100, the block dispatcher 304 generates a notice. For example, when the block dispatcher 304 is located within the game console 402 (FIG. 4A), the GPU 924 (FIG. 9B) of the game console 402 displays a representation of the notice on the display device 410 (FIG. 4A) of the client device and sends the notice and via the computer network 408 to the server system 404 to notify the server system 404. As another example, when the block dispatcher 304 is located within the server system 404 (FIG. 4B), the block dispatcher 304 generates the notice and a GPU of the server system 404 displays the representation of the notice on a display device that is coupled to the server system 404. On the other hand, determining that the second count is within the pre-determined limit from the first count, in an operation 1112 of the method 1100, the block dispatcher 304 does not trigger the notice.

Figure 12:
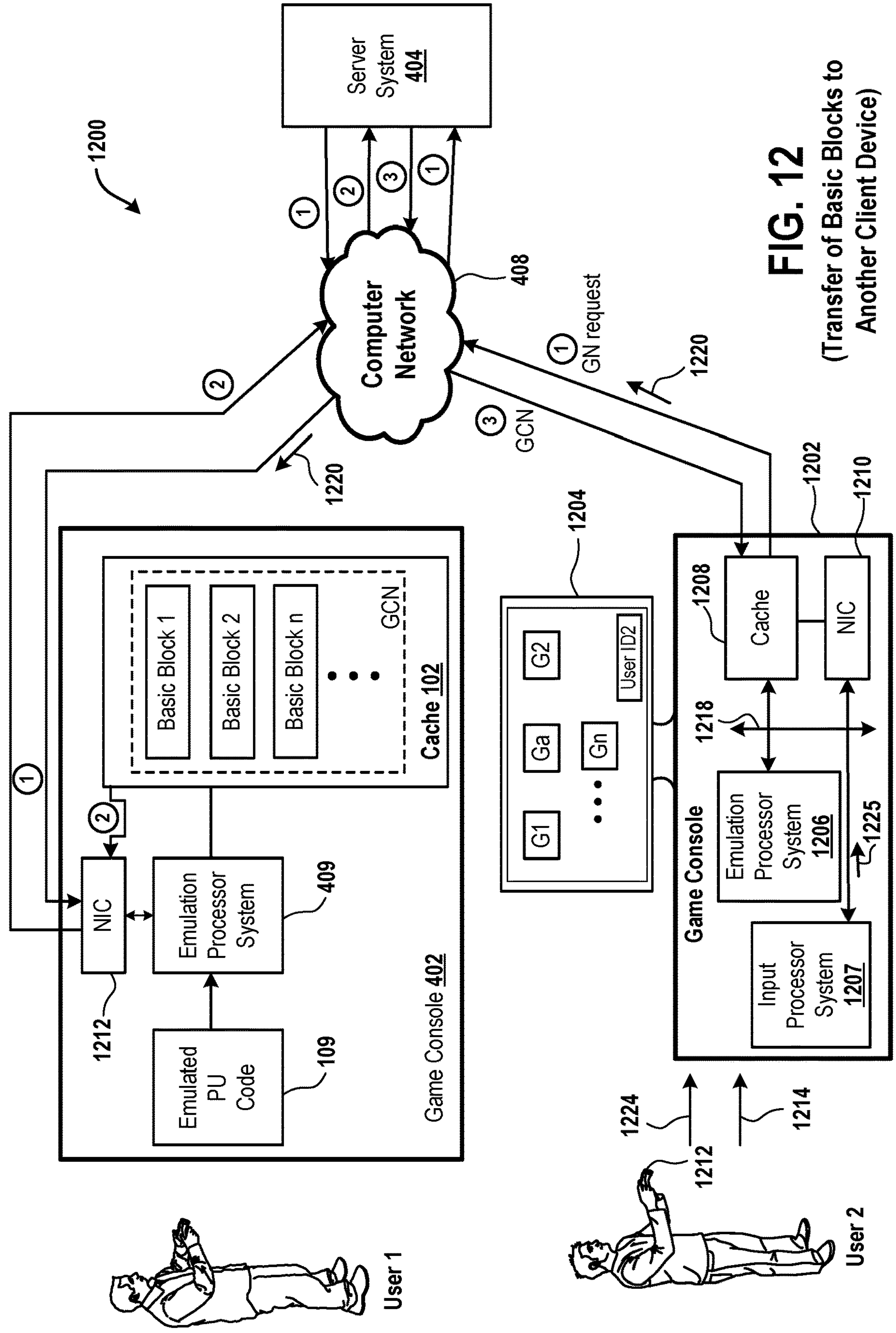
FIG. 12 is a diagram of an embodiment of a system to illustrate a transfer of the basic blocks from a first client device to a second client device.

FIG. 12 is a diagram of an embodiment of a system 1200 to illustrate a transfer of the basic blocks 1 through n from a first client device to a second client device. The system 1200 includes the game console 402, the computer network 408, the server system 404, a game console 1202, and a display device 1204. The game console 1202 is similar to the game console 402. For example, both the game consoles 402 and 1202 are examples of updated machines. As another example, the game console 1202 is not a legacy machine. Also, the display device 1204 is similar to the display device 410 of FIG. 4A. For example, the display device 410 is an HMD or a television or a smart television or a computer monitor.

The game console 402 includes a network interface controller 1212. The game console 1202 includes an emulation processor system 1206, an input processor system 1207, a cache 1208, and a network interface controller 1210. The emulation processor system 1206 has the same structure and same functionality as that of the emulation processor system 409. The input processor system 1207 has the same structure and same functionality as that of the input processor system 407 (FIG. 4A). Also, the cache 1208 has the same structure and the same functionality as that of the cache 102. The emulation processor system 1206, the input processor system 1207, the cache 1208, and the network interface controller 1210 are coupled to each other via a bus 1218.

Once the basic blocks 1 through n are stored in the cache 102, the basic block compiler 104 of the emulation processor system 409 sends the basic blocks 1 through n to the network interface controller 1212. The network interface controller 1212 applies the network communication protocol to the basic blocks 1 through n to generate one or more packets embedding the basic blocks 1 through n and sends the one or more packets via the computer network 408 to the server system 404. Upon receiving the one or more packets, the network interface controller of the server system 404 applies the network communication protocol to the one or more packets to extract the basic blocks 1 through n for the legacy game N having the game title GN and stores the basic blocks 1 through n in one or more memory devices of the server system 404.

A user 2 uses a hand-held controller 1212 to select one or more buttons on the hand-held controller 1212 to log into a user account 2 that is assigned to the user 2 by the server system 404. The user 2 logs into the user account 2 when a user ID2 and a password are authenticated by the server system 404. Once the user 2 logs into the user account 2, the user 2 can access multiple game titles, such as the game title G1, the game title Ga, the game title G2, and so on until the game title GN.

Upon logging into the user account 2, the user 2 uses the hand-held controller 1212 to select one or more buttons on the hand-held controller 1212 to generate a user input 1214. The user input 1214 is generated upon selection of the legacy game N having the title GN displayed on the display device 1204. When the user input 1214 is generated, the cache 1208 does not include the basic blocks 1 through n. For example, upon receiving the user input 1214, a basic block compiler of the emulation processor system 1206 checks the cache 102 to determine whether the cache 102 includes one or more of the basic blocks 1 through n of the game code GCN for servicing the user input 1214. Upon determining that the cache 102 does not include the one or more of the basic blocks 1 through n for servicing the user input 1214, the emulation processor system 1206 generates a request 1220 for the one or more of the basic blocks 1 through n and sends the request 1220 to the network interface controller 1210.

Upon receiving the request 1220, the network interface controller 1210 generates one or more packets embedding the request 1220 by applying the network communication protocol to the request 1220, and sends the one or more packets via the computer network 408 to the server system 404. The network interface controller of the server system 404 receives the one or more packets and applies the network communication protocol to extract the request 1220 from the one or more packets. A processor of the server system 404 analyzes the request 1220 to identify that the basic blocks 1 through n are requested.

In response to determining that the basic blocks 1 through n are requested, the server system 404 accesses the basic blocks 1 through n stored in the one or more memory devices of the server system 404 and provides the basic blocks 1 through n to the network interface controller of the server system 404. The network interface controller of the server system 404 applies the network communication protocol to generate one or more packets embedding the basic blocks 1 through n and sends the one or more packets via the computer network 408 to the game console 1202.

The network interface controller 1210 of the game console 1202 receives the one or more packets having the basic blocks 1 through n, applies the network communication protocol to extract the basic blocks 1 through n from the one or more packets, and sends the basic blocks 1 through n to the emulation processor system 1206. The basic block compiler of the emulation processor system 1206 stores the basic blocks 1 through n in the cache 1208.

When a user input 1224 is received from the hand-held controller 1212 during a play of the game having the game title GN, the input processor system 1207 converts the user input 1224 into a user input 1225 in the same manner in which the input processor system 407 converts the user input 419 into the user input 420. Upon receiving the user input 1225, the basic block compiler of the emulation processor system 1206 identifies one or more of the basic blocks 1 through n within the cache 1208 for servicing the user input 1225. A block dispatcher of the emulation processor system 1206 executes the one or more of the basic blocks 1 through n for servicing the user input 1225. In this manner, once the basic blocks 1 through n are compiled by the emulation processor system 409, the basic blocks 1 through n do not need to be compiled by the emulation processor system 1206 but can be accessed by the emulation processor system 1206 from the server system 404.

Figure 13:
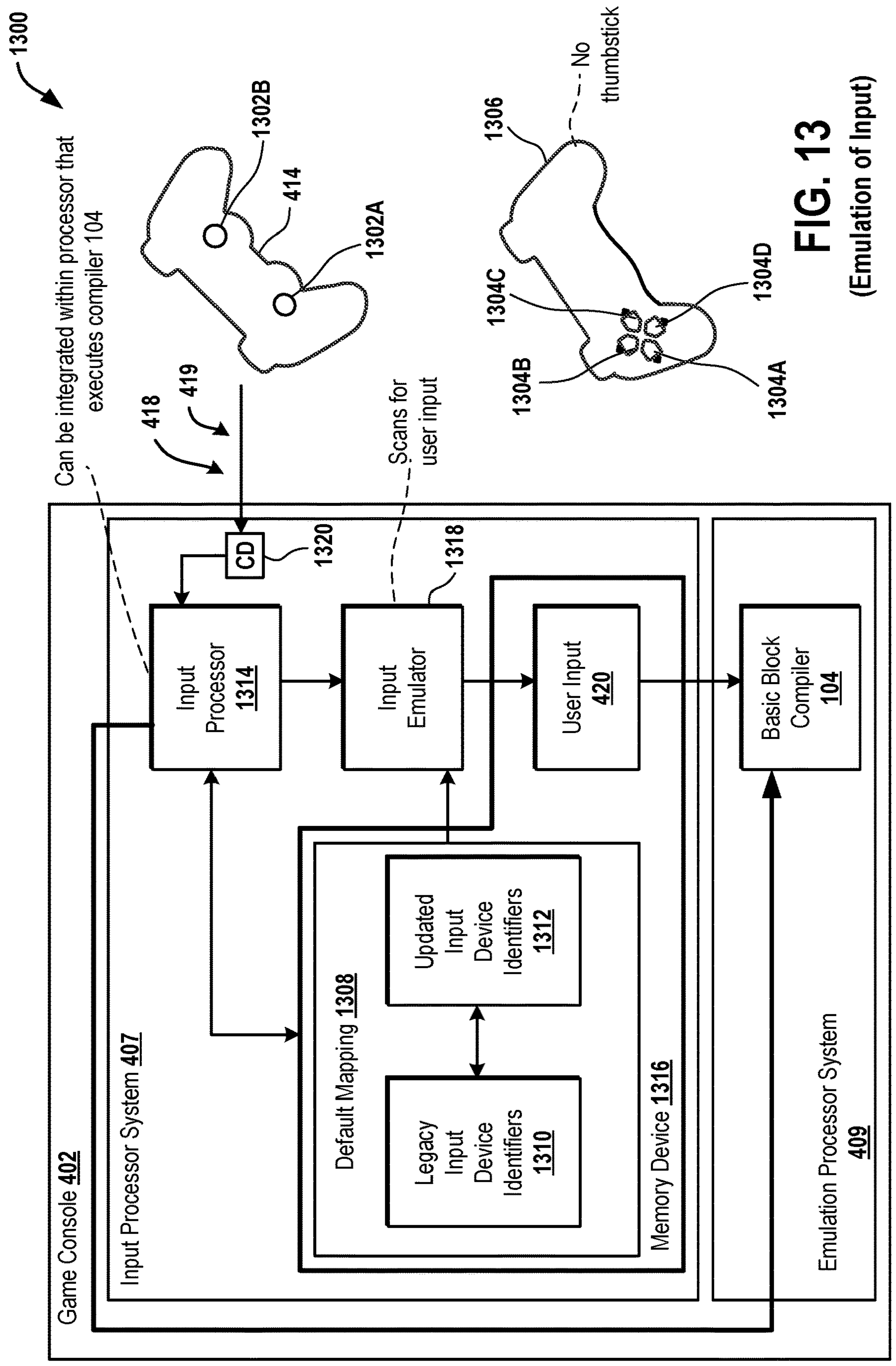
FIG. 13 is a diagram of an embodiment of a system to illustrate emulation of a user input received from an updated hand-held controller during a play of a legacy game.

FIG. 13 is a diagram of an embodiment of a system 1300 to illustrate emulation of the user input 419 received from the hand-held controller 414 during a play of the legacy game N. The system 1300 includes the input processor system 407, the emulation processor system 409, the hand-held controller 414, and a hand-held controller 1306.

The hand-held controller 1306 is an example of a legacy hand-held controller. As an example, the hand-held controller 1306 can be used with the legacy machine 900 (FIG. 9A) but cannot be used with the updated machine 920 (FIG. 9B). To illustrate, the input processor system 407 includes an input processor 1314, which cannot interpret a user input that is generated by and received from the hand-held controller 1306. To further illustrate, the input processor 1314 is capable of interpreting the user input 419 that is represented by 64 bits or 128 bits but cannot interpret the user input, having 32 bits, received from the hand-held controller 1306. As another example, the hand-held controller 1306 is an example of a legacy controller and the hand-held controller 414 is an example of an updated controller. To illustrate, the hand-held controller 1306 is not currently being manufactured by the entity and the hand-held controller 414 is currently being manufactured by the entity. To further illustrate, the hand-held controller 414 is the latest version and the hand-held controller 1306 is an older version. As another further illustration, the hand-held controller 1306 is manufactured by the entity years before the hand-held controller 414 is manufactured by the entity. As yet another example, the hand-held controller 1306 excludes a thumb stick but includes a Select button and the hand-held controller 414 excludes the Select button. An example of the input processor 1314 is a processor integrated within a serial input/output (I/O) chip.

The input processor system 407 further includes an input emulator 1318, a memory device 1316, and a communication device 1320. Within the memory device 1316, a default mapping 1308 are stored. It should be noted that the default mapping 1308 is associated with the user accounts 1 and 2. For example, when the legacy game N is accessed via the user account 1, unless there is a current mapping stored in the memory device 1316 and selected for use with the user account 1, the default mapping 1308 is applied by the input emulator 1318.

As an example, an input emulator, as described herein, is hardware or software or a combination thereof. To illustrate, an input emulator is a processor, or a PLD, or an ASIC, or a controller. To further illustrate, the input emulator 1318, when implemented within the updated machine 920 enables the updated machine 920 to receive and process user inputs received from the hand-held controller 414 to facilitate a play of the legacy game N. The input emulator 1318 facilitates use of the hand-held controller 414 to play the legacy game N. An example of the communication device 1320 is a communication circuit that applies a close-range communication protocol, such as a wireless transfer protocol or a wired transfer protocol. An example of the wired transfer protocol is a USB protocol and an example of the wireless transfer protocol is a Bluetooth™ protocol. The communication device 1320 is coupled to the input processor 1314, which is coupled to the input emulator 1318. The input emulator 1318 is coupled to the basic block compiler 104. Both the input processor 1314 and the input emulator 1318 are coupled to the memory device 1316.

Also, the hand-held controller 414 is coupled to the input processor 1314 via a connection, such as the wired connection or the wireless connection. An example of the wired connection includes a parallel transfer connection in which information is communication from the hand-held controller 414 to the input processor 1314 simultaneously in a parallel manner.

The user 1 operates one or more input devices on the hand-held controller 414 to select the game title GN to generate the user input 418 (FIG. 4A). Examples of the input devices of the hand-held controller 414 include a left thumb stick 1302A, a right thumb stick 1302B, and one or more buttons. To illustrate, to select the game title GN, a button on the hand-held controller 414 is selected, such as pushed or pressed, by the user 1. Based on the user input 418, the server system 404 sends the game code gcN via the computer network 408 to the game console 402 for storage in the memory device 406 (FIG. 4A) of the game console 402.

During a play of the legacy game N, one or more input devices of the hand-held controller 414 are operated by the user 1 to generate corresponding one or more electrical signals, which eventually form the user input 419. For example, when the user 1 moves a thumb stick of the hand-held controller 414 in a forward direction or a backward direction or a right direction or a left direction, an electrical signal is generated. To illustrate, the forward direction and backward direction are along a y-axis of the xyz co-ordinate system of the hand-held controller 414, and the right and left directions are along an x-axis of the xyz co-ordinate system. In the illustration, the forward direction is opposite to the backward direction and the right direction is opposite to the left direction.

The hand-held controller 414 includes motion sensitive hardware, such as one or more magnetometers, one or more accelerometers, one or more potentiometers, and one or more gyroscopes, that is coupled to the one or more input devices of the hand-held controller 414. The hand-held controller 414 further includes an analog-to-digital converter that is coupled to the motion sensitive hardware. The hand-held controller 414 includes a processor, such as an encoder, that is coupled to the analog-to-digital converter and a communication device that is coupled to the processor. When one or more input devices of the hand-held controller 414 are operated by the user 1, the corresponding electrical signals, such as one or more analog motion sensitive signals, are generated by the motion sensitive hardware. The one or more analog motion sensitive signals are sent from the motion sensitive hardware to the analog-to-digital converter of the hand-held controller 414. The analog-to-digital converter of the hand-held controller 414 converts the analog motion sensitive signals from an analog form to a digital form to output digital motion sensitive signals. The digital motion sensitive signals are sent from the analog-to-digital converter to the processor of the hand-held controller 414.

The processor of the hand-held controller 414 applies an encoding protocol to encode the digital motion sensitive signals to output encoded signals. For example, upon determining that a first digital motion sensitive signal represents a selection of an Options button on the hand-held controller 414, the processor of the hand-held controller 414 encodes the first digital motion sensitive signal using a first frequency. In the example, in response to determining that a second digital motion sensitive signal represents movement of the left thumb stick 1302A of the hand-held controller 414, the processor of the hand-held controller 414 encodes the second digital motion sensitive signal using a second frequency, which is different from, such as greater than or less than the first frequency. Also, in the example, in response to determining that a third digital motion sensitive signal represents movement of the right thumb stick 1302B of the hand-held controller 414, the processor of the hand-held controller 414 encodes the third digital motion sensitive signal using a third frequency, which is different from the first and second frequencies.

The processor of the hand-held controller 414 sends the encoded signals to the communication device of the hand-held controller 414. The communication device of the hand-held controller 414 applies the wireless transfer protocol, such as the Bluetooth™ protocol, to the encoded signals to generate one or more data packets, which are examples of the user input 419. The communication device of the hand-held controller 414 sends the user input 419 via the wireless connection to the communication device 1320 of the input processor system 407.

Upon receiving the user input 419, the communication device 1320 applies the wireless transfer protocol to extract the encoded signals from the one or more data packets, and sends the encoded signals to the input processor 1314. The input processor 1314 parses, such as decodes and analyzes, the encoded signals to determine initial input device information associated with the operation of the hand-held controller 414. For example, the input processor 1314 identifies, based on the one or more digital motion sensitive signals, which of the input devices of the hand-held controller 414 is operated by the user 1, amounts of movements of the input devices, and directions of the amounts of movements. To illustrate, the input processor 1314 determines, from the one or more digital motion sensitive signals generated based on the one or more analog motion sensitive signals received from the accelerometer of the hand-held controller 414, that a specific button, such as the Options button, on the hand-held controller 414 is selected by the user 1. To further illustrate, upon determining that the first digital motion sensitive signal is encoded using the first frequency, the input processor 1314 determines that the Options buttons is selected and in response to determining that the second digital motion sensitive signal is encoded using the second frequency, the input processor 1314 determines that the left thumb stick 1302A is operated by the user 1.

As another illustration, the input processor 1314 determines, from the one or more digital motion sensitive signals generated based on the one or more analog motion sensitive signals received from the accelerometer, gyroscope and the magnetometer of the hand-held controller 414, that a thumb stick is moved in a specific direction, such as the forward, backward, right, or left direction, and that the amount of movement exceeds a pre-determined threshold in the specific direction. In the illustration, the movement in the specific direction and the amount of movement are examples of functionality of the thumb stick. To further illustrate, the input processor 1314 determines that the amount of movement of the left thumb stick 1302A exceeds a pre-determined amount of movement to determine that the amount of movement exceeds the pre-determined threshold. The pre-determined amount of movement is stored in the memory device 1316. Another example of functionality of a button of the hand-held controller 414 is a selection, such as push or press, of the button by the user 1. In the example, the functionality of the button is determined when the button is identified by the input processor 1314 as being operated by the user 1. As another example of functionality of a button of the hand-held controller 414, the input processor 1314 determines a number of times for which a digital motion sensitive signal is generated when the user 1 operates the button. In the example, the number of times is equal to a number of times a digital motion sensitive signal is determined to be received by the input processor 1314 from the hand-held controller 414. Also, in the example, the number of times is equal to a number of times for which the button is selected by the user 1.

The input processor 1314 sends the initial input device information to the input emulator 1318. Upon receiving the initial input device information during the play of the legacy game N, the input emulator 1318 accesses a default mapping 1308 stored within the memory device 1316 to identify one or more of the legacy input devices of the hand-held controller 1306 based on identifiers 1312 of one or more of the updated input devices of the hand-held controller 414. For example, upon receiving the initial input device information, the input emulator 1318 determines from the default mapping 1308, one or more of legacy input device identifiers 1310 corresponding to one or more of updated input device identifiers 1312 of the one or more of the updated input devices of the hand-held controller 414 operated by the user 1. The default mapping 1408 includes a one-to-one correspondence, such as a link, between each of the legacy input devices of the hand-held controller 1306 and a corresponding one of the updated input devices of the hand-held controller 414.

An example of the updated input device identifiers 1312 includes identification characters, such as alphanumeric characters and symbols or bits, which identify one or more of the updated input devices of the hand-held controller 414. To illustrate, the updated input device identifiers 1312 include a symbol for the left thumb stick 1302A and a symbol for the right thumb stick 1302B. As another illustration, the updated input device identifiers 1312 include a symbol for a touchpad on the hand-held controller 414.

An example of the legacy input device identifiers 1310 includes identification characters, such as alphanumeric characters and symbols or bits, which identify one or more of the legacy input devices of the hand-held controller 1306. To illustrate, the updated input device identifiers 1310 include a symbol for a left move button 1304A of the hand-held controller 1306, a symbol for a forward move button 1304B of the hand-held controller 1306, a symbol for a right move button 1304C of the hand-held controller 1306, and a symbol for a backward move button 1304D of the hand-held controller 1306. As another illustration, the legacy input device identifiers 1310 include a symbol for the Select button on the hand-held controller 1306.

In addition, the input emulator 1318 determines one or more functionalities of the one or more legacy input devices of the hand-held controller 1306 from the one or more functionalities of the hand-held controller 414 operated by the user 1. To illustrate, the input emulator 1318 determines that the amount of movement of the left thumb stick 1302A in the left direction exceeding the pre-determined threshold corresponds to a selection of the left move button 1304A thrice by the user 1. As another illustration, the input emulator 1318 determines that the amount of movement of the left thumb stick 1302A in the left direction exceeding a first pre-determined threshold corresponds to a selection of the left move button 1304A twice by the user 1. In the illustration, the input emulator 1318 determines that the amount of movement of the left thumb stick 1302A in the left direction exceeding a second pre-determined threshold corresponds to a selection of the left move button 1304A thrice by the user 1. The second pre-determined threshold is greater or higher than the first pre-determined threshold. As yet another illustration, one or more functionalities of the one or more legacy input devices of the hand-held controller 1306 that are determined from one or more functionalities of the hand-held controller 414 achieve the same result as that achieved by the one or more functionalities of the hand-held controller 414. In the illustration, the one or more functionalities of the one or more legacy input devices of the hand-held controller 1306 and the one or more functionalities of the hand-held controller 414 result in the same amount of movement of a virtual object within the virtual environment 452. An example of the same amount of movement is a movement from one position to another or from one orientation to another or a combination thereof.

The input emulator 1318 generates the user input 420 having one or more of the legacy input device identifiers 1310 that correspond to one or more of the updated input device identifiers 1312 operated by the user 1. Also, the user input 420 includes the one or more functionalities of the one or more legacy input devices identified by the one or more of the legacy input device identifiers 1310. The input emulator 1318 sends the user input 420 to the basic block compiler 104.

The basic block compiler 104 determines, based on the user input 420, whether one or more of the basic blocks 1 through n for servicing the user input 420 are stored in the cache 102 (FIG. 1). For example, the basic block compiler 104 determines, based on the user input 420, that one or more of the basic blocks 1 through n, stored in the cache 102, can be executed to move the fighter jet from the position P1 to the position P2 during the play of the legacy game N. To illustrate, the basic block compiler 104 determines that based on a selection of the left move button 1304A that the fighter jet is to be moved from the position P1 to the position P2. The basic block compiler 104 further determines whether according to the selection of the left move button 1304A execution of one or more of the basic blocks 1 through n, stored in the cache 102, will enable the movement of the fighter jet from the position P1 to the position P2.

Upon determining that the one or more of the basic blocks 1 through n for servicing the user input 420 are stored in the cache 102, the basic block compiler 104 sends the instruction to the block dispatcher 302 (FIG. 3). The block dispatcher 302, in response to the instruction, executes the one or more of the basic blocks 1 through n from the cache 102 for servicing the user input 420. For example, the one or more of the basic blocks 1 through n are executed to move the fighter jet from the position P1 to the position P2. Moreover, the one or more of the basic blocks 1 through n are executed to generate one or more image frames in which the fighter jet is to move from the position P1 to the position P2.

On the other hand, in response to determining that the one of more of the basic blocks 1 through n for servicing the user input 420 are not stored in the cache 102, the basic block compiler 102 identifies one or more of the emulated PU code instructions 1 through M for servicing the user input 420. The basic block compiler 102 compiles one or more of the emulated PU code instructions 1 through M to generate one or more of the basic blocks 1 through n to service the user input 420, and provides the one or more of the basic blocks 1 through n to the cache 102 for storage. Also, the basic block compiler 102 sends the instruction to the block dispatcher 302 to execute the one or more of the basic blocks 1 thorough n that are recently stored in the cache 102. The one or more of the basic blocks 1 through n are then executed by the block dispatcher 302 for servicing the user input 420.

In one embodiment, the hand-held controller 414 is incompatible with the legacy machine 900 (FIG. 9A). For example, an input processor system of the legacy machine 900 includes an input processor that can interpret a user input generated by and received from the hand-held controller 1306. The input processor system of the legacy system 900 cannot interpret the user input 419 generated by and received from the hand-held controller 414. To further illustrate, the input processor of the legacy system 900 is capable of interpreting the user input that is received from the hand-held controller 1306 and that is represented by 32 bits but cannot interpret the user input 419 that is represented by 64 or 128 bits.

In an embodiment, the input emulator 1318 is a portion of the input processor 1314. For example, the input emulator 1318 is a computer program stored within a cache of the input processor 1314 for execution by a control unit and an arithmetic logic unit (ALU) of the input processor 1314.

In one embodiment, a communication device of the hand-held controller 414 is coupled to the motion sensitive hardware of the hand-held controller 414. The communication device applies the wired transfer protocol to send the digital motion sensitive signals via different channels of the wired connection to a communication device of the input processor system 407. For example, upon receiving the first digital motion sensitive signal that represents movement of the button on the hand-held controller 414, the communication device of the hand-held controller 414 transfers the first digital motion sensitive signal via a first channel, such as a first connection link or a first conductor, of the wired connection. In the example, in response to receiving the second digital motion sensitive signal that represents movement of the left thumb stick 1302A of the hand-held controller 414, the communication device of the hand-held controller 414 transfers the second digital motion sensitive signal via a second channel, such as a second connection link or a second conductor, of the wired connection. Also, in the example, in response to receiving the third digital motion sensitive signal that represents movement of the right thumb stick 1302B of the hand-held controller 414, the communication device of the hand-held controller 414 transfers the third digital motion sensitive signal via a third channel, such as a third connection link or a third wire, of the wired connection.

Continuing with the embodiment, the communication device of the input processor system 407 receives the digital motion sensitive signals and provides the digital motion sensitive signals to the input processor 1314 with channel information. For example, the communication device of the input processor 407 indicates to the input processor 1314 that the first digital motion sensitive signal is received via the first channel, the second digital motion sensitive signal is received via the second channel, and the third digital motion sensitive signal is received via the third channel. The input processor 1314 identifies based on the channels which of the input devices of the hand-held controller 414 is operated by the user 1.

In an embodiment, the hand-held controller 414 is itself an input device. For example, the hand-held controller 414 is moved by the user 1 in the forward direction, the backward direction, the right direction, or the left direction to control a virtual object to move in the direction.

FIG. 14A-1 is a diagram of an embodiment of a system 1400 to illustrate a change from the default mapping 1308 to a current mapping 1404 by the user 1. The system 1400 includes the hand-held controller 414, the input processor system 407, the NIC 1212, the computer network 408, and the server system 404.

The memory device 412 of the server system 404 stores information regarding the user accounts 1 and 2. For example, the memory device 412 stores the user accounts 1 and 2, and validation information to allow logging into the user accounts 1 and 2. As another example, the memory device 412 stores a number of points accumulated within the user account 1 by the user 1 during a play of the legacy game N and the current game having the game title Ga. In the example, the memory device 412 stores a number of points accumulated within the user account 2 by the user 2 during a play of the legacy game N and the current game having the game title Ga.

The user 1 operates one or more of the updated input devices of the hand-held controller 414 and when the one or more of the updated input devices are operated, one or more digital motion sensitive signals are generated in a manner similar to that illustrated above. For example, the user 1 operates one or more of the updated input devices of the hand-held controller 414 to pause the legacy game N. In the example, once the legacy game N is paused, the user 1 operates one or more of the updated input devices of the hand-held controller 414 to change the default mapping 1308 to a current mapping 1414. As another example, before the play of the legacy game N, the user 1 operates one or more of the updated input devices of the hand-held controller 414 to change the default mapping 1308 to the current mapping 1414.

As an example, the default mapping 1308 maps a first identifier of a first one of the updated input devices of the controller 414 to a first identifier of a first one of the legacy input devices of the controller 1306 (FIG. 13). Also an example, the default mapping 1308 maps a second identifier of a second one of the updated input devices of the controller 414 to a second identifier of a second one of the legacy input devices of the controller 1306.

The communication device of the hand-held controller 414 generates one or more data packets embedding the one or more digital motion sensitive signals, which indicate that the default mapping 1308 be modified to the current mapping 1414. The communication device of the hand-held controller 414 applies the wireless transfer protocol to generate the one or more data packets. The one or more data packets data packets for changing the default mapping 1308 to the current mapping 1414 are sent from the communication device of the hand-held controller 414 as a user input 1402 via the wireless connection to the communication device 1320.

The communication device 1320 applies the wireless transfer protocol to extract the one or more digital motion sensitive signals for changing the default mapping 1308 to the current mapping 1414 from the one or more packets. The communication device 1320 sends the one or more digital motion sensitive signals for changing the default mapping 1308 to the input processor 1314. Upon receiving the one or more digital motion sensitive signals, the input processor 1314 determines to generate the current mapping 1404 from the default mapping 1308. For example, in response to receiving an indication that the first identifier of the first one of the updated input devices of the controller 414 be mapped to the second identifier of the second one of the legacy input devices of the controller 1306, the input processor 1314 links the first identifier to the second identifier to generate the current mapping 1404, and associates the current mapping 1404 with the input emulator 1318 and the user account 1. As another example, in response to receiving an indication that the second identifier of the second one of the updated input devices of the controller 414 be mapped to the first identifier of the first one of the legacy input devices of the controller 1306, the input processor 1314 links the second identifier to the first identifier to generate the current mapping 1404, and associates the current mapping 1404 with the input emulator 1318.

Moreover, after the current mapping 1404 is generated via the user account 1, the input processor 1314 stores the current mapping 1404 in the memory device 1316 and associates the current mapping 1404 to the user account 1. For example, upon accessing the user account 1, the user 1 can access the current mapping 1404 in addition to the default mapping 1308. To illustrate, when the user 1 logs into the user account 1, after receiving a digital motion sensitive signal indicating the selection of the game title GN, the input processor 1314 provides an option to the user 1 to select between the default mapping 1308 and the current mapping 1404 to play the legacy game N. As another illustration, in response to generating the current mapping 1404, the input processor 1314 instructs the input emulator 1318 to emulate future user inputs received from the hand-held controller 414 during a play of the legacy game N. In the illustration, the future user inputs are received by the input processor system 407 after the user 1 logs into the user account 1. Also, in the illustration, the future user inputs are emulated according to the current mapping 1404 instead of default mapping 1308. To further illustrate, the user 1 logs out of the user account 1 after operating one or more of the updated input devices of the hand-held controller 414 to indicate that the default mapping 1308 be modified to the current mapping 1404. In the further illustration, the user 1 logs into the user account 1 after logging out of the user account 1. Continuing with the further illustration, after the user s1 logs into the user account 1, the input emulator 1318 applies the current mapping 1404 to the future user inputs instead of the default mapping 1308 until a selection of the default mapping 1308 is received from the hand-held controller 414.

FIG. 14A-2 is a diagram of an embodiment of the memory device 1316 to illustrate the default mapping 1308 and the current mapping 1404. The default mapping 1308 maps the legacy input device identifiers 1310 of the legacy input devices of the hand-held controller 1306 (FIG. 13), with identifiers of functionalities of the legacy input devices, the updated input device identifiers 1312 of the updated input devices of the hand-held controller 414 (FIG. 13), and identifiers of functionalities of the updated input devices. For example, the default mapping 1308 includes a one-to-one correspondence among a legacy input device identifier LID1 of a legacy input device of the hand-held controller 1306, a functionality LIF1 of the legacy input device, an updated input device identifier UID1 of an updated input device of the hand-held controller 1306, and a functionality UIF1 of the updated input device. As another example, the default mapping 1308 includes a one-to-one correspondence among a legacy input device identifier LID2 of a legacy input device of the hand-held controller 1306, a functionality LIF2 of the legacy input device, an updated input device identifier UID2 of an updated input device of the hand-held controller 1306, and a functionality UIF2 of the updated input device. As another yet another example, the default mapping 1308 includes a one-to-one correspondence among a legacy input device identifier LIDS of a legacy input device of the hand-held controller 1306, a functionality LIF5 of the legacy input device, an updated input device identifier UID5 of an updated input device of the hand-held controller 1306, and a functionality UIF5 of the updated input device.

Similarly, the current mapping 1404 maps the legacy input device identifiers 1310 of the legacy input devices of the hand-held controller 1306, with identifiers of functionalities of the legacy input devices, the updated input device identifiers of the updated input devices of the hand-held controller 414, and identifiers of functionalities of the updated input devices. For example, the current mapping 1404 includes a one-to-one correspondence among the legacy input device identifier LID1, the functionality LIF1, the updated input device identifier UID2, and the functionality UIF2 of the updated input device. As another example, the current mapping 1404 includes a one-to-one correspondence among the legacy input device identifier LID2, the functionality LIF2, the updated input device identifier UID1, and the functionality UIF1. It should be noted that in the current mapping 1404, the mapping between the identifiers LID1 and UID1 of the default mapping 1308 is switched to generate the mapping between the identifiers LID1 and UID2. Also, in the current mapping 1404, the mapping between the identifiers LID2 and UID2 of the default mapping 1308 is switched to generate the mapping between the identifiers LID2 and UID1.

In one embodiment, multiple legacy input device identifiers are mapped to one or more updated input device identifiers. For example, multiple legacy input device identifiers that identify the move left button 1304A and the move right button 1304C are mapped to a single updated input identifier of a thumb stick, such as the left thumb stick 1302A or the right thumb stick 1302B (FIG. 13), of the hand-held controller 414. As another example, multiple legacy input device identifiers that identify the move forward button 1304B and the move backward button 1304D are mapped to a single updated input identifier of a thumb stick, such as the left thumb stick 1302A or the right thumb stick 1302B, of the hand-held controller 414.

In an embodiment, the default mapping 1308 excludes the identifiers of the functionalities of the legacy input devices of the hand-held controller 1306 and the identifiers of the functionalities of the updated input devices of the hand-held controller 414.

In one embodiment, a mapping, as described herein, includes any number of identifiers for the same number of updated input devices of an updated hand-held controller. Also, the mapping includes any number of identifiers for the same number of legacy input devices of a legacy hand-held controller.

FIG. 14B is a diagram of an embodiment of a system 1450 to illustrate use of the current mapping 1404 instead of the default mapping 1308 (FIG. 13) during a play of the legacy game N. The user 1 logs into the user account 1 and selects the current mapping 1404 via one or more of the updated input devices of the hand-held controller 414. Upon receiving a user input indicating the selection of the current mapping 1404 from the hand-held controller 414, the input processor 1314 instructs the input emulator 1318 to apply the current mapping 1404 instead of the default mapping 1308.

During the play of the legacy game N, one or more input devices of the hand-held controller 414 are operated by the user 1 to generate corresponding one or more electrical signals, which eventually form a user input 1452. For example, when the user 1 moves a thumb stick of the hand-held controller 414 in the forward direction or the backward direction or the right direction or the left direction, an electrical signal is generated.

When one or more input devices of the hand-held controller 414 are operated by the user 1, corresponding additional electrical signals, such as one or more additional analog motion sensitive signals, are generated by the motion sensitive hardware. The one or more additional analog motion sensitive signals are sent from the motion sensitive hardware to the analog-to-digital converter of the hand-held controller 414. The analog-to-digital converter of the hand-held controller 414 converts the additional analog motion sensitive signals from an analog form to a digital form to output additional digital motion sensitive signals. The additional digital motion sensitive signals are sent from the analog-to-digital converter to the processor of the hand-held controller 414.

The processor of the hand-held controller 414 applies an encoding protocol to encode the additional digital motion sensitive signals to output additional encoded signals. For example, upon determining that a first additional digital motion sensitive signal represents movement of the Options button on the hand-held controller 414, the processor of the hand-held controller 414 encodes the first additional digital motion sensitive signal using the first frequency. In the example, in response to determining that a second additional digital motion sensitive signal represents movement of the left thumb stick 1302A of the hand-held controller 414, the processor of the hand-held controller 414 encodes the second additional digital motion sensitive signal using the second frequency. Also, in the example, in response to determining that a third additional digital motion sensitive signal represents movement of the right thumb stick 1302B of the hand-held controller 414, the processor of the hand-held controller 414 encodes the third additional digital motion sensitive signal using the third frequency.

The processor of the hand-held controller 414 sends the additional encoded signals to the communication device of the hand-held controller 414. The communication device of the hand-held controller 414 applies the wireless transfer protocol to the additional encoded signals to generate one or more additional data packets, which are examples of a user input 1452. The communication device of the hand-held controller 414 sends the user input 1452 via the wireless connection to the communication device 1320 of the input processor system 407.

Upon receiving the user input 1452, the communication device 1320 applies the close-range communication protocol to extract the additional encoded signals from the one or more additional data packets, and sends the additional encoded signals to the input processor 1314. The input processor 1314 parses, such as decodes and analyzes, the additional encoded signals to determine additional input device information associated with the operation of the hand-held controller 414. For example, the input processor 1314 identifies, based on the one or more additional digital motion sensitive signals, which of the input devices of the hand-held controller 414 is operated by the user 1, an amount of movement of the input device, and a direction of the amount of movement. To illustrate, the input processor 1314 determines, from the one or more additional digital motion sensitive signals, which are generated from the additional analog motion sensitive signals output from the accelerometer of the hand-held controller 414, that a specific button, such as the Options button, on the hand-held controller 414 is selected by the user 1. To further illustrate, upon determining that the first additional digital motion sensitive signal is encoded using the first frequency, the input processor 1314 determines that the Options buttons is selected and in response to determining that the second additional digital motion sensitive signal is encoded using the second frequency, the input processor 1314 determines that the left thumb stick 1302A is operated by the user 1.

As another illustration, the input processor 1314 determines, from the one or more additional digital motion sensitive signals, which are generated from the additional analog motion sensitive signals output from the accelerometer, gyroscope and the magnetometer of the hand-held controller 414, that a thumb stick is moved in a specific direction, such as the forward, backward, right, or left direction, and that the amount of movement exceeds the pre-determined threshold in the specific direction. To further illustrate, the input processor 1314 determines that the amount of movement of the left thumb stick 1302A exceeds the pre-determined amount of movement to determine that the amount of movement exceeds the pre-determined threshold. In the illustration, the movement in the specific direction and the amount of movement are examples of functionality of the thumb stick. Another example of functionality of a button of the hand-held controller 414 is a selection of the button by the user 1. In the example, the functionality of the button is determined when the button is identified by the input processor 1314 as being selected by the user 1. As another example of functionality of a button of the hand-held controller 414, the input processor 1314 determines a number of times for which an additional digital motion sensitive signal is generated when the user 1 operates the button. The number of times is equal to a number of times an additional digital motion sensitive signal is determined to be received by the input processor 1314 from the hand-held controller 414. Also, the number of times is equal to a number of times for which the button is selected by the user 1.

Upon receiving the additional input device information during the play of the legacy game N, the input emulator 1318 accesses the current mapping 1404 stored within the memory device 1316 to identify one or more of the legacy input devices of the hand-held controller 1306 based on the identifiers 1312 of one or more of the updated input devices of the hand-held controller 414. For example, upon receiving the additional input device information, the input emulator 1318 determines from the current mapping 1404, the one or more of legacy input device identifiers 1310 corresponding to one or more of updated input device identifiers 1312 of the one or more of the updated input devices of the hand-held controller 414 operated by the user 1.

In addition, the input emulator 1318 determines one or more functionalities of the one or more legacy input devices of the hand-held controller 1306 from the one or more functionalities of the hand-held controller 414 operated by the user 1 for generating the additional input device information. To illustrate, the input emulator 1318 determines that the amount of movement of the left thumb stick 1302A in the left direction exceeding the pre-determined threshold corresponds to a selection of the left move button 1304A thrice by the user 1. As another illustration, the input emulator 1318 determines that the amount of movement of the left thumb stick 1302A in the left direction exceeding the first pre-determined threshold corresponds to a selection of the left move button 1304A twice by the user 1. In the illustration, the input emulator 1318 determines that the amount of movement of the left thumb stick 1302A in the left direction exceeding the second pre-determined threshold corresponds to a selection of the left move button 1304A thrice by the user 1.

The input emulator 1318 generates a user input 1454 having one or more of the legacy input device identifiers 1310 that correspond to one or more of the updated input device identifiers 1312 of the one or more updated input devices of the hand-held controller 414 operated by the user 1. Also, the user input 1454 includes the one or more functionalities of the one or more legacy input devices identified by the one or more of the legacy input device identifiers 1310. The input emulator 1318 sends the user input 1454 to the basic block compiler 104.

The basic block compiler 104 determines, based on the user input 1454, whether one or more of the basic blocks 1 through n for servicing the user input 1454 are stored in the cache 102 (FIG. 1). For example, the basic block compiler 104 determines, based on the user input 1454, that one or more of the basic blocks 1 through n to move the fighter jet from the position P1 to the position P2 during the play of the legacy game N are stored in the cache 102. To illustrate, the basic block compiler 104 determines that based on a selection of the left move button 1304A that the fighter jet is to be moved from a first position to a second position or from a first orientation to a second orientation or a combination thereof. The basic block compiler 104 further determines whether according to the selection of the left move button 1304A execution of one or more of the basic blocks 1 through n, stored in the cache 102, will enable the movement of the fighter jet from the first position to the second position or from the first orientation to the second orientation or a combination thereof.

Upon determining that the one or more of the basic blocks 1 through n for servicing the user input 1454 are stored in the cache 102, the basic block compiler 104 sends the instruction to the block dispatcher 302 (FIG. 3). The block dispatcher 302, in response to the instruction, executes the one or more of the basic blocks 1 through n from the cache 102 for servicing the user input 1454. For example, the one or more of the basic blocks 1 through n are executed to move the fighter jet from the first position to the second position or from the first orientation to the second orientation or a combination thereof. Moreover, the one or more of the basic blocks 1 through n are executed to generate one or more image frames in which the fighter jet is to move from the first position to the second position or from the first orientation to the second orientation or a combination thereof.

On the other hand, in response to determining that the one of more of the basic blocks 1 through n for servicing the user input 1454 are not stored in the cache 102, the basic block compiler 102 identifies one or more of the emulated PU code instructions 1 through M for servicing the user input 1454. The basic block compiler 102 compiles one or more of the emulated PU code instructions 1 through M to generate one or more of the basic blocks 1 through n for servicing the user input 1454, and provides the one or more of the basic blocks to the cache 102 for storage. Also, the basic block compiler 102 sends the instruction to the block dispatcher 302 to execute the one or more of the basic blocks 1 thorough n that are recently stored in the cache 102.

In one embodiment, a communication device of the hand-held controller 414 is coupled to the motion sensitive hardware of the hand-held controller 414. The communication device applies the wired transfer protocol to send the additional digital motion sensitive signals via different channels of the wired transfer medium to a communication device of the input processor system 407. For example, upon receiving the first additional digital motion sensitive signal that represents movement of the button on the hand-held controller 414, the communication device of the hand-held controller 414 transfers the first additional digital motion sensitive signal via the first channel of the wired connection. In the example, in response to receiving the second additional digital motion sensitive signal that represents movement of the left thumb stick 1302A of the hand-held controller 414, the communication device of the hand-held controller 414 transfers the second additional digital motion sensitive signal via the second channel of the wired connection. Also, in the example, in response to receiving the third additional digital motion sensitive signal that represents movement of the right thumb stick 1302B of the hand-held controller 414, the communication device of the hand-held controller 414 transfers the third additional digital motion sensitive signal via the third channel of the wired connection.

Continuing with the embodiment, the communication device of the input processor system 407 receives the additional digital motion sensitive signals and provides the additional digital motion sensitive signals to the input processor 1314 with channel information. For example, the communication device of the input processor 407 indicates to the input processor 1314 that the first additional digital motion sensitive signal is received via the first channel, the second additional digital motion sensitive signal is received via the second channel, and the third additional digital motion sensitive signal is received via the third channel. The input processor 1314 identifies based on the channels which of the input devices of the hand-held controller 414 is operated by the user 1.

Figure 15:
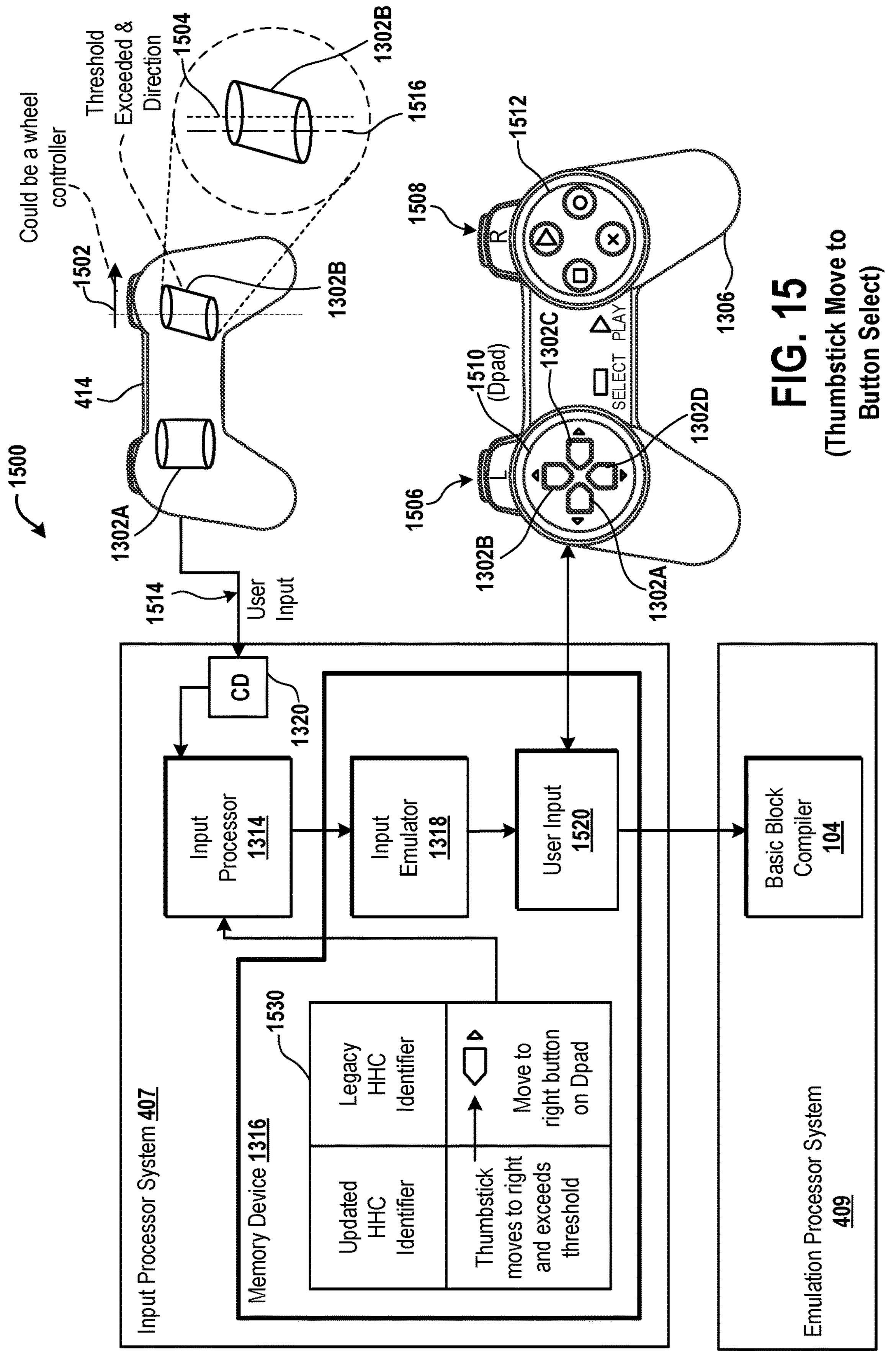
FIG. 15 is a diagram of an embodiment of a system to illustrate an identification of a move right button of a legacy hand-held controller based on movement of a right thumb stick of the updated hand-held controller.

FIG. 15 is a diagram of an embodiment of a system 1500 to illustrate an identification of the move right button 1302C based on movement of the right thumb stick 1302B. The system 1500 includes the hand-held controller 414, the hand-held controller 1306, the input processor system 407, and the emulation processor system 409.

The hand-held controller 1306 includes a directional pad (Dpad) 1510 and a pad 1512. On the directional pad 1510, the buttons 1302A-1302B are situated. Also, on the pad 1512, a square button, a triangle button, a circle button, and an X button are located. Further, the hand-held controller 1306 includes left shoulder buttons 1506 and right shoulder buttons 1508.

The user 1 moves the right thumb stick 1302 in a right direction 1502. As shown in a blown up view of the right thumb stick 1302B, when the user moves the right thumb stick in the right direction 1502, the moment exceeds a predetermined threshold 1504. The pre-determined threshold 1504 is measured from a center axis 1516, which is a vertical axis that passes through a center of the right thumb stick 1302B. For example, the center axis 1516 passes through a centroid of the right thumb stick 1302B. To illustrate, there is a pre-determined horizontal distance between the center axis 1516 and the predetermined threshold 1504. As an example, the pre-determined threshold 1504 is a vertical axis.

The hand-held controller 414 generates a user input 1514, which includes one or more digital motion sensitive signals, when the movement of the right thumb stick 1302 in a right direction 1502 to exceed the pre-determined threshold 1504. The one or more digital motion sensitive signals indicate that the right thumb stick 1302B moves in the right direction 1502 and exceeds the pre-determined threshold 1504. The user input 1514 is an example of the user input 419 (FIG. 13). The user input 1514 is sent from the hand-held controller 414 to the input processor system 407.

The input processor 1314 receives the one or more digital motion sensitive signals embedded within the user input 1514 and determines, based on a frequency channel, that the one or more digital motion sensitive signals identify that the right thumb stick 1302B is moved by the user 1. The frequency channel is used to wirelessly transfer the one or more digital motion sensitive signals embedded within the user input 1514 from the hand-held controller 414 to the input processor system 407. Based on an identifier of the frequency channel, such as a channel having a first frequency or a channel having a second frequency, the one or more digital motion sensitive signals identify that there is movement of the right thumb stick 1302B. For example, when the one or more digital motion sensitive signals are transferred via the channel at the first frequency, the input processor 1314 determines that the right thumb stick 1302B is moved and when the one or more digital motion sensitive signals are transferred via the channel at the second frequency, the input processor 1314 determines that the left thumb stick 1302A is moved. In the example, the second frequency is greater than or less than the first frequency.

Moreover, the input processor 1314 further determines, based on a directionality indicated by the one or more digital motion sensitive signals, that the right thumb stick 1302B has moved in the right direction 1502. For example, the one or more digital motion sensitive signals are output based on one or more analog motion sensitive signals generated by the gyroscope of the hand-held controller 414 and the gyroscope measures the directionality of movement of the right thumb stick 1302B.

Also, the input processor 1314 determines, based on the one or more digital motion sensitive signals output based on one or more analog motion sensitive signals generated by the potentiometer of the hand-held controller 414, an amount of movement of the right thumb stick 1302B in the right direction 1502. The input processor 1314 further determines that the amount of movement of the right thumb stick 1302B exceeds the pre-determined threshold 1504, which is stored in the memory device 1316.

The movement of the right thumb stick 1302B, the movement in the right direction 1502, and the movement in the right direction 1502 exceeding the pre-determined threshold 1504 are examples of input device information, such as the initial input device information or the additional input device information. The input processor 1314 provides the input device information to the input emulator 1318. The input emulator 1318 receives the input device information, and accesses a mapping 1530, such as the default mapping 1308 (FIG. 14A-2) or the current mapping 1404 (FIG. 14A-2), based on the input device information. For example, upon receiving an indication that the right thumb stick 1302B is moved in the right direction 1502, the input emulator 1318 identifies from the default mapping 1308, that the movement of the right thumb stick 1302B corresponds to a selection of the right move button 1302C. In addition, the input emulator 1318 determines, from the default mapping 1308, that the amount of movement of the right thumb stick 1302B corresponds to a pre-determined number of times, such as two or three or four, of selection of the right move button 1302C.

The input emulator 1318 generates a user input 1520 including information, which indicates operation of the right move button 1302C. The information indicates the selection of the right move button 1302C and the pre-determined number of times for which the right move button 1302C is selected. It should be noted that the right move button 1302C is not actually selected by the user 1. Rather, the movement of the right thumb stick 1302B is emulated as the selection of the right move button 1302C. The user input 1520 is an example of the user input 420 (FIG. 13). The input emulator 1318 provides the user input 1520 to the basic block compiler 104, which operates in a manner illustrated above with reference to FIG. 13.

It should be noted that the embodiment, described above with reference to FIG. 15, is for movement of the right thumb stick 1302B in the right direction 1502. In one of embodiment, instead of the right thumb stick 1302B, the left thumb stick 1302A is moved in the right, left, forward, or backward direction and a user input is generated by the hand-held controller 414 based on the movement. In an embodiment, instead of movement in the right direction 1502, a movement in any other direction, such as the right, forward, backward, or a combination thereof occurs.

In an embodiment, instead of the hand-held controller 414, a wheel controller is used. The wheel controller has the shape of a driving wheel. As an example, the wheel controller excludes the left thumb stick 1302A and the right thumb stick 1302B. Instead, the driving wheel is operated by the user 1 to move a virtual object of the legacy game N in the left, right, forward, and backward directions. The driving wheel can be rotated in a clockwise direction or a counter-clockwise direction. When the driving wheel is rotated in the clockwise direction by the user 1, the input processor 1314, determines based on one or more digital motion sensitive signals, that the driving wheel is rotated and whether the driving wheel is rotated in the clockwise on the counter clockwise direction. The input processor 1314 further determines whether an amount of the rotation exceeds a pre-set threshold. The input processor 1314 provides information, such as an identifier of the driving wheel, the direction of rotation, and an indication of whether the amount of rotation exceeds the pre-set threshold to the input emulator 1318. The input emulator 1318 accesses a mapping, such as a default mapping or a current mapping, to identify the corresponding button of the hand-held controller 1306 and operation of the corresponding button to generate a user input. For example, the input emulator 1318 identifies based on the information and the mapping that the corresponding button of the hand-held controller 1306 is selected and a number of times for which the corresponding button is selected to generate the user input. The input emulator 1318 provides the user input to the basic block compiler 104, which operates in a manner illustrated above with reference to FIG. 13 or 14B.

FIG. 16A is a diagram of an embodiment of a system 1600 to illustrate generation of a virtual image of a cross-hair when a touchpad 1602 is selected by the user 1. The touchpad 1602 is an example of a button. The system 1600 includes the input processor system 407, the hand-held controller 414, and the emulation processor system 409. The hand-held controller 414 includes the touchpad 1602, a directional pad 1604, a pad 1606, the left thumb stick 1302A, and the right thumb stick 1302B.

During a play of the legacy game N, the user 1 selects, using his/her finger, the touchpad 1602. The touchpad 1602 is an example of one of the updated input devices of the hand-held controller 414. The motion sensitive hardware of the hand-held controller 414 generates one or more analog motion sensitive signals in response to the selection of the touchpad 1602. For example, the one or more analog motion sensitive signals indicate a selection of the touchpad 1602 and a location of selection of the touchpad 1602 with respect to a reference co-ordinate system of the touchpad 1602. To illustrate, based on the location of the selection along an x-axis, a first potentiometer of the hand-held controller 414 generates a first electrical signal and based on the location of the selection along a y-axis, a second potentiometer of the hand-held controller 414 generates a second electrical signal. The x and y axes associated with the touchpad 1602 are further described below. The one or more analog motion sensitive signals are converted by the analog-to-digital converter of the hand-held controller 414 into one or more digital motion sensitive signals. The processor of the hand-held controller 414 applies the encoding protocol to the one or more digital motion sensitive signals to output one or more encoded signals. For example, the one or more encoded signals have a frequency that corresponds to, such as has a unique relationship with, the touchpad 1602. The communication device of the hand-held controller 414 applies the wireless transfer protocol to embed the one or more encoded signals into one or more data packets, and sends the one or more data packets via the wireless connection to the communication device 1320. The one or more data packets are illustrated in FIG. 16A as a user input 1612. The communication device 1320 applies the wireless transfer protocol to the one or more data packets received from the hand-held controller 414 to obtain the encoded signal and sends the encoded signal to the input processor 1314.

The input processor 1314 determines or identifies, in a manner similar to that illustrated about with reference to FIG. 13, that the touchpad 1602 is selected by the user 1. For example, in response to determining that the one or more digital motion sensitive signals encoded within the one or more encoded signals are received at a frequency from the hand-held controller 414 that matches a pre-determined frequency channel, the input processor 1314 determines that the touchpad 1602 is selected. In the example, the pre-determined frequency channel is stored within the memory device 1316. Also, in the example, the input processor 1314 determines the frequency by applying a Fourier transform to the encoded signals.

The input processor 1314 further determines the location of selection on the touchpad 1602 by the user 1 with respect to the reference co-ordinate system of the touchpad 1602. For example, the input processor 1314 determines based on an amount of voltage received from the first potentiometer of the hand-held controller 414 that the touchpad 1602 is selected by the user 1 at a co-ordinate (x1, 0) with respect to the reference co-ordinate system of the touchpad 1602. Moreover, in the example, the input processor 1314 determines based on an amount of voltage received from the second potentiometer of the hand-held controller 414 that the touchpad 1602 is selected by the user 1 at a co-ordinate (0, y1) with respect to the reference co-ordinate system of the touchpad 1602. In the example, the first and second amounts of voltages are received within the one or more encoded signals. To illustrate, the one or more analog motion sensitive signals that are output from the motion sensitive hardware of the handheld controller 414 include information representing the first and second amounts of voltages. An identifier of the touchpad 1602 that is selected and the location of selection on the touchpad 1602 by the user 1 are examples of input device information, such as the initial input device information and the additional input device information.

The input processor 1318 provides the identifier of the touchpad 1602 that is selected and the location of selection on the touchpad 1602 to the input emulator 1318. The input emulator 1318 accesses a mapping 1610 to identify, based on the identifier of the touchpad 1602 that is selected, a corresponding button on the hand-held controller 1306. For example, the input emulator 1318 determines, from the mapping 1610, that the Select button on the hand-held controller 1306 has a unique relationship with the touchpad 1602. The mapping 1610 is an example of the default mapping 1308 (FIG. 13) or of the current mapping 1404 (FIG. 14A-2).

Also, the input emulator 1318 sends a request to the block dispatcher 302 to obtain a size of an image frame having a virtual scene of the legacy game N. As an example, the image frame of the legacy game N for which the size is requested is to be generated after a user input 1614 is generated based on the user input 1612. To illustrate, a first image frame of the legacy game N for which the size is requested is to be generated based on the user input 1614 and no other image frame is to be generated, based on the user input 1614, before the first image frame is generated. The block dispatcher 302 provides the size of the image frame to the input emulator 1318. For example, the block dispatcher 302 provides the size of the image frame to be the same as a preceding image frame that is generated immediately before the image frame to be generated based on the user input 1614. To illustrate, there is no other image frame to be generated by the block dispatcher 302 between the generation of the image frame to be generated based on the user input 1614 and the preceding image frame. The input emulator 1318 is coupled to the block dispatcher 302.

The input emulator 1318 determines a location of the virtual image of the cross-hair within the image frame to be generated based on the user input 1614. The location of the virtual image of the cross-hair within the image frame corresponds to the location of the selection on the touchpad 1602. An illustration of a manner in which the location of the virtual image of the cross-hair within the image frame has a one-to-one relationship to the location of the selection on the touchpad 1602 is described with reference to FIG. 16B.

The input emulator 1318 generates the user input 1614 having the indication of the Select button on the hand-held controller 1306 and the location of the virtual image of the cross-hair within the image frame to be generated based on the user input 1614. The user input 1614 is provided from the input emulator 1318 to the block compiler 104.

Upon receiving the user input 1614, the block compiler 104 determines whether one or more of the basic blocks 1 through n for servicing the user input 1614 are stored in the cache 102 (FIG. 1). In response to determining that one or more of the basic blocks 1 through n are stored in the cache 102, the block dispatcher 302 (FIG. 3) executes the one or more basic blocks 1 through n to generate one or more image frames for servicing the user input 1614. For example, the block dispatcher 302 (FIG. 3) receives the location of the virtual image of the cross-hair within the image frame to be generated from the block compiler 104, and executes the one or more basic blocks 1 through n to generate the cross-hair as a virtual object within the image frame. In addition, the cross-hair is generated within the image frame at the location corresponding to the location of the selection of the touchpad 1602 by the user 1.

In one embodiment, the input emulator 1318 generates a command for the block dispatcher 302 to determine the location of the virtual image of the cross-hair within an image frame and sends the command to the block dispatcher 302. For example, the command indicates to the block dispatcher 302 that the image frame be generated by the block dispatcher 302 is to include the virtual image of the cross-hair at a location that is proportional to the location of the selection on the touchpad 1602 by the user 1. The command includes the location of the selection on the touchpad 1602 by the user 1. The input emulator 1318 is coupled to the block dispatcher 302. In the embodiment, the user input 1614 does not include the location of the virtual image of the cross-hair within the image frame. The block dispatcher 302 executes one or more of the basic blocks 1 through n to generate the image frame. In addition, the block dispatcher 302 determines the location of the virtual image of the crosshair within the image frame in the same manner, described herein, such as with reference to FIG. 16B, in which the input emulator 1318 determines the location of the virtual image of the crosshair within the image frame based on the location of the selection on the touchpad 1602 by the user 1.

Figure 16B:
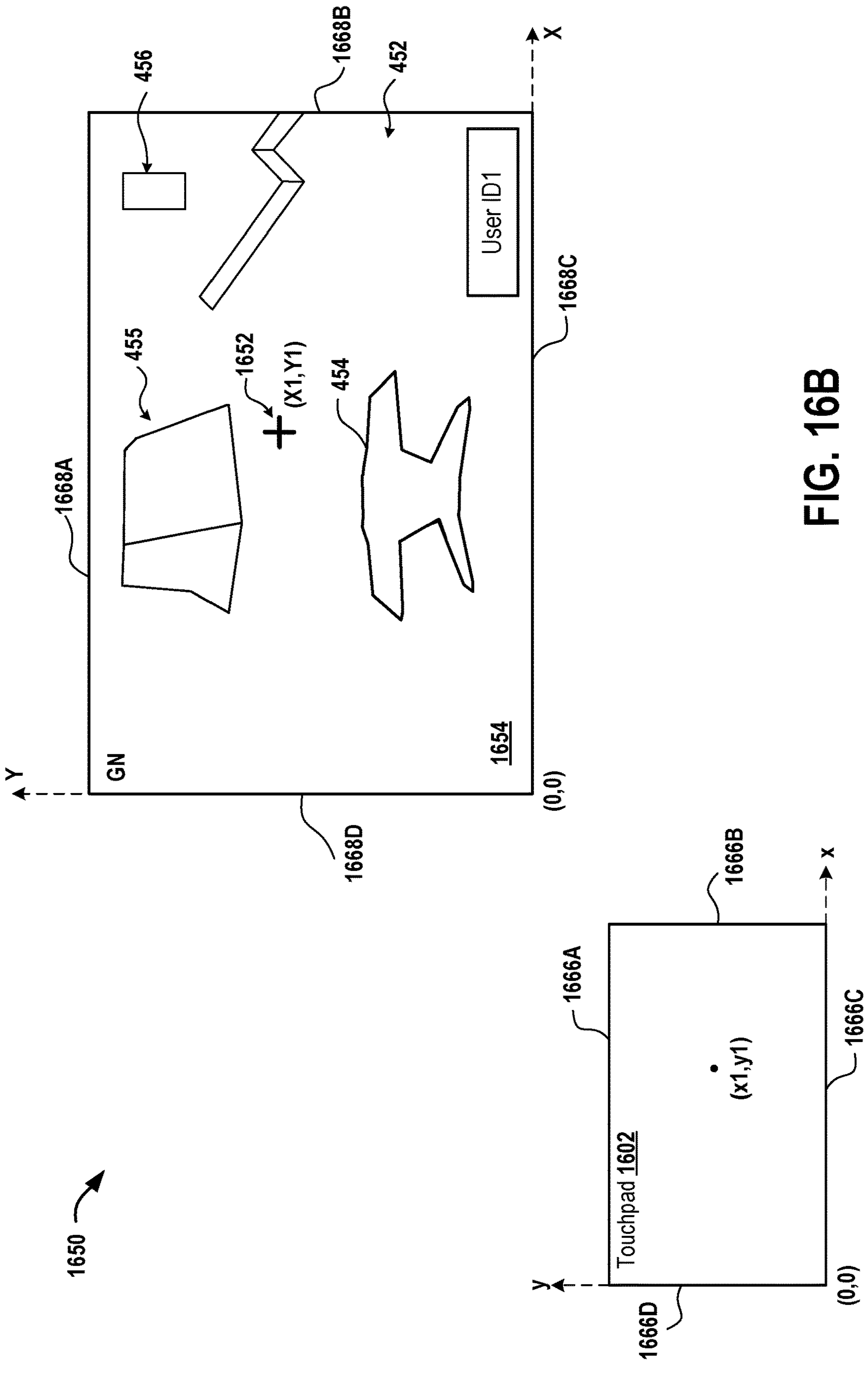
FIG. 16B is a diagram of an embodiment of a system to illustrate a correspondence between a location of selection on the touchpad by the user and a location of a cross-hair on an image frame.

FIG. 16B is a diagram of an embodiment of a system 1650 to illustrate a correspondence between the location of selection on the touchpad 1062 by the user 1 and a location of a cross-hair 1652 on an image frame 1654 having the virtual environment 452. The correspondence is determined by the input emulator 1318 (FIG. 16A). The image frame 1654 is displayed on the display screen of the display device 410 (FIG. 4B). The system 1650 includes the touchpad 1602 and the image frame 1654.

The touchpad 1602 has a top edge 1666A, a right edge 1666B, a bottom edge 1666C, and a left edge 1666D. The top edge 1666A is adjacent to and adjoining the right and left edges. Also, the bottom edge 1666C is adjacent to and adjoining the right and left edges. The bottom edge 1666C faces the top edge 1666A and the right edge 1666B faces the left edge 1666D.

A location of the selection on the touchpad 1602 is a co-ordinate (x1, y1). The touchpad 1602 is associated with the reference co-ordinate system having an origin (0, 0) at a corner of the touchpad 1602. The touchpad 1602 has four corners, such as four vertices of a rectangle. As an example, the touchpad 1602 is of a rectangular shape having the vertices. The x-axis of the reference co-ordinate system of the touchpad 1602 is along the bottom edge 1666C of the touchpad 1602 and the y-axis of the reference co-ordinate system is along the left edge 1666D of the touchpad 1602. The co-ordinate x1 is a distance along the x-axis from the origin (0, 0) and the co-ordinate y1 is a distance along the y-axis from the origin (0, 0). The x-axis of the reference co-ordinate system is perpendicular to the y-axis of the reference co-ordinate system.

Similarly, the image frame 1654 has a top edge 1668A, a right edge 1668B, a bottom edge 1668C, and a left edge 1668D. The top edge 1668A is adjacent to and adjoining the right and left edges. Also, the bottom edge 1668C is adjacent to and adjoining the right and left edges of the image frame 1654. The bottom edge 1668C faces the top edge 1668A and the right edge 1668B faces the left edge 1668D.

The location of the cross-hair 1652 is at a co-ordinate (X1, Y1). The image frame 1654 is associated with a reference co-ordinate system having an origin (0, 0) at a corner of the image frame 1654. The image frame 1654 has four corners, such as four vertices of a rectangle. As an example, the image frame 1654 is of a rectangular shape having the vertices. An X-axis of the reference co-ordinate system of the image frame 1654 is along the bottom edge 1668C and a Y-axis of the reference co-ordinate system of the image frame 1654 is along the left edge 1668D. The co-ordinate X1 is a distance along the X-axis from the origin (0, 0) at the corner of the image frame 1654 and the co-ordinate Y1 is a distance along the Y-axis from the origin (0, 0).

The input emulator 1318 determines that the distance along the X-axis of the reference co-ordinate system of the image frame 1654 is proportional to the distance along the x-axis of the reference co-ordinate system of the touchpad 1602. For example, the input emulator 1318 determines that a width of the image frame 1654 is P times a width of the touchpad 1602, where P is an integer greater than zero. The width of the image frame 1654 is measured along the X-axis of the reference co-ordinate system of the image frame 1654 and the width of the touchpad 1602 is measured along the x-axis of the reference co-ordinate system of the touchpad 1602. In the example, the input emulator 1318 determines that that a height of the image frame 1654 is Q times a height of the touchpad 1602, where Q is an integer greater than zero. The height of the image frame 1654 is measured along the Y-axis of the reference co-ordinate system of the image frame 1654 and the height of the touchpad 1602 is measured along the y-axis of the reference co-ordinate system of the touchpad 1602. In the example, the input emulator 1318 determines the distance along the X-axis to be P times the distance along the x-axis of the reference co-ordinate system of the touchpad 1602. Also, in the example, the input emulator 1318 determines the distance along the Y-axis to be Q times the distance along the x-axis of the reference co-ordinate system of the touchpad 1602.

Figure 17:
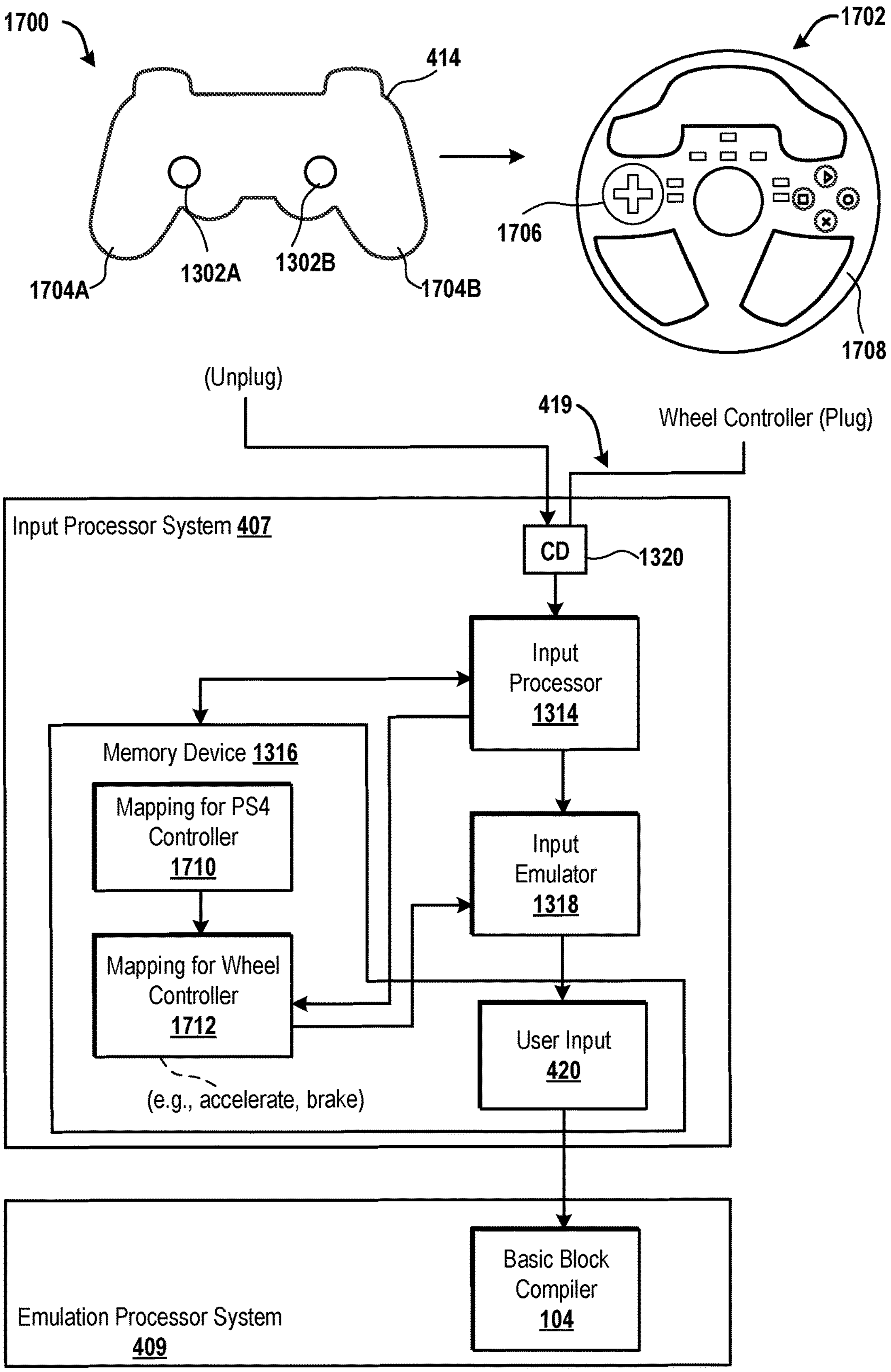
FIG. 17 is a diagram of an embodiment of a system to illustrate the use of different mappings with use of different types of hand-held controllers.

FIG. 17 is a diagram of an embodiment of a system 1700 to illustrate the use of different mappings with use of different types of hand-held controllers. The system 1700 includes a wheel controller 1702, the hand-held controller 414, and the input processor system 407. The wheel controller 1702 has the shape of a driving wheel and includes updated input devices, such as, a steering wheel 1708, a directional pad 1706, square button, a triangle button, a circle button, and an X button.

It should be noted that the wheel controller 1702 is of a different type than the hand-held controller 414. For example, the hand-held controller 414 has a left handle 1704A and a right handle 1704B, and excludes a steering wheel. The handles 1704A and 1704B extend downward from a body of the hand-held controller 414. Comparatively, the wheel controller 1702 has the steering wheel 1708 but excludes left and right handles.

Moreover, a sub-type of a first hand-held controller is of a different sub-type than a sub-type of a second hand-held controller when both the first and second hand-held controllers are of the same type but are manufactured by different entities. For example, a wheel controller manufactured by Logitech™ corporation is of a different sub-type than a wheel controller manufactured by Sony™ corporation. As another example, a hand-held controller manufactured by Sony™ corporation is of a different type than a hand-held controller manufactured by Microsoft™ corporation.

The wheel controller 1702 has the same or similar internal components as that of the hand-held controller 414. For example, the wheel controller 1702 includes motion sensitive hardware, an analog-to-digital converter, a processor, and a communication device. The internal components of the wheel controller 1702 are coupled to each other in the same manner in which the internal components of the hand-held controller 414 are coupled with each other.

When the user 1 couples an updated controller, such as the hand-held controller 414 or the wheel controller 1702, with the input processor system 407, the user 1 operates one or more updated input devices of the updated controller to provide the type and the sub-type of the updated controller. For example, the user 1 decouples the hand-held controller 414 from the input processor system 407 and instead couples the wheel controller 1702 to the input processor system 407. When the updated controller is operated by the user 1, the updated controller generates an identification signal having the type of the updated controller and sends the identification signal to the input processor system 407. Also, the updated controller generates an identification signal having the sub-type of the updated controller and sends the identification signal to the input processor system 407. The input processor 1314 receives the type and the sub-type of the updated controller and provides the type and the sub-type to the input emulator 1318.

Upon receiving the type and the sub-type of the updated controller, the input emulator 1318 selects a mapping 1710 or a mapping 1712 based on the type and the sub-type. For example, the input emulator 1318 selects the mapping 1710 when the type of the updated controller is the hand-held controller 414 and the sub-type of the updated controller is the hand-held controller 414 manufactured by Sony™ corporation. The input emulator selects the mapping 1712 when the type of the updated controller is the wheel controller 1702 and the sub-type of the updated controller is the wheel controller 1702 manufactured by Sony™ corporation. An example of the mapping 1710 is a default mapping for the user account 1 or a current mapping for the user account 1. An example of the mapping 1712 is a default mapping for the user account 1 or a current mapping for the user account 1.

During a play of the legacy game N, the input processor system 407 receives the user input 419 from the wheel controller 1702, which is coupled to the input processor system 407 after decoupling the hand-held controller 414. The user input 419 is generated in the same manner by the wheel controller 1702 in which the user input 419 is generated by the hand-held controller 414 except that the driving wheel 1708 is rotated instead of the thumb sticks 1302A and 1302B. For example, the user 1 operates one or more of the updated input devices of the wheel controller 1702. The motion sensitive hardware of the wheel controller 1702 generates one or more analog motion sensitive signals in response to the operation of the one or more updated input devices of the wheel controller 1702. The analog-to-digital converter of the wheel controller 1702 converts the one or more analog motion sensitive signals into one or more digital motion sensitive signals. The processor of the wheel controller 1702 applies the encoding protocol to encode the one or more digital sensitive signals to output one or more encoded signals. The communication device of the wheel controller 1702 applies the wireless transfer protocol to the one or more encoded signals to generate one or more data packets, and sends the one or more data packets to the communication device 1320.

The communication device 1320 applies the wireless transfer protocol to the one or more data packets to extract the one or more encoded signals and sends the one or more encoded signals to the input processor 1314. The input processor 1314 identifies, from the one or more encoded signals, which of the updated input devices of the wheel controller 1702 are operated by the user 1, and provides one or more identifiers of one or more of the updated input devices to the input emulator 1318. The input emulator 1318 accesses the mapping 1712 and applies the mapping 1712 to identify corresponding one or more legacy input devices of the hand-held controller 1306 (FIG. 13) to generate the user input 420.

Figure 18:
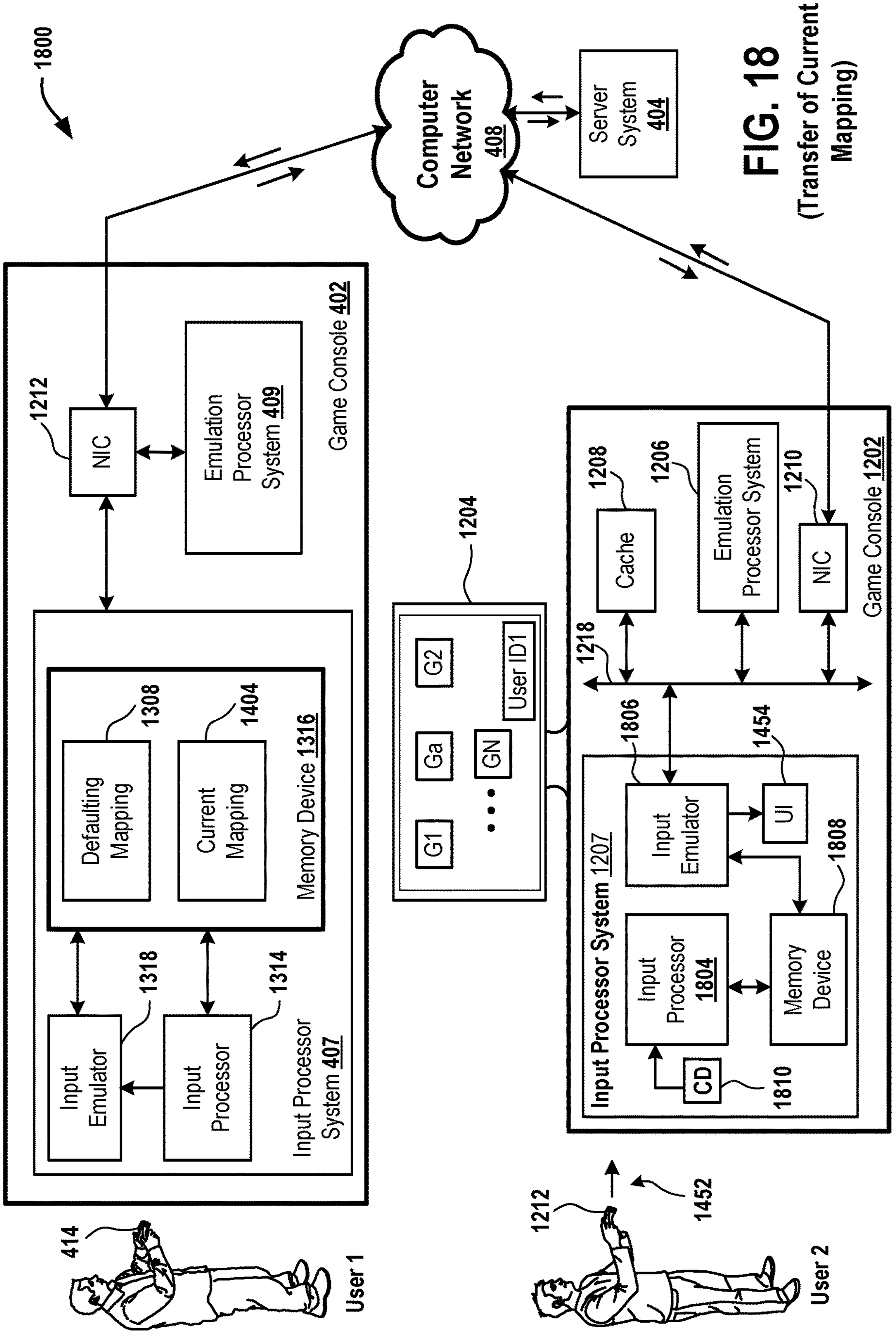
FIG. 18 is a diagram of an embodiment of a system to illustrate a communication of a current mapping from a game console to another game console.

FIG. 18 is a diagram of an embodiment of a system 1800 to illustrate a communication of a current mapping from the game console 402 to the game console 1202. The system 1800 includes the game console 402, the computer network 408, the server system 404, and the game console 1202.

The game console 1202 includes the input processor system 1207, which includes an input processor 1804, an input emulator 1806, a memory device 1808, and a communication device 1810. As an illustration, the input emulator 1806, when implemented within the game console 1202, enables a play of the legacy game N by using a hand-held controller 1212. An example of the communication device 1810 is a communication device that applies the close-range communication protocol.

The communication device 1810 is coupled to the input processor 1804. The input processor 1804 and the input emulator 1806 are coupled to the memory device 1808. The input processor system 1207 is coupled to the bus 1218.

The input processor 1314 of the game console 402 accesses, such as reads, the current mapping 1404 from the memory device 1316 and sends the current mapping 1404 to the NIC 1212. For example, within a pre-determined time period after the current mapping 1404 is generated, the input processor 1314 sends the current mapping 1404 to the NIC 1212. To illustrate, immediately after the currently mapping 1404 is created, the current mapping 1404 is stored in the memory device 1316 and simultaneously sent to the NIC 1212. The NIC 1212 applies the network communication protocol to the current mapping 1404 to generate one or more data packets, and sends the one or more data packets via the computer network 408 to the server system 404 for storage in the one or more memory devices of the server system 404.

The user 1 uses the hand-held controller 1212 to log into the user account 1 and access the legacy game N via the game console 1202. In addition, before or during a play of the legacy game N, the user 1 selects one or more updated input devices of the hand-held controller 1212 to generate an indication, such as a request, for accessing the current mapping 1404 from the server system 404. Upon receiving the selection of the one or more updated input devices of the hand-held controller 1212, the hand-held controller 1212 applies the wireless transfer protocol to generate one or more data packets and sends the one or more data packets to the communication device 1810. The communication device 1810 applies the wireless transfer protocol to obtain the indication that the current mapping 1404 is to be obtained for the user account 1, and stores the indication in the memory device 1808 of the game console 1202.

A CPU, such as the CPU 922 (FIG. 9B), of the game console 1202 accesses the indication for obtaining the current mapping 1404 from the memory device 1808 and sends the indication to the NIC 1210. The NIC 1210 applies the network communication protocol to the indication for obtaining the current mapping 1404 to generate one or more data packets, and sends the one or more data packets via the computer network 408 to the server system 404.

In response to receiving the indication for the current mapping 1404 from the game console 1202, the server system 404 accesses the current mapping 1404 from the one or more memory devices of the server system 404 and sends the current mapping 1404 via the computer network 408 to the game console 1202. For example, the processor of the server system 404 determines that the indication for obtaining the current mapping 1404 corresponds to the user account 1. To illustrate, the processor of the server system 404 determines that indication is received while the user 1 is logged into the user account 1 to determine that the indication corresponds to the user account 1. Continuing with the example, the processor of the server system 404 accesses the current mapping 1404 from the one or more memory devices of the server system 404 and sends the current mapping 1404 to the network interface controller of the server system 404. The network interface controller of the server system 404 applies the network communication protocol to the current mapping 1404 to generate one or more data packets and sends the one or more data packets via the computer network 408 to the game console 1202.

The NIC 1210 of the game console 1202 extracts the current mapping 1404 from the one or more data packets received from the server system 404, and stores the current mapping 404 in the memory device 1808. The user input 1452 is received from the hand-held controller 1212 by the input processor system 1207 in the same manner in which the user input 1452 is received from the hand-held controller 414 by the input processor system 407. When the user input 1452 is received, the input emulator 1806 accesses the current mapping 1404 from the memory device 1808 to determine the user input 1454. For example, the user input 1454 is determined by the input emulator 1806 from the user input 1452 in the same manner in which the user input 1454 is determined by the input emulator 1318 from the user input 1452. The input emulator 1806 sends the user input 1454 to the emulation processor system 1206 via the bus 1218.

Upon receiving the user input 1454, the basic block compiler of the emulation processor system 1206 checks the cache 1208 of the emulation processor system 1206 to determine whether the cache 1208 includes one or more of the basic blocks 1 through n of the game code GCN for servicing the user input 1454. Upon determining that the cache 1208 does not include the one or more of the basic blocks 1 through n for servicing the user input 1454, the basic block compiler of the emulation processor system 1206 accesses one or more of the emulated PU code instructions 1 through M from the one or more memory devices of the emulation processor system 1206 for servicing the user input 1454, and compiles the one or more of the emulated PU code instructions 1 through M to generate one or more of the basic blocks 1 through n for servicing the user input 1454. The basic block compiler of the emulation processor system 1206 sends the one or more of the basic blocks 1 through n to the block dispatcher of the emulation processor system 1206. Upon receiving the one or more basic blocks 1 through n, the block dispatcher of the emulation processor system 1206 executes the one or more basic blocks 1 through n to generate one or more image frames based on the user input 1454. On the other hand, upon determining that the cache 1208 includes the one or more of the basic blocks 1 through n for servicing the user input 1454, the basic block compiler of the emulation processor system 1206 sends an instruction to the block dispatcher of the emulation processor system 1206. In response to receiving the instruction, the block dispatcher of the emulation processor system 1206 executes the one or more of the basic blocks 1 through n for servicing the user input 1454.

Figure 19A:
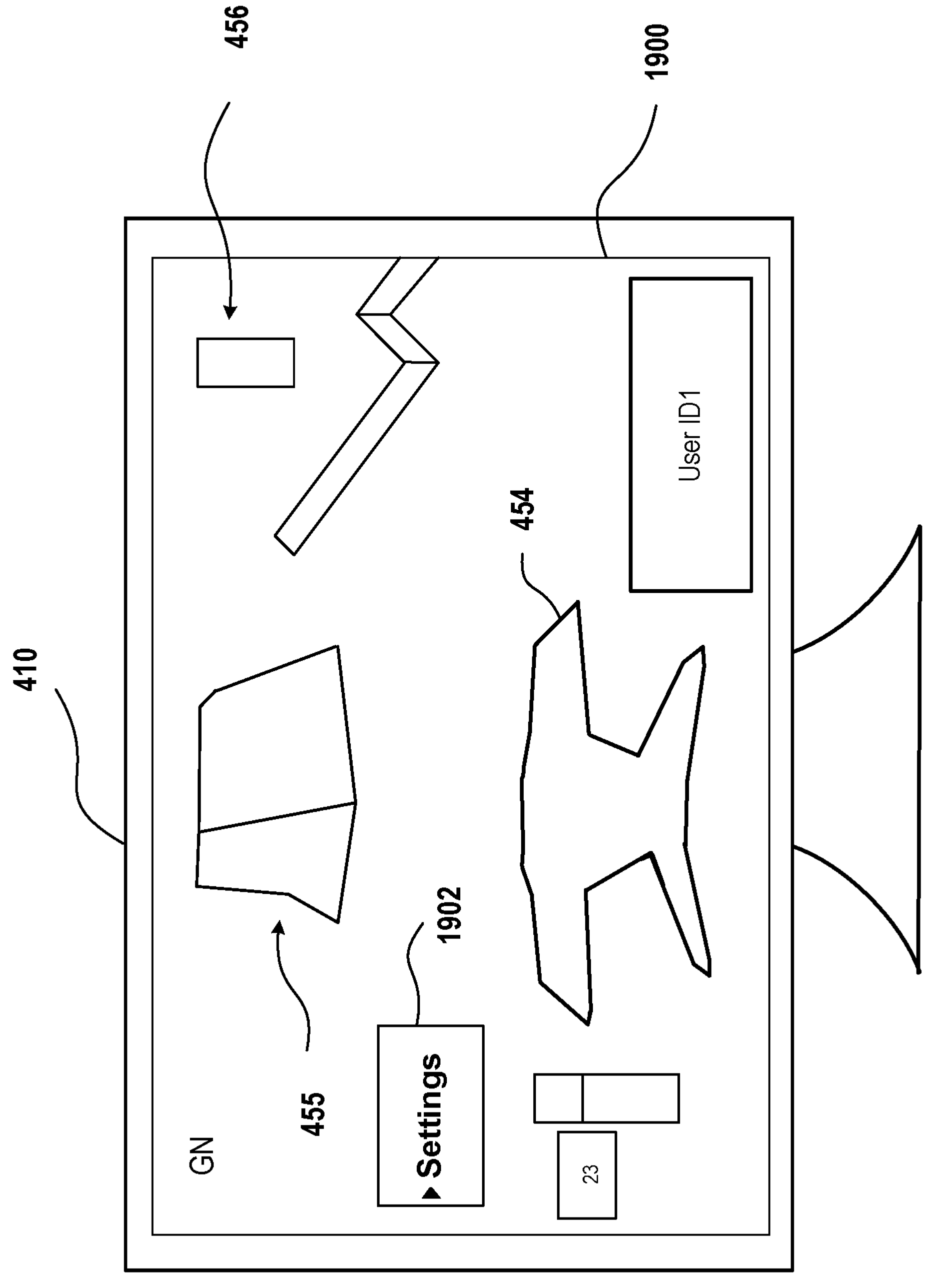
FIG. 19A is a screen shot of an image to illustrate reception of a type and a sub-type of an updated hand-held controller.

FIG. 19A is a screen shot of an image 1900 to illustrate reception of a type and a sub-type of an updated hand-held controller, such as the hand-held controller 414 or the wheel controller 1702 (FIG. 17) or the hand-held controller 1212

(FIG. 18). The image 1900 includes the virtual environment 452 (FIG. 4B) of the legacy game N.

During or before a play of the legacy game N, the user 1 decouples a first updated hand-held controller from the input processor system 407 and couples a second updated hand-held controller to the input processor system 407. The user 1 then operates one or more updated input devices of the second updated hand-held controller to access a menu 1902, which includes a Settings option. A CPU, such as the CPU 922 (FIG. 9B), of the emulation processor system 409 instructs the GPU, such as the GPU 924 (FIG. 9B), of the emulation processor system 409 to display the menu 1902 on the display screen of the display device 410 (FIG. 4B). The user 1 further operates one or more updated input devices of the second updated hand-held controller to select the Settings option. When the Settings option is selected, the CPU of the emulation processor system 409 instructs the GPU of the emulation processor system 409 to display another menu on the display screen of the display device 410 (FIG. 4B). The other menu includes a Controls and Peripherals option. The user 1 then operates one or more updated input devices of the second updated hand-held controller to select the Controls and Peripherals option. When the Controls and Peripherals option is selected, the CPU of the emulation processor system 409 instructs the GPU of the emulation processor system 409 to display a menu 1912 (FIG. 19B) on the display screen of the display device 410.

Figure 19B:
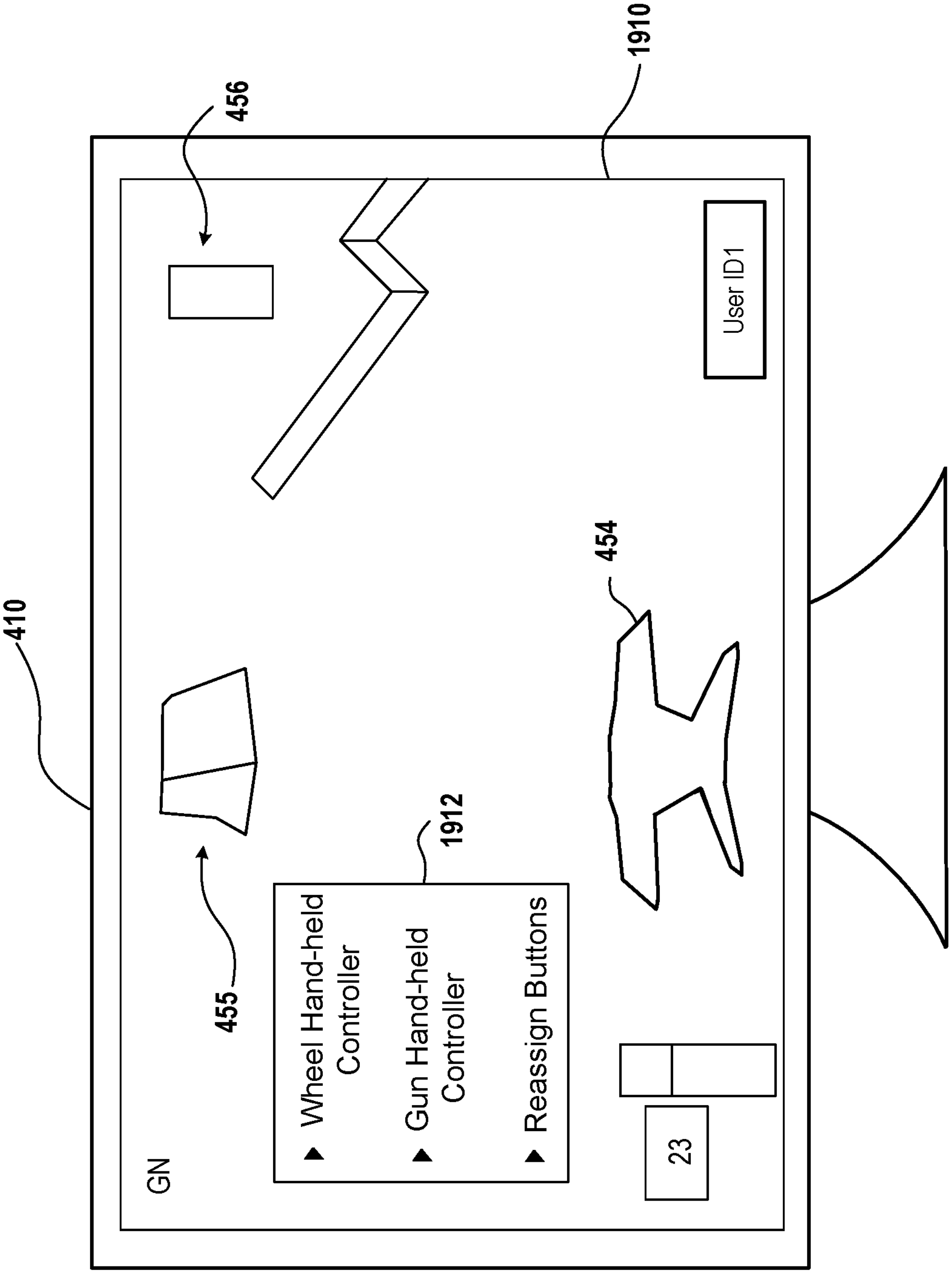
FIG. 19B is a screen shot of an image to illustrate a menu for receiving a type of an updated hand-held controller.

FIG. 19B is a screen shot of an image 1910 to illustrate the menu 1912. The menu 1910 includes a Reassign Buttons option to reassign buttons, a Gun Hand-held Controller option to indicate to the input processor system 407 (FIG. 4B) that a gun-shaped controller is to be used as the second updated hand-held controller with the input processor system 407, and a Wheel Hand-held Controller option to indicate to the input processor system 407 (FIG. 4B) that a wheel controller is to be used as the second updated hand-held controller with the input processor system 407. The gun-shaped controller is an example of a type of the updated hand-held controller.

The user 1 operates one or more updated input devices of the second updated hand-held controller to select the Wheel Hand-held Controller option. When the Wheel Hand-held Controller option is selected, the CPU of the emulation processor system 409 instructs the GPU of the emulation processor system 409 to display a menu including a first sub-type controller option and a second sub-type controller option on the display screen of the display device 410. The first sub-type controller and the second sub-type controller are examples of sub-types of a wheel controller.

The user 1 operates one or more updated input devices of the second updated hand-held controller to select the second sub-type controller option. Upon receiving the selection of the second sub-type controller option, the CPU of the emulation processor system 409 instructs the GPU of the emulation processor system 409 to continue or begin a play of the legacy game N.

Figure 20:
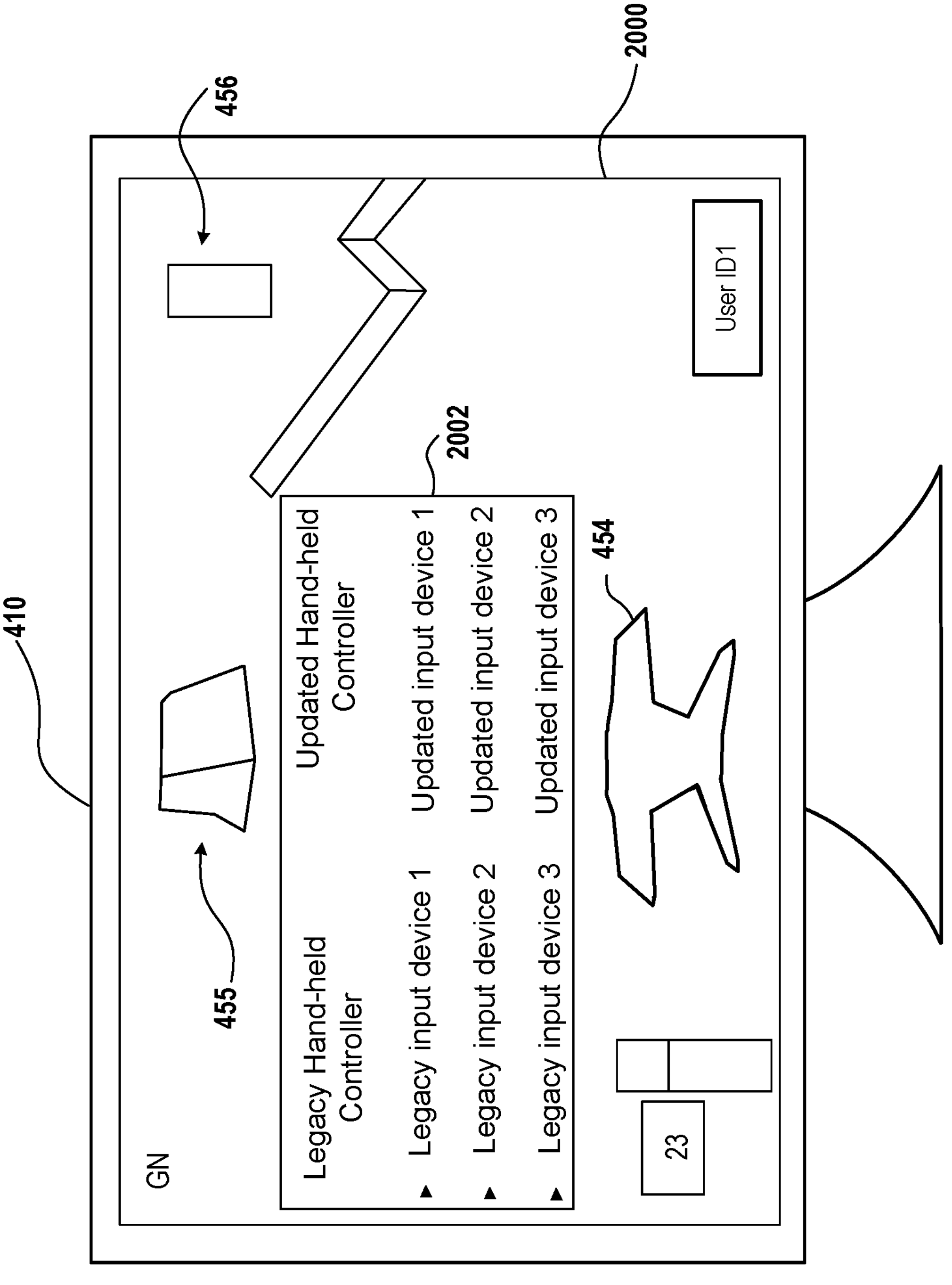
FIG. 20 is an embodiment of a screen shot of an image to illustrate a mapping between input devices of a legacy hand-held controller and an updated hand-held controller.

FIG. 20 is an embodiment of a screen shot of an image 2000 to illustrate a mapping 2002, such as a default mapping. The image 2000 includes the virtual environment 452 of the legacy game N. The mapping 2002 is an example of the default mapping 1308 (FIG. 13). During or before a play of the legacy game N, the CPU of the emulation processor system 409 instructs the GPU of the emulation processor 409 to display the mapping 2002 on the display screen of the display device 410.

The mapping 2022 includes a unique relationship, such as a correspondence or a one-to-one relationship, between input devices of the legacy hand-held controller and input devices of the updated hand-held controller. For example, a legacy input device 1, such as the triangle button, of the legacy hand-held controller maps to an updated input device 1, such as the triangle button, of the updated hand-held controller. As another example, a legacy input device 2, such as the touchpad 1602 (FIG. 16A) of the updated hand-held controller has a correspondence with an updated input device 2, such as the Select button of the legacy hand-held controller. As yet another example, a legacy input device 3 of the legacy hand-held controller has a one-to-one relationship with an updated input device 2 of the updated hand-held controller.

Figure 21A:
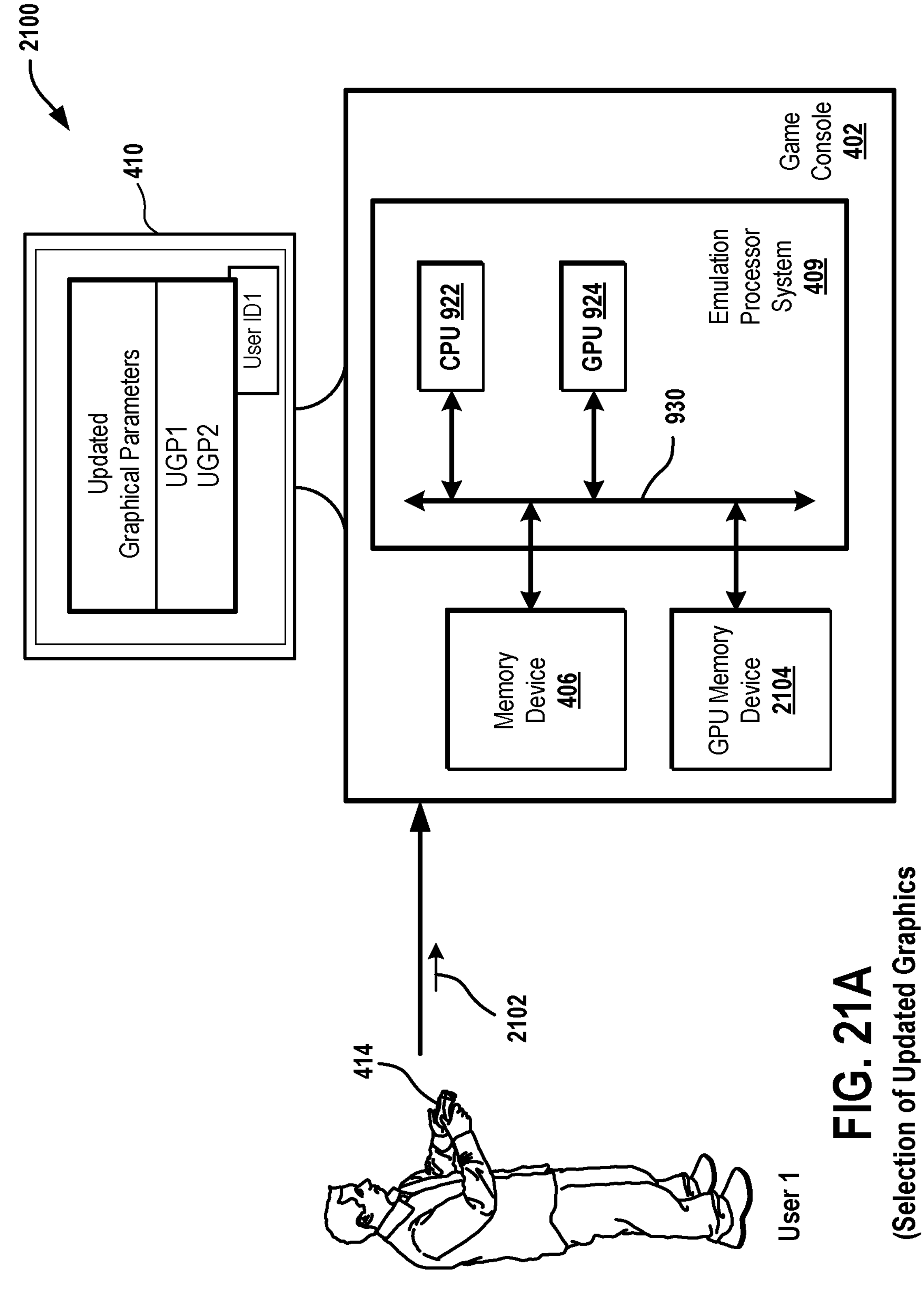
FIG. 21A is a diagram of an embodiment of a system to illustrate reception of updated graphics parameters from the user.

FIG. 21A is a diagram of an embodiment of a system 2100 to illustrate reception of updated graphics parameters from the user 1. The system 2100 includes the display device 410, the hand-held controller 414, and the game console 402.

The game console 402 includes the emulation processor system 409, the memory device 406, and a GPU memory device 2104. The emulation processor system 409 includes the CPU 922 and the GPU 924. The GPU memory device 2104 is coupled to the bus 930. The GPU memory device 2104 is an example of a memory device of the memory system 926 (FIG. 9B).

After the user 1 logs into the user account 1, during or before a play of the legacy game N, the GPU 924 controls the display device 410 to display a list of one or more updated graphical parameters, such as UGP1 and UGP2. For example, during a play of the legacy game N, the GPU 924 renders the updated graphical parameters UGP1 and UGP2 on the display device 410.

After the updated graphical parameters are displayed on the display device 410, the user 1 operates one or more updated input devices of the hand-held controller 414 to select one or more of the updated graphical parameters, and the hand-held controller 414 generates a user input 2102 based on the operation. The user input 2102 includes an indication of the selection of the one or more updated graphical parameters. The user input 2102 is sent from the hand-held controller 414 to the CPU 922 of the game console 402. The CPU 922 obtains the one or more updated graphical parameters from the user input 2102 and provides the one or more updated graphical parameters to the GPU 924. The GPU 924 emulates one or more legacy graphical parameters into the one or more graphical parameters.

In one embodiment, any number of updated graphical parameters are displayed on the display device 410.

Figures 1, 21B:
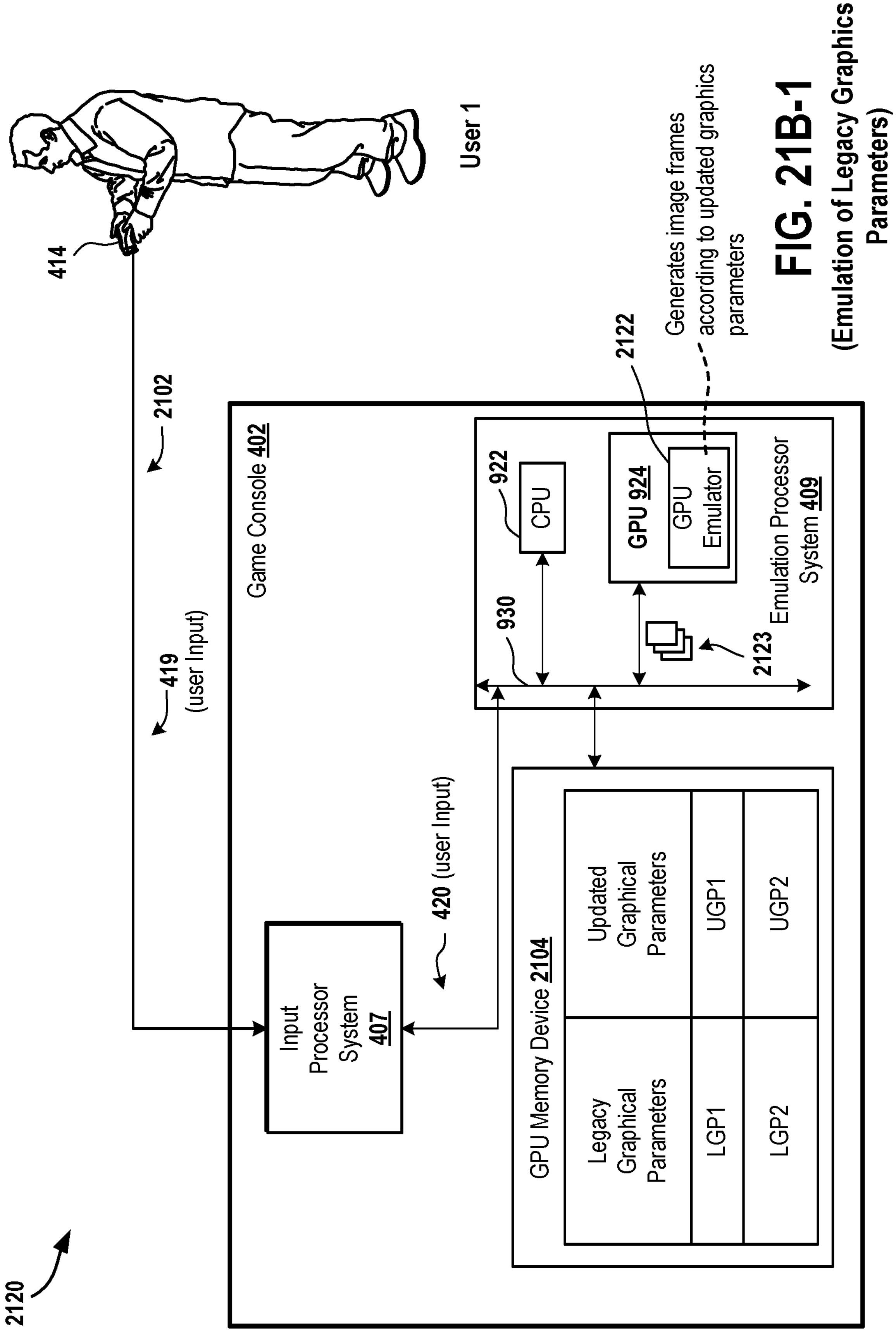
Figures 2, 21B:
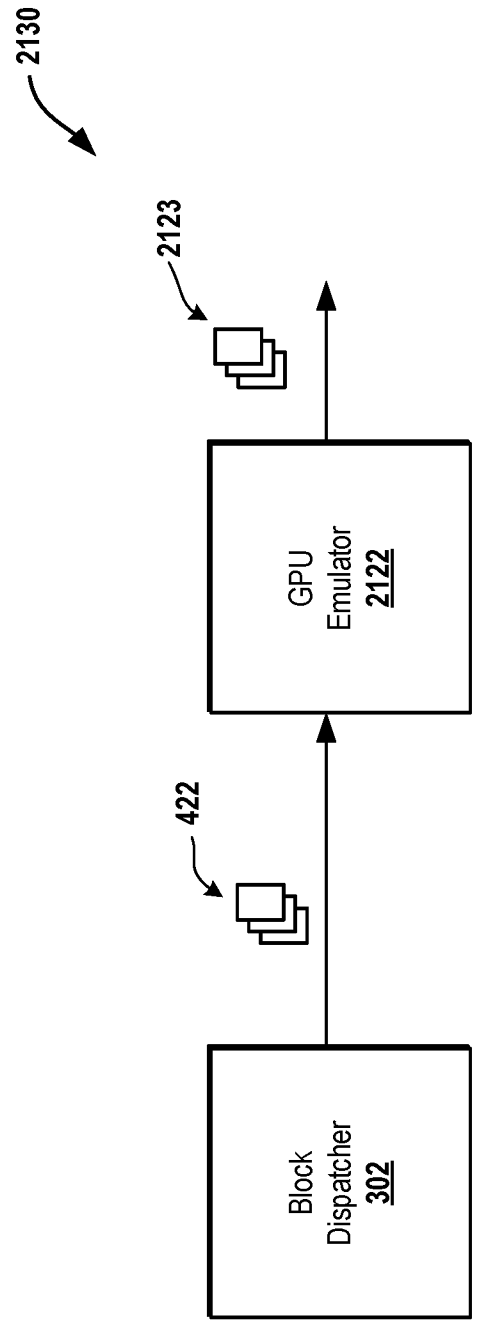

FIG. 21B-1 is a diagram of an embodiment of a system 2120 to illustrate emulation of the one or more legacy graphical parameters into the one or more updated graphical parameters. The system 2120 includes the hand-held controller 414 and the game console 402.

The GPU 924 includes a GPU emulator 2122. As an example, a GPU emulator, as described herein, is hardware or software or a combination thereof. To illustrate, a GPU emulator is a processor, or a PLD, or an ASIC, or a controller. As another illustration, a GPU emulator is a computer program.

When the indication of the selection of the one or more updated graphical parameters is received from the hand-held controller 414, the CPU 922 provides the updated graphical parameters to the GPU 924. The GPU 924 stores the updated graphical parameters within the GPU memory device 2104. In response to the user input 420, the GPU 924 executes the one or more basic blocks 1 through n of the updated code to determine the one or more legacy graphical parameters, such as a legacy graphical parameter LGP1 and a legacy graphical parameter LGP2, to be applied to virtual objects and a virtual background within image frames 2123 of the legacy game N. The image frames 2123 are updated image frames. It should be noted that the user input 419 from which the user input 420 is generated is received before the user input 2102 for applying the one or more updated graphical parameters is received.

Upon determination, by the GPU 924, of the one or more legacy graphical parameters to generate one or more legacy image frames, such as the image frames 422 (FIG. 4B), the GPU emulator 2122 applies the one or more updated graphical parameters instead of the one or more of the legacy graphical parameters to the legacy image frames to output the images frames 2123. The application of the one or more updated graphical parameters is sometimes referred to as rendering of an image frame of a virtual environment of the legacy game N. For example, the GPU emulator 2122 identifies, from the GPU memory device 2104, the updated graphical parameter UGP1 as corresponding to the legacy graphical parameter LGP1 and the updated graphical parameter UGP2 as corresponding to the legacy graphical parameter LGP2. In the example, the updated graphical parameter UGP1 and the legacy graphical parameter LGP1 are of the same type. To illustrate, the updated graphical parameter UGP1 is an updated resolution of a virtual image of a virtual object and the legacy graphical parameter LGP1 is a legacy resolution of a virtual image of the virtual object. As another illustration, the updated graphical parameter UGP2 is a set of colors to be applied to a virtual object from a 32 bit color palette and the legacy graphical parameter LGP2 is a set of colors to be applied to the virtual object from a 16 bit color palette. As another example, both the graphical parameters LGP1 and UGP1 include the same identifier, such as an alphanumeric code, of a type of a graphical parameter. In the example, the GPU emulator 2122 determines that the updated graphical parameter UGP1 corresponds to the legacy graphical parameter LGP1 in response to determining that both the graphical parameters UGP1 and LGP1 include the same identifier. The GPU 924 displays images of virtual environments, such as a virtual environment having the virtual objects and the virtual background of the virtual environment 452, on the display device 410 according to the image frames 2123. For example, the GPU 924 controls light emitters of the display device 410 to display the images according to the image frames 2123. The images of the virtual environments are displayed on the display device 410 to display a play of the legacy game N.

In one embodiment, the legacy GPU 904 (FIG. 9A) executes one or more of the emulated PU code instructions 1 through M. Upon execution of the emulated PU code instructions 1 through M, the updated graphical parameters cannot be generated. Rather, the legacy graphical parameters are generated.

In one embodiment, the CPU 922 executes the basic block compiler 104 and the GPU 924 executes the block dispatcher 302.

In an embodiment, the CPU 922 executes the basic block compiler 104 and the block dispatcher 302.

In one embodiment, an updated graphical parameter does not correspond to a legacy graphical parameter. For example, there is no legacy graphical parameter that corresponds to the updated graphical parameter UPG1. Instead of applying any of the legacy graphical parameters, the GPU emulator 2122 applies the updated graphical parameter UPG1 during a rendering operation performed during a play of the legacy game N.

In an embodiment, the GPU emulator 2122 applies interpolation operations, such as nearest, or bilinear, or bicubic, or a combination, thereof, to a legacy image frame to estimate updated graphical parameters to be applied to legacy image pixels, of the legacy image frame, for which legacy graphical parameters are unknown. For example, the GPU emulator 2122 interpolates color and intensity values of a first image pixel of the virtual environment 452 to a second image pixel of the virtual environment 452 to output an updated image frame having the first and second image pixels. In the example, a legacy graphical parameter, such as color and intensity values, of the second image pixel are unknown upon execution of the one or more basic blocks 1 through n of the updated code. In the example, the first and second image pixels are portions of an updated image frame, such as one of the updated image frames 2123.

In one embodiment, the GPU emulator 2122 applies one or more interpolation operations and one or more convolution operations to a legacy image frame to estimate updated graphical parameters to be applied to legacy image pixels, of the legacy image frame. For example, the after applying the bicubic interpolation, the GPU emulator 2122 applies a 9×9 convolution, a 1×1 convolution, and a 5×5 convolution to the legacy image frame to output an updated image frame. For example, in an n×m convolution, the GPU emulator 2122 obtains n×m image pixels of a legacy image frame, convolves the n×m image pixels with an n×m kernel to output a result value of an updated graphical parameter, where n and m are positive integers, n represents a row number of an image pixel or a kernel pixel, and m represents a column number of the image pixel the kernel pixel. For example, n is 4 and m is 2. As another example, both m and n are 4. A value of the updated graphical parameter of an n×1 pixel of the legacy image frame to which the n×m kernel is applied is replaced with the result value.

In an embodiment, instead of applying convolution to an image pixel of a legacy image frame, the GPU emulator 2122 divides the image pixel into sub-pixels and applies a convolution to the sub-pixels. In the embodiment, the convolution is applied to the sub-pixels before or after applying the convolution to the image pixels.

In one embodiment, the GPU 924 applies a deep learning method. In the deep learning method, the GPU emulator 2122 receives a legacy image frame and accesses a database in which a comparison image frame is stored, and compares the legacy image frame with the comparison image frame to output an updated image frame. As an example, the comparison image frame has one or more of the same virtual objects as that in the legacy image frame. In the example, the comparison image frame has a comparison fighter jet and the legacy image frame has the virtual object 454. Continuing with the example, the GPU emulator 2122 compares the comparison fighter jet with the virtual object 454 to determine whether the virtual object 454 is to be modified based on the comparison fighter jet. Continuing further with the example, the GPU emulator 2122 determines that at least a portion, such as wings, of the virtual object 454 is to be replaced with at least a corresponding portion, such as wings, of the comparison fighter jet. In the example, upon receiving the determination from the GPU emulator 2122, the GPU 924 replaces at least the portion of the virtual object 454 with at least the corresponding portion of the comparison fighter jet to output a result fighter jet to further output the updated image frame. The updated image frame is stored by the GPU 924 within the database. It should be noted that the database is stored within the GPU memory device 2104.

In an embodiment, the GPU applies a recursive learning method. The recursive learning method includes the deep learning method. In addition, in the recursive learning method, the GPU emulator 2122 receives an additional legacy image frame and accesses the database in which the updated image frame is stored, and compares the additional legacy image frame with the updated image frame to output an additional updated image frame. As an example, the updated image frame has one or more of the same virtual objects as that in the additional legacy image frame. In the example, the updated image frame has the result fighter jet and the additional legacy image frame has the virtual object 454. Continuing with the example, the GPU emulator 2122 compares the result fighter jet with the virtual object 454 to determine whether the virtual object 454 is to be modified based on the result fighter jet. Continuing further with the example, the GPU emulator 2122 determines that at least a portion, such as wings, of the virtual object 454 is to be replaced with at least a corresponding portion, such as wings, of the result fighter jet. In the example, upon receiving the determination from the GPU emulator 2122, the GPU 924 replaces at least the portion of the virtual object 454 with at least the corresponding portion of the result fighter jet to output an additional result fighter jet to further output an additional updated image frame. The additional updated image frame is stored by the GPU 924 within the database to apply to the next legacy image frame. The next legacy image frame is received consecutive to the reception of the additional legacy image frame by the GPU emulator 2122.

FIG. 21B-2 is a diagram of an embodiment of a system 2130 to illustrate generation of the updated image frames 2123 from the image frames 422, such as legacy image frames, output from the block dispatcher 302. The system 2130 includes the block dispatcher 302 and the GPU emulator 2122. The block dispatcher 302 is coupled to the GPU emulator 2122. The block dispatcher 302 executes one or more of the basic blocks 1 through n of the updated code to generate the image frames 422, which include the legacy graphical parameters. The GPU emulator 2122 receives the image frames 422, parses the image frames 422 to identify the legacy graphical parameters, and converts the legacy graphical parameters into the updated graphical parameters to output the updated image frames 2123.

In one embodiment, each image frame is an image file. For example, a first image frame is a first image file and a second image frame is a second image file.

Figures 2, 21C:
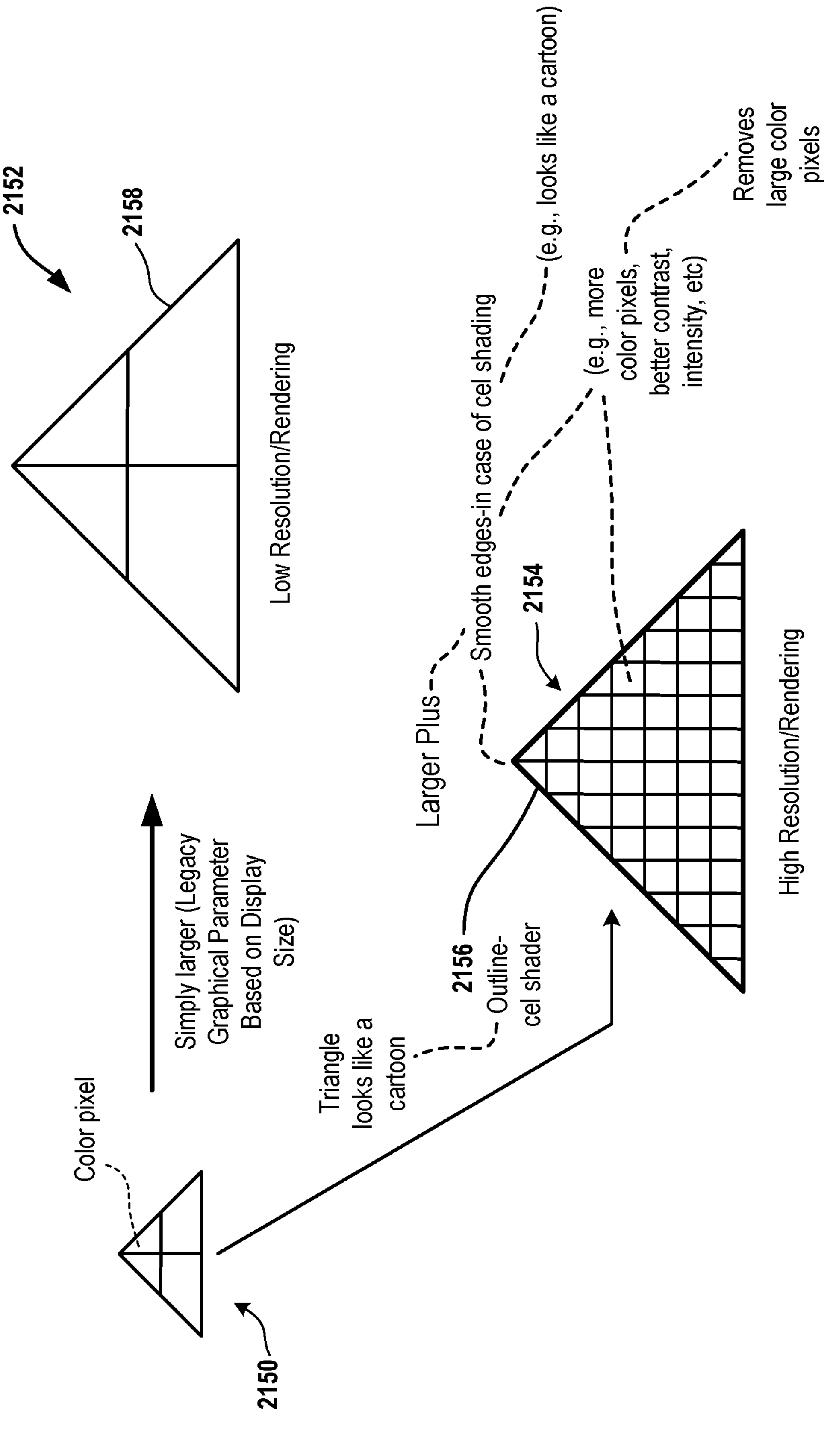

FIG. 21C-1 is an embodiment of a listing of legacy and updated graphical parameters, and a correspondence between the legacy and updated graphical parameters. One example of the legacy graphical parameter LGP1 or LGP2 is a legacy image resolution, such as a 640×480 pixel resolution, a 720×480 pixel resolution, and a 720×586 pixel resolution of a virtual image of a virtual environment. In the example, the updated graphical parameter UGP1 corresponding to the legacy graphical parameter LGP1 or the updated graphical parameter UGP2 corresponding to the legacy graphical parameter LGP2 is an updated image resolution. To illustrate, the updated resolution include a high definition (HD) resolution, which is four times the pixel resolution of a legacy graphical parameter, and a 4K resolution, which is eight times the pixel resolution of the legacy graphical parameter.

Another example of the legacy graphical parameter LGP1 or LGP2 is a thickness of a legacy line. The legacy line is a line image of one or more portions of one or more virtual objects of a virtual scene of the legacy game N and a portion of a virtual background of the virtual scene. In the example, the updated graphical parameter UGP1 corresponding to the legacy graphical parameter LGP1 or the updated graphical parameter UGP2 corresponding to the legacy graphical parameter LGP2 is an updated line thickness. As an illustration, the updated line thickness is a multiple or a factor of the legacy line thickness.

Yet another example of the legacy graphical parameter LGP1 or LGP2 is a legacy line count, which is defined by a number of legacy lines having pixels that form an image of a virtual environment of the legacy game N. In the example, the updated graphical parameter UGP1 corresponding to the legacy graphical parameter LGP1 or the updated graphical parameter UGP2 corresponding to the legacy graphical parameter LGP2 is an updated line count. As an illustration, the updated line count is a multiple or a factor of the legacy line count.

Still another example of the updated graphical parameter UGP1 or UGP2 is an updated scanline thickness, which is defined by a thickness of each scanline that is overlaid on an image frame of a virtual image of a virtual environment of the legacy game N. To illustrate, each scanline is overlaid on a legacy image frame. Each scanline is overlaid to extend from one end of the virtual image to an opposite end of the virtual image. It should be noted that in the example, there is no corresponding legacy graphical parameter that corresponds to the updated scanline thickness.

Another example of the updated graphical parameter UGP1 or UGP2 is an updated scanline count, which is defined by a number of scanlines that are overlaid on a virtual image of a virtual environment of the legacy game N. It should be noted that in the example, there is no corresponding legacy graphical parameter that corresponds to the updated scanline count.

Yet example of the legacy graphical parameter LGP1 or LGP2 is a legacy anti-aliasing filter and a legacy video filter. The legacy anti-aliasing and legacy video filters reduce or remove noise, such as blurry colors or intensities, that is output and evident within pixels of a virtual image of a virtual environment of the legacy game N. In the example, the updated graphical parameter UGP1 corresponding to the legacy graphical parameter LGP1 or the updated graphical parameter UGP2 corresponding to the legacy graphical parameter LGP2 is an updated anti-aliasing filter and an updated video filter. As an illustration, the updated anti-aliasing and video filters reduce or remove the noise with a greater resolution than that with which the legacy anti-aliasing and legacy video filters remove or reduce the noise. In the illustration, the noise is removed or reduced by smoothing polygonal edges of polygons used to represent virtual objects of the legacy game N or by interpolating brightness of pixels of a virtual background of a virtual scene of the legacy game N.

Still another example of the legacy graphical parameter LGP1 or LGP2 is a legacy color scale, such as a legacy color space or a legacy color palette, which is defined by a number of bits that represents each color within the legacy color scale. An illustration of the legacy color space is a video graphics array (VGA) color space. Each color within the legacy color palette is represented by 16 bits. The colors within the legacy color palette can be applied to represent an image of a virtual environment of the legacy game N. In the example, the updated graphical parameter UGP1 corresponding to the legacy graphical parameter LGP1 or the updated graphical parameter UGP2 corresponding to the legacy graphical parameter LGP2 is an updated color scale.

As an illustration, the updated color scale is 32-bit color palette. Each color in the updated color scale is represented by 32 bits instead of 16.

Another example of the legacy graphical parameter LGP1 or LGP2 is a legacy rendering rate, such as 20 frames per second (fps) or 30 fps, with which legacy image frames are rendered and displayed on the display device 410. In the example, the updated graphical parameter UGP1 corresponding to the legacy graphical parameter LGP1 or the updated graphical parameter UGP2 corresponding to the legacy graphical parameter LGP2 is an updated rendering rate, which is a multiple of the legacy rendering rate. As an illustration, the updated rendering rate is 60 fps or 120 fps, with which updated image frames are rendered and displayed on the display device 410.

Yet another example of the legacy graphical parameter LGP1 or LGP2 is a legacy upscale factor, which is defined by the legacy image resolution and a size of a standard television, such as a cathode ray tube, that is used with the legacy machine 900 (FIG. 9A). The legacy upscale factor scales an image of a virtual object or a virtual background to fill in display pixels of the standard television after the legacy resolution is applied to the image. In the example, the updated graphical parameter UGP1 corresponding to the legacy graphical parameter LGP1 or the updated graphical parameter UGP2 corresponding to the legacy graphical parameter LGP2 is an updated upscale factor. To illustrate, the updated upscale factor includes the HD resolution or the 4K resolution. Also, in the illustration, the updated upscale factor scales an image of the virtual object or the virtual background to fill in display pixels of an HD display device or a 4K display device. The HD display device and the 4K display device are examples of the display device 410.

FIG. 21C-2 is a diagram to illustrate an embodiment of a method executed by the GPU emulator 2122 (FIG. 21B-1) for changing a resolution of a virtual object during a rendering operation. Without the GPU emulator 2122, a position and an orientation 2150 of a virtual object 2152 in a virtual scene of the legacy game N is resized to be larger and rendered by the GPU 924 using four color pixels. For example, the virtual object 2152 is rendered by the legacy GPU 904 (FIG. 9A), which excludes the GPU emulator 2122.

When the GPU emulator 2122 is used, the position and orientation 2150 is resized and rendered as a virtual object 2154 in a virtual scene of the legacy game N. As an example, the virtual object 2154 has a greater resolution than the virtual object 2152. To illustrate, the virtual object 2154 has a greater number of image pixels than the virtual object 2152. To further illustrate, the GPU emulator 2122 effectively replaces one or more large color pixels of the virtual object 2152 with one or more corresponding sets of smaller pixels to output the virtual object 2154. As another example, the virtual object 2154 has a more prominent outline 2156 compared to an outline 2158 of the virtual object 2152. As yet another example, the virtual object 2154 appears cartoonish compared to the virtual object 2152. To illustrate, the virtual object 2154 is rendered as a two-dimensional virtual object and the virtual object 2152 is rendered as a three-dimensional virtual object. As another example, the outline 2156 has smoother edges and vertices compared to the outline 2158. As another example, the virtual object 2154 has a higher contrast compared to the virtual object 2152. As yet another example, the virtual object 2154 has a greater variety of intensity levels compared to that of the virtual object 2152.

Figure 21D:
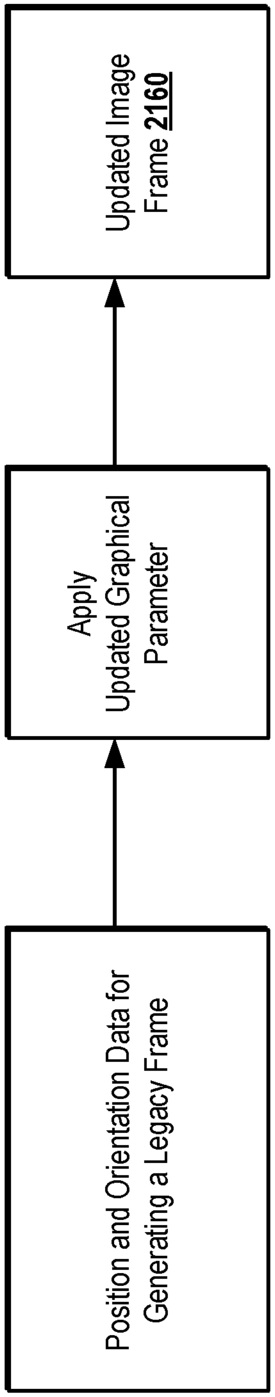
FIG. 21D is a diagram to illustrate an embodiment of a method for generating an image frame based on the updated graphical parameters.

FIG. 21D is a diagram to illustrate an embodiment of a method for generating an updated image frame 2160 based on the updated graphical parameters. The CPU 922 (FIG. 21B-1) executes one or more of the basic blocks 1 through n of the game code GCN to determine positions and orientations of virtual objects and a virtual background in a virtual scene of the legacy game N. The image frame 2160 is an example of one of the image frames 2123 (FIG. 21B-1). The GPU 924 (FIG. 21B-1) executes one or more of the basic blocks 1 through n of the game code GCN to generate the legacy image frames, such as the image frames 422, having the legacy graphical parameters. The legacy graphical parameters are applied by the GPU 924 to the positions and orientations of the virtual objects and the virtual background in the virtual scene of the legacy game N. The GPU 924, instead of providing the legacy image frames to the display device 410 for display of images of the virtual environment 452, applies, such as executes, the GPU emulator 2122 to determine the updated graphical parameters corresponding to the legacy graphical parameters. The GPU 924 generates the updated image frame 2160 based on the updated graphical parameters instead of the legacy graphical parameters, and sends the updated image frame to the display screen 410 for display of an image of the legacy game N.

Figure 22A:
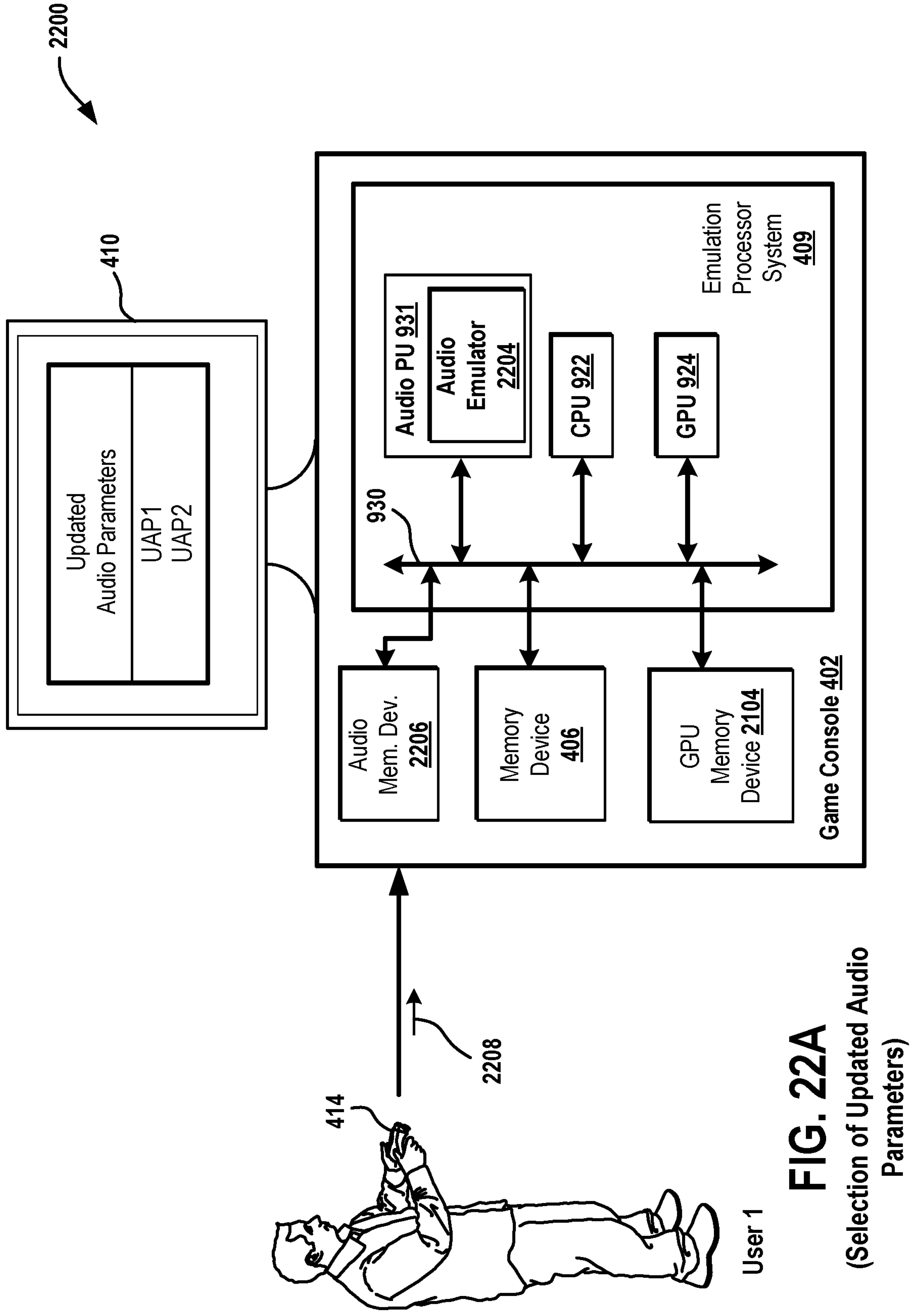
FIG. 22A is a diagram of an embodiment of a system to illustrate reception of updated audio parameters from the user.

FIG. 22A is a diagram of an embodiment of a system 2200 to illustrate reception of updated audio parameters from the user 1. The system 2200 includes the display device 410, the hand-held controller 414, and the game console 402.

The game console 402 includes the emulation processor system 409 and an audio memory device 2206. The emulation processor system 409 includes an APU 931, which includes an audio emulator 2204. As an example, an audio emulator, as described herein, is hardware or software or a combination thereof. To illustrate, an audio emulator is a processor, or a PLD, or an ASIC, or a controller. As another illustration, an audio emulator is a computer program.

The audio memory device 2206 and the APU 931 are coupled to the bus 930. As an example, the APU 931 is implemented within the updated machine 920. Also, as an example, the audio memory device 2206 is implemented within the memory system 926 (FIG. 9B).

After the user 1 logs into the user account 1, during or before a play of the legacy game N, the GPU 924 controls the display device 410 to display a list of one or more updated audio parameters, such as UAP1 and UAP2. For example, during a play of the legacy game N, the GPU 924 renders the updated audio parameters UAP1 and UAP2 on the display device 410.

After the updated audio parameters are displayed on the display device 410, the user 1 operates one or more updated input devices of the hand-held controller 414 to select one or more of the updated audio parameters, and the hand-held controller 414 generates a user input 2208 based on the operation. The user input 2208 includes an indication of the selection of the one or more updated audio parameters. The user input 2208 is sent from the hand-held controller 414 to the CPU 922. The CPU 922 obtains the one or more updated audio parameters from the user input 2208 and sends the one or more updated audio parameters to the APU emulator 2204 of the APU 931. The APU emulator 2204 emulates one or more legacy audio parameters into the one or more updated audio parameters.

In one embodiment, any number of updated audio parameters are displayed on the display device 410.

Figures 1, 22B:
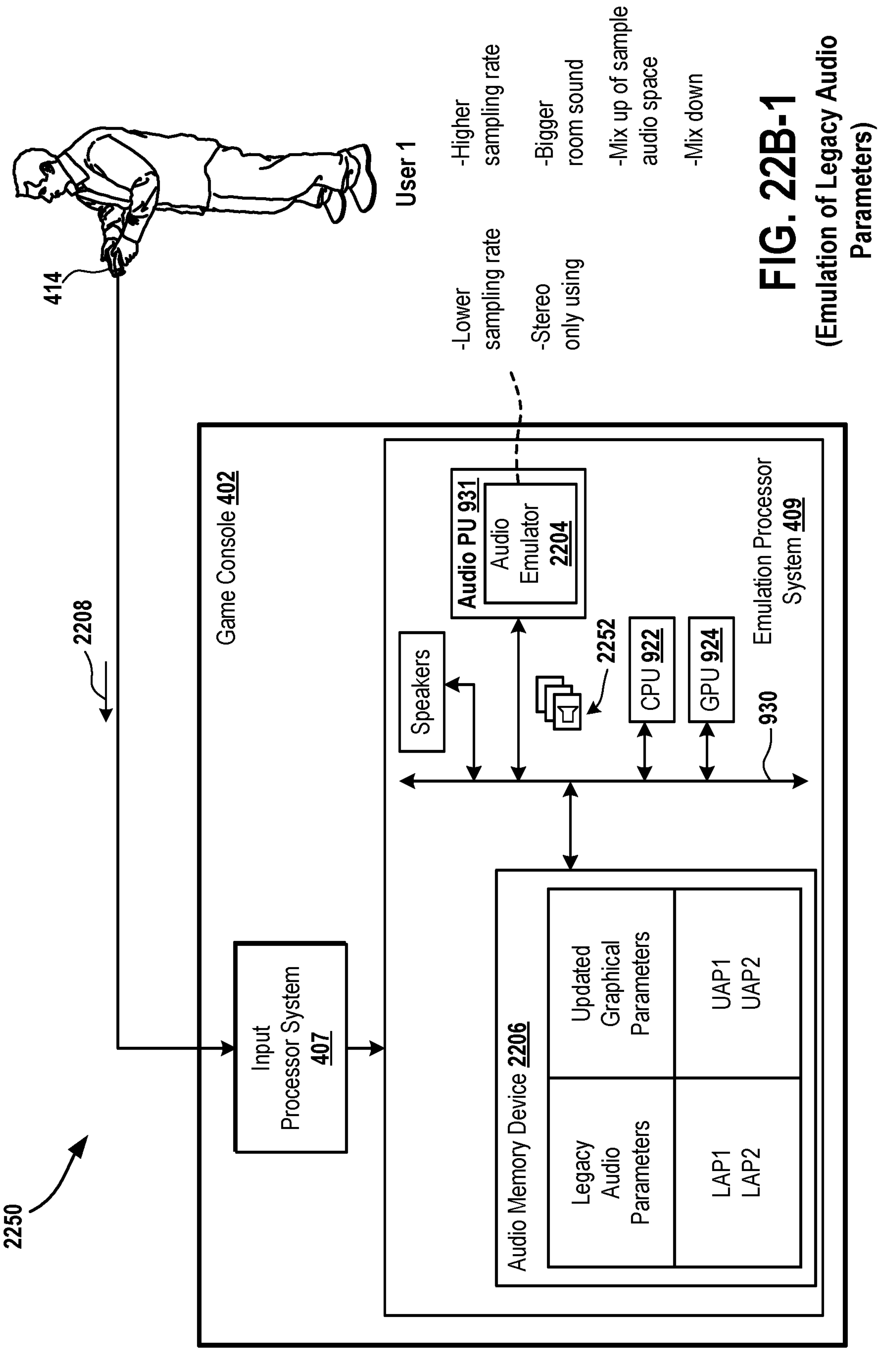
Figures 2, 22B:
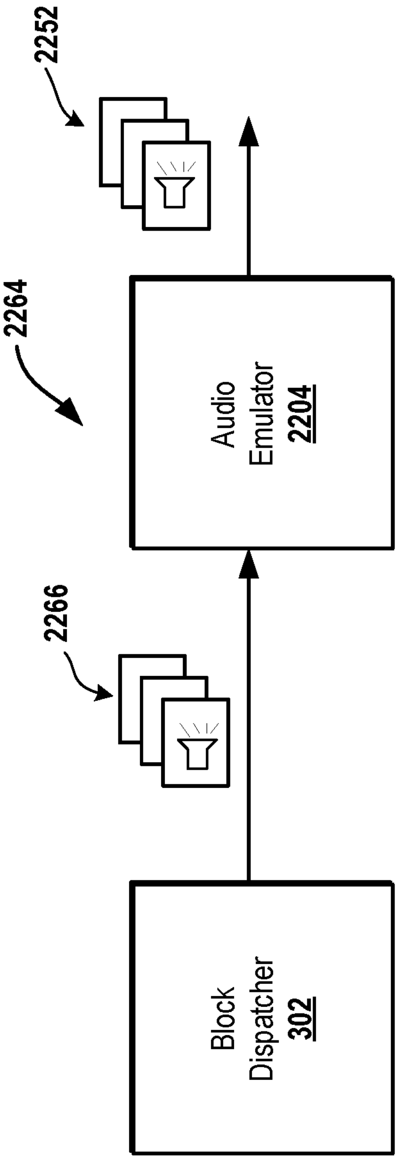

FIG. 22B-1 is a diagram of an embodiment of a system 2250 to illustrate emulation of the one or more legacy audio parameters into the one or more updated audio parameters. The system 2120 includes the hand-held controller 414 and the game console 402.

When the indication of the selection of the one or more updated audio parameters is received via the user input 2208 from the hand-held controller 414, the CPU 922 provides the updated audio parameters to the APU 931 via the bus 930. The APU 931 stores the updated audio parameters within the audio memory device 2206. In response to the user input 420, the APU 931 executes the one or more basic blocks 1 through n of the updated code to determine the one or more legacy audio parameters, such as a legacy audio parameter LAP1 and a legacy audio parameter LAP2, to be applied to virtual objects and a virtual background within the image frames 2123 of the legacy game N. The APU 931 further generates one or more legacy audio frames based on the one or more legacy audio parameters to be output in synchronization with the image frames 2123 (FIG. 21B-1). It should be noted that the user input 419 from which the user input 420 is generated is received before the user input 2208 for applying the one or more updated audio parameters is received.

Upon generation, by the APU 931, of the legacy audio frames to be output with the image frames 2123, the audio emulator 2204 applies the one or more updated audio parameters to the legacy audio frames instead of the one or more of the legacy audio parameters for the generation of one or more audio frames 2252, which are updated audio frames. The application of the one or more updated audio parameters is sometimes referred to as generation of an audio frame to be output with a virtual environment of the legacy game N. For example, the audio emulator 2204 identifies, from the audio memory device 2206, the updated audio parameter UAP1 as corresponding to the legacy audio parameter LAP1 and the updated audio parameter UAP2 as corresponding to the legacy audio parameter LAP2. In the example, the updated audio parameter UAP1 and the legacy audio parameter LAP1 are of the same type. To illustrate, the updated audio parameter UAP1 is an updated sampling rate based on which a sound is output from a virtual image of a virtual object of the legacy game N and the legacy audio parameter LAP1 is a legacy sampling rate based on which a sound can be output from the virtual image. The updated sampling rate is greater than the legacy sampling rate. To further illustrate, the legacy sampling rate is 10,000 samples per second and the updated sampling rate is 96,000 samples per second. As another illustration, the updated audio parameter UAP2 enables sound to be output by a virtual object of the legacy game N as stereo, or mono, or as surround sound. In the illustration, the legacy audio parameter LGP2 enables sound to be output by the virtual object as stereo only. As yet another illustration, the updated audio parameter UAP1 is a larger sample space of audio sounds compared to a sample space of audio sounds of the legacy audio parameter LAP1. In the larger sample space, there is a greater variety of audio sounds compared to the sample space of audio sounds of the legacy audio parameter LAP1. As another illustration, the updated audio parameter UAP2 has a different reverb compared to the legacy audio parameter LAP2. To further illustrate, the updated audio parameter UAP2 indicates more or less echo compared to an amount of echo to be output based on the legacy audio parameter LAP2.

As another example, both the audio parameters LAP1 and UAP1 include the same identifier, such as an alphanumeric code, of a type of an audio parameter. In the example, the audio emulator 2204 determines that the updated audio parameter UAP1 corresponds to the legacy audio parameter LAP1 in response to determining that both the audio parameters UAP1 and LAP1 include the same identifier. The GPU 924 sends the image frames 2123 and the APU 931 sends the audio frames 2252 to the display device 410 to display images of virtual environments, such as the virtual environment 452, on the display device 410 according to the image frames 2123 and according to sound output based on the audio frames 2252. For example, the GPU of the display device 410 controls light emitters of the display device 410 to display the images according to the image frames 2123 and an APU of the display device 410 controls speakers of the display device 410 to output sound according to the audio frames 2252. The images of the virtual environments are displayed on the display device 410 to display a play of the legacy game N.

In one embodiment, the APU 931, excluding the audio emulator 2204, is a component of the legacy machine 900 (FIG. 9A). For example, the APU 931 is coupled to the memory device 906. As another example, the same audio processing hardware is used both in the legacy machine 900 and in the updated machine 920 (FIG. 9B). As yet another example, the APU 931 has the same hardware and software specifications as the legacy APU 910.

In one embodiment, the CPU 922, or the GPU 924, or the APU 931, or a combination of two or more thereof executes the basic block compiler 104.

In one embodiment, the CPU 922, or the GPU 924, or the APU 931, or a combination of two or more thereof executes the block dispatcher 302.

In one embodiment, an updated audio parameter does not correspond to a legacy audio parameter. For example, there is no legacy audio parameter that corresponds to the updated audio parameter UAP1. Instead of applying any of the legacy audio parameters, the APU 931 determines the updated audio parameter UAP1 to generate the audio frames 2252 of the legacy game N.

In one embodiment, the legacy APU 910 (FIG. 9A) executes one or more of the emulated PU code instructions 1 through M. Upon execution of the emulated PU code instructions 1 through M, the updated audio parameters cannot be generated. Rather, the legacy audio parameters are generated.

In an embodiment, when the emulation processor system 409 is implemented within the server system 404 (FIG. 4B), a client device, such as the display device 410 or an HMD, is used. The emulation processor system 409 is coupled to the client device via the computer network 408. The NIC of the server system 404 applies the network communication protocol to the updated image frames 2123 to generate one or more data packets and sends the data packets via the computer network 408 to the client device. A NIC of the client device applies the network communication protocol to the data packets to extract the updated image frames 2123 from the data packets, and provides the updated image frames 2123 to a display screen of the client device for display of a virtual environment of the legacy game N.

FIG. 22B-2 is a diagram of an embodiment of a system 2264 to illustrate generation of the updated audio frames 2252 from legacy audio frames 2266 output from the block dispatcher 302. The system 2264 includes the block dispatcher 302 and the APU emulator 2204. The block dispatcher 302 is coupled to the APU emulator 2204. The block dispatcher 302 executes one or more of the basic blocks 1 through n to generate the legacy audio frames 2266, which include the legacy audio parameters. The APU emulator 2204 receives the legacy audio frames 2266, parses the legacy audio frames 2266 to identify the legacy audio parameters, and converts the legacy audio parameters into the updated audio parameters to output the updated audio frames 2252.

Figures 1, 22C:
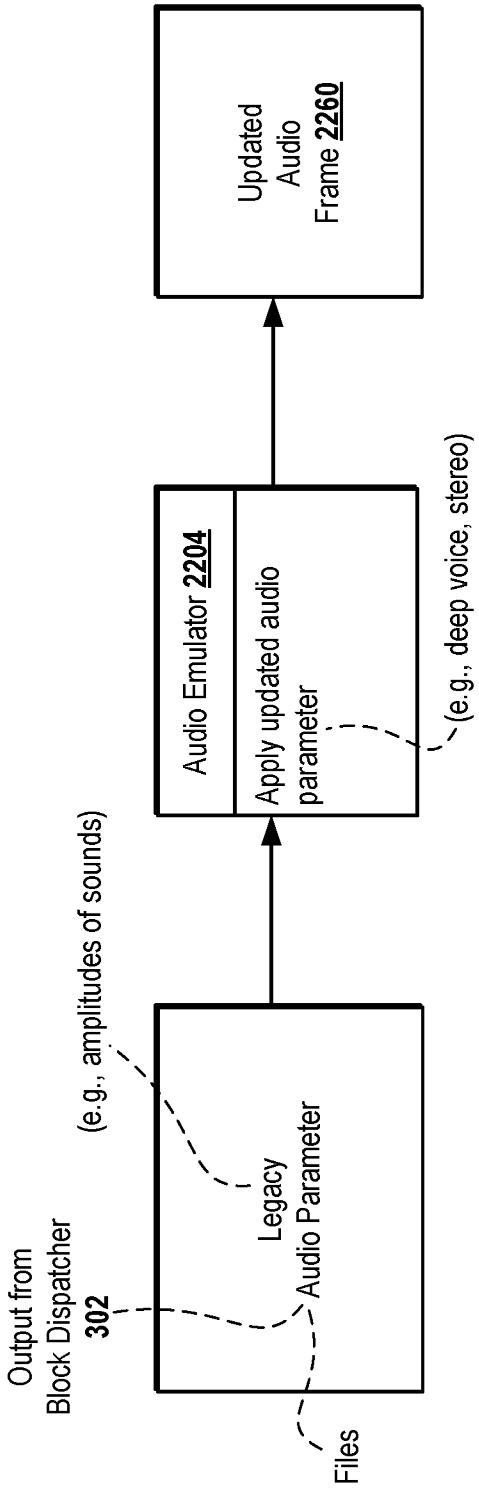
Figures 2, 22C:
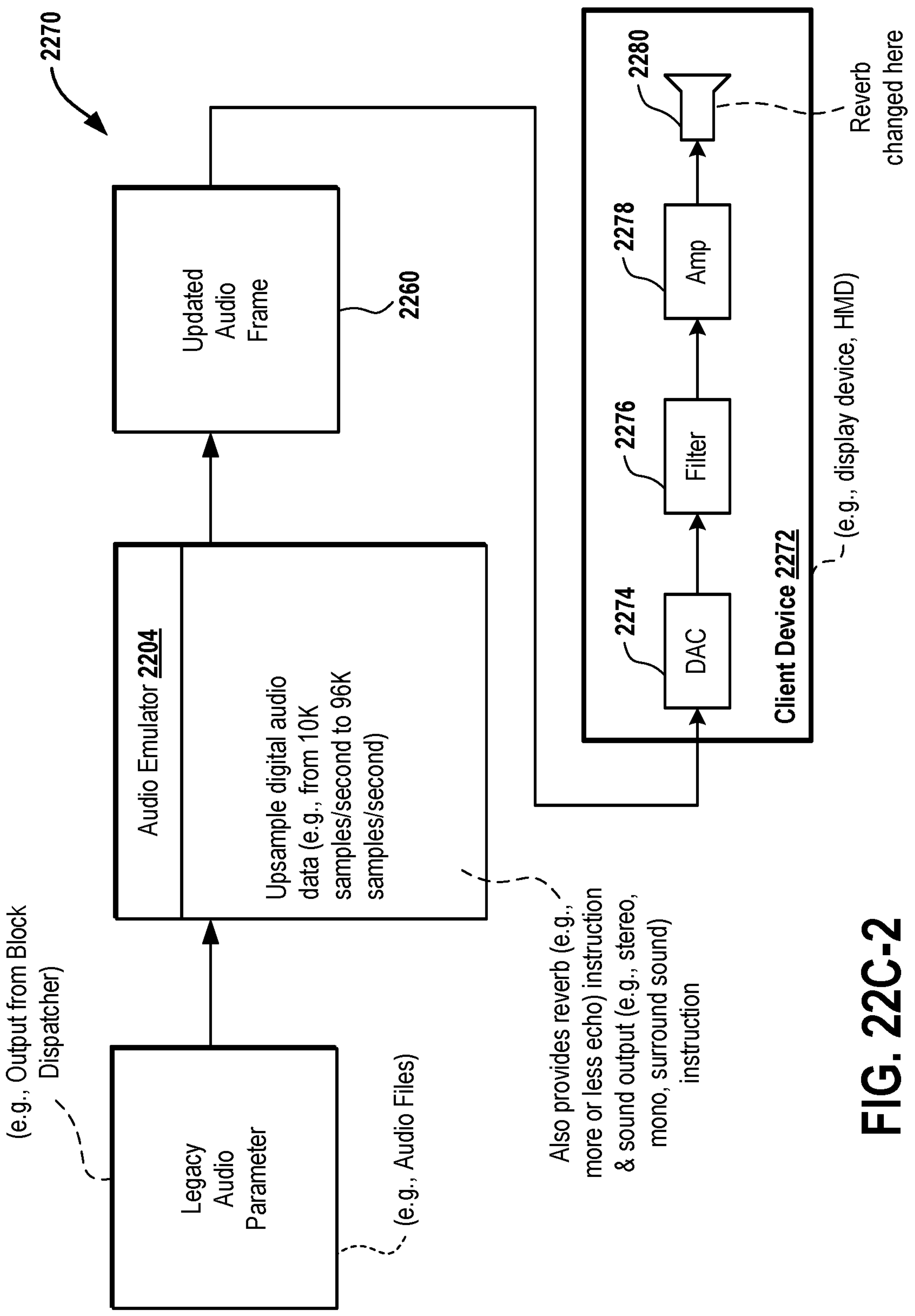
Figures 3, 22C:
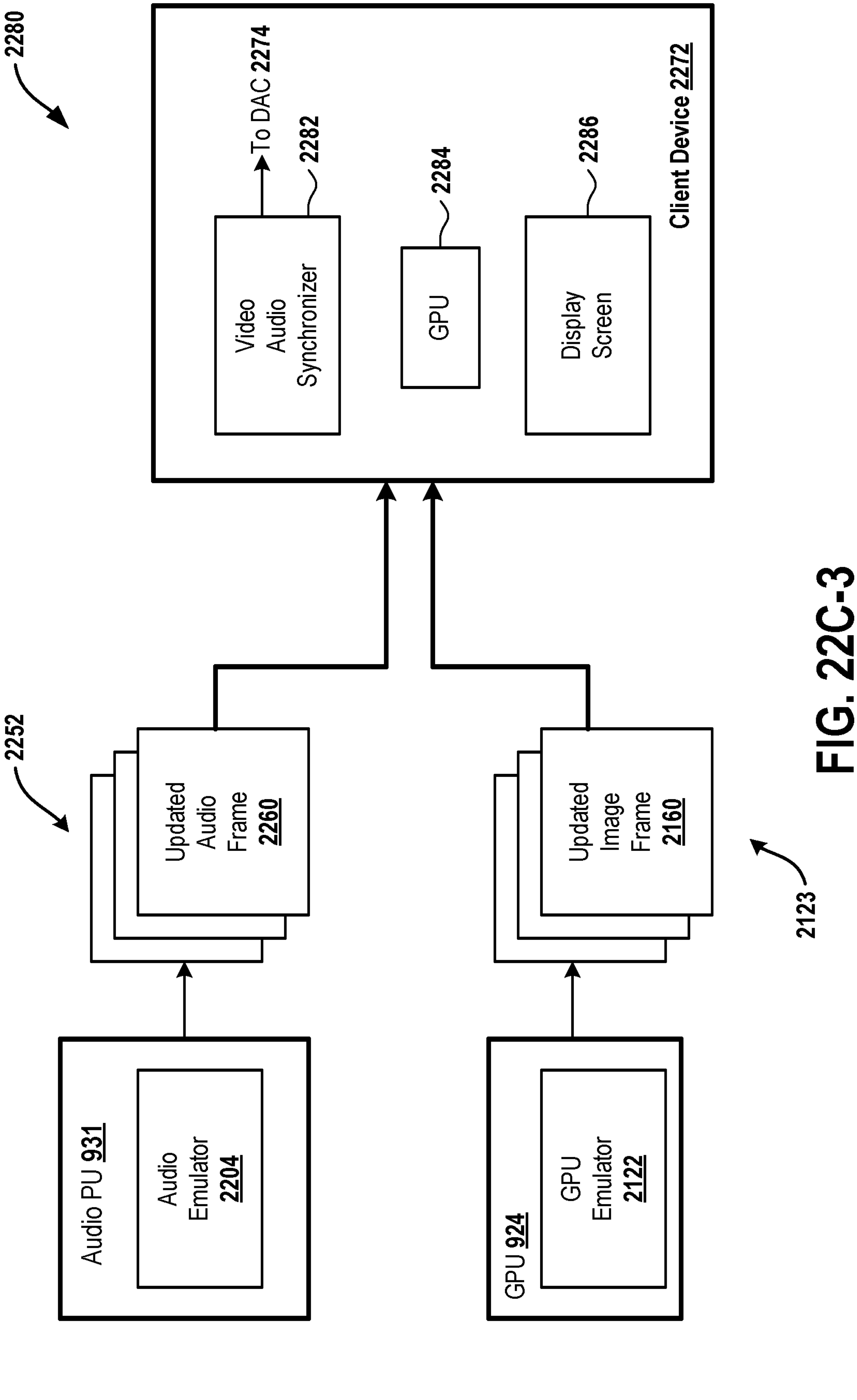

FIG. 22C-1 is a diagram to illustrate an embodiment of a method for generating an updated audio frame 2260 based on a legacy audio parameter. The APU 931 executes the block dispatcher 302 (FIG. 3) to determine a legacy audio parameter and to generate a legacy audio frame based on the legacy audio parameter. The APU emulator 2204 (FIG. 22B-1) extracts the legacy audio parameter from the legacy audio frame and emulates, such as converts, the legacy audio parameter of the legacy audio frame into an updated audio parameter. The APU 931 generates an updated audio frame 2260 having the updated audio parameter. The updated audio frame 2260 is to be output with an image frame of a virtual scene of the legacy game N. For example, the updated audio frame 2260 is sent from the APU 931 and the updated image frame 2160 (FIG. 21D) is sent from the GPU 924 to the display device 410 for display of an image of a virtual scene of the legacy game N with sound. The updated audio frame 2260 is an example of one of the updated audio frames 2252 (FIG. 22B-1). In a similar manner, additional updated audio parameters are determined based on additional legacy audio parameters and the additional updated audio parameters are integrated within the updated audio frame 2260.

FIG. 22C-2 is a diagram of an embodiment of a system 2270 to illustrate processing of audio frames of the legacy game N by a client device 2272 when the emulation processor system 409 is implemented within the game console 402 (FIG. 4A). An example of the client device 2272 is the display device 410 or an HMD. The client device 2272 includes a digital-to-analog converter (DAC) 2274, a filter 2276, an amplifier 2278, and a speaker 2280. The DAC 2274 is coupled to the filter 2276, which is coupled to the amplifier 2278. The amplifier 2278 is coupled to the speaker 2280. The DAC 2274 is also coupled to the audio emulator 2204.

The DAC 2274 receives the updated audio frame 2260 from the audio emulator 2204. Upon receiving the updated audio frame 2260, digital audio data of the updated audio frame 2260 is converted from the digital form to the analog form by the DAC 2274 to output analog audio data. The filter 2276 filters the analog audio data to filter, such as reduce or remove, noise from the analog audio data to output noise-reduced audio data. The amplifier 2278 amplifies, such as changes an amplitude of, the noise-reduced audio data to output amplified audio data. The speaker 2280 converts electrical energy of the amplified audio data into sound. In a similar manner the updated audio frames 2252 (FIG. 22B-2) are processed by the client device 2272.

In one embodiment, the client device 2272 includes multiple speakers that are coupled to the amplifier 2278.

In an embodiment, when the emulation processor system 409 is implemented within the server system 404 (FIG. 4B), another client device, such as a combination of the game console 402 and the display device 410, or a combination of the game console 402 and an HMD, or the client device 2272, is used. In the embodiment, the NIC of the server system 404 receives the updated audio frame 2260 from the audio emulator 2204 and applies the network communication protocol to the updated audio frame 2260 to generate one or more data packets and sends the data packets via the computer network 408 to the other client device. The NIC of the server system 404 is coupled to the APU 931 via the bus 930. A NIC of the other client device receives the data packets. As an example, the NIC of the other client device is located within the HMD or the display device 410 or the game console 402. The NIC of the other client device applies the network communication protocol to the data packets to obtain the updated audio frame 2260 from the data packets and sends the updated audio frame 2260 to the DAC 2274. The NIC of the other client device is coupled to the DAC 2274.

FIG. 22C-3 is a diagram of an embodiment of a system 2280 to illustrate synchronization of display of images based on the updated image frames 2123 with output of sound based on the updated audio frames 2252 for multiple virtual scenes of the legacy game N. The system 2280 includes the APU 931, the GPU 924, and the client device 2272. The client device 2272 includes a video-audio (VA) synchronizer 2282, a GPU 2284, and a display screen 2286. The VA synchronizer 2282 is coupled to the DAC 2274 and to the GPU 2284, which is coupled to the display screen 2286.

When the emulation processor system 409 is implemented within the game console 402, the APU 931 and the CPU 924 are coupled to a communication device of the game console 402. The communication device receives the audio frames 2252 and the image frames 2123 an applies the close-range communication protocol to the frames 2252 and 2123 to generate one or more data packets and sends the one or more data packets to the display device 410. The display device 410 includes a communication device that receives the one or more data packets and applies the close-range communication protocol to the data packets to extract the frames 2252 and 2123. The communication device of the display device 410 sends the frames 2252 and 2123 to the VA synchronizer 2282.

The VA synchronizer 2282 synchronizes an order of display of the image frames 2123 with an order of display of the audio frames 2252. For example, the VA synchronizer 2282 determines based on a first time identifier embedded within updated audio frame 2260 and a second time identifier embedded within the updated image frame 2160 that the updated audio frame 2260 and the updated image frame 2160 are to be output at the same time. As an illustration, the VA synchronizer 2282 determines that the first time identifier matches the second time identifier to determine that the updated audio frame 2260 and the updated image frame 2160 are to be output at the same time. Also, in the illustration, each of the first and second time identifiers is an alphanumeric code. In the illustration, the first time identifier is generated by the APU 931 and the second time identifier is generated by the GPU 924. Also, in the illustration, both the APU 931 and the GPU 924 generate the first and second time identifiers based on the same clock signal. To further illustrate, the clock signal is generated by the APU 931 and sent to the GPU 924 or generated by the GPU 924 and sent to the APU 931 or generated by a clock source and sent to the APU 931 and the GPU 924. An example of the clock source is the Internet.

The VA synchronizer 2282 outputs the image frames 2123 to the GPU 2284 and the audio frames 2252 to the DAC 2274 after synchronizing the frames 2123 with the 2252. For example, the VA synchronizer 2282 provides the updated image frame 2160 to the GPU 2284 simultaneously with providing the updated audio frame 2260 to the DAC 2274. The GPU 2284 controls display pixels of the display screen 2286 to display images of multiple virtual scenes of the legacy game N according to the image frames 2123. Also, the audio frames 2252 are processed by the DAC 2274, the filter 2276, the amplifier 2278, and the speaker 2280 (FIG. 22C-2) in the same manner in which the updated audio frame 2260 is processed to output sound in synchronization with the display of the images of the multiple virtual scenes of the legacy game N.

In one embodiment, when the emulation processor system 409 is implemented within the server system 404 (FIG. 4B), the audio frames 2252 are sent from the APU 931 to the NIC of the server system 404. The APU 931 and the GPU 924 are coupled to the NIC of the server system 404. Also, the image frames 2123 are sent from the GPU 924 to the NIC of the server system 404. The NIC of the server system 404 applies the network communication protocol to the frames 2123 and 2252 to generate one or more packets and sends the packets via the computer network 408 (FIG. 4B) to the other client device, which is described above with reference to FIG. 22C-2. The NIC of the other client device applies the network communication protocol to the one or more packets to extract the frames 2252 and 2123 from the packets. The NIC of the other client device sends the frames 2252 and 2123 to the VA synchronizer 2282 for processing of the frames 2252 and 2123 in the same manner as that described above with reference to FIG. 22C-3.

Figure 22D:
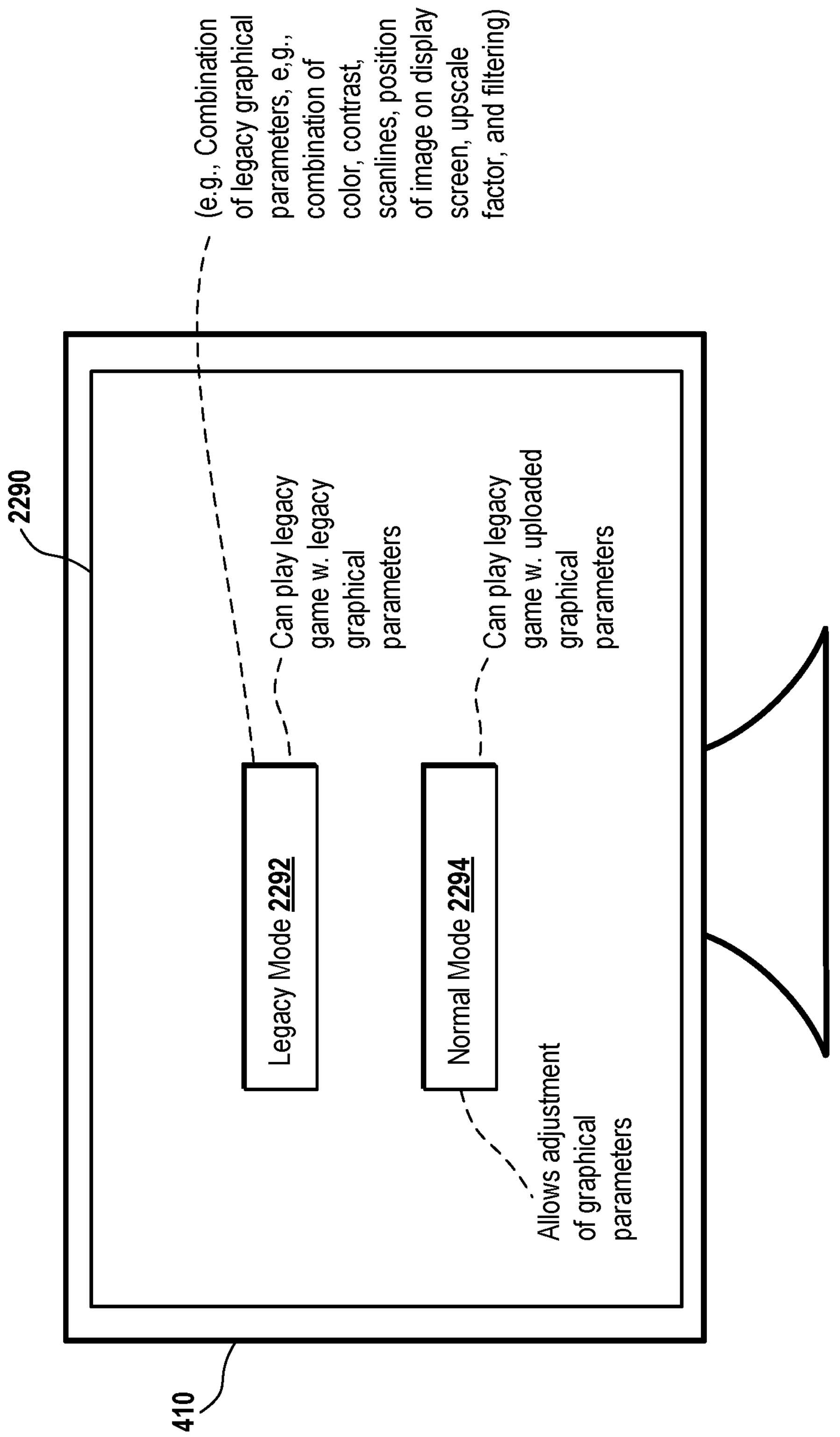
FIG. 22D is a diagram of an embodiment of a display device to display a legacy mode and a normal mode.

FIG. 22D is a diagram of an embodiment of the display device 410 to display a legacy mode and a normal mode. The user 1 operates the hand-held controller 414 to generate a user input. Upon receiving the user input before or during the play of the legacy game N, the GPU 924 generates an image frame and sends the image frame to the display device 410. The display device 410 displays, based on the image frame, an image 2290, which includes an item 2292 for receiving a selection of a Legacy Mode and an item 2294 for receiving a selection of a Normal Mode. When the user 1 operates the hand-held controller 414 to select the item 2292, the GPU 924 generates the image frames 2123 (FIG. 21B-1) based on the updated graphical parameters. On the other hand, when the user 1 operates the hand-held controller 414 to select the item 2294, the GPU 924 generates the image frames 422 (FIG. 4B) based on the legacy graphical parameters.

Figure 23:
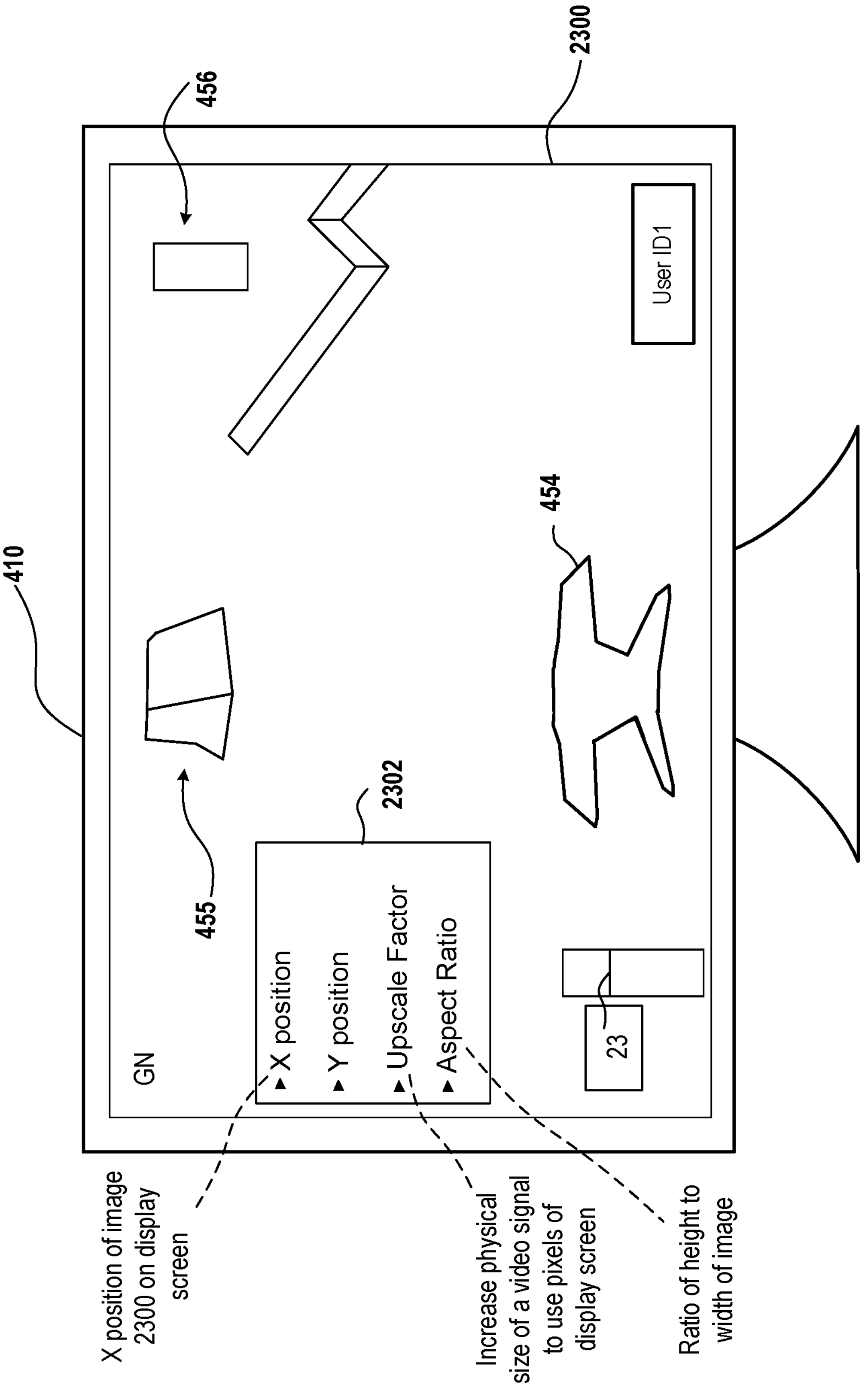
FIG. 23 is a diagram of an embodiment of the display device for displaying a virtual environment in which a menu is displayed.

FIG. 23 is a diagram of an embodiment of the display device 410 for displaying a virtual environment 2300 in which a menu 2302 is displayed. The virtual environment 2300 is the same as the virtual environment 452 (FIG. 4B) except that the virtual environment 2300 includes the menu 2302. The menu 2302 is displayed by the GPU of the display device 410 when a user input is received from the hand-held controller 414 (FIG. 4B) during a play of the legacy game N.

The menu 2302 includes multiple updated graphical parameters, such as an X position, a Y position, an Upscale Factor, and an Aspect Ratio. The user 1 operates the hand-held controller 414 to select one or more of the updated graphical parameters displayed within the menu 2302. For example, the user 1 selects the X position to change a position of the virtual environment 452 with respect to a horizontal level of the display screen of display device 410. As another example, the user 1 selects the Y position to change a position of the virtual environment 452 with respect to a vertical level of the display screen of display device 410. The horizontal level of the display screen is perpendicular to the vertical level. To illustrate, the horizontal level is along an x-axis and the vertical level is along a y-axis. As another example, the user 1 selects the Upscale Factor to modify the updated upscale factor. As yet another example, the user 1 selects the Aspect Ratio to change a ratio of height of the virtual environment 452 to a width of the virtual environment 452 on the display screen of the display device 410. The height is measured along the vertical level of the display screen and the width is measured along the horizontal level of the display screen.

In one embodiment, the menu 2302 includes a sliding scale for each of the updated graphical parameters displayed within the menu 2302. The user 1 uses the hand-held controller 414 to slide a slider of a corresponding sliding scale of one of the updated graphical parameters of the menu 2302 to select a level or an amount of the updated graphical parameter.

Figure 24A:
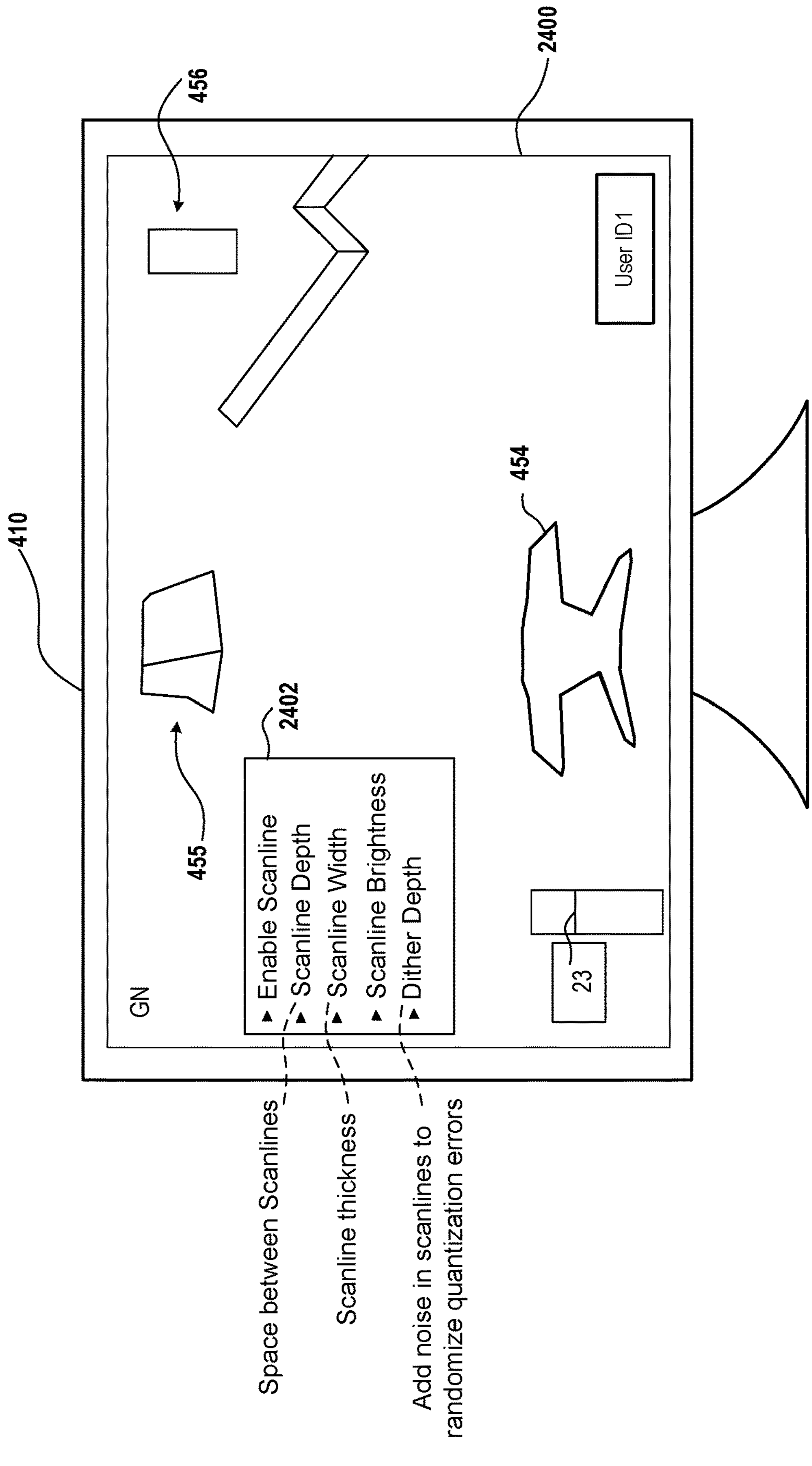
FIG. 24A is a diagram of an embodiment of the display device for displaying a virtual environment in which a menu is displayed.

FIG. 24A is a diagram of an embodiment of the display device 410 for displaying a virtual environment 2400 in which a menu 2402 is displayed. The virtual environment 2400 is the same as the virtual environment 452 (FIG. 4B) except that the virtual environment 2400 includes the menu 2402. The menu 2402 is displayed by the GPU of the display device 410 when a user input is received from the hand-held controller 414 (FIG. 4B) during a play of the legacy game N.

The menu 2402 includes multiple updated graphical parameters, such as. Enable Scanline, Scanline Depth, Scanline Width, Scanline Brightness, and Dither Depth. The user 1 operates the hand-held controller 414 to select one or more of the updated graphical parameters displayed within the menu 2402. For example, the user 1 selects the Enable Scanline to overlay scanlines on top of the virtual environment 452. Upon receiving an indication of the selection of option of the Enable Scanline, the GPU 924 applies the GPU emulator 2122 to overlay the scanlines. As another example, the user 1 selects the Scanline Depth to change a depth of each of the scanlines overlaid or to be overlaid on the virtual environment 452. The depth of the scanlines is along a horizontal level of the display screen of the display device 410. To illustrate, the depth of the scanlines is along a z-axis, which is perpendicular to both the x and y axes. As another example, the user 1 selects the Scanline Width to change a width of each of the scanlines overlaid or to be overlaid on the virtual environment 452. The width of the scanlines is along the vertical level of the display screen of the display device 410. As yet another example, the user 1 selects the Scanline Brightness to change an amount of brightness of the scanlines overlaid or to be overlaid on the virtual environment 452. Upon receiving an indication of a change in the brightness of the scanlines, the GPU 924 applies the GPU emulator 2122 to change a level of the brightness. As yet another example, the user 1 selects the Dither Depth to add noise to reduce quantization errors in generating the scanlines. The quantization errors are reduced by randomizing the quantization. Upon receiving an indication of a change in dither depth from the hand-held controller 414 the GPU 924 applies the GPU emulator 2122 to change a level of the dither depth for generating the scanlines. To illustrate, the GPU emulator 2122 samples data for generating the scanlines at a first sampling rate, which is less than a second sampling rate. The second sampling rate is also for sampling data for generating the scanlines. When the first sampling rate is applied, a first amount of sample points output from the sampling is lower compared to a second amount of sampling points output from the second sampling rate. To illustrate, the first sampling rate is less than a Nyquist sampling rate. The GPU emulator 2122 applies an amount of the dither depth to the first amount of sampling points to increase noise so that the scanlines are more prominent. The scanlines are more prominent compared to when the dither depth is not applied.

In one embodiment, the menu 2402 includes a sliding scale for each of the updated graphical parameters displayed within the menu 2402. The user 1 uses the hand-held controller 414 to slide a slider of a corresponding sliding scale of one of the updated graphical parameters of the menu 2402 to select a level or an amount of the updated graphical parameter.

Figure 24B:
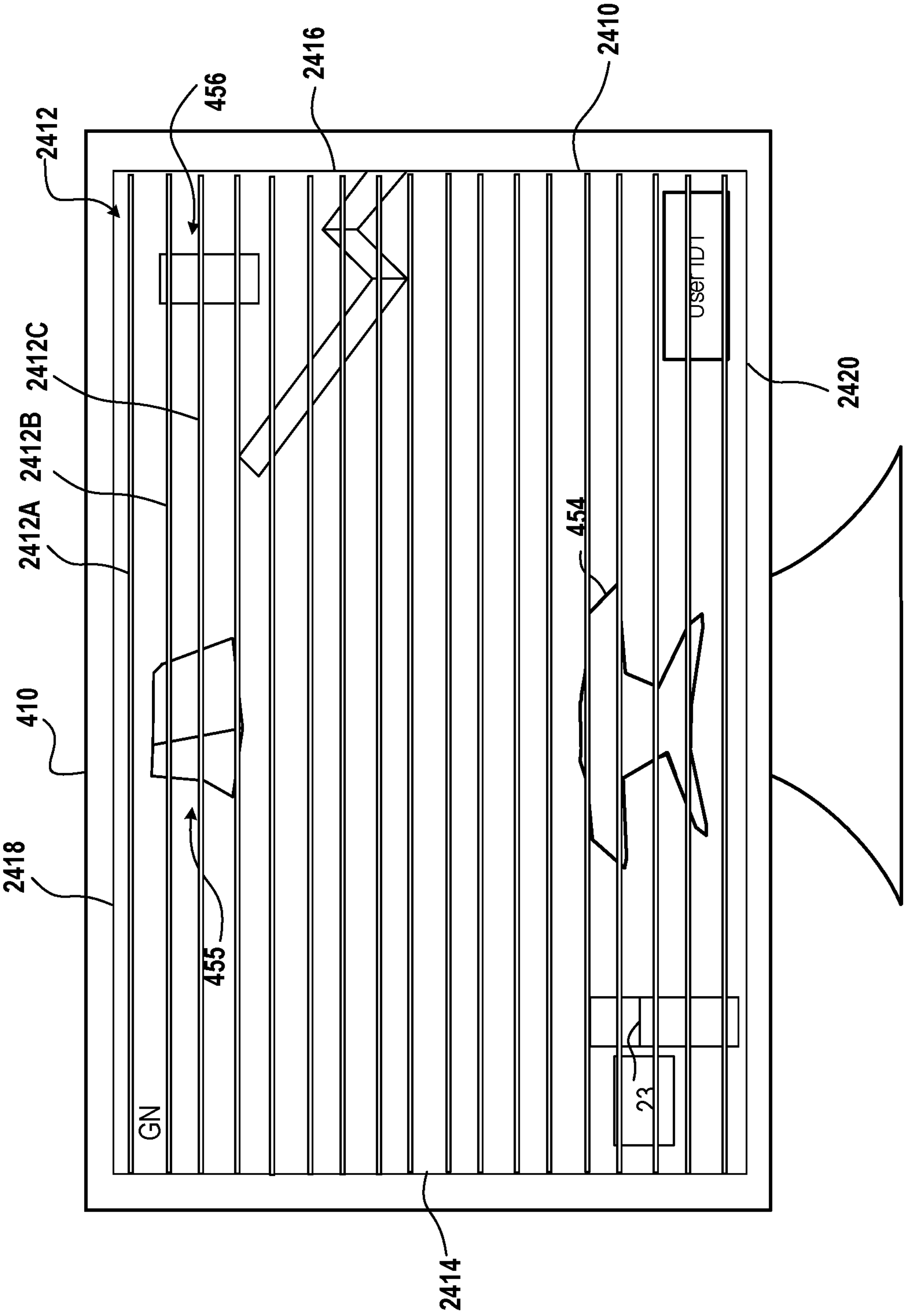
FIG. 24B is a diagram of an embodiment of the display device for displaying a virtual environment having multiple scanlines.

FIG. 24B is a diagram of an embodiment of the display device 410 for displaying a virtual environment 2410 having multiple scanlines 2412, such as a scanline 2412A, a scanline 2412B, and a scanline 2412C. The virtual environment 2410 is the same as the virtual environment 452 (FIG. 4B) except that the virtual environment 2410 includes the scanlines 2412. Each of the scanlines 2412 extend from a left edge 2414 of the image of the virtual environment 452 to a right edge 2416 of the image of virtual environment 452. For example, each of the scanlines 2412 is horizontal. The left edge 2414 is perpendicular to a top edge 2418 of the image of virtual environment 452 and to a bottom edge 2420 of the image of the virtual environment 452.

In an embodiment, instead of the scanlines 2412, vertically oriented scanlines are generated and overlaid on the virtual environment 452. For example, the vertically oriented scanlines extend from the top edge 2418 to the bottom edge 2420. The vertically oriented scanlines are generated by the GPU 924 for display on the display device 410.

Figure 25A:
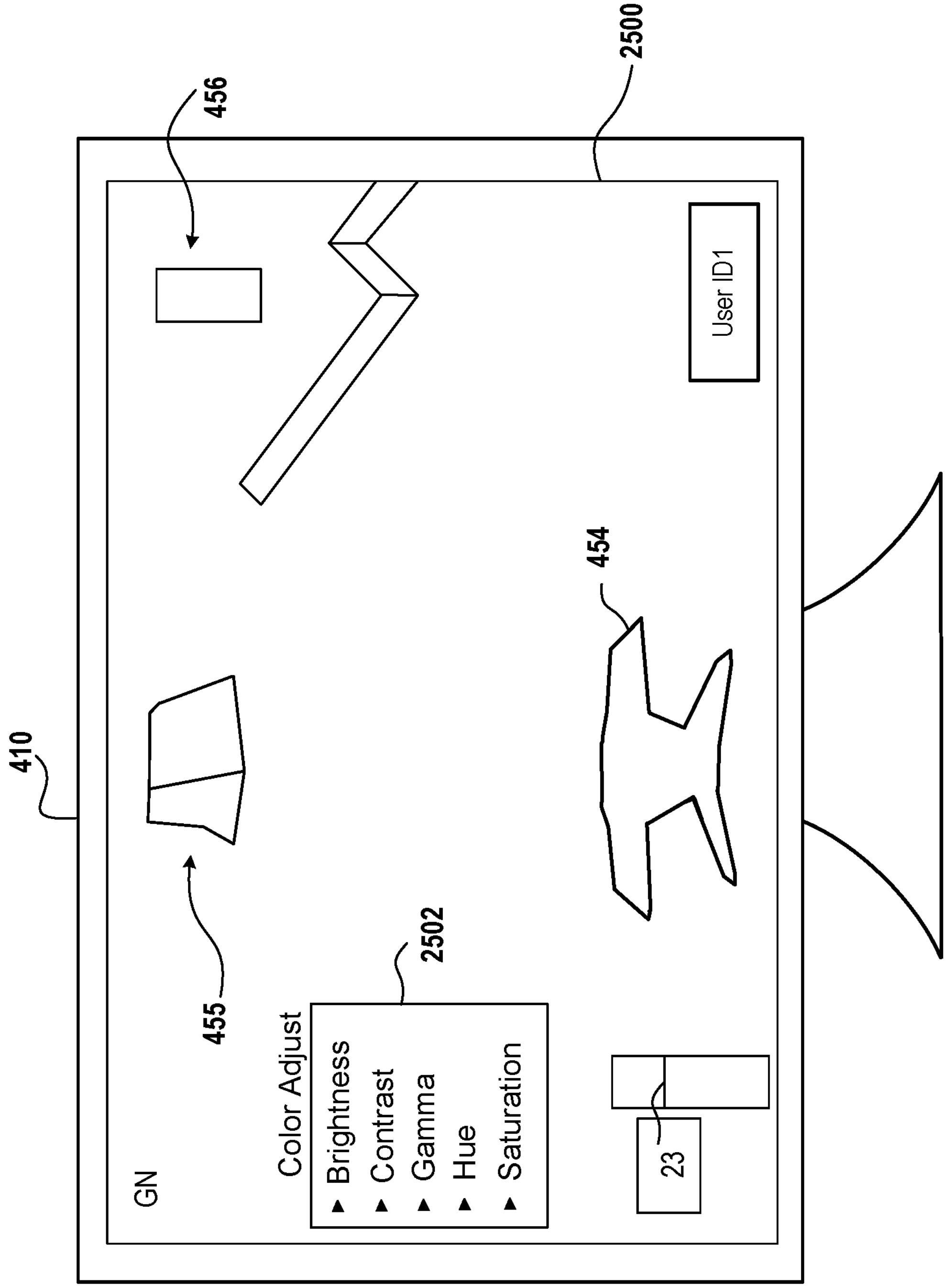
FIG. 25A is a diagram of an embodiment of the display device for displaying a virtual environment in which a menu is displayed.

FIG. 25A is a diagram of an embodiment of the display device 410 for displaying a virtual environment 2500 in which a menu 2502 is displayed. The virtual environment 2500 is the same as the virtual environment 452 (FIG. 4B) except that the virtual environment 2500 includes the menu 2502. The menu 2502 is displayed by the GPU of the display device 410 when a user input is received from the hand-held controller 414 (FIG. 4B) during a play of the legacy game N.

The menu 2502 includes multiple updated graphical parameters, such as. Brightness, Contrast, Gamma, Hue, and Saturation. The user 1 operates the hand-held controller 414 to select one or more of the updated graphical parameters displayed within the menu 2402. For example, the user 1 selects the Brightness to change, such as increase or decrease, brightness of image pixels of the virtual environment 452. Upon receiving an indication of the selection of option of the Brightness, the GPU 924 applies the GPU emulator 2122 to change the brightness. As another example, the user 1 selects the Contrast to change a contrast of virtual objects of the virtual environment 452 compared to a virtual background of the virtual environment 452. As another example, the user 1 selects the Gamma to provide an indication as to how quickly colors change in the image of the virtual environment 452. Upon receiving an indication of the selection of Gamma, the GPU 924 applies the GPU emulator 2122 to change the colors at a higher or a lower frequency. As yet another example, the user 1 selects the Hue to change colors that fill the virtual environment 452. Upon receiving an indication of a change in the brightness of the scanlines, the GPU 924 applies the GPU emulator 2122 to an amount of colors that are used to generate image pixels of the virtual environment 452. To illustrate, the GPU emulator 2122 changes a first hue that includes red, blue, green, and yellow to a second hue that includes red, blue, green, orange, and yellow As yet another example, the user 1 selects the Saturation to change an amount of intensity or purity of a color of each image pixel of the virtual environment 452. As saturation of a color increases, the color appears to be more pure. As the saturation decreases, the color appears to be replaced with grey.

In one embodiment, the menu 2502 includes a sliding scale for each of the updated graphical parameters displayed within the menu 2502. The user 1 uses the hand-held controller 414 to slide a slider of a corresponding sliding scale of one of the updated graphical parameters of the menu 2502 to select a level or an amount of the updated graphical parameter.

Figure 25B:
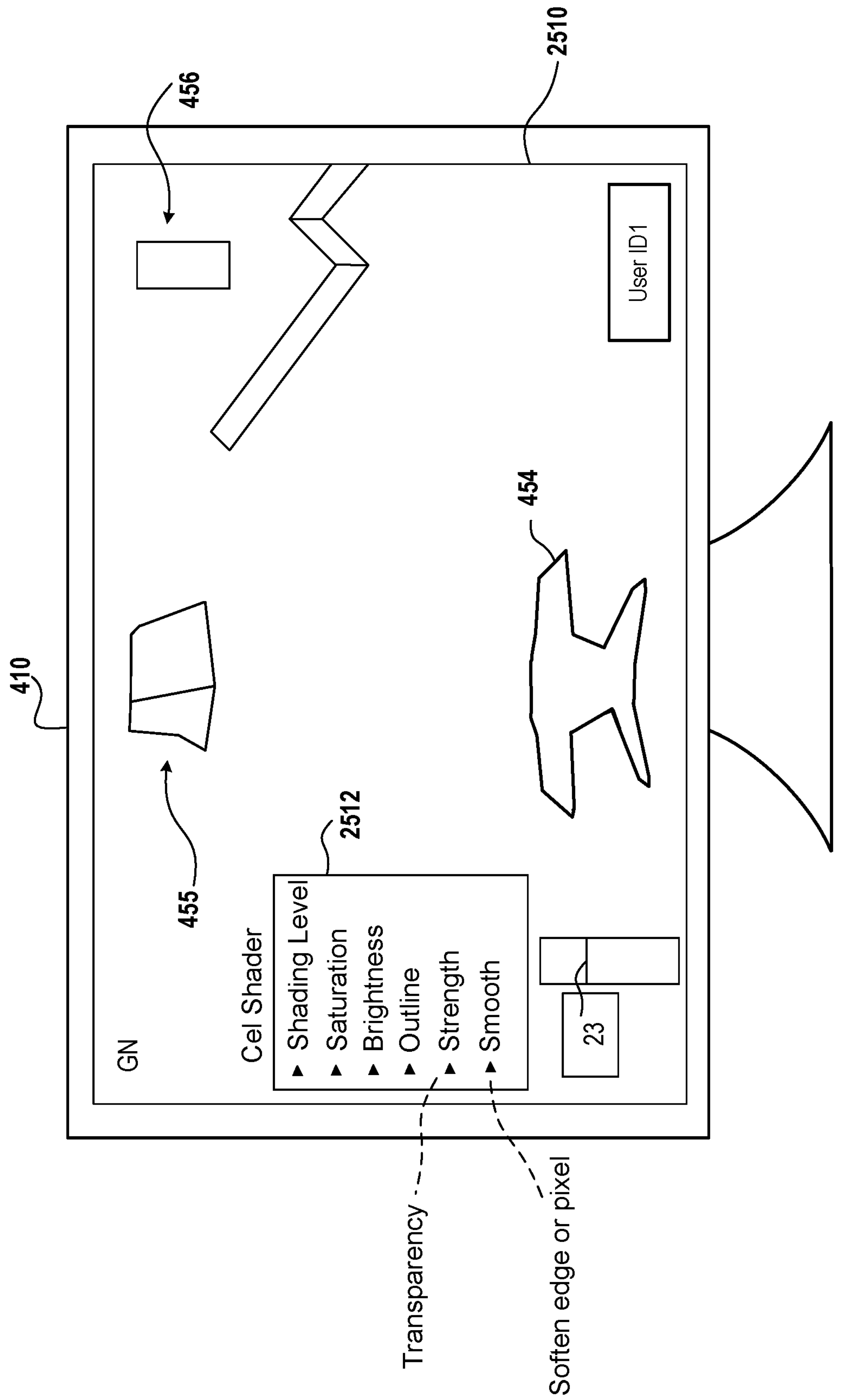
FIG. 25B is a diagram of an embodiment of the display device for displaying a virtual environment in which a menu is displayed.

FIG. 25B is a diagram of an embodiment of the display device 410 for displaying a virtual environment 2510 in which a menu 2512 is displayed. The virtual environment 2510 is the same as the virtual environment 452 (FIG. 4B) except that the virtual environment 2510 includes the menu 2512. The menu 2512 is displayed by the GPU of the display device 410 when a user input is received from the hand-held controller 414 (FIG. 4B) during a play of the legacy game N.

The menu 2512 includes multiple updated graphical parameters, such as. Shading Level to be applied by a Cel Shader, Saturation to be applied by the Cel Shader, Brightness to be applied by the Cel Shader, Outline to be applied by the Cel Shader, Strength to be applied by the Cel Shader, and Smooth to be applied by the Cel Shader. The Cel Shader is an example of the GPU emulator 2122 (Figure B). The user 1 operates the hand-held controller 414 to select one or more of the updated graphical parameters displayed within the menu 2512. For example, the user 1 selects the Shading Level to change, such as increase or decrease, an amount of shading of image pixels of an outline, such as a perimeter or a boundary, of a virtual object in the virtual environment 452. To illustrate, the virtual object is a virtual character that is controlled by the user 1 via the hand-held controller 414. To further illustrate, the virtual object is the fighter jet. The shading alters colors or intensities of colors of the outline. As an example, the outline of the virtual object in a virtual scene distinguishes the virtual object from other virtual objects and from a virtual background in the virtual scene. Upon receiving an indication of the selection of option of the Shading Level, the GPU 924 applies the GPU emulator 2122 to change the shading level of the outline of the virtual object. As another example, the user 1 selects the Saturation to change, such as increase or decrease, an amount of intensity or purity of a color of each image pixel of the outline of the virtual object of the virtual environment 452. Upon receiving an indication of the selection of option of the Saturation, the GPU 924 applies the GPU emulator 2122 to change the amount of intensity or purity of the color of each image pixel of the outline of the virtual object.

As another example, the user 1 selects the Brightness to change, such as increase or decrease, brightness of image pixels of the outline of the virtual object in the virtual environment 452. Upon receiving an indication of the selection of option of the Saturation, the GPU 924 applies the GPU emulator 2122 to change the brightness of image pixels of the outline of the virtual object.

As yet another example, the user 1 selects the Outline to indicate whether to generate the outline of the virtual object in the virtual environment. Upon receiving an indication of the Outline, the GPU 924 applies the GPU emulator 2122 to include an outline of the virtual object. The outline forms a perimeter of the virtual object and contrasts a boundary of the virtual object to distinguish the virtual object from a virtual background of the virtual object and from other virtual objects in the virtual environment 452. As still another example, the user 1 selects the Strength to change an amount of transparency of the outline of the virtual object in the virtual environment 452. As the transparency of the outline decreases, the outline appears to be opaque and as the transparency increases, the outline appears to be transparent. In this manner, the outline switches from being opaque to being translucent to further being transparent and vice versa. Upon receiving an indication of the Outline, the GPU 924 applies the GPU emulator 2122 to change the amount of transparency of the outline of the virtual object in the virtual environment 452.

As another example, the user 1 selects Smooth to change, such as increase or decrease, an amount of smoothness of image pixels of an outline of a virtual object in the virtual environment 452. To illustrate, the smoothness is increased by increasing a number of image pixels of the outline and is decreased by reducing a number of image pixels of the outline. Upon receiving an indication of the selection of option of the Smooth, the GPU 924 applies the GPU emulator 2122 to change the smoothness of the image pixels of the outline of the virtual object.

In one embodiment, the menu 2512 includes a sliding scale for each of the updated graphical parameters displayed within the menu 2512. The user 1 uses the hand-held controller 414 to slide a slider of a corresponding sliding scale of one of the updated graphical parameters of the menu 2512 to select a level or an amount of the updated graphical parameter.

Figure 25C:
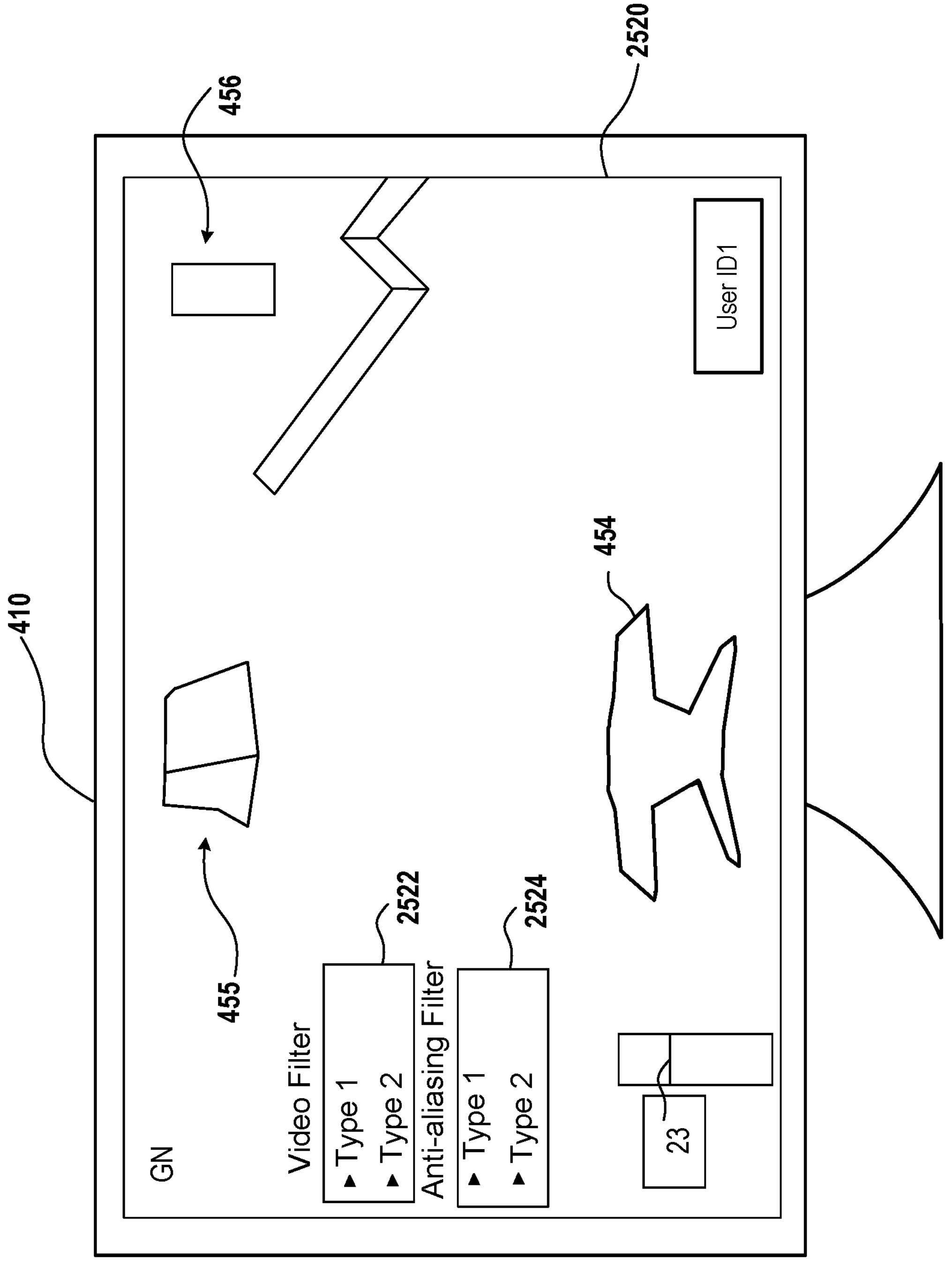
FIG. 25C is a diagram of an embodiment of the display device for displaying a virtual environment in which multiple menus are displayed.

FIG. 25C is a diagram of an embodiment of the display device 410 for displaying a virtual environment 2520 in which a menu 2522 and a menu 2524 are displayed. The virtual environment 2520 is the same as the virtual environment 452 (FIG. 4B) except that the virtual environment 2520 includes the menus 2522 and 2524. The menus 2522 and 2524 are displayed by the GPU of the display device 410 when a user input is received from the hand-held controller 414 (FIG. 4B) during a play of the legacy game N.

The menu 2522 includes multiple updated graphical parameters, such as a Type 1 of a video filter and a Type 2 of a video filter. The user 1 operates the hand-held controller 414 to select one or more of the updated graphical parameters displayed within the menu 2522. For example, the user 1 selects the Type 1 filter or the Type 2 filter to be applied to the image pixels of the virtual environment 452. An illustration of the Type 1 filter is a Mitchell Netravali™ filter and an illustration of the Type 2 filter is a Butterworth™ filter. Other illustration of filter types of video filters include Chebyshev™ and Bessel™. Upon receiving an indication of the selection of the Type 1 or Type 2 of the video filter, the GPU 924 applies the GPU emulator 2122 to apply the type of the video filter to generate image pixels of the virtual object or image pixels of a virtual background or a combination thereof of the legacy game N.

Similarly, the menu 2524 includes multiple updated graphical parameters, such as a Type 1 of an anti-aliasing filter and a Type 2 of an anti-aliasing filter. The user 1 operates the hand-held controller 414 to select one or more of the updated graphical parameters displayed within the menu 2524. For example, the user 1 selects the Type 1 filter or the Type 2 filter to be applied to the image pixels of the virtual environment 452. An illustration of the Type 1 filter is an FXAA™ filter and an illustration of the Type 2 filter is a Line Thickness™ filter. Upon receiving an indication of the selection of the Type 1 or Type 2 of the anti-aliasing filter, the GPU 924 applies the GPU emulator 2122 to apply the type of the anti-aliasing filter to generate image pixels of the virtual object or image pixels of a virtual background or a combination thereof of the legacy game N.

In one embodiment, each menu 2522 and 2524 includes a sliding scale for each of the updated graphical parameters displayed within the menu. The user 1 uses the hand-held controller 414 to slide a slider of a corresponding sliding scale of one of the updated graphical parameters of the menu 2522 or 2524 to select a level or an amount of the updated graphical parameter.

FIG. 25D is a diagram of an embodiment of the display device 410 for displaying a virtual environment 2530 in which a cross-hair 2532 is displayed. The virtual environment 2532 is the same as the virtual environment 452 (FIG. 4B) except that the virtual environment 2532 includes the cross-hair 2532. The cross-hair 2532 is displayed by the GPU of the display device 410 when a user input is received from the hand-held controller 414 (FIG. 4B) during a play of the legacy game N. For example, the user input indicates a size of the cross-hair 2532.

The user 1 uses the hand-held controller 414 to pause the legacy game N. Once the legacy game N is paused, the user 1 operates the hand-held controller 414 to generate a user input, which includes an indication that a size of the cross-hair 2532 is to be changed. The size of the cross-hair is an example of an updated graphical parameter. Upon receiving the indication, the GPU 924 applies the GPU emulator 2122 (FIG. 21B-1) to change a size of the cross-hair 2532 to match the size received via the user input.

FIG. 26 is a diagram of an embodiment of an ahead-of-time (AoT) processor system 2600. The AoT processor system 2600 includes a compiled code generator (CCG) 2601 and runtime components 2603. The CCG 2601 includes a scanner 2602, a decoder and translator 2604, and a compiler 2606. The runtime components 2603 include a fiber creator 2608, a switch 2610, and an AoT executor 2612. As an example, in AoT compiling, executable portions of the emulated PU code 106 are compiled before runtime. As such, there is no need to compile the executable portions of the emulated PU code 106 during runtime and time is saved.

As an example, each of the scanner 2602, the decoder and translator 2604, and the compiler 2606 are implemented within a host processor, such as a host CPU, of a host computer. To illustrate, each of the scanner 2602, the decoder and translator 2604, and the compiler 2606 is a computer program executed by the host processor. As another example, each of the scanner 2602, the decoder and translator 2604, the compiler 2606 is a host hardware component, such as an ASIC or a PLD or a microcontroller. Examples of the host computer include one or more servers of the server system 404 (FIG. 4A), a desktop computer, laptop computer, a smart phone, and a tablet. To illustrate, the desktop computer or the laptop computer is a part of the server system 404. It should be noted that the terms host computer and a host computing device are used herein interchangeably and the terms host processor and a host processing unit are used herein interchangeably.

As an example, each of the fiber creator 2608, the switch 2610, and the AoT executor 2612 are implemented within the CPU 922 (FIG. 9B). To illustrate, each of the fiber creator 2608, the switch 2610, and the AoT executor 2612 is a computer program executed by the CPU 922. As another example, the AoT executor 2612 is implemented within the CPU 922, the GPU 924 (FIG. 9B), or a combination thereof. To illustrate, the AoT executor 2612 is implemented when the CPU 922 instructs the GPU 924 to generate the image frames 422 (FIG. 4A). As another example, each of the fiber creator 2608, the switch 2610, and the AoT executor 2612 is a hardware component, such as an ASIC or a PLD or a microcontroller, that is implemented within the game console 402 (FIG. 4A).

The scanner 2602 is coupled to the decoder and translator 2604, which is coupled to the compiler 2606. The compiler 2606 is coupled to the fiber creator 2608, which his coupled to the switch 2610. The switch 2610 is coupled to the AoT executor 2612.

The scanner 2602 scans the emulated PU code 106 for all executable functions of the legacy game N to output scanned functions. For example, the scanner 2602 accesses the emulated PU code 106 from the memory device 412 (FIG. 6C) and parses or traverses through each line of the emulated PU code 106 to identify portions of the emulated PU code 106 that are operations, such as the executable functions, which can be executed to generate the image frames 422, and distinguishes the portions from other portions of the emulated PU code 106 that are data. In the example, the data, by itself, cannot be executed to generate image frames 422. As another example, the data, by itself, cannot service the user input 420 (FIG. 4B) but can service the user input 418 to initiate the play of the legacy game N. Rather, in the example, the executable functions apply the data to service the user input 418 or 420. To illustrate, the scanner 2602 scans the emulated PU code 106 to identify movements, such as positions and orientations, of all possible virtual objects of the legacy game N and to identify movements, such as positions and orientations, of all possible virtual backgrounds of the legacy game N. In the illustration, the movements of the virtual objects and the virtual backgrounds that are identified are in response to a user input, such as the user input 420 (FIG. 4A), which is anticipated by the scanner 2602 to be received by the AoT executor 2612 during a play of the legacy game N. Illustrations of the executable functions of the emulated PU code 106 include operations, such as, a write operation, a read operation, a jump operation, and a load operation.

Examples of the data of the emulated PU code 106 include image data and audio data. To illustrate, the image data is an icon or a look and feel of an animation. As another illustration, the image data is graphical data, such as colors and intensities, of the virtual objects of the legacy game N and the virtual backgrounds. As another illustration, the audio data enables sound to be output with the image data. To further illustrate, the audio data is processed to output sound from one or more of the virtual objects of the legacy game N or to output sound with one or more of the virtual backgrounds of the legacy game N.

The scanner 2602 sends the scanned functions, such as the executable functions, to the decoder and translator 2604. For example, the scanner 2602 does not provide the data to the decoder and translator 2604.

The decoder and translator 2604 decodes and translates the scanned functions that are output from the scanner 2602 into a first source code, such as C++ source code, a Python™ source code, or a Java™ source code. For example, the decoder and translator 2604 decodes, such as identifies, that the scanned functions include read and write operations of an Assembly language program, and translates the read and write operations into a function having a title read and write. The function having the title read and write is sometimes referred to herein and a read and write function. The read and write function identifies memory locations of a host memory device in the host computer in which data for performing the read and write function is stored and further includes operators for performing the read and write operations. The host memory device is coupled to the host processor. The scanned functions are decoded to identify the operations of the emulated PU code 106 and then translated into the first source code.

The compiler 2606 receives the first source code from the decoder and translator 2604. In addition, the compiler 2606 receives a second source code from a host input device. For example, a programmer provides the second source code via the host input device to the host processor. Examples of the host input device include a host peripheral device, such as, a keyboard, a mouse, a stylus, a touchpad, or a combination thereof. The host input device is a part of the host computer and is coupled to the host processor of the host computer. Examples of the second source code include a source code for refreshing one of the image frames 422 at a periodic time interval or a source code for refreshing sound generated from an audio frame at a periodic time interval or a combination thereof. An example of the periodic time interval for refreshing one of the image frames 422 is a time period of 16 milliseconds when a frame rate of display of the image frames 422 on the display device 410 or the HMD is 60 frames per second. The compiler 2606 receives the first and second source codes, compiles the first source code into a first compiled code and compiles the second source code into a second compiled code. An example of the first compiled code or the second compiled code is an object code.

During AoT runtime, which includes a time period of play of the legacy game N, the fiber creator 2608 receives the first and second compiled codes from the compiler 2606 and creates a fiber from the first and second compiled codes. As an example, the fiber is an order of execution, by the CPU 922, of one or more portions of the first compiled code and one or more portions of the second compiled code. The fiber creator 2608 stores the fiber within the cache 102.

The switch 2610 is executed during the AoT runtime. When the switch 2610 is executed, execution changes from one or more portions of the first compiled code to one or more portions of the second compiled code and vice versa. When the AoT executor 2602 is executed, the first and second compiled codes are executed by the CPU 922 in addition to the fiber to output the image frames 422 of the legacy game N. As an example, the CPU 922 runs the AoT executor 2612 to instruct the GPU 924 to generate the image frames 422.

In one embodiment, instead of the decoder and translator 2604, a separate decoder and a separate translator is used. For example, the decoder is a separate computer program from the translator. As another example, the decoder is a separate integrated circuit, such as an ASIC, or a separate PLD, from the translator.

FIG. 27 is a diagram of an embodiment of a system 2700 to illustrate generation of a compiled code set 2702, which includes the first and second compiled codes. The system 2700 includes a host processor 2704 and a memory device 2706. As an example, the host processor 2704 is coupled to the server system 404 (FIG. 4B). To illustrate, the host computer is coupled to the server system 404 via the computer network 408 (FIG. 4B). The host processor 2704 is a processor of the host computer. An example of the memory device 2706 includes a CD-ROM, which is readable by the CD-ROM drive 908. The memory device 2706 stores the emulated PU code 106 of the legacy game N.

The host processor 2704 is coupled to the memory device 2706. The scanner 2602 (FIG. 26) is executed by the host processor 2704 to scan the emulated PU code 106 from the memory device 2706. For example, the emulated PU code 106 is read by the host processor 2704 from the memory device 2706 to distinguish the executable functions of the emulated PU code 106 from the data of the emulated PU code 106 to output the scanned functions. The host processor 2704 executes the decoder and translator 2604 (FIG. 26) to decode and translate the scanned functions into the first source code. The first source code is provided from the decoder and translator 2604 to the compiler 2606 (FIG. 26).

Also, the second source code, such as a lightweight emulator program, is received by the compiler 2606 from the host input device. The host processor 2704 executes the compiler 2606 to compile the first and second source codes into the compiled code set 2702. As an example, the compiled code set 2702 includes multiple native libraries, and each of the native libraries include one or more files for storing portions of the compiled code set 2702. In the example, the compiled code set 2702 is a non-executable program. To illustrate, the compiled code set 2702 does not run or execute automatically. In the illustration, the compiled code set 2702 executes when a user input, such as the user input 418 or 420, is received.

In one embodiment, the native libraries exclude the second compiled code.

FIG. 28 is a diagram of an embodiment of a system 2800 to illustrate a fiber 2802, such as a computer thread. An example of the fiber 2802 is a sequence or a series of execution of the first and second compiled codes and operations to be performed between execution of the first and second compiled codes. The fiber 2802 is illustrated in the system 2800 with a dashed line. The system 2800 includes a compiled code (CC) 1 and a compiled code 2. As an example, the compiled code 1 is the first compiled code that is compiled from the first source code of the legacy game N and the compiled code 2 is the second compiled code that is compiled from the second source code.

The compiled code 1 has a start address and an end address. The start address of the compiled code 1 is a location in the cache 102 (FIG. 1) at which an indication of a start of the compiled code 1 is stored. For example, the start address of the compiled code 1 is an address at which a start identifier, such as a name or an alphanumeric identifier, of the compiled code 1 is stored. The end address of the compiled code 1 is a location in the cache 102 at which an indication of end of the compiled code 1 is stored. For example, the end address of the compiled code 1 is an address at which an end identifier, such as a name or an alphanumeric identifier, of the compiled code 1 is stored.

Similarly, the compiled code 2 has a start address and an end address. The start address of the compiled code 2 is a location in the cache 102 at which an indication of a start of the compiled code 2 is stored. For example, the start address of the compiled code 2 is an address at which a start identifier, such as a name or an alphanumeric identifier, of the compiled code 2 is stored. The end address of the compiled code 2 is a location in the cache 102 at which an indication of end of the compiled code 2 is stored. For example, the end address of the compiled code 2 is an address at which an end identifier, such as a name or an alphanumeric identifier, of the compiled code 2 is stored.

The compiled code 1 includes multiple portions, such as a compiled code portion 1 (CCP1), a CCP2, a CCP3, and so on of the legacy game N. An example of the compiled code portion CCP1 is an animation of the legacy game N and the animation introduces the legacy game N to the user 1. To illustrate, the animation provides the title GN of the legacy game N, one or more images, and an audio of an introduction of the legacy game N when the user input 418 (FIG. 4A) is received from the hand-held controller 414 (FIG. 4A). An example of the compiled code portion CCP2 includes a movement of the virtual object 454 (FIG. 4B) of the legacy game N in response to the user input 420 (FIG. 4A) during the play of the legacy game N. An example of the compiled code portion CCP3 includes a movement, such as an up movement or a down movement, of the virtual object 454. In the example, the virtual object 454 moves without receiving the user input 420. To illustrate, the virtual object 454 moves automatically within the legacy game N and the movement does not require the user input 420.

An example of the compiled code 2 includes a periodic refresh of an image of the legacy game N. To illustrate, an image or an image frame displayed on the display device 410 (FIG. 4A) or on the HMD is refreshed because the display device 410 or the HMD does not have a capacity to hold the image or the image frame. In the illustration, the GPU 924 (FIG. 9B) controls light sources, such as LCD elements or LEDs, of the display device 410 or the HMD to periodically sweep the light sources across the display screen of the display device 410 or the display screen of the HMD, redrawing the image or the image frame. In the illustration, the GPU 924 controls the light sources by providing a control signal to multiple display drivers, such as one or more transistors, of the display device 410 or the HMD. In the illustration, each display driver is coupled to a corresponding light source to control the corresponding light source. Also, in the illustration, each display driver is coupled to the GPU 924. Further in the illustration, in response to receiving the control signal, the display driver turns on or off the corresponding light source to redraw the image. Also in the illustration, the display drivers are part of a display controller of the display device 410 or the HMD. As another illustration, the compiled code 2 includes a periodic refresh screen, which refreshes an image of the legacy game N periodically, such as every 16 milliseconds (ms). In the illustration, the image is generated based on execution of a compiled code portion of the compiled code 1. Further, in the illustration, the compiled code portion of the compiled code 1 is executed by the AoT executor 2612 (FIG. 26) preceding to the execution of the compiled code 2 by the AoT executor 2612. To further illustrate, the compiled code 2 periodically refreshes the image that is generated when the compiled code portion CCP2 is executed by the AoT executor 2612.

Another example of the compiled code 2 includes a periodic refresh of sound generated from an audio frame of the legacy game N. To illustrate, a sound output via the speakers of the display device 410 (FIG. 4A) or speakers of the HMD is refreshed because the speakers of the display device 410 or the speakers of the HMD do not have a capacity to hold electrical energy representing the sound. In the illustration, the CPU 922 (FIG. 9B) controls the speakers of the display device 410 or the speakers of the HMD to periodically refresh the electrical energy that is converted by the speakers into sound to refresh the sound. In the illustration, the CPU 924 controls the speakers of the display device 410 or the HMD by providing a control signal to an audio driver, such as a combination of the DAC 2274, the filter 2276, and the amplifier 2278 (FIG. 22C-2), of the display device 410 or the HMD. In the illustration, the audio driver is coupled to the CPU 922. Further in the illustration, in response to receiving the control signal, the audio driver re-outputs the sound. Also in the illustration, the audio driver is a part of an audio controller of the display device 410 or the HMD. As another illustration, the compiled code 2 includes a periodic refresh of sound, which refreshes a sound that is output with an image of the legacy game N periodically. In the illustration, the compiled code 2 periodically refreshes the sound of the legacy game N generated based on execution of a compiled code portion of the compiled code 1. Further, in the illustration, the compiled code portion of the compiled code 1 is executed by the AoT executor 2612

(FIG. 26) preceding to the execution of the compiled code 2 by the AoT executor 2612. To further illustrate, the compiled code 2 periodically refreshes the sound that is generated when the compiled code portion CCP2 is executed by the AoT executor 2612. As another illustration, the compiled code 2 includes a periodic refresh sound, which refreshes a sound of the legacy game N periodically. In the illustration, the compiled code 2 periodically refreshes the sound of the legacy game N generated based on execution of a compiled code portion of the compiled code 1. Further, in the illustration, the compiled code portion of the compiled code 1 is executed by the AoT executor 2612 (FIG. 26) preceding to the execution of the compiled code 2 by the AoT executor 2612. To further illustrate, the compiled code 2 periodically refreshes the sound that is output when the compiled code portion CCP2 is executed by the AoT executor 2612.

The fiber 2802, when executed by the AoT executor 2612, directs to execution of the compiled code portion CCP1 starting with the start address of the compiled code 1. For example, the AoT executor 2612 determines whether the user input 418 is received from the hand-held controller 414 (FIG. 4A). In the example, upon determining that the user input 418 is received, the AoT executor 2612 executes the compiled code portion CCP1 of the compiled code 1. To illustrate, when the compiled code portion CCP1 is executed, one or more images frames having an animation of the legacy game N with the game title GN are displayed on the display device 410 (FIG. 4A) or the HMD.

Once the compiled code portion CCP1 is executed, the AoT executor 2612 determines whether the user input 420 (FIG. 4A) is received from the input processor system 407 (FIG. 4A). Upon determining that the user input 420 is received, the AoT executor 2612 executes the fiber 2802 to direct execution to the compiled code portion CCP2. To illustrate, the compiled code portion CCP2 is executed to move the fighter jet in a direction, such as an up direction, or a down direction, or a left direction, or a right direction, in response to the user input 420.

After the compiled code portion CCP2 executes, the AoT executor 2612 executes the fiber 2802 to execute an operation 2804 of storing states of registers of the cache 102 at an end of the execution of the compiled code portion CCP2. For example, a number of points earned by the user 1 until an end of execution of the compiled code portion CCP2 are copied from a first register of the cache 102 to a memory location outside the first register. An example of the memory location outside the first register includes another location within the cache 928 or a location within the memory system 926 (FIG. 9B). As another example, an identification of an end sub-address of the compiled code portion CCP2 at which the fiber 2802 directs to leave execution of the compiled code 1 is copied from a second register of the cache 102 to a memory location outside the second register. An example of the memory location outside the second register includes another location within the cache 928 or a location within the memory system 926.

During continued execution of the fiber 2802 after the operation 2804, in an operation 2806, the switch 2610 (FIG. 26), switches execution of the operation 2804 to execution of the compiled code 2. As an example, during the operation 2806, when the fiber 2802 is executed, the switch 2610 directs execution from the operation 2806 to execution of the compiled code 2. As another example, after the states of the first and second registers are copied to the memory locations outside the first and second registers, the fiber 2802 switches from the operation 2804 to the start address of the compiled code 2 and the compiled code 2 is executed. Also, in the example, the first and second registers are overwritten by data generated upon execution of the compiled code 2.

The compiled code 2 is executed until the end address of the compiled code 2 is reached. After the compiled code 2 is executed, execution of the fiber 2802 continues with an operation 2808. During the operation 2808, the registers of the cache 102 that are overwritten with the data generated upon execution of the compiled code 2 are overwritten with the states of the registers. As such, the registers are restored with the states. For example, the number of points earned by the user 1 until the end of execution of the compiled code portion CCP2 is copied from the memory location outside the first register to the first register. Also, in the example, the identification of the end sub-address of the compiled code portion CCP2 at which the fiber 2802 directs to leave the compiled code 1 is copied from the memory location outside the second register to the second register.

During continued execution of the fiber 2802 after the operation 2808, in an operation 2810, the switch 2610 switches from execution of the operation 2808 to execution of the compiled code portion CCP3. For example, after the states of the first and second registers are copied back from the memory locations outside the first and second registers to the first and second registers, the fiber 2802 switches a direction of execution to the end sub-address of the CCP2. The fiber 2802 upon continued execution, directs to execute the compiled code portion CCP3 starting at a start sub-address of the compiled code portion CCP3.

In this manner, the fiber creator 2608 (FIG. 26) creates the fiber 2802. For example, the fiber creator 2608 creates an order or a sequence or a direction of execution of the compiled code portion CCP1 first, the compiled code portion CCP2 second, the operation 2804 third, the operation 2806 fourth, the compiled code 2 fifth, the operation 2808 sixth, the operation 2810 seventh, and the compiled code portion CCP3 eighth. To illustrate, the fiber 2802 includes the operations 2804, 2806, 2808, and 2810. As another example, when the fiber 2802 is executed, the compiled codes 1 and 2 are not executed in parallel, such as simultaneously. Rather, the compiled codes 1 and 2 are executed sequentially or consecutively. In one embodiment, one or more of the compiled codes 1 and 2 are stored in the memory system 926 (FIG. 9B) instead of being stored in the cache 928 (FIG. 9B).

In an embodiment, a refresh of sound output with an image or an image frame of the legacy game N is performed before or after a refresh of the image or the image frame is performed. For example, a compiled code 3 is executed by the AoT executor 2612 preceding to or immediately after the compiled code 2 is executed as is directed by the fiber 2802. In the example, when the compiled code 2 is executed to periodically refresh an image, the compiled code 3 is executed to periodically refresh a sound output with the image. As another example, the compiled code 3 includes functions for periodically refreshing a sound output with an image or an image frame of the legacy game N. In the example, after the compiled code portion CCP3 is executed, another operation of storing states of the registers of the cache 102 to the memory locations outside the registers of the cache 102 is executed by the AoT executor 2612, followed by an operation of switching to the compiled code 3 according to a direction of the fiber 2802. The operation of switching to the compiled code 3 is performed by the switch 2610, which directs the fiber 2802 to switch to execution to the compiled code 3. The compiled code 3 is then executed by the AoT executor 2612 as per a direction of the fiber 2802. Further in the example, after execution of the compiled code 3, the states stored within the registers of the cache 102 are updated with data generated based on the execution of the compiled code 3. In the example, after the update, the states of the registers are then restored when the data is overwritten by the AoT executor 2612 with the states of the registers. Also, in the example, after the data is overwritten, the switch 2610 switches execution, according to a direction provided by the fiber 2802, to a compiled code portion 4 (CCP4) of the compiled code 1. In the example, the fiber 2812 includes an order of execution of the other operation of storing the states of the registers, the operation of switching to the compiled code 3, the execution of the compiled code 3, the operation of overwriting the data within the registers with the states of the registers, and the execution of the CCP4.

In an embodiment, the fiber 2802 includes the compiled code portion CCP1, the compiled code portion CCP2, the operation 2804, the operation 2806, the compiled code 2, the operation 2808, the operation 2810, and the compiled code portion CCP3.

In one embodiment, the fiber 2802 includes the operation 2804, the operation 2806, the compiled code 2, the operation 2808, and the operation 2810.

In one embodiment, a store register state operation, similar to the operation 2804, of storing one or more states of registers of the cache 102 at an end of the execution of the compiled code portion CCP1 is performed by the AoT executor 2612 after running the compiled code portion CCP1. Also, after the store register state operation, the operation 2806 repeats to switch to execution of the compiled code 2. For example, an image frame that provides an animation of the legacy game N having the title GN without any user input is refreshed periodically, or a sound output, based on an audio frame, simultaneously with the animation is refreshed periodically, or a combination thereof. When the compiled code 2 is executed, the one or more states are updated with data. Moreover, after the compiled code 2 is executed, a restore register state operation, such as the operation 2808, of replacing the data with the one or more states is performed by the AoT executor 2612. Furthermore, after the restore register state operation, the operation 2810 repeats to switch to execution of the compiled code portion CCP2. In the embodiment, the fiber 2802 includes the order of execution of the compiled code portion CCP1, the store register state operation, the operation 2806, the compiled code 2, the restore register state operation, the operation 2810, and the compiled code portion CCP2.

In an embodiment, the fiber 2802 includes the compiled code portion CCP1, the store register state operation, the operation 2806, the compiled code 2, the store restore register state operation, the operation 2810, and the compiled code portion CCP2.

In one embodiment, the fiber 2802 includes the store register state operation, the operation 2806, the compiled code 2, and the store restore register state operation, the operation 2810.

In one embodiment, a store register state operation, similar to the operation 2804, of storing one or more states of registers of the cache 102 at an end of the execution of the compiled code portion CCP3 is performed by the AoT executor 2612 after running the compiled code portion CCP3. Also, after the store register state operation, the operation 2806 repeats to switch to execution of the compiled code 2. For example, an image frame in which the fighter jet moves without any user input is refreshed periodically or sound output, based on an audio frame, simultaneously with the movement of the fighter jet is refreshed periodically or a combination thereof. When the compiled code 2 is executed, the one or more states are updated with data. Moreover, after the compiled code 2 is executed, a restore register state operation, such as the operation 2808, of replacing the data with the one or more states is performed by the AoT executor 2612. Furthermore, after the restore register state operation, the operation 2810 repeats to switch to execution of a following compiled code portion. The following compiled code portion immediately follows the compiled code portion CCP3. There is no other compiled code portion between the compiled code portion CCP3 and the following compiled code portion. In the embodiment, the fiber 2802 includes the order of execution of the compiled code portion CCP3, the store register state operation, the operation 2806, the compiled code 2, the restore register state operation, the operation 2810, and the following compiled code portion.

In an embodiment, the fiber 2802 includes the compiled code portion CCP3, the store register state operation, the operation 2806, the compiled code 2, the restore register state operation, the operation 2810, and the following compiled code portion.

In one embodiment, the fiber 2802 includes the store register state operation, the operation 2806, the compiled code 2, the restore register state operation, and the operation 2810.

FIG. 29A is a diagram of an embodiment of an executable code 2900, such as an Assembly Language program, of the legacy game N to illustrate some of the executable functions of the legacy game N. The executable code 2900 starts with a term ".code" to indicate to the host processor 2704 that the executable code 2900 is about to start while reading the memory device 2706 (FIG. 27). The executable code 2900 includes a read opcode, a write opcode, a reset opcode, a jump opcode, an add opcode, and a loop opcode. As an example, the read opcode is executed to read information, such as data or a value, from a register of the cache of the legacy machine 900 (FIG. 9A) or a memory location within the memory device 906 (FIG. 9A) or the CD-ROM coupled to the CD-ROM drive 908 (FIG. 9A). As another example, the write opcode is executed to write information to a register of the cache of the legacy machine 900 or a memory location within the memory device 906 or the CD-ROM coupled to the CD-ROM drive 908. As yet another example, the jump opcode is executed to jump to a register of the cache of the legacy machine 900 or a memory location within the memory device 906 or the CD-ROM coupled to the CD-ROM drive 908. As another example, the add opcode is executed to add a value stored within a first register of the cache of the legacy machine 900 or a first memory location within the memory device 906 or a first location within the CD-ROM coupled to the CD-ROM drive 908 to a value stored within a second register of the cache of the legacy machine 900 or a second memory location within the memory device 906 or a second location within the CD-ROM. As another example, the loop opcode is executed to repeat an operation multiple times until a condition is satisfied. To illustrate, the loop opcode is executed to multiply a value stored within a register r1 of the cache of the legacy machine 900 with a value stored within a register r0 of the cache of the legacy machine 900. Each opcode is an example of an executable function of the legacy game N.

In one embodiment, the host processor 2702 identifies any of the opcodes, described herein, as an executable function without a need to determine that a start term, such as ".code"

precedes the opcodes. There is no need for the term to precede the opcodes for the host processor 2702 to identify the opcodes to distinguish the opcodes from data.

FIG. 29B is a diagram of an embodiment of data 2910, which is identified by the host processor 2704 (FIG. 27) as not being executable. The data 2910 is of the legacy game N. The data 2910 starts with a term ".data" to indicate to the host processor 2704 that the data 2910 is about to start while reading the memory device 2706 (FIG. 27). As an example, the data 2910 includes a value of 4 stored within the register r1 and a value of 6 stored within the register r1. Other examples of data, of the legacy game N, stored within the memory device 2706 include sound data and image data, such as game icons.

FIG. 30A illustrates an embodiment of a source code 3000. The source code 3000 includes a name main( ). The name is further followed by an open curly bracket, which is further followed by an assignment of a register a of the cache 102 to store an integer and an assignment of a register b of the cache 102 to store an integer. The assignments are followed by reading a value from the register a and writing a value of 1 to the register b. The source code ends with a close curly bracket. The source code 3000 is an example of the first source code of the legacy game N.

FIG. 30B illustrates an embodiment of a source code 3010 and another source code 3012. The source code 3010 is an example of the first source code and the source code 3012 is an example of the second source code. The source code 3010 is compiled to generate the compiled code 1. The source code 3012 is compiled to generate the compiled code 2 or the compiled code 3 or a combination thereof.

FIG. 31 is a diagram of an embodiment of a system 3100 to illustrate a coupling between the block creator 604 and the fiber creator 2608. The block creator 604 is coupled to the fiber creator 2608. Operations performed by the block creator 604 and the fiber creator 2608 are illustrated below with reference to FIGS. 32A-32C.

FIG. 32A is a flowchart of an embodiment of a method 3200 that is executed by the block creator 604 and the fiber creator 2608 of FIG. 31. In the method 3200, an operation 3202 is executed by the fiber creator 2608. In the operation 3202, the fiber creator 2608 determines whether the fiber 2802 (FIG. 28) is set up. For example, in response to receiving the user input 418, the fiber creator 2608 determines whether the fiber 2802 for servicing the user input 418 is created and stored in the cache 102. To illustrate, the fiber creator 2608 parses the user input 418 to determine that the user input 418 includes a request for initiating a play of the legacy game N and determines that the compiled code portion CCP1 includes an animation of the legacy game N to determine that the fiber 2802 for servicing the user input 418 is created. As another example, in response to receiving the user input 420, the fiber creator 2608 determines whether the fiber 2802 for servicing the user input 420 is created and stored in the cache 102. To illustrate, the fiber creator 2608 parses the user input 420 to determine that the user input 420 includes a request to move the virtual fighter jet in a direction, determines that the compiled code portion CCP2 includes operations to generate one or more of the image frames 422 representing the movement of the virtual fighter jet in the direction, and determines that the operations 2804 and 2806, the compiled code 2, and the operations 2808 and 2810 are to be executed after executing the compiled code portion CCP2 to determine that the fiber 2802 for servicing the user input 420 is created.

Upon determining that the fiber 2802 is set up, an operation 3204 of switching to a next compiled code is performed by the switch 2610 (FIG. 26). In the operation 3204, the switch 2610 switches execution to the next compiled code. For example, the switch 2610 switches execution to the start address of the compiled code 1 upon receiving the user input 418. As another example, the switch 2610 switches execution to the start address of the compiled code 2 after receiving the user input 420. In the example, the execution is switched to the compiled code 2 after the compiled code portions CCP1 and CCP2 and the operation 2804 are executed (FIG. 28).

An operation 3206 of the method 3200 is performed by the AoT executor 2612 (FIG. 26). For example, the AoT executor 2612 executes the next compiled code. To illustrate, the AoT executor 2612 executes the compiled code portion CCP1 at the start address of the compiled code 1 when the user input 418 is the received. As another illustration, the AoT executor 2612 executes the compiled code 2 at the start address of the compiled code 2 after the compiled code portion CCP2 is executed and the operation 2804 is performed. The operations 3202, 3204, and 3206 repeat in this manner after the operation 3206.

On the other hand, upon determining that the fiber 2802 is not set up, such as not stored in the cache 102, the fiber creator 2608 determines, in an operation 3208 of the method 3200, whether the next compiled code can be located from the native libraries. For example, the fiber creator 2608 parses or searches the native libraries to identify the compiled code 1 for servicing the user input 418 when the user input 418 is received. To illustrate, the fiber creator 2608 parses the native libraries and determines whether functionality of the compiled code 1 is capable of servicing the user input 418. To further illustrate, the fiber creator 2608 parses the user input 418 to determine that the user input 418 includes a request for initiating a play of the legacy game N and determines that the compiled code portion CCP1 includes an animation of the legacy game N to determine that the compiled code 1 for servicing the user input 418 is stored in the native libraries. As another example, the fiber creator 2608 parses or searches the native libraries to identify the compiled code 1 for servicing the user input 420 when the user input 420 is received. To illustrate, the fiber creator 2608 parses the native libraries and determines whether one or more functions of the compiled code 1 is capable of servicing the user input 420. To further illustrate, the fiber creator 2608 parses the user input 420 to determine that the user input 420 includes a request to move the virtual fighter jet in a direction, determines that the compiled code portion CCP2 includes operations to generate one or more of the image frames 422 representing the movement of the virtual fighter jet in the direction to determine that the compiled code 1 for servicing the user input 420 is stored within the native libraries.

Upon determining that the next compiled code can be located within the native libraries, in an operation 3210 of the method 3200, the fiber creator 2608 sets up the fiber 2802 with an entry point, such as a start address of a compiled code. For example, the fiber creator 2608 creates the fiber 2608 with the start address of the compiled code 1 upon receiving the user input 418. As another example, the fiber creator 2608 creates the fiber 2802 with a start sub-address of the compiled code portion CCP2, to be followed by the operation 2804, further to be followed by the operation 2806, to be further followed by the start address of the compiled code 2, to be followed by the operation 2808, to be additionally followed by the operation 2810 upon receiving the user input 420. The operation 3204 is performed after the operation 3210.

Figure 32B:
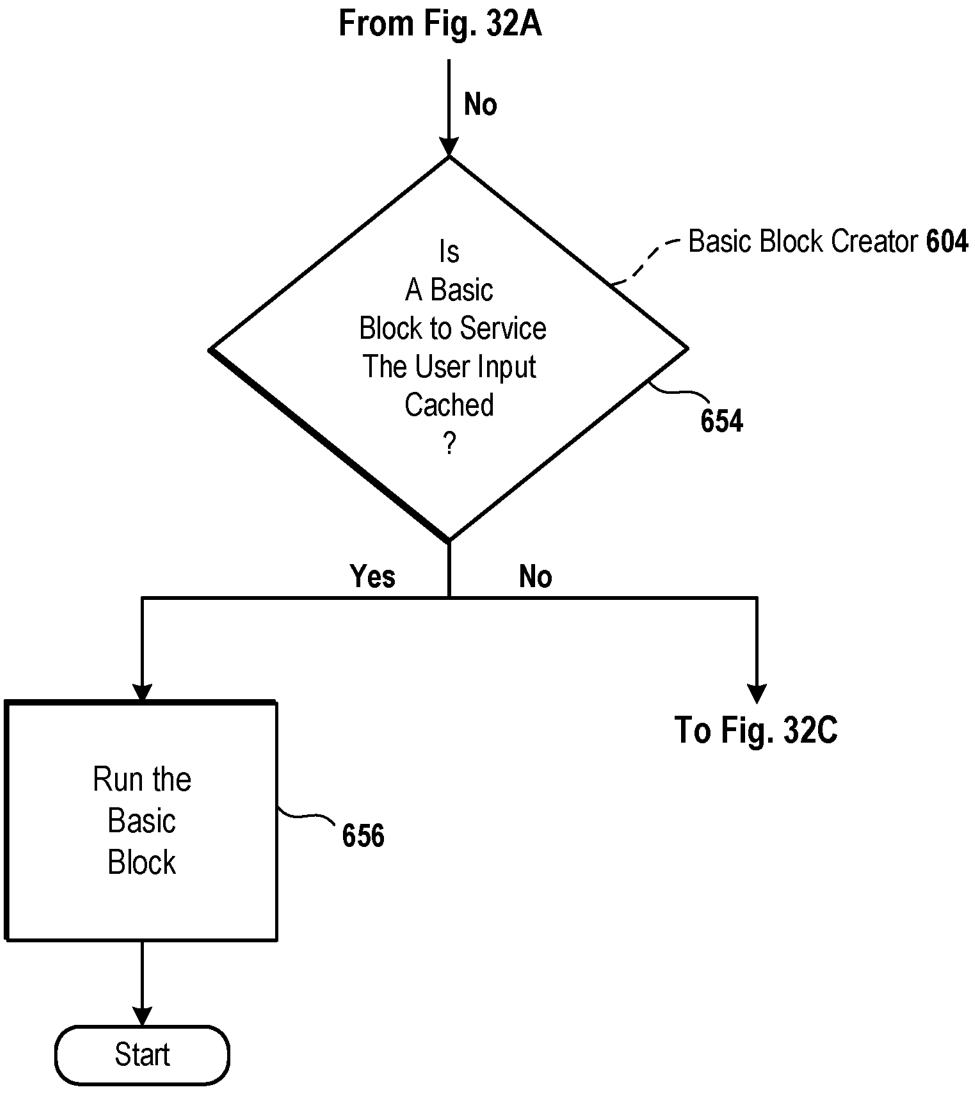
FIG. 32B is a continuation of the method of FIG. 32A.

On the other hand, upon determining that the next compiled code cannot be located within the native libraries, execution of the method 3200 continues to FIG. 32B. For example, a signal indicating that the next compiled code cannot be located within the native libraries is sent from the fiber creator 2608 to the basic block creator 604.

FIG. 32B is a continuation of the method 3200. In the operation 654 of the method 3200, upon receiving the signal indicating that the next compiled code cannot be located within the native libraries, the basic block creator 604 determines whether one or more of the basic blocks (n+1) through p for servicing a user input, such as the user input 418 or 420, are stored in the cache 102. Upon determining that the one or more of the blocks (n+1) through p for servicing the user input are cached, the operation 656 of running the one or more of the basic blocks (n+1) through p is performed. For example, the block dispatcher 302 sends a request to the block reader 608 to read the one or more of the basic blocks 1 through n from the cache 102. Upon receiving the command, the block reader 608 (FIG. 6A) reads the one or more of the basic blocks (n+1) through p from the cache 102 and provides the one or more of the basic blocks (n+1) through p to the block dispatcher 302 (FIG. 3).

Upon receiving the one or more of the basic blocks 1 through n, the block dispatcher 302 executes the one or more of the basic blocks (n+1) through p to generate an animation of the legacy game N or the virtual environment 452 (FIG. 4B). To illustrate, when the user input 420 is received, the block dispatcher 302 executes the one or more of the basic blocks (n+1) through p to generate one or more of the image frames 422, which includes virtual environment data, such as a position and an orientation of the virtual object 454, the parameter of the virtual object 454, positions and orientations of other virtual objects in the virtual environment 452, and the parameter of the other virtual objects in the virtual environment 452. The block dispatcher 302 provides the one or more of the image frames 422 to the GPU of the emulation processor system 409 to display the virtual environment 452 on the display screen of the display device 410 (FIG. 4A) or the HMD. As another example, the block dispatcher 302 executes the one or more of the basic blocks (n+1) through p to generate one or more audio frames and provides the one or more audio frames to a client device to output sounds based on the one or more audio frames. The method 3200 repeats after the operation 656. As another illustration, when the user input 418 is received, one or more of the basic blocks (n+1) through p are executed to generate image data for displaying the animation of the legacy game N, and the image data is provided from the block dispatcher 302 to the display device 410 or the HMD for display of the animation. On the other hand, upon determining that the one or more of the blocks (n+1) through p for servicing the user input 418 are not cached, the method 3200 continues to FIG. 32C.

Figure 32C:
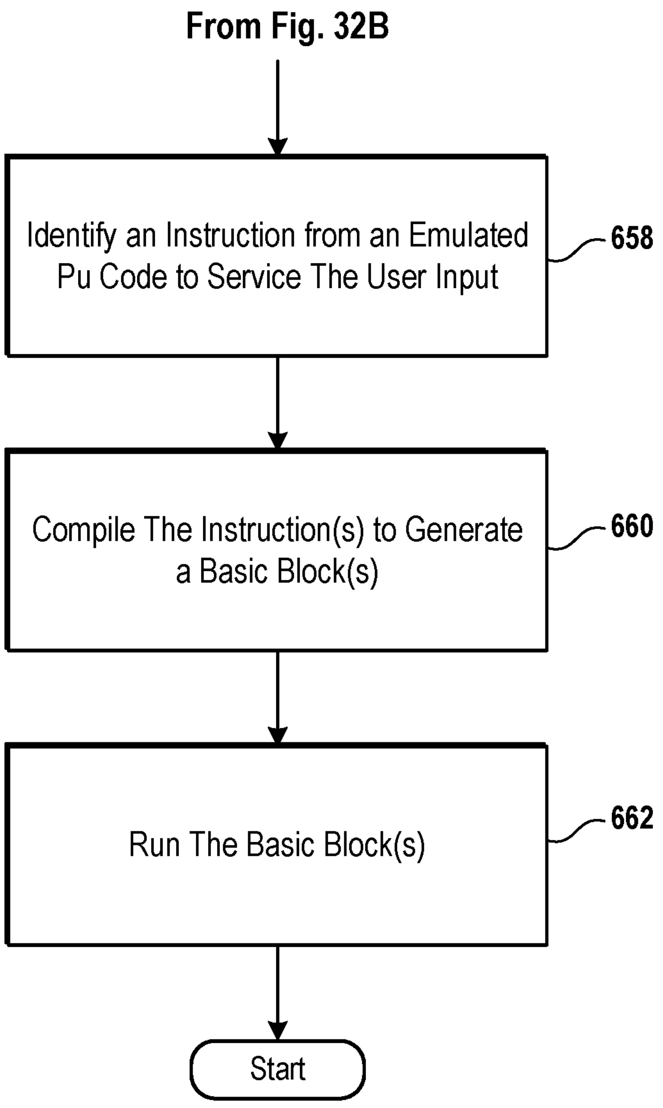
FIG. 32C is a continuation of the method of FIG. 32B.

FIG. 32C is a continuation of the method 3200 of FIG. 32B. In the method 3200, the operations 658, 660, and 662 are performed.

In one embodiment, it should be noted that when the next compiled code cannot be located within the native libraries in the operation 3208, and the operations illustrated in FIG. 32B are not performed, the method 3200 crashes. When the method 3200 crashes, the legacy game N crashes and cannot be executed.

FIG. 33 is a diagram of an embodiment of a system 3300 to illustrate a coupling between the AoT executor 2612 and the GPU emulator 2122. The system 3300 includes the AoT executor 2612 and the GPU emulator 2122. The AoT executor 2612 is coupled to the GPU emulator 2122.

In response to a user input, such as the user input 418 or the user input 420 (FIG. 4A), the AoT executor 2612 services the user input. For example, the AoT executor 2612 executes one or more compiled codes, such as the compiled code 1 or the compiled code 2 or a combination thereof. In the example, the AoT executor 2612 further executes one or more operations for storing register states, such as the operation 2804 or the operation 2808 or a combination thereof. Also, in the example, the AoT executor 2612 executes one or more operations for switching between compiled codes, such as the operation 2806 or the operation 2810 or a combination thereof, according to directionality provided by a fiber, such as the fiber 2802 (FIG. 28), to generate the image frames 422. The image frames 422 are provided from the AoT executor 2612 to the GPU emulator 2122. The GPU emulator 2122 applies the one or more updated graphical parameters to the image frames 422 to output the images frames 2123.

Figure 34:
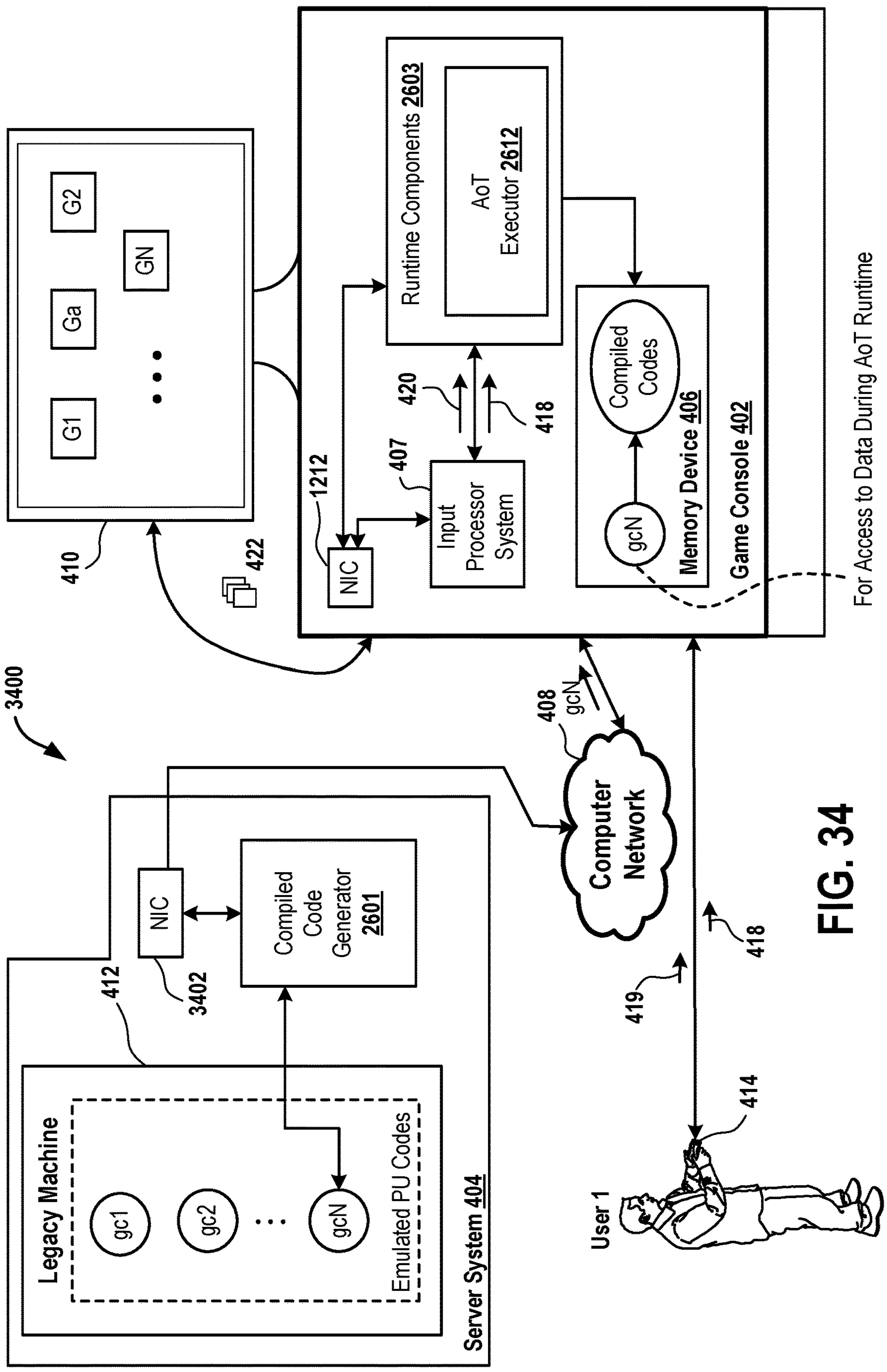
FIG. 34 is a diagram of an embodiment of a system to illustrate locations of a compiled code generator and the AoT executor.

FIG. 34 is a diagram of an embodiment of a system 3400 to illustrate locations of the compiled code generator 2601 and the runtime components 2603. The system 3400 includes the server system 404, the game console 402, the computer network 408, and the hand-held controller 414. The server system 404 includes the compiled code generator 2601 and a NIC 3402. The NIC 3402 is coupled to the compiled code generator 2601. The game console 42 includes the memory device 406, which includes multiple compiled codes, such as the compiled code 1, the compiled code 2 (FIG. 28), and the compiled code 3. For example, the compiled codes, described herein, are pre-stored within the game console 402. To illustrate, at a time of purchase of the game console 402 by the user 1, the compiled codes are stored in the memory device 406.

Similarly, the legacy game code gcN is stored in the memory device 406. For example, the game code gcN is pre-stored within the game console 402. To illustrate, at the time of purchase of the game console 402 by the user 1, the game code gcN is stored in the memory device 406. Also, the runtime components 2603 are located in the game console 402. To illustrate, at the time of purchase of the game console 402 by the user 1, the runtime components 2603 are within the game console 402. The runtime components 2603 are coupled to the input processor system 407, to the memory device 406, and to the NIC 1212.

The input processor system 408 receives a user input, such as the user input 418 or the user input 419, from the hand-held controller 414. When the user input 418 is received by the input processor system 407, the input processor system 407 determines that there is no need to convert the user input 418 and provides the user input 418 to the runtime components 2603. Upon receiving the user input 418, the runtime components 2603 service the user input 418. During servicing of the user input 418, the AoT executor 2612 accesses one or more of the compiled codes from the memory device 406, accesses data, such as image data or audio data, from the game code gcN, and applies the compiled codes to the data according to a directionality provided by the fiber 2802 (FIG. 28) to generate one or more of the image frames 422. For example, the compiled code 1 is run by the AoT executor 2612 as per the directionality of the fiber 2802. In the example, during execution of the compiled code 1, image data, such as animation image data, is accessed from the game code gcN to generate one or more of the image frames 422 of the legacy game N. Further in the example, the one or more of image frames 422 are sent from the game console 402 to the display device 410 for display of the animation of the legacy game N.

Moreover, when the user input 419 is received by the input processor system 407, the input processor system 407 converts the user input 419 into the user input 420, and provides the user input 420 to the runtime components 2603. In response to receiving the user input 420, the runtime components 2603 service the user input 420. During servicing of the user input 420, the AoT executor 2612 accesses one or more of the compiled codes, such as the compiled codes 1 and 2, from the memory device 406, accesses data, such as image data or audio data, from the game code gcN, and applies the compiled codes to the data according to a directionality provided by the fiber 2802 to generate one or more of the image frames 422. Also in the example, the one or more of image frames 422 are sent from the game console 402 to the display device 410 for display of the legacy game N.

In one embodiment, the compiled codes are generated by the compiled code generator 2601 of the server system 404 and stored within the one or more memory devices of the server system 404. The user input 418, when received by the game console 402 is sent from the game console 418 via the computer network 408 to the compiled code generator 2601. In response to receiving the user input 418, the compiled code generator 2601 accesses the compiled codes from the one or more memory devices of the server system 404 and sends the compiled codes to the NIC 3402. The NIC 3402 applies the network communication protocol to the compiled codes to generate one or more packets and sends the one or more packets via the computer network 408 to the game console 402. The NIC 1212 receives the one or more packets and applies the network communication protocol to the one or more packets to extract the compiled codes and provides the compiled codes to the runtime components 2603. The runtime components 2603 receive the compiled codes from the NIC 1212 and store the compiled codes within the memory device 406. When the user input 420 is received from the input processor system 407, the fiber creator 2608 of the runtime components 2603 generates the fiber 2802 to provide directionality of execution of the compiled codes.

In an embodiment, the AoT executor 2612 is a computer program that is executed by the CPU 922 of the updated machine 920 (FIG. 9B). In the embodiment, the AoT executor 2612 is stored within the memory system 926 or within the cache 928 (FIG. 9B). The CPU 922 accesses the AoT executor 2612 from the memory system 926 or the cache 928 and executes the AoT executor 2612.

In an embodiment, the runtime components 2603 are pre-stored in the memory device 406 for execution by the CPU 922 of the game console 402.

Figure 35:
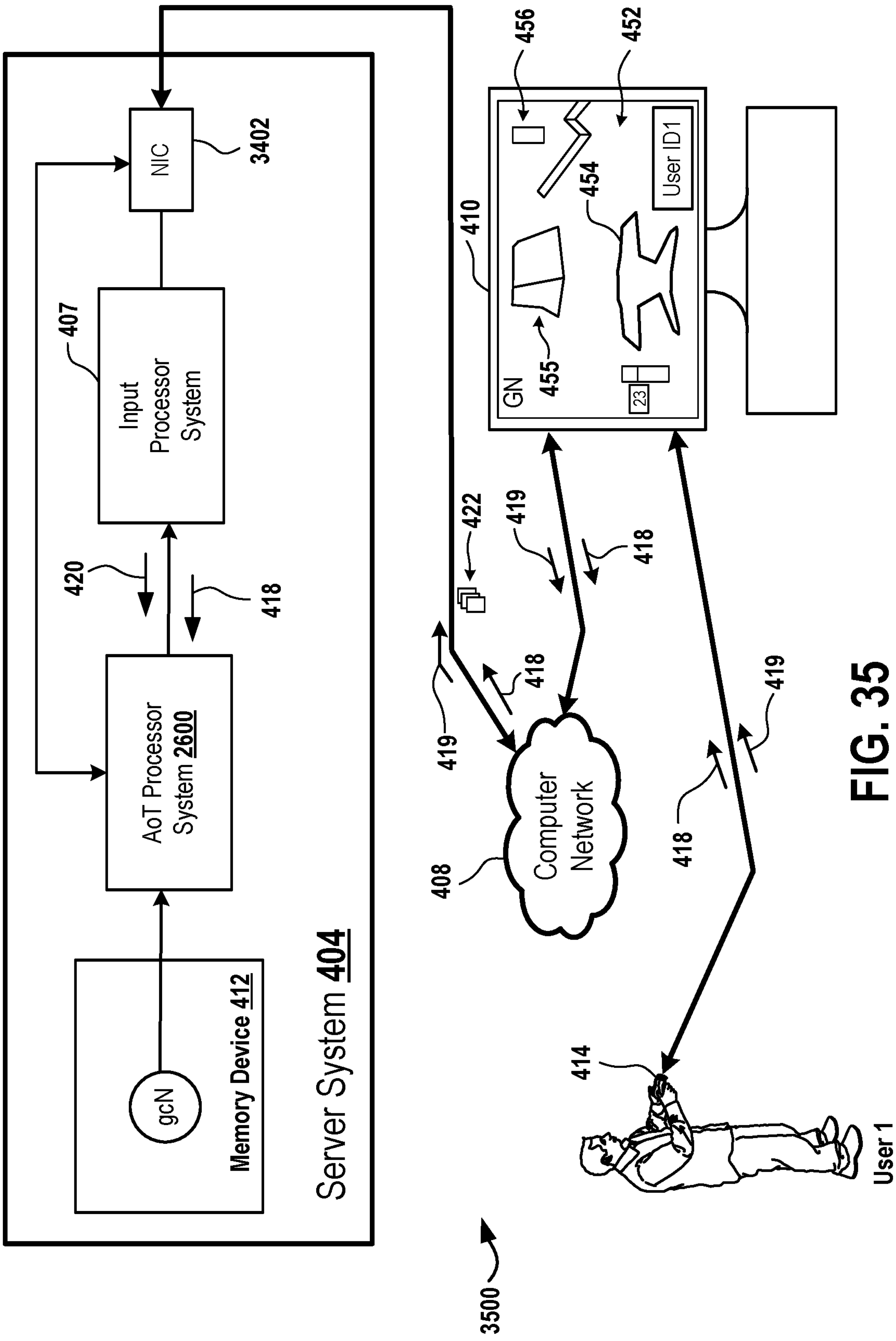
FIG. 35 is a diagram of an embodiment of a system to illustrate a location of an AoT processor system within the server system.

FIG. 35 is a diagram of an embodiment of a system 3500 to illustrate a location of the AoT processor system 2600 within the server system 404. The system 3500 includes the server system 404, the display device 410, the computer network 408, and the hand-held controller 414. The server system 404 includes the memory device 412, the AoT processor system 2600, and the input processor system 407. The memory device 412 is coupled to the AoT processor system 2600, which is coupled to the input processor system 407. The input processor system 407 is coupled to the NIC 3402, which is coupled to the computer network 408. The NIC 3402 is coupled to the AoT processor system 2600.

The user input 418 is sent from the hand-held controller 414 to the display device 410. The NIC of the display device 410 applies the network communication protocol to the user input 418 to generate one or more packets and sends the packets via the computer network 408 to the NIC 3402. The NIC 3402 applies the network communication protocol to the one or more packets to extract the user input 418 from the one or more packets and sends the user input 418 to the input processor system 407.

The input processor system 407 provides the user input 418 to the AoT processor system 2600 without converting the user input 418. Before the user input 418 is received, the compiled codes are generated by the AoT processor system 2600. The AoT processor system 2600 services the user input 418 to execute one or more of the compiled codes according to a direction provided by the fiber 2802 (FIG. 28). The user input 418 is serviced to generate one or more of the image frames 422. The image frames 422 are provided from the AoT processor system 2600 to the NIC 3402. The NIC 3402 applies the network communication protocol to the one or more of the image frames 422 to generate one or more packets and sends the packets via the computer network 408 to the display device 410. Upon receiving the one or more packets, the NIC of the display device 410 applies the network communication protocol to the one or more packets to obtain the one or more of the image frames 422 from the one or more packets. The GPU of the display device 410 displays the one or more of the image frames 422 as images, such as an image of an animation of the legacy game N.

Furthermore, during a play of the legacy game N, the hand-held controller 414 generates the user input 419 and sends the user input 419 to the display device 410. The NIC of the display device 410 applies the network communication protocol to the user input 419 to generate one or more packets and sends the packets via the computer network 408 to the NIC 3402. The NIC 3402 applies the network communication protocol to the one or more packets to extract the user input 419 from the one or more packets and sends the user input 419 to the input processor system 407.

The input processor system 407 converts the user input 419 into the user input 420 and provides the user input 420 to the AoT processor system 2600. The AoT processor system 2600 services the user input 420 to generate one or more of the image frames 422. The image frames 422 are provided from the AoT processor system 2600 to the NIC 3402. The NIC 3402 applies the network communication protocol to the one or more of the image frames 422 to generate one or more packets and sends the packets via the computer network 408 to the display device 410. Upon receiving the one or more packets, the NIC of the display device 410 applies the network communication protocol to the one or more packets to obtain the one or more of the image frames 422 from the one or more packets. The GPU of the display device 410 displays the one or more of the image frames 422 as images, such as the virtual environment 452 (FIG. 4A).

In one embodiment, instead of the display device 410, the HMD is used.

Figure 36:
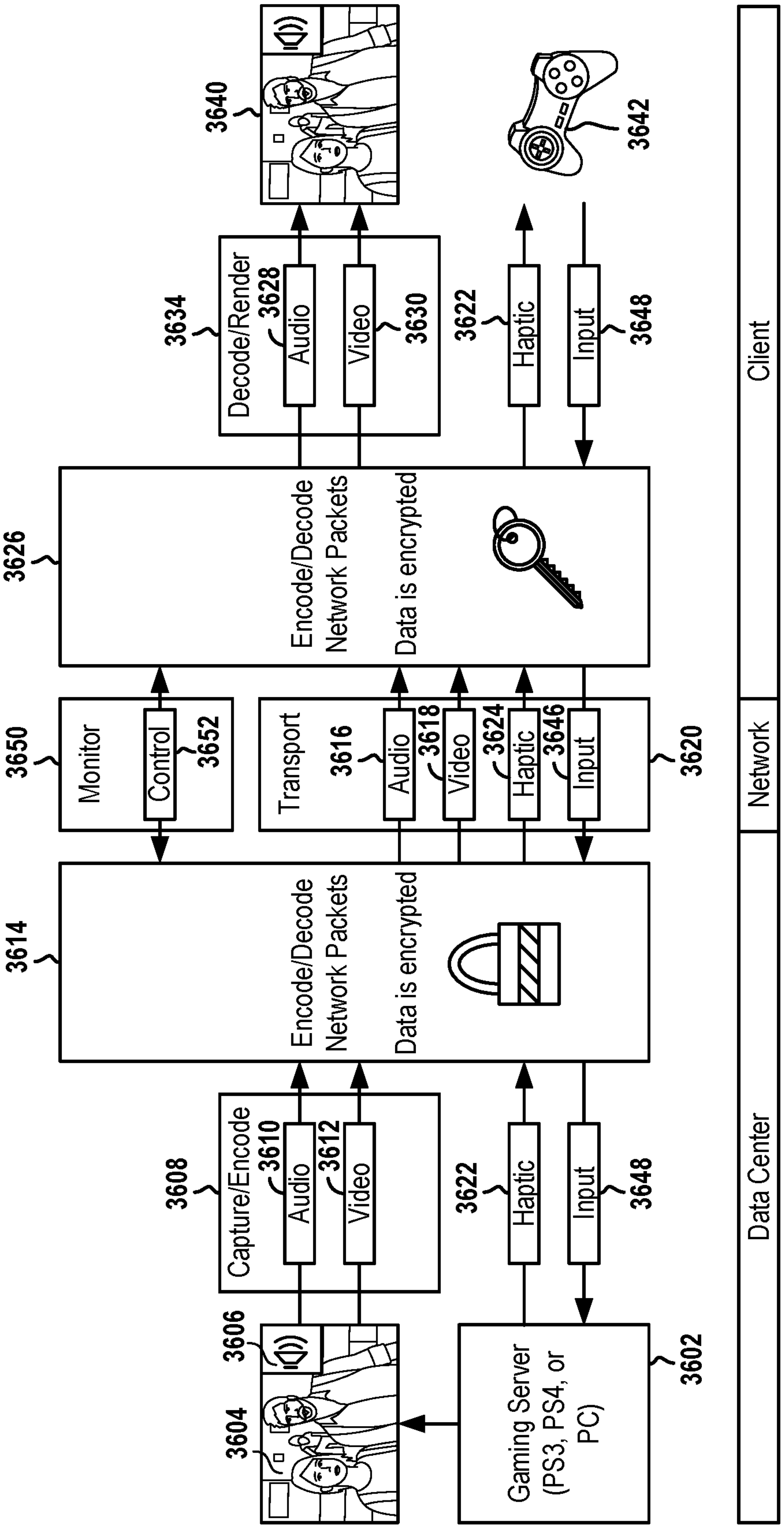
FIG. 36 is a flow diagram conceptually illustrating various operations, which are performed for streaming a cloud video game to a client device, in accordance with implementations of the present disclosure.

FIG. 36 is a flow diagram conceptually illustrating various operations which are performed for streaming a cloud video game to a client device, in accordance with implementations of the disclosure. Examples of the client device include a combination of a hand-held controller and a display device, a smart phone, a combination of a hand-held controller and a display device and a game console, a combination of a hand-held controller and an HMD, a combination of a hand-held controller and a game console and an HMD, a tablet, and a computer. A game server 3602 executes a game program, such as a video game or the game code GCN, and generates raw (uncompressed) video 3604 and audio 3606. The virtual environment 452 (FIG. 4A) and audio output during presentation of the virtual environment 452 are examples of the video 3604 and audio 3606. The game server 3602 is an example of the server system 404 (FIG. 4A). The video 3604 and audio 3606 are captured and encoded for streaming purposes, as indicated at reference 3608 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc. Encoded audio 3610 and encoded video 3612 are further packetized into network packets, as indicated at reference numeral 3614, for purposes of transmission over a computer network 3620, which is an example of the computer network 408 (FIG. 4A). In some embodiments, the network packet encoding process also employs a data encryption process, thereby providing enhanced data security. In the illustrated implementation, audio packets 3616 and video packets 3618 are generated for transport over the computer network 3620.

The game server 3602 additionally generates haptic feedback data 3622, which is also packetized into network packets for network transmission. In the illustrated implementation, haptic feedback packets 3624 are generated for transport over the computer network 3620.

The foregoing operations of generating the raw video and audio and the haptic feedback data are performed on the game server 3602 of a data center, and the operations of encoding the video and audio, and packetizing the encoded audio/video and haptic feedback data for transport are performed by the streaming engine of the data center. As indicated, the audio, video, and haptic feedback packets are transported over the computer network 3620. As indicated at reference 3626, the audio packets 3616, video packets 3618, and haptic feedback packets 3624, are disintegrated, e.g., parsed, etc., by the client device to extract encoded audio 3628, encoded video 3630, and haptic feedback data 3622 at the client device from the network packets. If data has been encrypted, then the data is also decrypted. The encoded audio 3628 and encoded video 3630 are then decoded by the client device, as indicated at reference 3634, to generate client-side raw audio and video data for rendering on a display device 3640 of the client device. The haptic feedback data 3622 is processed by a processor of the client device to produce a haptic feedback effect at a controller device 3642 or other interface device, e.g., the HMD, etc., through which haptic effects can be rendered. The controller device 3642 is an example of a hand-held controller, such as the hand-held controller 414 (FIG. 4A) or 1212 (FIG. 12), of the client device. One example of a haptic effect is a vibration or rumble of the controller device 3642.

It will be appreciated that a video game is responsive to player or user inputs, and thus, a similar procedural flow to that described above for transmission and processing of player input, but in the reverse direction from client device to server, is performed. As shown, the controller device 3642 or another updated controller, e.g., an HMD, etc., or a combination thereof generates input data 3648. The input data 3648 is packetized at the client device for transport as a user input over the computer network 3620 to the data center. Input data packets 3646 are unpacked and reassembled by the game server 3602 to define the input data 3648 on the data center side. The input data 3648 is fed to the game server 3602, which processes the input data 3648 to generate a game state of the legacy game N.

During transport via the computer network 3620 of the audio packets 3616, the video packets 3618, and haptic feedback packets 3624, in some embodiments, the transmission of data over the computer network 3620 is monitored to ensure a quality of service. For example, network conditions of the computer network 3620 are monitored as indicated by reference 3650, including both upstream and downstream network bandwidth, and the game streaming is adjusted in response to changes in available bandwidth. That is, the encoding and decoding of network packets is controlled based on present network conditions, as indicated by reference 3652.

Figure 37:
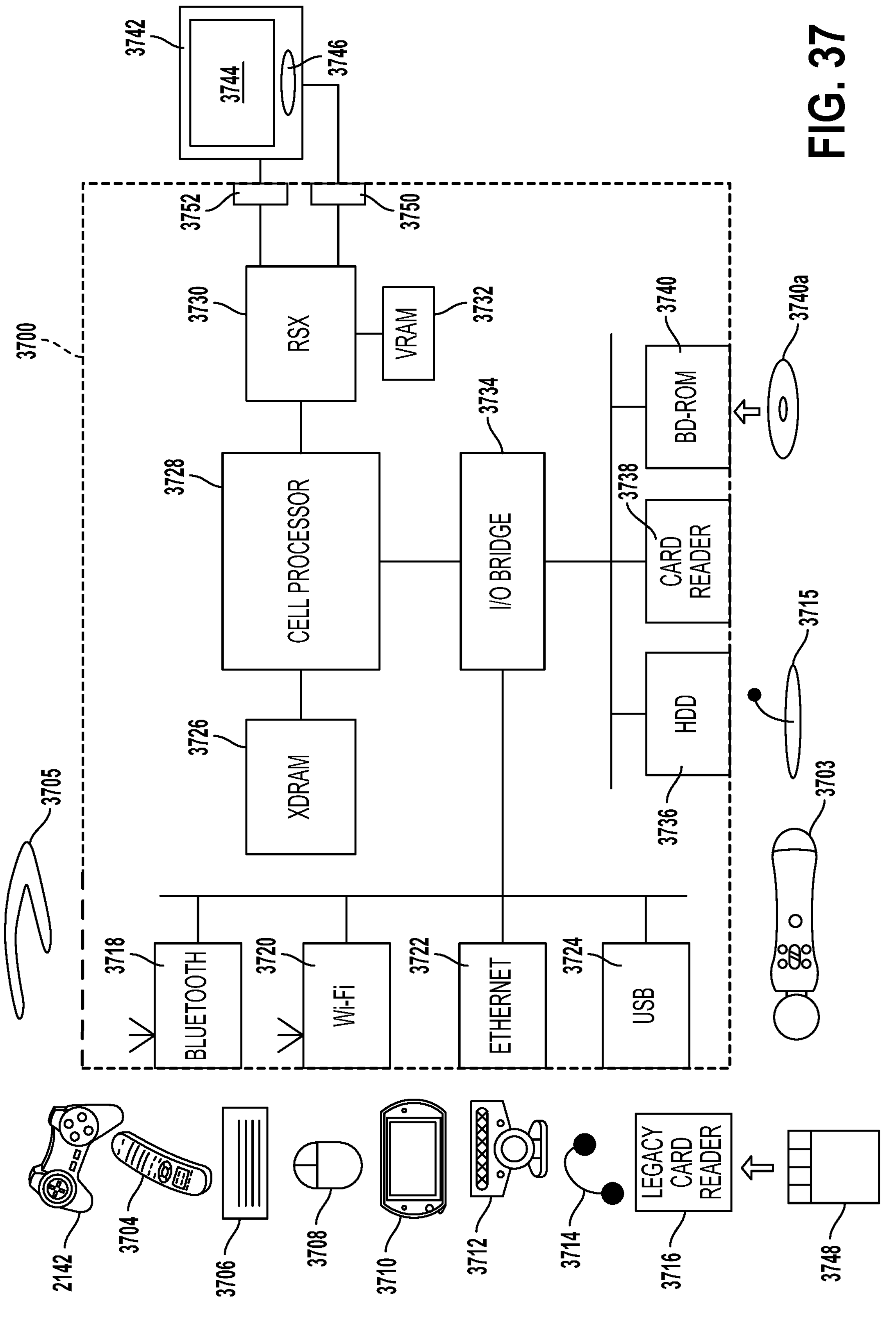
FIG. 37 is a block diagram of an embodiment of a game console that is compatible for interfacing with a display device of a client device and is capable of communicating via a computer network with a game hosting system.

FIG. 37 is a block diagram of an embodiment of a game console 3700 that is compatible for interfacing with a display device of a client device and is capable of communicating via the computer network 3620 (FIG. 36) with a game hosting system, such as the server system 404 (FIG. 4A). The game console 3700 is an example of the game console 402 (FIG. 4A) and of the game console 1202 (FIG. 12). The game console 3700 is located within the data center or is located at a location at which a player, such as the user 1 or 2, is located. In some embodiments, the game console 3700 is used to execute the game code GCN or the compiled codes according to the fiber 2802 (FIG. 28) to display the legacy game N on an HMD 3705. The game console 3700 is provided with various peripheral devices connectable to the game console 3700. The game console 3700 has a cell processor 3728, a dynamic random access memory (XDRAM) unit 3726, a Reality Synthesizer graphics processor unit 3730 with a dedicated video random access memory (VRAM) unit 3732, and an input/output (I/O) bridge 3734. The game console 3700 also has a Blu Ray® Disk read-only memory (BD-ROM) optical disk reader 3740 for reading from a disk 3740*a* and a removable slot-in hard disk drive (HDD) 3736, accessible through the I/O bridge 3734. Optionally, the game console 3700 also includes a memory card reader 3738 for reading compact flash memory cards, memory Stick® memory cards and the like, which is similarly accessible through the I/O bridge 3734. The I/O bridge 3734 also connects to USB 2.0 ports 3724, a gigabit Ethernet port 3722, an IEEE 802.11b/g wireless network (Wi-Fi™) port 3720, and a Bluetooth® wireless link port 3718 capable of supporting Bluetooth connections.

In operation, the I/O bridge 3734 handles all wireless, USB and Ethernet data, including data from a game controller and from the HMD 3705. For example, when the player is playing the legacy game N generated by execution of a portion of a game code, such as the game code GCN, the I/O bridge 3734 receives input data or an input signal, described herein, from the game controller 3642 and/or from the HMD 3705 via a Bluetooth link and directs the input data to the cell processor 3728, which updates a current state of the legacy game N accordingly. As an example, a camera within the HMD 3705 captures a gesture of the player to generate an image representing the gesture.

The wireless, USB and Ethernet ports also provide connectivity for the game controllers 3642 and 3703, the HMD 3705, and other peripheral devices, such as, for example, a remote control 3704, a keyboard 3706, a mouse 3708, a portable entertainment device 3710, such as, e.g., a Sony Playstation Portable® entertainment device, etc., a video camera, such as, e.g., an EyeToy® video camera 3712, etc., a microphone headset 3714, and a microphone 3715. The portable entertainment device 3710 is an example of a game controller. In some embodiments, such peripheral devices are connected to the game console 3700 wirelessly, for example, the portable entertainment device 3710 communicates via a Wi-Fi™ ad-hoc connection, whilst the microphone headset 3714 communicates via a Bluetooth link.

The provision of these interfaces means that the game console 3700 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 3716 is connected to the game console 3700 via the USB port 3724, enabling the reading of memory cards 3748 of a kind used by the game console 3700. The game controllers 3642 and 3703, and the HMD 3705 are operable to communicate wirelessly with the game console 3700 via the Bluetooth link 3718, or to be connected to the USB port 3724, thereby also receiving power by which to charge batteries of the game controller 3642 and 3703 and the HMD 3705. In some embodiments, each of the game controllers 3642 and 3703, and the HMD 3705 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 3700, and wireless devices using protocols, such as, e.g., Bluetooth, Wi-Fi, etc.

The game controller 3642 is a controller designed to be used with two hands by a player, such the user 1 or 2, and the game controller 3703 is a single-hand controller with an attachment. The HMD 3705 is designed to fit on top of a head and/or in front of eyes of the player. In addition to one or more analog joysticks and conventional control buttons, each game controller 3642 and 3703 is susceptible to three-dimensional location determination. Similarly, the HMD 3705 is susceptible to three-dimensional location determination. Consequently, in some embodiments, gestures and movements by the player that uses the game controller 3642 and 3703 and of the HMD 3705 are translated as inputs to a game in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 3704 is also operable to communicate wirelessly with the game console 3700 via the Bluetooth link 3718. The remote control 3704 includes controls suitable for the operation of the Blu Ray™ Disk BD-ROM reader 3740 and for navigation of disk content.

The Blu Ray™ Disk BD-ROM reader 3740 is operable to read CD-ROMs compatible with the game console 3700, in addition to conventional pre-recorded and recordable CDs, and so-called Super Audio CDs. The Blu Ray™ Disk BD-ROM reader 3740 is also operable to read digital video disk-ROMs (DVD-ROMs) compatible with the game console 3700, in addition to conventional pre-recorded and recordable DVDs. The Blu Ray™ Disk BD-ROM reader 3740 is further operable to read BD-ROMs compatible with the game console 3700, as well as conventional pre-recorded and recordable Blu-Ray Disks.

The game console 3700 is operable to supply audio and video, either generated or decoded via the Reality Synthesizer graphics unit 3730, through audio connectors 3750 and video connectors 3752 to a display and sound output device 3742, such as, e.g., a monitor or television set, etc., having a display screen 3744 and one or more loudspeakers 3746, or to supply the audio and video via the Bluetooth® wireless link port 3718 to the display device of the HMD 3705. The audio connectors 3750, in various embodiments, include conventional analogue and digital outputs whilst the video connectors 3752 variously include component video, S-video, composite video, and one or more High Definition Multimedia Interface (HDMI) outputs. Consequently, video output may be in formats such as phase alternating line (PAL) or National Television System Committee (NTSC), or in 3720p, 1080i or 1080p high definition. Audio processing, e.g., generation, decoding, etc., is performed by the cell processor 3708. An operating system of the game console 3700 supports Dolby® 5.1 surround sound, Dolby® Theatre Surround (DTS), and the decoding of 7.1 surround sound from Blu-Ray® disks. The display and sound output device 3742 is an example of the display device 410 (FIG. 4A).

In some embodiments, a video camera, e.g., the video camera 3712, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 3700. An LED indicator of the video camera 3712 is arranged to illuminate in response to appropriate control data from the game console 3700, for example, to signify adverse lighting conditions, etc. Some embodiments of the video camera 3712 connect to the game console 3700 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 3700, an appropriate piece of software, such as, a device driver, etc., is provided.

In some embodiments, the aforementioned system devices, including the game console 3700, the game controller 3642 (FIG. 36) or 3703, and the HMD 3705 enable the HMD 3705 to display and capture video of an interactive session of the legacy game N. The system devices initiate an interactive session of the of the legacy game N, the interactive session defining interactivity between the player 1 and other players and the of the legacy game N. The system devices further determine an initial position and orientation of the game controller 3642 (FIG. 36) or 3603, and/or the HMD 3705 operated by the player. The game console 3700 determines a current state of a game based on the interactivity between the player and the legacy game N. The system devices track a position and orientation of the game controller 3642, 3703 and/or the HMD 3705 during an interactive session of the player with the legacy game N. The system devices generate a spectator video stream of the interactive session based on a current state of the legacy game N and the tracked position and orientation of the game controller 3642, 3703 and/or the HMD 3705. In some embodiments, the HHC renders the spectator video stream on a display screen of the HHC. In various embodiments, the HMD 3705 renders the spectator video stream on a display screen of the HMD 3705.

Figure 38:
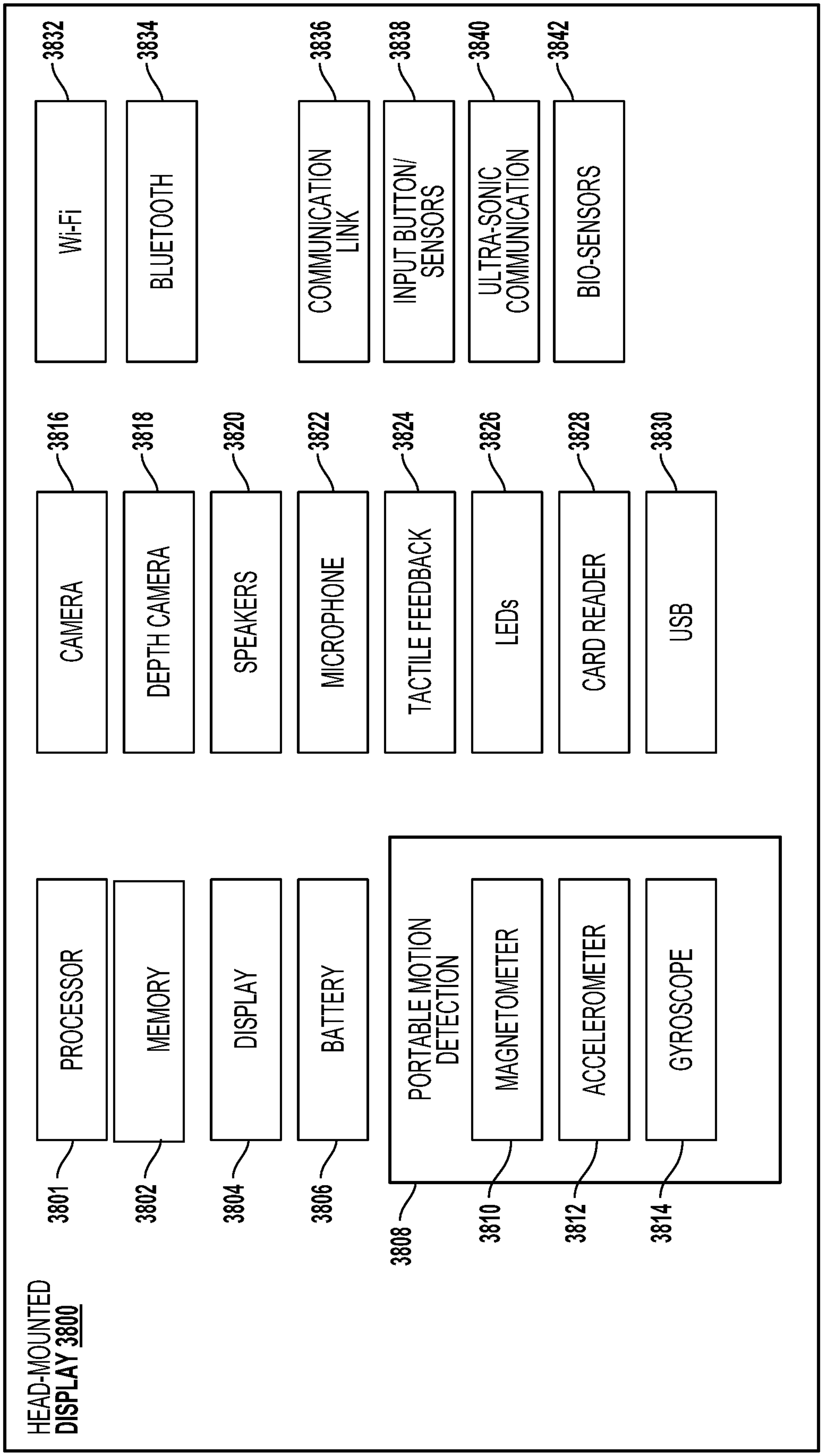
FIG. 38 is a diagram illustrating components of a head-mounted display (HMD).

With reference to FIG. 38, a diagram illustrating components of an HMD 3800 is shown. The HMD 3800 is an example of the HMD 3705 (FIG. 37). The HMD 3800 includes a processor 3801 for executing program instructions. A memory device 3802 is provided for storage purposes. Examples of the memory device 3802 include a volatile memory, a non-volatile memory, or a combination thereof. A display device 3804 is included which provides a visual interface, e.g., display of image frames generated from save data, etc., that the player views. A battery 3806 is provided as a power source for the HMD 3800. A motion detection module 3808 includes any of various kinds of motion sensitive hardware, such as a magnetometer 3810, an accelerometer 3812, and a gyroscope 3814.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 3812 are used to provide the direction of gravity, which gives an absolute reference for two angles, e.g., world-space pitch and world-space roll, etc.

A magnetometer measures a strength and a direction of a magnetic field in a vicinity of the HMD 3800. In some embodiments, three magnetometers 3810 are used within the HMD 3800, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 3814, a camera 3816, etc. In one embodiment, the accelerometer 3812 is used together with magnetometer 3810 to obtain the inclination and azimuth of the HMD 3800.

A gyroscope is a device for measuring or maintaining orientation, based on the principles of angular momentum. In one embodiment, instead of the gyroscope 3814, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 3816 is provided for capturing images and image streams of a real-world environment, e.g., room, cabin, natural environment, etc., surrounding the player. In various embodiments, more than one camera is included in the HMD 3800, including a camera that is rear-facing, e.g., directed away from the player, when the player is viewing the display of the HMD 3800, etc., and a camera that is front-facing, e.g., directed towards the player when the player is viewing the display of the HMD 3800, etc. Additionally, in several embodiments, a depth camera 3818 is included in the HMD 3800 for sensing depth information of objects in the real-world environment.

The HMD 3800 includes speakers 3820 for providing audio output. Also, a microphone 3822 is included, in some embodiments, for capturing audio from the real-world environment, including sounds from an ambient environment, and speech made by the player, etc. The HMD 3800 includes a tactile feedback module 3824, e.g., a vibration device, etc., for providing tactile feedback to the player. In one embodiment, the tactile feedback module 3824 is capable of causing movement and/or vibration of the HMD 3800 to provide tactile feedback to the player.

LEDs 3826 are provided as visual indicators of statuses of the HMD 3800. For example, an LED may indicate battery level, power on, etc. A card reader 3828 is provided to enable the HMD 3800 to read and write information to and from a memory card. A USB interface 3830 is included as one example of an interface for enabling connection of peripheral devices, or connection to other devices, such as other portable devices, computers, etc. In various embodiments of the HMD 3800, any of various kinds of interfaces may be included to enable greater connectivity of the HMD 3800.

A Wi-Fi™ module 3832 is included for enabling connection to the Internet via wireless networking technologies. Also, the HMD 3800 includes a Bluetooth™ module 3834 for enabling wireless connection to other devices. A communications link 3836 is also included, in some embodiments, for connection to other devices. In one embodiment, the communications link 3836 utilizes infrared transmission for wireless communication. In other embodiments, the communications link 3836 utilizes any of various wireless or wired transmission protocols for communication with other devices.

Input buttons/sensors 3838 are included to provide an input interface for the player. Any of various kinds of input interfaces are included, such as buttons, touchpad, joystick, trackball, etc. An ultra-sonic communication module 3840 is included, in various embodiments, in the HMD 3802 for facilitating communication with other devices via ultra-sonic technologies.

Bio-sensors 3842 are included to enable detection of physiological data from the player. In one embodiment, the bio-sensors 3842 include one or more dry electrodes for detecting bio-electric signals of the player, through the player's skin.

The foregoing components of HMD 3800 have been described as merely exemplary components that may be included in HMD 3800. In various embodiments, the HMD 3800 includes or does not include some of the various aforementioned components.

Figure 39:
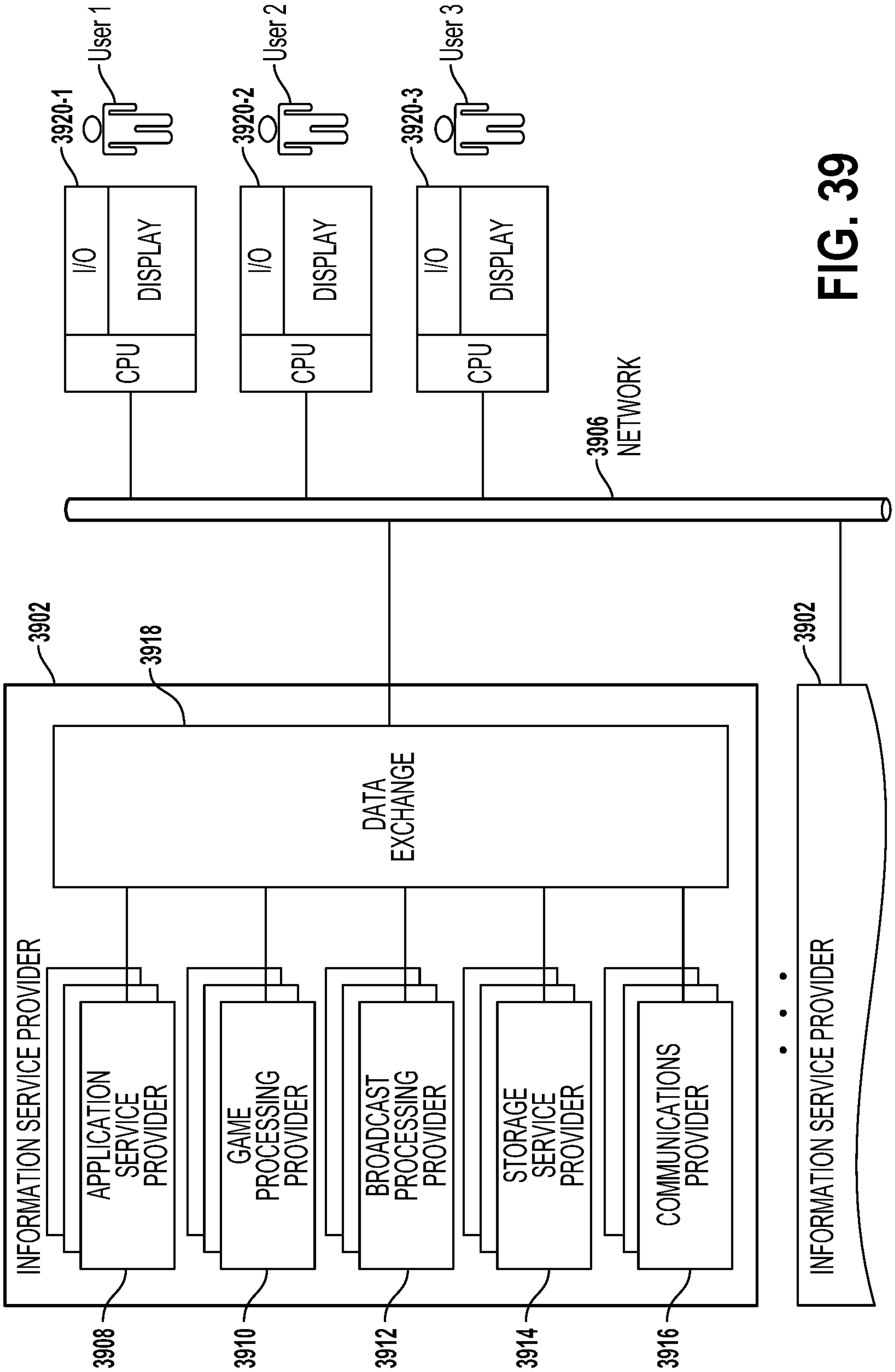
FIG. 39 illustrates an embodiment of an Information Service Provider (INSP) architecture.

FIG. 39 illustrates an embodiment of an Information Service Provider (INSP) architecture. INSPs 3902 delivers a multitude of information services to the player geographically dispersed and connected via a computer network 3906, e.g., a LAN, a WAN, or a combination thereof, etc. The computer network 3906 is an example of the computer network 3620 (FIG. 36). The user 1 operates a client device 3920-1, the user 2 operates another client device 3920-2, and a user 3 operates yet another client device 3920-3.

In some embodiments, each client device 3920-1, 3920-2, and 3920-3 includes a CPU, a display, and an input/output (I/O) interface. Examples of each client device 3920-1, 3920-2, and 3920-3 include a personal computer (PC), a mobile phone, a netbook, a tablet, a gaming system, a personal digital assistant (PDA), a combination of the game console 3700 and a display device, the HMD 3800 (FIG.

38), a combination of the game console 3700 and the HMD 3800, a desktop computer, a laptop computer, and a smart television, etc. In some embodiments, the INSP 3902 recognizes a type of a client device and adjusts a communication method employed.

In some embodiments, the INSP 3902 delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 3920-1 is served by an INSP in near proximity to the client device 3920-1 while the client device 3920-1 is in a home town of the user 1, and client device 3920-1 is served by a different INSP when the user 1 travels to a different city. The home-town INSP will transfer requested information and data to the new INSP, such that the information "follows" the client device 3920-1 to the new city making the data closer to the client device 3920-1 and easier to access. In various embodiments, a master-server relationship is established between a master INSP, which manages the information for the client device 3920-1, and a server INSP that interfaces directly with the client device 3920-1 under control from the master INSP. In some embodiments, data is transferred from one ISP to another ISP as the client device 3920-1 moves around the world to make the INSP in better position to service client device 3920-1 be the one that delivers these services.

The INSP 3902 includes an Application Service Provider (ASP) 3908, which provides computer-based services to customers over the computer network 3906. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 3920-1, 3920-2, and 3920-3 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 3906. The users 1 through 3 do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 3906, e.g., using servers, storage and logic, etc., based on how the computer network 3906 is depicted in computer network diagrams and is an abstraction for the complex infrastructure it conceals.

Further, the INSP 3902 includes a game processing provider (GPP) 3910, also sometimes referred to herein as a game processing server, which is used by the client devices 3920-1, 3920-2, and 3920-3 to play single and multiplayer video games, such as the legacy game N. Most video games played over the computer network 3906 operate via a connection to a game server. Typically, games use a dedicated server application that collects data from the client devices 3920-1, 3920-2, and 3920-3 and distributes it to other clients that are operated by other users. This is more efficient and effective than a peer-to-peer arrangement, but a separate server is used to host the server application. In some embodiments, the GPP 3910 establishes communication between the client devices 3920-1, 3920-2, and 3920-3, which exchange information without further relying on the centralized GPP 3910.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 3912, sometimes referred to herein as a broadcast processing provider, distributes audio or video signals to an audience. Broadcasting to a very narrow range of audience is sometimes called narrowcasting. A final leg of broadcast distribution is how a signal gets to the client devices 3920-1, 3920-2, and 3920-3, and the signal, in some embodiments, is distributed over the air as with a radio station or a television station to an antenna and receiver, or through a cable television or cable radio or "wireless cable" via the station. The computer network 3906 also brings, in various embodiments, either radio or television signals to the client devices 3920-1, 3920-2, and 3920-3, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 3914 provides computer storage space and related management services. The SSP 3914 also offers periodic backup and archiving. By offering storage as a service, the client devices 3920-1, 3920-2, and 3920-3 use more storage compared to when storage is not used as a service. Another major advantage is that the SSP 3914 includes backup services and the client devices 3920-1, 3920-2, and 3920-3 will not lose data if their hard drives fail. Further, a plurality of SSPs, in some embodiments, have total or partial copies of the data received from the client devices 3920-1, 3920-2, and 3920-3, allowing the client devices 3920-1, 3920-2, and 3920-3 to access data in an efficient way independently of where the client devices 3920-1, 3920-2, and 3920-3 are located or of types of the clients. For example, the player accesses personal files via a home computer, as well as via a mobile phone while the player is on the move.

A communications provider 3916 provides connectivity to the client devices 3920-1, 3920-2, and 3920-3. One kind of the communications provider 3916 is an Internet service provider (ISP), which offers access to the computer network 3906. The ISP connects the client devices 3920-1, 3920-2, and 3920-3 using a data transmission technology appropriate for delivering Internet Protocol datagrams, such as dial-up, digital subscriber line (DSL), cable modem, fiber, wireless or dedicated high-speed interconnects. The communications provider 3916 also provides, in some embodiments, messaging services, such as e-mail, instant messaging, and short message service (SMS) texting. Another type of a communications Provider is a network service provider (NSP), which sells bandwidth or network access by providing direct backbone access to the computer network 3906. Examples of network service providers include telecommunications companies, data carriers, wireless communications providers, Internet service providers, cable television operators offering high-speed Internet access, etc.

A data exchange 3918 interconnects the several modules inside INSP 602 and connects these modules to the client devices 3920-1, 3920-2, and 3920-3 via the computer network 3906. The data exchange 3918 covers, in various embodiments, a small area where all the modules of INSP 3902 are in close proximity, or covers a large geographic area when the different modules are geographically dispersed. For example, the data exchange 3902 includes a fast Gigabit Ethernet within a cabinet of a data center, or an intercontinental virtual LAN.

In some embodiments, communication between the server system 404 (FIG. 4A) and the client devices 3920-1 through 3920-3 may be facilitated using wireless technologies. Such technologies may include, for example, 5G wireless communication technologies.

In one embodiment, a video game, such as the legacy game N, as described herein, is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a CD-ROM, a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for ahead of time (AoT) compiling during a play of a legacy game, comprising:
- scanning a memory device for an executable code of the legacy game;
- decoding the executable code;
- translating the executable code into a first source code;
- compiling the first source code to output a first compiled code;
- determining whether a user input during the play of the legacy game is received;
- determining whether a fiber for servicing the user input is created, wherein the fiber provides directionality of execution between the first compiled code and a second compiled code; and
- executing, by a first processing unit, the fiber in response to determining that the fiber for servicing the user input is created, wherein the fiber is executed to direct execution of the first and second compiled codes to generate one or more image frames of the legacy game.

2. The method of claim 1, further comprising:
- determining whether the first compiled code is located within one or more native libraries in response to determining that the fiber is not created, wherein the first compiled code is for servicing the user input;

creating the fiber after locating the first compiled code within the one or more native libraries, wherein said executing the fiber is performed after said creating the fiber.

3. The method of claim 2, further comprising:

determining whether one or more basic blocks for servicing the user input are cached in response to determining that the first compiled code is not located within the one or more native libraries;

executing the one or more basic blocks for servicing the user input in response to determining that the one or more basic blocks are cached.

4. The method of claim 1, wherein said scanning for the executable code comprises distinguishing the executable code of the legacy game from data of the legacy game, the method further comprising providing the executable code for said decoding without providing the data for said decoding.

5. The method of claim 4, wherein the data includes image data or audio data.

6. The method of claim 1, wherein the directionality provides a sequence of operation of the first compiled and the second compiled code.

7. The method of claim 1, wherein the fiber includes an operation of storing one or more states of one or more registers of a cache, an operation of switching from the first compiled code to the second compiled code, an operation of restoring the one or more states of the one or more registers after execution of the second compiled code, and an operation of switching from the second compiled code to the first compiled code.

8. The method of claim 7, wherein said scanning is performed by a second processing unit, wherein the cache is of a game console, wherein the fiber is stored in the cache, wherein the cache is configured to be accessed by the first processing unit.

9. The method of claim 8, wherein the first processing unit is located within the game console and the second processing unit is located within a server system.

10. The method of claim 1, wherein the second compiled code includes a periodic refresh image operation of refreshing one of the one or more image frames or a periodic refresh audio operation of refreshing sound that is output with the one of the one or more image frames.

11. The method of claim 1, wherein said scanning the memory device, said decoding the executable code, said translating the executable code, and said compiling the first source code are performed before the user input is received.

12. A system for ahead of time (AoT) compiling during a play of a legacy game, comprising a first computing device including:

a scanner configured to scan a memory device for an executable code of the legacy game;

a decoder configured to decode the executable code;

a translator configured to translate the executable code into a first source code; and a compiler configured to compile the first source code to output a first compiled code; and a second computing device configured to be coupled to the first computing device, wherein the second computing device is configured to:

determine whether a user input during the play of the legacy game is received;

determine whether a fiber for servicing the user input is created, wherein the fiber provides directionality of execution between the first compiled code and a second compiled code; and execute the fiber when it is determined that the fiber for servicing the user input is created, wherein the fiber is executed to direct execution of the first and second compiled codes to generate one or more image frames of the legacy game.

13. The system of claim 12, wherein the second computing device is configured to:

determine whether the first compiled code is located within one or more native libraries when it is determined that the fiber is not created, wherein the first compiled code is for servicing the user input;

create the fiber after locating the first compiled code within the one or more native libraries, wherein the fiber is executed after the fiber is created.

14. The system of claim 13, wherein the second computing device is configured to:

determine whether one or more basic blocks for servicing the user input are cached when it is determined that the first compiled code is not located within the one or more native libraries;

execute the one or more basic blocks for servicing the user input when it is determined that the one or more basic blocks are cached.

15. The system of claim 12, wherein the scanner is configured to distinguish the executable code of the legacy game from data of the legacy game, wherein the scanner is configured to provide the executable code to the decoder without providing the data to the decoder.

16. The system of claim 15, wherein the data includes image data or audio data.

17. The system of claim 12, wherein the directionality provides a sequence of operation of the first compiled and the second compiled code.

18. The system of claim 12, wherein the second computing device includes a cache, wherein the fiber is configured to store one or more states of one or more registers of the cache, switch from the first compiled code to the second compiled code, restore the one or more states of the one or more registers after the second compiled code is executed, and switch from the second compiled code to the first compiled code.

19. The system of claim 12, wherein the first computing device is located within a server system and the second computing device is located within a game console.

20. The system of claim 12, wherein the first computing device is a host computer and the second computing device is a game console.

21. A non-transitory computer readable medium containing program instructions for ahead of time (AoT) compiling during a play of a legacy game, wherein execution of the program instructions by one or more processors of a computer system causes the one or more processors to carry out a plurality of operations comprising:

scanning a memory device for an executable code of the legacy game;

decoding the executable code;

translating the executable code into a first source code;

compiling the first source code to output a first compiled code;

determining whether a user input during the play of the legacy game is received;

determining whether a fiber for servicing the user input is created, wherein the fiber provides directionality of execution between the first compiled code and a second compiled code; and executing, by a first processing unit, the fiber in response to determining that the fiber for servicing the user input is created, wherein the fiber is executed to direct execution of the first and second compiled codes to generate one or more image frames of the legacy game.

22. The non-transitory computer readable medium of claim 21, wherein the plurality of operations further comprise:

determining whether the first compiled code is located within one or more native libraries in response to determining that the fiber is not created, wherein the first compiled code is for servicing the user input;

creating the fiber after locating the first compiled code within the one or more native libraries, wherein said executing the fiber is performed after said creating the fiber.

* * * * *